US008127060B2

(12) United States Patent
    Doll et al.

(10) Patent No.: US 8,127,060 B2
(45) Date of Patent: Feb. 28, 2012

(54) METHODS AND APPARATUS FOR CONTROL CONFIGURATION WITH CONTROL OBJECTS THAT ARE FIELDBUS PROTOCOL-AWARE

(75) Inventors: Benno Doll, Fellbach (DE); Vladimir Kostadinov, Sharon, MA (US); Keith E. Eldridge, North Easton, MA (US)

(73) Assignee: Invensys Systems, Inc, Foxboro, MA (US)

( * ) Notice: Subject to any disclaimer, the term of this patent is extended or adjusted under 35 U.S.C. 154(b) by 212 days.

(21) Appl. No.: 12/474,942

(22) Filed: May 29, 2009

(65) Prior Publication Data

US 2010/0305720 A1 Dec. 2, 2010

(51) Int. Cl.
    *G06F 13/00* (2006.01)
    *G06F 15/16* (2006.01)
(52) U.S. Cl. ............................. 710/104; 700/86; 709/211
(58) Field of Classification Search .................... 710/104
    See application file for complete search history.

(56) References Cited

U.S. PATENT DOCUMENTS

| | | | |
|---|---|---|---|
| 3,096,434 A | 7/1963 | King | |
| 3,404,264 A | 10/1968 | Kugler | |
| 3,665,172 A | 5/1972 | Spaargaren et al. | |
| 3,701,280 A | 10/1972 | Stroman | |
| 3,802,590 A | 4/1974 | Culver | |
| 3,810,119 A | 5/1974 | Zieve et al. | |
| 3,825,905 A | 7/1974 | Allen, Jr. | |
| 3,959,772 A | 5/1976 | Wakasa et al. | |
| 4,006,464 A | 2/1977 | Landell | |
| RE29,383 E | 9/1977 | Gallatin et al. | |
| 4,058,975 A | 11/1977 | Gilbert et al. | |
| 4,096,566 A | 6/1978 | Borie et al. | |
| 4,276,593 A | 6/1981 | Hansen | |
| 4,302,820 A | 11/1981 | Struger et al. | |
| 4,312,068 A | 1/1982 | Goss et al. | |
| 4,323,966 A | 4/1982 | Whiteside et al. | |
| 4,347,563 A | 8/1982 | Paredes et al. | |
| 4,351,023 A | 9/1982 | Richer | |
| 4,377,000 A | 3/1983 | Staab | |
| 4,410,942 A | 10/1983 | Milligan et al. | |
| 4,413,314 A | 11/1983 | Slater et al. | |

(Continued)

OTHER PUBLICATIONS

U.S. Appl. No. 09/721,409, Venkatraman et al.

(Continued)

*Primary Examiner* — Ryan Stiglic
(74) *Attorney, Agent, or Firm* — Edward Jarmolowicz

(57) ABSTRACT

The invention provides, in some aspects, improved apparatus for configuring a control system. The apparatus includes a model made up of objects representing devices of such a system, including, at least one device that defines and/or controls communications on at least a portion of a network within that system. That device is referred to, here, as a "bus master" and the portion of the network is referred to as a "segment." The object (or objects) representing the bus master can include information defining timings, port assignments and/or other aspects of the configuration of the segment. A download service transfers configuration information from objects in the model to devices in the control system. This includes transferring to the bus master communications configuration information for the segment. A download service according to this aspect of the invention generates—e.g., for logging by a change tracking system— indicia of the configuration information transferred to the bus master. The download service can likewise generate for logging (by the change tracking system) information transferred from the model to other devices in control system.

14 Claims, 57 Drawing Sheets

Process Control System

U.S. PATENT DOCUMENTS

| | | |
|---|---|---|
| 4,423,486 A | 12/1983 | Berner |
| 4,428,044 A | 1/1984 | Liron |
| 4,435,762 A | 3/1984 | Milligan et al. |
| 4,443,861 A | 4/1984 | Slater |
| 4,456,997 A | 6/1984 | Spitza |
| 4,466,098 A | 8/1984 | Southard |
| 4,471,457 A | 9/1984 | Videki, II |
| 4,488,226 A | 12/1984 | Wagner, Jr. et al. |
| 4,493,027 A | 1/1985 | Katz et al. |
| 4,530,234 A | 7/1985 | Cullick et al. |
| 4,609,995 A | 9/1986 | Hasebe |
| 4,612,620 A | 9/1986 | Davis et al. |
| 4,615,001 A | 9/1986 | Hudgins, Jr. |
| 4,628,437 A | 12/1986 | Poschmann et al. |
| 4,633,217 A | 12/1986 | Akano |
| 4,639,852 A | 1/1987 | Motomiya |
| 4,641,269 A | 2/1987 | Japenga et al. |
| 4,641,276 A | 2/1987 | Dunki-Jacobs |
| 4,648,064 A | 3/1987 | Morley |
| 4,649,479 A | 3/1987 | Advani et al. |
| 4,663,704 A | 5/1987 | Jones et al. |
| 4,672,530 A | 6/1987 | Schuss |
| 4,675,812 A | 6/1987 | Capowski et al. |
| 4,682,158 A | 7/1987 | Ito et al. |
| 4,682,304 A | 7/1987 | Tierney |
| 4,683,530 A | 7/1987 | Quatse |
| 4,692,859 A | 9/1987 | Ott |
| 4,692,918 A | 9/1987 | Elliott et al. |
| 4,703,421 A | 10/1987 | Abrant et al. |
| 4,704,676 A | 11/1987 | Flanagan et al. |
| 4,709,325 A | 11/1987 | Yajima |
| 4,719,593 A | 1/1988 | Threewitt et al. |
| 4,727,477 A | 2/1988 | Gavril |
| 4,733,366 A | 3/1988 | Deyesso et al. |
| 4,740,955 A | 4/1988 | Litterer et al. |
| 4,742,349 A | 5/1988 | Miesterfeld et al. |
| 4,750,109 A | 6/1988 | Kita |
| 4,770,841 A | 9/1988 | Haley et al. |
| 4,790,762 A | 12/1988 | Harms et al. |
| 4,800,512 A | 1/1989 | Busch |
| 4,805,107 A | 2/1989 | Kieckhafer et al. |
| 4,806,905 A | 2/1989 | McGowan, III et al. |
| 4,816,996 A | 3/1989 | Hill et al. |
| 4,817,094 A | 3/1989 | Lebizay et al. |
| 4,839,854 A | 6/1989 | Sakami et al. |
| 4,872,106 A | 10/1989 | Slater |
| 4,885,707 A | 12/1989 | Nichol et al. |
| 4,896,290 A | 1/1990 | Rhodes et al. |
| 4,897,777 A | 1/1990 | Janke et al. |
| RE33,162 E | 2/1990 | Yoshida et al. |
| 4,910,658 A | 3/1990 | Dudash et al. |
| 4,910,691 A | 3/1990 | Skeirik |
| 4,918,690 A | 4/1990 | Markkula, Jr. et al. |
| 4,924,462 A | 5/1990 | Sojka |
| 4,926,158 A | 5/1990 | Zeigler |
| 4,934,196 A | 6/1990 | Romano |
| 4,940,974 A | 7/1990 | Sojka |
| 4,958,277 A | 9/1990 | Hill et al. |
| 4,959,774 A | 9/1990 | Davis |
| 4,965,717 A | 10/1990 | Cutts, Jr. et al. |
| 4,965,742 A | 10/1990 | Skeirik |
| 4,965,880 A | 10/1990 | Petitjean |
| 4,991,076 A | 2/1991 | Zifferer et al. |
| 4,991,170 A | 2/1991 | Kem |
| 5,008,805 A | 4/1991 | Fiebig et al. |
| 5,050,165 A | 9/1991 | Yoshioka et al. |
| 5,068,778 A | 11/1991 | Kosem et al. |
| 5,089,927 A | 2/1992 | Bulan et al. |
| 5,089,974 A | 2/1992 | Demeyer et al. |
| 5,109,692 A | 5/1992 | Fitzgerald |
| 5,121,318 A | 6/1992 | Lipner et al. |
| 5,122,948 A | 6/1992 | Zapolin |
| 5,124,908 A | 6/1992 | Broadbent |
| 5,129,087 A | 7/1992 | Will |
| 5,131,092 A | 7/1992 | Sackmann et al. |
| 5,134,574 A | 7/1992 | Beaverstock et al. |
| 5,136,704 A | 8/1992 | Danielsen et al. |
| 5,138,708 A | 8/1992 | Vosbury |
| 5,140,677 A | 8/1992 | Fleming et al. |
| 5,146,589 A | 9/1992 | Peet, Jr. et al. |
| 5,150,289 A | 9/1992 | Badavas |
| 5,151,930 A | 9/1992 | Hagl |
| 5,151,978 A | 9/1992 | Bronikowski et al. |
| 5,151,981 A | 9/1992 | Westcott et al. |
| 5,159,673 A | 10/1992 | Sackmann et al. |
| 5,162,986 A | 11/1992 | Graber et al. |
| 5,163,055 A | 11/1992 | Lee et al. |
| 5,164,894 A | 11/1992 | Cunningham-Reid et al. |
| 5,166,685 A | 11/1992 | Campbell, Jr. et al. |
| 5,167,009 A | 11/1992 | Skeirik |
| 5,168,276 A | 12/1992 | Huston et al. |
| 5,168,441 A | 12/1992 | Onarheim et al. |
| 5,170,340 A | 12/1992 | Prokop et al. |
| 5,175,698 A | 12/1992 | Barbanell |
| 5,175,829 A | 12/1992 | Stumpf et al. |
| 5,181,978 A | 1/1993 | Ochiai |
| 5,193,175 A | 3/1993 | Cutts, Jr. et al. |
| 5,197,114 A | 3/1993 | Skeirik |
| 5,202,961 A | 4/1993 | Mills et al. |
| 5,212,784 A | 5/1993 | Sparks |
| 5,218,187 A | 6/1993 | Koenck et al. |
| 5,224,203 A | 6/1993 | Skeirik |
| 5,233,615 A | 8/1993 | Goetz |
| 5,245,704 A | 9/1993 | Weber et al. |
| 5,249,274 A | 9/1993 | Sztipanovits et al. |
| 5,251,125 A | 10/1993 | Karnowski et al. |
| 5,255,367 A | 10/1993 | Bruckert et al. |
| 5,257,208 A | 10/1993 | Brown et al. |
| 5,258,999 A | 11/1993 | Wernimont et al. |
| 5,271,013 A | 12/1993 | Gleeson |
| 5,276,901 A | 1/1994 | Howell et al. |
| 5,283,729 A | 2/1994 | Lloyd |
| 5,289,365 A | 2/1994 | Caldwell et al. |
| 5,291,390 A | 3/1994 | Satou |
| 5,295,258 A | 3/1994 | Jewett et al. |
| 5,295,263 A | 3/1994 | Kojima et al. |
| 5,297,143 A | 3/1994 | Fridrich et al. |
| 5,301,346 A | 4/1994 | Notarianni et al. |
| 5,302,952 A | 4/1994 | Campbell, Jr. et al. |
| 5,303,227 A | 4/1994 | Herold et al. |
| 5,303,375 A | 4/1994 | Collins et al. |
| 5,303,392 A | 4/1994 | Carney et al. |
| 5,307,346 A | 4/1994 | Fieldhouse |
| 5,307,372 A | 4/1994 | Sawyer et al. |
| 5,307,463 A | 4/1994 | Hyatt et al. |
| 5,309,556 A | 5/1994 | Sismilich |
| 5,310,998 A | 5/1994 | Okuno |
| 5,317,726 A | 5/1994 | Horst |
| 5,325,339 A | 6/1994 | Yost et al. |
| 5,327,144 A | 7/1994 | Stilp et al. |
| 5,335,186 A | 8/1994 | Tarrant |
| 5,335,221 A | 8/1994 | Snowbarger et al. |
| 5,339,362 A | 8/1994 | Harris |
| 5,339,680 A | 8/1994 | Bronkal et al. |
| 5,347,181 A | 9/1994 | Ashby et al. |
| 5,349,343 A | 9/1994 | Oliver |
| 5,349,678 A | 9/1994 | Morris et al. |
| 5,352,033 A | 10/1994 | Gresham et al. |
| 5,353,217 A | 10/1994 | Berghs et al. |
| 5,359,721 A | 10/1994 | Kempf et al. |
| 5,361,198 A | 11/1994 | Harmon et al. |
| 5,367,640 A | 11/1994 | Hamilton et al. |
| 5,371,895 A | 12/1994 | Bristol |
| 5,377,315 A | 12/1994 | Leggett |
| 5,381,529 A | 1/1995 | Matsushima |
| 5,384,910 A | 1/1995 | Torres |
| 5,386,373 A | 1/1995 | Keeler et al. |
| 5,386,417 A | 1/1995 | Daugherty et al. |
| 5,390,321 A | 2/1995 | Proesel |
| 5,392,280 A | 2/1995 | Zheng |
| 5,392,389 A | 2/1995 | Fleming |
| 5,394,522 A | 2/1995 | Sanchez-Frank et al. |
| 5,398,331 A | 3/1995 | Huang et al. |
| 5,400,140 A | 3/1995 | Johnston |
| 5,405,779 A | 4/1995 | McCabe et al. |
| 5,408,603 A | 4/1995 | Van de Lavoir et al. |
| 5,410,141 A | 4/1995 | Koenck et al. |

| Patent No. | Date | Inventor |
|---|---|---|
| 5,410,492 A | 4/1995 | Gross et al. |
| 5,410,717 A | 4/1995 | Floro |
| 5,420,977 A | 5/1995 | Sztipanovits et al. |
| 5,421,017 A | 5/1995 | Scholz et al. |
| 5,422,816 A | 6/1995 | Sprague et al. |
| 5,426,732 A | 6/1995 | Boies et al. |
| 5,428,734 A | 6/1995 | Haynes et al. |
| 5,428,769 A | 6/1995 | Glaser et al. |
| 5,428,781 A | 6/1995 | Duault et al. |
| 5,432,705 A | 7/1995 | Severt et al. |
| 5,432,711 A | 7/1995 | Jackson et al. |
| 5,434,952 A | 7/1995 | Yen et al. |
| 5,434,997 A | 7/1995 | Landry et al. |
| 5,437,007 A | 7/1995 | Bailey et al. |
| 5,440,237 A | 8/1995 | Brown et al. |
| 5,442,639 A | 8/1995 | Crowder et al. |
| 5,442,791 A | 8/1995 | Wrabetz et al. |
| 5,444,851 A | 8/1995 | Woest |
| 5,444,861 A | 8/1995 | Adamec et al. |
| 5,450,403 A | 9/1995 | Ichii et al. |
| 5,450,425 A | 9/1995 | Gunn et al. |
| 5,450,764 A | 9/1995 | Johnston |
| 5,451,923 A | 9/1995 | Seberger et al. |
| 5,451,939 A | 9/1995 | Price |
| 5,452,201 A | 9/1995 | Pieronek et al. |
| 5,453,933 A | 9/1995 | Wright et al. |
| 5,457,797 A | 10/1995 | Butterworth et al. |
| 5,459,825 A | 10/1995 | Anderson et al. |
| 5,459,839 A | 10/1995 | Swarts et al. |
| 5,461,611 A | 10/1995 | Drake, Jr. et al. |
| 5,461,710 A | 10/1995 | Bloomfield et al. |
| 5,463,735 A | 10/1995 | Pascucci et al. |
| 5,467,264 A | 11/1995 | Rauch et al. |
| 5,469,150 A | 11/1995 | Sitte |
| 5,469,570 A | 11/1995 | Shibata |
| 5,475,856 A | 12/1995 | Kogge |
| 5,481,715 A | 1/1996 | Hamilton et al. |
| 5,481,718 A | 1/1996 | Ryu et al. |
| 5,481,741 A | 1/1996 | McKaskle et al. |
| 5,483,660 A | 1/1996 | Yishay et al. |
| 5,485,617 A | 1/1996 | Stutz et al. |
| 5,485,620 A | 1/1996 | Sadre et al. |
| 5,490,276 A | 2/1996 | Doli, Jr. et al. |
| 5,491,625 A | 2/1996 | Pressnall et al. |
| 5,491,791 A | 2/1996 | Glowny et al. |
| 5,493,534 A | 2/1996 | Mok |
| 5,499,023 A | 3/1996 | Goldschmidt |
| 5,499,365 A | 3/1996 | Anderson et al. |
| 5,499,371 A | 3/1996 | Henninger et al. |
| 5,500,934 A | 3/1996 | Austin et al. |
| 5,501,608 A | 3/1996 | Scheer et al. |
| 5,504,672 A | 4/1996 | Hardiman et al. |
| 5,504,895 A | 4/1996 | Kurosawa et al. |
| 5,504,902 A | 4/1996 | McGrath et al. |
| 5,509,811 A | 4/1996 | Homic |
| 5,513,095 A | 4/1996 | Pajonk |
| 5,513,192 A | 4/1996 | Janku et al. |
| 5,513,354 A | 4/1996 | Dwork et al. |
| 5,517,645 A | 5/1996 | Stutz et al. |
| 5,517,655 A | 5/1996 | Collins et al. |
| 5,519,605 A | 5/1996 | Cawlfield |
| 5,519,701 A | 5/1996 | Colmant et al. |
| 5,522,044 A | 5/1996 | Pascucci et al. |
| 5,526,287 A | 6/1996 | French |
| 5,526,353 A | 6/1996 | Henley et al. |
| 5,530,377 A | 6/1996 | Walls |
| 5,530,643 A | 6/1996 | Hodorowski |
| 5,530,868 A | 6/1996 | Record et al. |
| 5,531,328 A | 7/1996 | Rochelo et al. |
| 5,534,912 A | 7/1996 | Kostreski |
| 5,535,425 A | 7/1996 | Watanabe |
| 5,537,548 A | 7/1996 | Fin et al. |
| 5,539,638 A | 7/1996 | Keeler et al. |
| 5,539,909 A | 7/1996 | Tanaka et al. |
| 5,541,810 A | 7/1996 | Donhauser et al. |
| 5,542,039 A | 7/1996 | Brinson et al. |
| 5,544,008 A | 8/1996 | Dimmick et al. |
| 5,544,073 A | 8/1996 | Piety et al. |
| 5,544,321 A | 8/1996 | Theimer et al. |
| 5,548,528 A | 8/1996 | Keeler et al. |
| 5,549,137 A | 8/1996 | Lenz et al. |
| 5,550,980 A | 8/1996 | Pascucci et al. |
| 5,551,047 A | 8/1996 | Mori et al. |
| 5,555,213 A | 9/1996 | DeLong |
| 5,555,416 A | 9/1996 | Owens et al. |
| 5,555,437 A | 9/1996 | Packer |
| 5,555,510 A | 9/1996 | Verseput et al. |
| 5,557,559 A | 9/1996 | Rhodes |
| 5,559,691 A | 9/1996 | Monta et al. |
| 5,559,963 A | 9/1996 | Gregg et al. |
| 5,561,770 A | 10/1996 | de Bruijn et al. |
| 5,563,400 A | 10/1996 | Le Roux |
| 5,564,055 A | 10/1996 | Asnaashari et al. |
| 5,566,320 A | 10/1996 | Hubert |
| 5,568,378 A | 10/1996 | Wojsznis |
| 5,570,300 A | 10/1996 | Henry et al. |
| 5,572,643 A | 11/1996 | Judson |
| 5,572,673 A | 11/1996 | Shurts |
| 5,576,946 A | 11/1996 | Bender et al. |
| 5,579,220 A | 11/1996 | Barthel et al. |
| 5,579,487 A | 11/1996 | Meyerson et al. |
| 5,581,760 A | 12/1996 | Atkinson et al. |
| 5,586,066 A | 12/1996 | White et al. |
| 5,586,112 A | 12/1996 | Tabata |
| 5,586,156 A | 12/1996 | Gaubatz |
| 5,586,329 A | 12/1996 | Knudsen et al. |
| 5,586,330 A | 12/1996 | Knudsen et al. |
| 5,587,899 A | 12/1996 | Ho et al. |
| 5,594,858 A | 1/1997 | Blevins |
| 5,594,899 A | 1/1997 | Knudsen et al. |
| 5,596,331 A | 1/1997 | Bonaffini et al. |
| 5,596,752 A | 1/1997 | Knudsen et al. |
| 5,598,536 A | 1/1997 | Slaughter, III et al. |
| 5,598,566 A | 1/1997 | Pascucci et al. |
| 5,600,845 A | 2/1997 | Gilson |
| 5,602,749 A | 2/1997 | Vosburgh |
| 5,604,737 A | 2/1997 | Iwami et al. |
| 5,604,871 A | 2/1997 | Pecone |
| 5,608,607 A | 3/1997 | Dittmer |
| 5,608,608 A | 3/1997 | Flint et al. |
| 5,611,057 A | 3/1997 | Pecone et al. |
| 5,613,148 A | 3/1997 | Bezviner et al. |
| 5,613,164 A | 3/1997 | DiAngelo et al. |
| 5,613,190 A | 3/1997 | Hylton |
| 5,617,540 A | 4/1997 | Civanlar et al. |
| 5,621,871 A | 4/1997 | Jaremko et al. |
| 5,621,890 A | 4/1997 | Notarianni et al. |
| 5,623,592 A | 4/1997 | Carlson et al. |
| 5,623,670 A | 4/1997 | Bohannon et al. |
| 5,627,979 A | 5/1997 | Chang et al. |
| 5,629,872 A | 5/1997 | Gross et al. |
| 5,629,949 A | 5/1997 | Zook |
| 5,630,056 A | 5/1997 | Horvath et al. |
| 5,630,152 A | 5/1997 | DeLuca et al. |
| 5,633,811 A | 5/1997 | Canada et al. |
| 5,642,259 A | 6/1997 | Ma |
| 5,642,511 A | 6/1997 | Chow et al. |
| 5,648,768 A | 7/1997 | Bouve |
| 5,649,121 A | 7/1997 | Budman et al. |
| 5,655,092 A | 8/1997 | Ojala |
| 5,659,680 A | 8/1997 | Cunningham et al. |
| 5,659,727 A | 8/1997 | Velissaropoulos et al. |
| 5,664,101 A | 9/1997 | Picache |
| 5,664,168 A | 9/1997 | Yishay et al. |
| 5,671,374 A | 9/1997 | Postman et al. |
| 5,671,436 A | 9/1997 | Morris et al. |
| 5,673,401 A | 9/1997 | Volk et al. |
| 5,676,141 A | 10/1997 | Hollub |
| 5,680,404 A | 10/1997 | Gray |
| 5,680,409 A | 10/1997 | Qin et al. |
| 5,682,317 A | 10/1997 | Keeler et al. |
| 5,682,476 A | 10/1997 | Tapperson et al. |
| 5,687,316 A | 11/1997 | Graziano et al. |
| 5,691,897 A | 11/1997 | Brown et al. |
| 5,700,090 A | 12/1997 | Eryurek |
| 5,701,414 A | 12/1997 | Cheng et al. |
| 5,701,484 A | 12/1997 | Artsy |
| 5,704,011 A | 12/1997 | Hansen et al. |

| Patent | Date | Inventor |
|---|---|---|
| 5,706,502 A | 1/1998 | Foley et al. |
| 5,708,709 A | 1/1998 | Rose |
| 5,708,779 A | 1/1998 | Graziano et al. |
| 5,713,045 A | 1/1998 | Berdahl |
| 5,715,178 A | 2/1998 | Scarola et al. |
| 5,716,221 A | 2/1998 | Kantner |
| 5,717,880 A | 2/1998 | Imai et al. |
| 5,717,925 A | 2/1998 | Harper et al. |
| 5,719,761 A | 2/1998 | Gatti et al. |
| 5,724,025 A | 3/1998 | Tavori |
| 5,726,911 A | 3/1998 | Canada et al. |
| 5,726,912 A | 3/1998 | Krall, Jr. et al. |
| 5,727,128 A | 3/1998 | Morrison |
| 5,732,074 A | 3/1998 | Spaur et al. |
| 5,732,218 A | 3/1998 | Bland et al. |
| 5,734,902 A | 3/1998 | Atkins et al. |
| 5,737,529 A | 4/1998 | Dolin, Jr. et al. |
| 5,740,429 A | 4/1998 | Wang et al. |
| 5,740,441 A | 4/1998 | Yellin et al. |
| 5,742,596 A | 4/1998 | Baratz et al. |
| 5,742,762 A | 4/1998 | Scholl et al. |
| 5,745,049 A | 4/1998 | Akiyama et al. |
| 5,746,511 A | 5/1998 | Eryurek et al. |
| 5,748,467 A | 5/1998 | Qin et al. |
| 5,748,896 A | 5/1998 | Daly et al. |
| 5,748,912 A | 5/1998 | Lee |
| 5,751,574 A | 5/1998 | Loebig |
| 5,752,007 A | 5/1998 | Morrison |
| 5,752,008 A | 5/1998 | Bowling |
| 5,752,246 A | 5/1998 | Rogers et al. |
| 5,754,189 A | 5/1998 | Doi et al. |
| 5,754,772 A | 5/1998 | Leaf |
| 5,754,830 A | 5/1998 | Butts et al. |
| 5,757,925 A | 5/1998 | Faybishenko |
| 5,758,073 A | 5/1998 | Liang et al. |
| 5,758,075 A | 5/1998 | Graziano et al. |
| 5,761,033 A | 6/1998 | Wilhelm |
| 5,761,090 A | 6/1998 | Gross et al. |
| 5,761,405 A | 6/1998 | Tadamura et al. |
| 5,761,421 A | 6/1998 | van Hoff et al. |
| 5,761,477 A | 6/1998 | Wahbe et al. |
| 5,761,499 A | 6/1998 | Sonderegger |
| 5,761,518 A | 6/1998 | Boehling et al. |
| 5,764,906 A | 6/1998 | Edelstein et al. |
| 5,768,119 A | 6/1998 | Havekost et al. |
| 5,768,510 A | 6/1998 | Gish |
| 5,774,378 A | 6/1998 | Yang |
| 5,774,670 A | 6/1998 | Montulli |
| 5,777,874 A | 7/1998 | Flood et al. |
| 5,778,368 A | 7/1998 | Hogan et al. |
| 5,784,557 A | 7/1998 | Oprescu |
| 5,786,119 A | 7/1998 | Sorriero et al. |
| 5,787,247 A | 7/1998 | Norin et al. |
| 5,787,272 A | 7/1998 | Gupta et al. |
| 5,787,280 A | 7/1998 | Joseph et al. |
| 5,790,791 A | 8/1998 | Chong et al. |
| 5,793,963 A | 8/1998 | Tapperson et al. |
| 5,794,071 A | 8/1998 | Watanabe et al. |
| 5,796,602 A | 8/1998 | Wellan et al. |
| 5,797,038 A | 8/1998 | Crawford et al. |
| 5,801,770 A | 9/1998 | Paff et al. |
| 5,801,942 A | 9/1998 | Nixon et al. |
| 5,802,389 A | 9/1998 | McNutt |
| 5,805,153 A | 9/1998 | Nielsen |
| 5,805,442 A | 9/1998 | Crater et al. |
| 5,805,889 A | 9/1998 | Van De Vanter |
| 5,805,922 A | 9/1998 | Sim et al. |
| 5,809,247 A | 9/1998 | Richardson et al. |
| 5,812,394 A | 9/1998 | Lewis et al. |
| 5,815,152 A | 9/1998 | Collier et al. |
| 5,815,659 A | 9/1998 | Umetsu et al. |
| 5,815,710 A | 9/1998 | Martin et al. |
| 5,822,220 A | 10/1998 | Baines |
| 5,828,567 A | 10/1998 | Eryurek et al. |
| 5,828,851 A | 10/1998 | Nixon et al. |
| 5,828,882 A | 10/1998 | Hinckley |
| 5,831,669 A | 11/1998 | Adrain |
| 5,832,268 A | 11/1998 | Anderson et al. |
| 5,832,418 A | 11/1998 | Meyer |
| 5,835,704 A | 11/1998 | Li et al. |
| 5,835,712 A | 11/1998 | DuFresne |
| 5,835,724 A | 11/1998 | Smith |
| 5,835,789 A | 11/1998 | Ueda et al. |
| 5,838,563 A | 11/1998 | Dove et al. |
| 5,838,910 A | 11/1998 | Domenikos et al. |
| 5,838,920 A | 11/1998 | Rosborough |
| 5,838,969 A | 11/1998 | Jacklin et al. |
| 5,839,094 A | 11/1998 | French |
| 5,841,360 A | 11/1998 | Binder |
| 5,841,654 A | 11/1998 | Verissimo et al. |
| 5,841,963 A | 11/1998 | Nakamikawa et al. |
| 5,841,991 A | 11/1998 | Russell |
| 5,844,601 A | 12/1998 | McPheely et al. |
| 5,844,796 A | 12/1998 | Araki |
| 5,844,804 A | 12/1998 | Schussler |
| 5,845,078 A | 12/1998 | Tezuka et al. |
| 5,845,230 A | 12/1998 | Lamberson |
| 5,847,957 A | 12/1998 | Cohen et al. |
| 5,848,274 A | 12/1998 | Hamby et al. |
| 5,848,393 A | 12/1998 | Goodridge et al. |
| 5,854,750 A | 12/1998 | Phillips et al. |
| 5,854,944 A | 12/1998 | Catherwood et al. |
| 5,859,966 A | 1/1999 | Hayman et al. |
| 5,862,052 A | 1/1999 | Nixon et al. |
| 5,864,773 A | 1/1999 | Barna et al. |
| 5,867,704 A | 2/1999 | Tanaka et al. |
| 5,872,973 A | 2/1999 | Mitchell et al. |
| 5,872,992 A | 2/1999 | Tietjen et al. |
| 5,873,089 A | 2/1999 | Regache |
| 5,874,990 A | 2/1999 | Kato |
| 5,875,430 A | 2/1999 | Koether |
| 5,876,122 A | 3/1999 | Eryurek |
| 5,878,415 A | 3/1999 | Olds |
| 5,880,775 A | 3/1999 | Ross |
| 5,884,014 A | 3/1999 | Huttenlocher et al. |
| 5,903,455 A | 5/1999 | Sharpe, Jr. et al. |
| 5,903,894 A | 5/1999 | Reneris |
| 5,905,248 A | 5/1999 | Russell et al. |
| 5,905,963 A | 5/1999 | Lysejko |
| 5,907,675 A | 5/1999 | Aahlad |
| 5,909,586 A | 6/1999 | Anderson |
| 5,917,822 A | 6/1999 | Lyles et al. |
| 5,917,840 A | 6/1999 | Cheney et al. |
| 5,919,247 A | 7/1999 | Van Hoff et al. |
| 5,920,479 A | 7/1999 | Sojoodi et al. |
| 5,922,050 A | 7/1999 | Madany |
| 5,927,398 A | 7/1999 | Maciulewicz |
| 5,928,345 A | 7/1999 | Tetzlaff et al. |
| 5,930,768 A | 7/1999 | Hooban |
| 5,935,242 A | 8/1999 | Madany et al. |
| 5,935,249 A | 8/1999 | Stern et al. |
| 5,940,294 A | 8/1999 | Dove |
| 5,940,839 A | 8/1999 | Chen et al. |
| 5,946,487 A | 8/1999 | Dangelo |
| 5,950,006 A | 9/1999 | Crater et al. |
| 5,950,172 A | 9/1999 | Klingman |
| 5,956,484 A | 9/1999 | Rosenberg et al. |
| 5,956,487 A | 9/1999 | Venkatraman et al. |
| 5,956,716 A | 9/1999 | Kenner et al. |
| 5,959,487 A | 9/1999 | Kawamura |
| 5,960,205 A | 9/1999 | Mao et al. |
| 5,960,214 A | 9/1999 | Sharpe, Jr. et al. |
| 5,966,304 A | 10/1999 | Cook et al. |
| 5,969,967 A | 10/1999 | Aahlad et al. |
| 5,970,430 A | 10/1999 | Burns et al. |
| 5,974,497 A | 10/1999 | Teshome |
| 5,975,737 A | 11/1999 | Crater et al. |
| 5,978,578 A | 11/1999 | Azarya et al. |
| 5,978,933 A | 11/1999 | Wyld et al. |
| 5,980,078 A | 11/1999 | Krivoshein et al. |
| 5,980,090 A | 11/1999 | Royal, Jr. et al. |
| 5,982,362 A | 11/1999 | Crater et al. |
| 5,982,762 A | 11/1999 | Anzai et al. |
| 5,987,506 A | 11/1999 | Carter et al. |
| 5,988,852 A | 11/1999 | Nakanishi |
| 5,994,998 A | 11/1999 | Fisher et al. |
| 5,995,916 A | 11/1999 | Nixon et al. |
| 6,002,104 A | 12/1999 | Hsu |

| | | |
|---|---|---|
| 6,006,164 A | 12/1999 | McCarty et al. |
| 6,006,171 A | 12/1999 | Vines et al. |
| 6,008,985 A | 12/1999 | Lake et al. |
| 6,009,103 A | 12/1999 | Woundy |
| 6,014,591 A | 1/2000 | Ikeda |
| 6,014,612 A | 1/2000 | Larson et al. |
| 6,016,515 A | 1/2000 | Shaw et al. |
| 6,018,627 A | 1/2000 | Iyengar et al. |
| 6,018,816 A | 1/2000 | Tateyama |
| 6,026,336 A | 2/2000 | Sakurai et al. |
| 6,026,352 A | 2/2000 | Burns et al. |
| 6,032,151 A | 2/2000 | Arnold et al. |
| 6,032,208 A | 2/2000 | Nixon et al. |
| H001845 H | 3/2000 | Kelly |
| 6,033,257 A | 3/2000 | Lake et al. |
| 6,035,264 A | 3/2000 | Donaldson et al. |
| 6,038,271 A | 3/2000 | Olaker et al. |
| 6,038,486 A | 3/2000 | Saitoh et al. |
| 6,044,305 A | 3/2000 | Larson et al. |
| 6,047,222 A | 4/2000 | Burns et al. |
| 6,049,578 A | 4/2000 | Senechal et al. |
| 6,049,775 A | 4/2000 | Gertner et al. |
| 6,052,629 A | 4/2000 | Leatherman et al. |
| 6,055,633 A | 4/2000 | Schrier et al. |
| 6,061,603 A | 5/2000 | Papadopoulos et al. |
| 6,070,186 A | 5/2000 | Nishio |
| 6,070,250 A | 5/2000 | Yeager et al. |
| 6,073,109 A | 6/2000 | Flores et al. |
| 6,075,863 A | 6/2000 | Krishnan et al. |
| 6,076,124 A | 6/2000 | Korowitz et al. |
| 6,078,320 A | 6/2000 | Dove et al. |
| 6,078,848 A | 6/2000 | Bernstein et al. |
| 6,080,207 A | 6/2000 | Kroening et al. |
| 6,085,120 A | 7/2000 | Schwerdtfeger et al. |
| 6,088,665 A | 7/2000 | Burns et al. |
| 6,094,600 A | 7/2000 | Sharpe, Jr. et al. |
| 6,094,655 A | 7/2000 | Rogers et al. |
| 6,094,684 A | 7/2000 | Pallmann |
| 6,095,674 A | 8/2000 | Verissimo et al. |
| 6,097,761 A | 8/2000 | Buhring et al. |
| 6,098,116 A | 8/2000 | Nixon et al. |
| 6,104,391 A | 8/2000 | Johnston, Jr. et al. |
| 6,104,875 A | 8/2000 | Gallagher et al. |
| 6,105,132 A | 8/2000 | Fritch et al. |
| 6,108,662 A | 8/2000 | Hoskins et al. |
| 6,112,020 A | 8/2000 | Wright |
| 6,112,246 A | 8/2000 | Horbal et al. |
| 6,115,468 A | 9/2000 | De Nicolo |
| 6,115,744 A | 9/2000 | Robins et al. |
| 6,129,449 A | 10/2000 | McCain et al. |
| 6,129,724 A | 10/2000 | Fleischman et al. |
| 6,131,067 A | 10/2000 | Girerd et al. |
| 6,133,914 A | 10/2000 | Rogers et al. |
| 6,134,559 A | 10/2000 | Brumme et al. |
| 6,138,140 A | 10/2000 | Yokote |
| 6,138,174 A | 10/2000 | Keeley |
| 6,139,177 A | 10/2000 | Venkatraman et al. |
| 6,140,911 A | 10/2000 | Fisher et al. |
| 6,141,794 A | 10/2000 | Dice et al. |
| 6,148,346 A | 11/2000 | Hanson |
| 6,148,391 A | 11/2000 | Petrick |
| 6,151,625 A | 11/2000 | Swales et al. |
| 6,154,875 A | 11/2000 | Tanaka et al. |
| 6,157,864 A | 12/2000 | Schwenke et al. |
| 6,160,484 A | 12/2000 | Spahl et al. |
| 6,167,253 A | 12/2000 | Farris et al. |
| 6,167,464 A | 12/2000 | Kretschmann |
| 6,170,007 B1 | 1/2001 | Venkatraman et al. |
| 6,173,414 B1 | 1/2001 | Zumkehr et al. |
| 6,175,556 B1 | 1/2001 | Allen, Jr. et al. |
| 6,176,421 B1 | 1/2001 | Royal, Jr. et al. |
| 6,183,289 B1 | 2/2001 | Lake et al. |
| 6,185,611 B1 | 2/2001 | Waldo et al. |
| 6,192,281 B1 | 2/2001 | Brown et al. |
| 6,195,591 B1 | 2/2001 | Nixon et al. |
| 6,195,694 B1 | 2/2001 | Chen et al. |
| 6,195,774 B1 | 2/2001 | Jacobson |
| 6,199,068 B1 | 3/2001 | Carpenter |
| 6,199,195 B1 | 3/2001 | Goodwin et al. |
| 6,201,996 B1 | 3/2001 | Crater et al. |
| 6,212,440 B1 | 4/2001 | Suzuki |
| 6,212,575 B1 | 4/2001 | Cleron et al. |
| 6,212,608 B1 | 4/2001 | Bak |
| 6,216,158 B1 | 4/2001 | Luo et al. |
| 6,218,930 B1 | 4/2001 | Katzenberg et al. |
| 6,219,708 B1 | 4/2001 | Martenson |
| 6,226,783 B1 | 5/2001 | Limondin et al. |
| 6,236,909 B1 | 5/2001 | Colson et al. |
| 6,246,748 B1 | 6/2001 | Yano |
| 6,260,187 B1 | 7/2001 | Cirne |
| 6,263,487 B1 | 7/2001 | Stripf et al. |
| 6,266,716 B1 | 7/2001 | Wilson et al. |
| 6,266,724 B1 | 7/2001 | Harari et al. |
| 6,268,789 B1 | 7/2001 | Diamant et al. |
| 6,269,473 B1 | 7/2001 | Freed et al. |
| 6,272,529 B1 | 8/2001 | Lum |
| 6,272,556 B1 | 8/2001 | Gish |
| 6,282,454 B1 | 8/2001 | Papadopoulos et al. |
| 6,282,455 B1 | 8/2001 | Engdahl |
| 6,285,966 B1 | 9/2001 | Brown et al. |
| 6,289,299 B1 | 9/2001 | Daniel, Jr. et al. |
| 6,295,356 B1 | 9/2001 | De Nicolo |
| 6,295,513 B1 | 9/2001 | Thackston |
| 6,298,377 B1 | 10/2001 | Hartikainen et al. |
| 6,308,317 B1 | 10/2001 | Wilkinson et al. |
| 6,311,101 B1 | 10/2001 | Kastner |
| 6,314,448 B1 | 11/2001 | Conner et al. |
| 6,314,464 B1 | 11/2001 | Murata et al. |
| 6,317,701 B1 | 11/2001 | Pyotsia et al. |
| 6,324,607 B1 | 11/2001 | Korowitz et al. |
| 6,327,511 B1 | 12/2001 | Naismith et al. |
| 6,332,163 B1 | 12/2001 | Bowman-Amuah |
| 6,334,161 B1 | 12/2001 | Suzuki et al. |
| 6,336,142 B1 | 1/2002 | Kato et al. |
| 6,345,295 B1 | 2/2002 | Beardsley et al. |
| 6,345,382 B1 | 2/2002 | Hughes |
| 6,348,874 B1 | 2/2002 | Cole et al. |
| 6,349,274 B1 | 2/2002 | Kay et al. |
| 6,349,287 B1 | 2/2002 | Hayashi |
| 6,353,859 B1 | 3/2002 | McKeehan et al. |
| 6,353,860 B1 | 3/2002 | Hare et al. |
| 6,360,091 B1 | 3/2002 | Schellinger et al. |
| 6,366,300 B1 | 4/2002 | Ohara et al. |
| 6,370,448 B1 | 4/2002 | Eryurek |
| 6,370,573 B1 | 4/2002 | Bowman-Amuah |
| 6,373,841 B1 | 4/2002 | Goh et al. |
| 6,377,543 B1 | 4/2002 | Grover et al. |
| 6,377,859 B1 | 4/2002 | Brown et al. |
| 6,382,226 B1 | 5/2002 | Larson et al. |
| 6,393,050 B1 | 5/2002 | Liu |
| 6,405,099 B1 | 6/2002 | Nagai et al. |
| 6,405,210 B1 | 6/2002 | Doyle et al. |
| 6,412,070 B1 | 6/2002 | Van Dyke et al. |
| 6,418,499 B1 | 7/2002 | Korowitz et al. |
| 6,424,883 B1 | 7/2002 | Hosokawa et al. |
| 6,429,885 B1 | 8/2002 | Saib et al. |
| 6,430,564 B1 | 8/2002 | Judge et al. |
| 6,434,594 B1 | 8/2002 | Wesemann |
| 6,438,182 B1 | 8/2002 | Olaker et al. |
| 6,442,442 B1 | 8/2002 | Weinhofer |
| 6,445,962 B1 | 9/2002 | Blevins et al. |
| 6,449,624 B1 | 9/2002 | Hammack et al. |
| 6,449,715 B1 | 9/2002 | Krivoshein |
| 6,480,903 B1 | 11/2002 | Voutaz et al. |
| 6,480,955 B1 | 11/2002 | DeKoning et al. |
| 6,487,214 B1 | 11/2002 | Bachar |
| 6,487,558 B1 | 11/2002 | Hitchcock |
| 6,493,405 B1 | 12/2002 | Olaker et al. |
| 6,496,892 B1 | 12/2002 | Lake et al. |
| 6,499,048 B1 | 12/2002 | Williams |
| 6,501,995 B1 | 12/2002 | Kinney et al. |
| 6,510,352 B1 | 1/2003 | Badavas et al. |
| 6,526,455 B1 | 2/2003 | Kamimura |
| 6,526,516 B1 | 2/2003 | Ishikawa et al. |
| 6,532,531 B1 | 3/2003 | O'Connor et al. |
| 6,557,056 B1 | 4/2003 | Lanteigne et al. |
| 6,563,420 B2 | 5/2003 | Brown et al. |
| 6,574,515 B1 | 6/2003 | Kirkpatrick et al. |

| | | | | | | |
|---|---|---|---|---|---|---|
| 6,574,694 B1 | 6/2003 | Chen et al. | | 2001/0034777 A1 | 10/2001 | Venkatraman et al. |
| 6,594,692 B1 | 7/2003 | Reisman | | 2001/0034778 A1 | 10/2001 | Venkatraman et al. |
| 6,598,224 B1 | 7/2003 | Maeda et al. | | 2001/0034779 A1 | 10/2001 | Venkatraman et al. |
| 6,609,147 B1 | 8/2003 | Matsuda et al. | | 2001/0034780 A1 | 10/2001 | Venkatraman et al. |
| 6,612,022 B1 | 9/2003 | Gale et al. | | 2001/0034781 A1 | 10/2001 | Venkatraman et al. |
| 6,618,754 B1 | 9/2003 | Gosling | | 2001/0037489 A1 | 11/2001 | Stripf et al. |
| 6,622,147 B1 | 9/2003 | Smiga et al. | | 2001/0044836 A1 | 11/2001 | Venkatraman et al. |
| 6,636,900 B2 | 10/2003 | Abdelnur | | 2001/0052109 A1 | 12/2001 | Nagashima et al. |
| 6,640,308 B1 | 10/2003 | Keyghobad et al. | | 2002/0013629 A1 | 1/2002 | Nixon et al. |
| 6,647,495 B1 | 11/2003 | Takeuchi et al. | | 2002/0049865 A1 | 4/2002 | Charnell et al. |
| 6,654,353 B1 | 11/2003 | Tokura et al. | | 2002/0067370 A1 | 6/2002 | Forney et al. |
| 6,671,763 B1 | 12/2003 | Korowitz et al. | | 2002/0093980 A1 | 7/2002 | Trebes |
| 6,675,193 B1 | 1/2004 | Slavin et al. | | 2002/0133636 A1 | 9/2002 | Venkatraman et al. |
| 6,687,698 B1 | 2/2004 | Nixon et al. | | 2002/0150156 A1 | 10/2002 | Calvin |
| 6,700,869 B1 | 3/2004 | Falco et al. | | 2002/0165848 A1 | 11/2002 | Rautenbach et al. |
| 6,701,284 B1 | 3/2004 | Huntley et al. | | 2002/0194393 A1 | 12/2002 | Hrischuk et al. |
| 6,718,215 B2 | 4/2004 | Friedrich et al. | | 2002/0198920 A1 | 12/2002 | Resnick et al. |
| 6,718,533 B1 | 4/2004 | Schneider et al. | | 2003/0009250 A1 | 1/2003 | Resnick et al. |
| 6,738,388 B1 | 5/2004 | Stevenson et al. | | 2003/0051068 A1 | 3/2003 | Eldridge |
| 6,754,885 B1 | 6/2004 | Dardinski et al. | | 2003/0115238 A1 | 6/2003 | O'Connor et al. |
| 6,760,687 B2 | 7/2004 | Apel et al. | | 2003/0167269 A1 | 9/2003 | Gupta |
| 6,763,370 B1 | 7/2004 | Schmeidler et al. | | 2003/0200351 A1 | 10/2003 | O'Connor et al. |
| 6,775,707 B1 | 8/2004 | Bennett et al. | | 2003/0200369 A1 | 10/2003 | Musumeci |
| 6,788,980 B1 | 9/2004 | Johnson | | 2003/0208558 A1 | 11/2003 | Venkatraman et al. |
| 6,789,054 B1 | 9/2004 | Makhlouf | | 2004/0103165 A1 | 5/2004 | Nixon et al. |
| 6,792,321 B2 | 9/2004 | Sepe, Jr. | | 2004/0117534 A1 | 6/2004 | Parry et al. |
| 6,799,148 B2 | 9/2004 | Ling et al. | | 2004/0221289 A1 | 11/2004 | D'Souza et al. |
| 6,799,185 B2 | 9/2004 | Wallman et al. | | 2005/0138226 A1 | 6/2005 | Tateyama et al. |
| 6,799,195 B1 | 9/2004 | Thibault et al. | | 2005/0149893 A1 | 7/2005 | Roesner et al. |
| 6,806,847 B2 | 10/2004 | Nixon et al. | | 2005/0160263 A1 | 7/2005 | Naizhen et al. |
| 6,807,558 B1 | 10/2004 | Hassett et al. | | 2005/0172258 A1 | 8/2005 | Nixon et al. |
| 6,826,590 B1 | 11/2004 | Glanzer et al. | | 2005/0283730 A1 | 12/2005 | Uyttendaele et al. |
| 6,832,223 B1 | 12/2004 | Scheifler et al. | | 2006/0129724 A1 | 6/2006 | Kostadinov |
| 6,850,973 B1 | 2/2005 | Larson et al. | | 2006/0206860 A1 | 9/2006 | Dardinski et al. |
| 6,853,867 B1 | 2/2005 | Klindt et al. | | 2006/0206866 A1 | 9/2006 | Eldrige et al. |
| 6,868,538 B1 | 3/2005 | Nixon et al. | | 2006/0212146 A1 | 9/2006 | Johnson et al. |
| 6,874,082 B2 | 3/2005 | Tateyama et al. | | 2007/0006149 A1 | 1/2007 | Resnick et al. |
| 6,888,541 B2 | 5/2005 | Morse | | 2007/0019560 A1 | 1/2007 | Brewer et al. |
| 6,895,409 B1 | 5/2005 | Uluakar et al. | | 2007/0061786 A1 | 3/2007 | Zhou et al. |
| 6,928,396 B2 | 8/2005 | Thackston | | 2007/0083552 A1 | 4/2007 | Allen et al. |
| 6,959,356 B2 | 10/2005 | Packwood et al. | | 2007/0110835 A1 | 5/2007 | Maes et al. |
| 6,978,194 B2 | 12/2005 | McIlhany et al. | | 2007/0118805 A1 | 5/2007 | Kraus et al. |
| 6,983,227 B1 | 1/2006 | Thalhammer-Reyero | | 2007/0244571 A1 | 10/2007 | Wilson et al. |
| 7,020,532 B2 | 3/2006 | Johnson et al. | | 2007/0265089 A1 | 11/2007 | Robarts et al. |
| 7,024,282 B2 | 4/2006 | Coogan et al. | | 2008/0040477 A1 | 2/2008 | Johnson et al. |
| 7,032,045 B2 | 4/2006 | Kostadinov | | 2008/0046598 A1 | 2/2008 | Johnson et al. |
| 7,054,793 B2 | 5/2006 | Moritz et al. | | 2008/0052386 A1 | 2/2008 | Johnson et al. |
| 7,080,366 B2 | 7/2006 | Kramskoy et al. | | 2008/0119951 A1 | 5/2008 | Thibault et al. |
| 7,086,009 B2 | 8/2006 | Resnick et al. | | 2008/0120367 A1 | 5/2008 | Thibault et al. |
| 7,089,530 B1 | 8/2006 | Dardinski et al. | | 2008/0126500 A1 | 5/2008 | Thibault et al. |
| 7,096,465 B1 | 8/2006 | Dardinski et al. | | 2008/0133700 A1 | 6/2008 | Thibault et al. |
| 7,110,835 B2 | 9/2006 | Blevins et al. | | 2008/0134215 A1 | 6/2008 | Thibault et al. |
| 7,123,974 B1 | 10/2006 | Hamilton | | 2008/0148170 A1 | 6/2008 | Thibault et al. |
| 7,142,322 B2 | 11/2006 | Lee | | 2008/0216169 A1 | 9/2008 | Naizhen et al. |
| 7,146,231 B2 | 12/2006 | Schleiss et al. | | 2008/0222276 A1 | 9/2008 | Thibault et al. |
| 7,146,408 B1 | 12/2006 | Crater et al. | | 2009/0094326 A1 | 4/2009 | Thibault et al. |
| 7,151,966 B1 | 12/2006 | Baier et al. | | 2009/0118845 A1 | 5/2009 | Eldridge et al. |
| 7,158,513 B2 | 1/2007 | Wada et al. | | 2009/0118846 A1 | 5/2009 | Eldridge et al. |
| 7,162,510 B2 | 1/2007 | Jammes | | 2009/0125128 A1 | 5/2009 | Eldridge et al. |
| 7,177,052 B2 | 2/2007 | Lapstun et al. | | 2009/0125129 A1 | 5/2009 | Eldridge et al. |
| 7,199,784 B2 | 4/2007 | Mathiowetz et al. | | 2009/0125130 A1 | 5/2009 | Eldridge et al. |
| 7,245,271 B2 | 7/2007 | Nixon et al. | | 2009/0125131 A1 | 5/2009 | Eldridge et al. |
| 7,249,330 B2 | 7/2007 | Roesner et al. | | 2009/0132996 A1 | 5/2009 | Eldridge et al. |
| 7,272,815 B1 | 9/2007 | Eldridge et al. | | 2009/0164031 A1 | 6/2009 | Johnson et al. |
| 7,275,062 B2 | 9/2007 | Deitz et al. | | 2009/0193347 A1 | 7/2009 | Takahashi et al. |
| 7,337,256 B2 | 2/2008 | Korowitz et al. | | 2009/0241086 A1 | 9/2009 | Saito et al. |
| 7,356,588 B2 | 4/2008 | Stineman, Jr. et al. | | 2009/0259751 A1 | 10/2009 | Thibault et al. |
| 7,502,656 B2 | 3/2009 | Thibault et al. | | 2009/0319058 A1 | 12/2009 | Rovaglio et al. |
| 7,574,693 B1 | 8/2009 | Kemink | | 2010/0005425 A1* | 1/2010 | Kodosky et al. ............ 715/853 |
| 7,610,354 B2 | 10/2009 | Adams et al. | | 2010/0011127 A1 | 1/2010 | Johnson et al. |
| 7,664,574 B2 | 2/2010 | Imhof et al. | | 2010/0011311 A1* | 1/2010 | Kodosky et al. ............ 715/771 |
| 7,720,944 B2 | 5/2010 | Thibault et al. | | 2010/0076604 A1 | 3/2010 | Johnson et al. |
| 7,739,361 B2 | 6/2010 | Thibault et al. | | 2010/0121999 A1* | 5/2010 | Isenmann et al. ............ 710/105 |
| 7,882,197 B2 | 2/2011 | Thibault et al. | | 2010/0131084 A1* | 5/2010 | Van Camp ............ 700/86 |
| 7,890,927 B2 | 2/2011 | Eldridge et al. | | 2010/0222902 A1 | 9/2010 | Eldridge et al. |
| 7,899,070 B2 | 3/2011 | Thibault et al. | | 2010/0223593 A1 | 9/2010 | Eldridge et al. |
| 2001/0007133 A1 | 7/2001 | Moriconi et al. | | 2010/0305720 A1 | 12/2010 | Doll et al. |
| 2001/0007183 A1 | 7/2001 | Weder | | | | |
| 2001/0025307 A1 | 9/2001 | Venkatraman et al. | | | | |

| | | | |
|---|---|---|---|
| 2010/0305721 | A1 | 12/2010 | Kostadinov et al. |
| 2011/0040390 | A1* | 2/2011 | Blevins et al. ............... 700/18 |
| 2011/0093098 | A1 | 4/2011 | Kostadinov et al. |

OTHER PUBLICATIONS

U.S. Appl. No. 11/260,859, filed Oct. 28, 2005, Keyghobad et al.
"1995 World Batch Forum: Meeting of the Minds [Agenda]," (May 22-24, 1995) Newtown Square, Pennsylvania, (2 pages).
"A sensation in supervisory control," Manufacturing Systems (Windows NT in manufacturing Supplement), Oct. 1996, pp. 12A-24A.
"AC I/O Modules Available for Low-Cost Automation Controller," New Release, Control Technology Corporation, Jun. 28, 1989 (DialogWeb search result) (1 page).
"Agenda," ISA/SP50—1988-180, ISA Draft, May 3-5, 1988.
"Agenda," World Batch Forum 1994 (Mar. 6-9, 1994), Tempe, AZ, (9 pages).
"Apacs Control System," Power vol. 139, No. 6 (Jun. 1995) p. 81 (Dialog print-out).
"Application of PRIAM Model to Safety Systems on Offshore Oil/Gas Platforms," Silvertech Ltd., Jan. 9, 1995.
"At Interop, Will ToasterNet Be on the Hot List?" Data Communications, vol. 19, No. 13, Oct. 1990, p. 214.
"Automation Controller accepts Customization," News Release, Control Technology, Jul. 12, 1985, (DialogWeb search result).
"Automation Controller features fast 80186 Processor, Integrated Software," News Release, Control Technology (US), Apr. 22, 1986, (DialogWeb search result).
"Automation Programming Environment runs on IBM (R)-PC," News Release, Control Technology (US), Mar. 29, 1988, (DialogWeb search result).
"Automation System Monitors, Controls Fab HVAC, Other Systems," Microcontamination (Aug. 1994).
"Background Info on Mercury Project," (no date available).
"Breaking News for Invensys Software Systems Employees: iBaan and FactorySuite 2000 Integration Announced," internal e-mail dated Mar. 23, 2001.
"Briefs," Network World, May 29, 1995, p. 19.
"bsy's List of Internet Accessible Coke Machines," web page print-out (Feb. 12, 1999) from http://www-cse.ucsd.edu/users/bsy/coke.html (1 page).
"CAD/CAM Software creates Automation 'Programming Environment'," News Release, Control Technology (US), Oct. 3, 1988, (DialogWeb search result).
"CMU SCS Coke Machine: Current Status," web page print-out (Feb. 12, 1999) from http://www.cs.cmu.edu/.about.coke/ (1 page).
"Compact System Combines Motion Control, Machine Control," News Release, Control Technology, May 28, 1985, (DialogWeb search result).
"Company Profiles: What Users Need," Power vol. 139 No. 6 (Jun. 1995) p. 81.
"Control System Features Plug-and-Play Technology, Scalability," Chemical Processing (May 1996), p. 33.
"Control system," Power vol. 139, No. 4 (Apr. 1995) p. 114 (Dialog print-out).
"ControlShell Version 5.1 User's Manual," Real-Time Innovations, Jun. 1996, whole manual.
"ControlShell Version 6.0 User's Manual," Real-Time Innovations, Jan. 1999, whole manual.
"DeltaV(tm) System: We Do Smart Plants." Brochure issued by Fisher-Rosemount Systems (1998).
"DeltaV.TM. System Overview: Do More." Brochure issued by Fisher-Rosemount Systems (1998).
"Disk Drive with Embedded Hyper-Text Markup Language Server," IBM TDB, vol. 38, n. 12, Dec. 1995, pp. 479-480.
"Dual-Axis Servo Module for Small Controller," News Release, Control Technology (US), Sep. 11, 1990, (DialogWeb search result).
"Editors' Product Picks," Chemical Processing (May 1996), p. 34.
"Embedded Systems Conference Addresses the Increasing Complexity of Electronic Systems Design; Technical Program and Exhibits Help Embedded Systems Design Professionals Keep Pace with Rapid Change," PR Newswire, Dec. 27, 1995.

"ErgoTech upgrades ErgoCim; first 'plug and play' component software for manufacturing," Business Wire, Feb. 15, 1996.
"Fisher-Rosemount Is: Managing the Process Better," Fisher Controls International, Inc. and Rosemount Inc. 1993, (19 pages).
"Gensym Announces Its Initiative for Leveraging Intelligent Systems with Internet/Intranet Technology," Business Wire, Oct. 7, 1997.
"Gensym introduces G2 WebMiner for accessing and reasoning about data from the World Wide Web," Business Wire, May 15, 1996.
"Gensym introduces Internet connectivity for its G2 family of intelligent real-time software," Business Wire, Mar. 18, 1996.
"I/A Series Model 51 FoxRemote II Installation and Configuration Guide," Apr. 8, 1998 (Preliminary), pp. i-iv, 1-2.
"Industries Fashion NASA Products Into Commercial Work", Anne Eisele, Space News, v9, n14, p. 14, Apr. 6, 1998, 1 page.
"Industry's top embedded operating software supports Java; pSOSystem enables Embedded Internet applications and Low-cost Internet appliances," Business Wire, Feb. 1, 1996.
"Inexpensive Automation Controller features Message Display Capability," News Release, Control Technology (US), May 19, 1989, (DialogWeb search result).
"Information technology in manufacturing," Manufacturing Systems, vol. 14, No. 12, Dec. 1996, pp. 54-78.
"Innovative Small Controller Family offers Full Integration," News Release, Control Technology, Aug. 17, 1989, (DialogWeb search result).
"Integrated Systems; Industry's top embedded operating software supports Java," M2 Presswire, Mar. 4, 1996.
"Intel, SunDisk offerings narrow flash focus," Electronic Engineering Times, p. 10, Oct. 24, 1994.
"Internet windows to the world," New Media Age, Oct. 26, 1995, p. 4.
"Introducing Bailey Evolution 90TM . . . The sound investment strategy for process automation," Bailey 1990 (brochure).
"Jim Henry's 1996 ASEE Paper," web page print-out from http://chem.engr.utc.edu/Documents/ASEE-96-full.html (5 pages).
"Linear Actuators offer Plug-Compatibility with Controller," News Release, Control Technology (US), Nov. 21, 1985, (DialogWeb search result).
"Low-Cost Automation Controller features Motion Control, Communications," News Release, Control Technology (US), Mar. 7, 1988, (DialogWeb search result).
"Make Your Automation Plan a Reality: MAX1000," Leeds & Northrup Technical Overview, (approximately 1990).
"Mitsubishi licenses Sun's Java tool," Electronic Engineering Times (Dec. 11, 1995) p. 29.
"Modular Valve Assemblies Connect to Controller with Ribbon Cable," New Product Release, Control Technology (US), Jan. 8, 1986, (DialogWeb search result).
"Multi-Tasking Controller provides High-level Instructions for Motion Control, Sequencing," News Release, Control Technology Corporation, Aug. 22, 1986, (DialogWeb search result).
"NCR Fieldbus Slave Controller Advance Information," ISA-SP50-1988-161, ISA Draft.
"New at IPC/92! Ethernet link provides Global PLC Registers," News Release, Control Technology (US), Nov. 20, 1992, (DialogWeb search result).
"New at IPC/92! High-Capacity Integrated Motion Controller," News Release, Control Technology (US) Nov. 20, 1992, (DialogWeb search result).
"New Equipment/Literature," Control System vol. 139, No. 4 (Apr. 1995), p. 114.
"New Open Architecture Group Works on Control Standards," Control Engineering Online (Aug. 1997).
"New Products Provide Interactive Graphics Over Web Using Netscape Plug-Ins and Java," PR Newswire, May 20, 1996.
"New Small Automation Controller features Precision Analog I/O Modules," News Release, Control Technology (US), May 30, 1989, (DialogWeb search result).
"New State-Logic Microcontroller," News Release, Control Technology Corp., Jun. 1, 1996 (DialogWeb search result).
"New Telemecanique Programmable Controllers Feature Multiple Programming Languages," (Feb. 11, 1985).

"On-Line Vending Machine and Catalog Product Icons," IBM TDB, v. 38, n. 4 (Apr. 1995), pp. 113-116.
"Operator's Console creates Friendly Machines," News Release, Control Technology (US), May 19, 1986, (DialogWeb search result).
"Operator's Console for Automated Machines," News Release, Control Technology, Aug. 15, 1985, (DialogWeb search result).
"Peter Beebee's Home Page," web page print-out (Feb. 12, 1999) from http://www-swiss.ai.mit.edu/htbin/ptbbgate/jwz/?fetch+personal%2Fmain.text.html (2 pages).
"Pipeline: Announced," InfoWorld, May 29, 1995, p. 45.
"Plant Operations Framework," AMR Report (May/Jun. 1995), (6 pages).
"Plug-Compatible Controls and Actuators Speed System Development," News Release, Control Technology (US), Jan. 13, 1986, (DialogWeb search result).
"Policy Manual," 1994 World Batch Forum (Mar. 6-9, 1994), (15 pages).
"Process Manager Specification and Technical Data," UC03-300 Sep. 1991 Honeywell, copyright 1990 (43 pages).
"Programmable Controller offers control of Stepping and Servo Motors," News Release, Control Technology, May 31, 1985, (DialogWeb search result).
"Radio Field Bus," ISA/SP50—1988-184, ISA Draft.
"Real-Time Innovations Email NewsLetter," Apr. 1998, http://www.rti.com/corporate/newsletter04-98, 2 pages.
"Ricoh to sell world's first multimedia still camera," Japan Economic Newswire, Feb. 21, 1995.
"RTI Announces Major New Component-Based Programming System for Building Complex Electromechanical Systems", PR Newswire, Mar. 16, 1998, 3 pages.
"SDRD Using 1553B Data Link Services," ISA/SP50-1988-243 (1988).
"SECS-11 Communication Board Plugs into Automation Controller," News Release, Control Technology, Aug. 26, 1985, (DialogWeb search result).
"Signal Conditioners Designed for Fisher-Rosemount System Delta V," issued by M-Systems Co., Ltd. (Dec. 1997).
"Small Multi-Tasking Controller for Cost-sensitive Aplications," News Release, Control Technology US, Nov. 8, 1988, (DialogWeb search result).
"SP88 Mes Task-Force Europe Position Document," 1994 World Batch Forum (Mar. 6-9, 1994), (pp. 1-30).
"Special Topic: PC-Based Control," A Supplement to Software Strategies, pp. 3-5, 7-8, 10-15, 20-21 (no date available).
"Suggested Outline for Application Sub-committee Document: Fieldbus Architecture Subcommittee Document," ISA/SP50—1988-175, ISA Draft. (1988).
"Sun announces availability of Javatm Embedded Server 1.0," Press Release dated Oct. 1, 1998, downloaded from java.sun.com website.
"System Provides Stepping Motor Control in Workcell Environment," News Release, Control Technology Corp., Dec. 5, 1986, (DialogWeb search result).
"TDC 3000 Overview," Honeywell, (approximately 1992).
"TDC 3000 Process Manager.TM.: Process Connected Solutions for the Advanced Controls Requirements of the 1990s," Honeywell, (approximately 1992).
"The 'Only' Coke Machine on the Internet," web page print-out (Feb. 12, 1999) from http://www.cs.cmu.edu/.about.coke/history_long.txt (3 pages).
"The Object Primer", Scott Ambler, pp. 1-248. Jan. 4, 1996.
"The Switzerland Coke Machine Credits," web page print-out (Feb. 12, 1999) from http://www-swiss.ai.mit.edu/htbin/coke/ (1 page).
"Toshiba Integrated Control System," Technical Manual Third Edition (Nov. 1990).
"Tour an actual TribeLink via WebManage," web page print-out from http://www.tribe.com/products/webmanage/quick_view.htm (printed on Jul. 12, 1999) (1 page).
"Tribe Announces Revolutionary Use of the Internet; Launches Innovative Remote Management Solution; New WebManage Technology Provides Network Management via World Wide Web," Business Wire, May 22, 1995.

"Tribe Computer Works' Net Products Can be Managed via World Wide Web," IAC (SM) Newsletter Database.TM., DataTrends Publications, Inc., No. 11, vol. 7, May 30, 1995.
"Tribe Launches First Networking Device Capable of Being Managed via Internet Web Browser; TribeLink2 Enables Remote Computing and Internet Access," Business Wire, May 22, 1995.
"Tribe Launches Innovative Remote Management Solution; New WebManage Technology Provides Network Management Via the World Wide Web," web page print-out (Jul. 12, 1999) from http://www.tribe.com/products/webmanage/wm_pr. (1 page).
"TribeStar," web page print-out from http://www.tribe.com/products/tribestar/index.htm (3 pages) (copyright 1996).
"UDC 6000 Process Controller: From Stand-alone Control to Full System Integration Honeywell Has a Solution for You," Honeywell, (Aug. 1992).
"User Layer Structure," SP-50 Technical Report (Jul. 25, 1990).
"User Layer Technical Report," ISA/SP—50 1990-389C, ISA Draft.
"Wide-range, Fully Compatible Family of Process Automation & Management Systems," Copyright 1993 by Elsag Bailey Group as an Unpublished Work, (24 pages).
"Wizards wheel over SCADA systems; Supervisory Control and Data Acquisition," Control and Instrumentation, No. 12, vol. 28, Dec. 1996, p. 23.
"WWWF'94: Papers Received," web page print-out (Apr. 7, 2000) from http://www.ncsa.uiuc.edu/SDG/IT94/Agenda/Papers-received.html (8 pages).
Adler, David J. et al. "Does a Manufacturing Execution System Reduce the Cost of Production for Bulk Pharmaceuticals?" 1995 World Batch Forum (May 22-24, 1995), (13 pages).
Andrews, "15 MB in a Matchbook" (Jan. 1995) http://www.byte.com/art/9501/sec4/art5.htm.
ANSI/ASME PTC 19.1-1985, "Part 1—Measurement Uncertainty", Apr. 30, 1986, entire document.
Ash, Raymond H. et al. "Strategic Needs in Batch Manufacturing," 1995 World Batch Forum (May 22-24, 1995), (8 pages).
Bader, F. P. "Building a Better Batch Control Foundation with IEC 1131-3 Control Languages," 1994 World Batch Forum (Mar. 6-9, 1994), (23 pages).
Batch Control. Part I: Models and Terminology. (Approved Feb. 28, 1995) ISA-S88.01 1995, pp. 1-128.
Baxter, Richard V., Jr. "Implementing Open Networking in a Motor Drive," The Imbedded Internet Workshop Real World Applications Session (Oct. 1, 1999) San Jose, CA.
Beestermoller, H.J., et al. "An Online and offline programmable Multi-Loop Controller for Distributed Systems," IEEE (1994), pp. 15-20.
Benkhallat, Yazid, et al. "Interoperability of sensors and distributed systems," Sensors and Actuators A vol. 37-38 (1993), 247-254.
Benner, Stephen J. "MES in Batch Process Manufacturing. A MES Vendor view" 1995 World Batch Forum (May 22-24, 1995), (8 pages).
Berge, Jonas, "Using Ethernet is a no-brainer," In Tech: The International Journal for Measurement and Control, pp. 36-39, Jul. 2000.
Bernard, Viki, "Remote-access ware emerge: Shiva, Nortel, and Tribe leading list of innovators," PCWeek, No. 21, vol. 12, May 29, 1995, p. 47.
Berre, A., "Sharing of Objects in an Object-Oriented Language," Proceedings on the 1986 International Workshop on Object-Oriented Database Systems, IEEE Computer Society Press, Los Alamitos, CA, 1986.
Bishop, Brian. "Realtime System-Design Tool Models Electromechanical Systems",, Personal Eng & Instrumentation News, v15, n4, p. 21, Apr. 1998.
Bristol, E H., "Not a Batch Language; A Control Language!" 1995 World Batch Forum (May 22-24, 1995), (14 pages).
Brown, Jerry et al. "Meeting the Challenge of Automation Technology," 1996 World Batch Forum (May 22-24, 1995), (11 pages).
Brown, Jerry et al. "Trends and Opportunities in Batch Control System Architectures," 1994 World Batch Forum (Mar. 6-9, 1994), (pp. 1-12).
Browne, Malcolme W. "South Pole Ready for Internet Revolution," The New York Times, Section C, col. 1, p. 1, Jan. 10, 1995.

Brunn, P. "Collision Avoidance for Two Robots Sharing a Common Workspace," (1995) The Institution of Electrical Engineers.
Bullotta, Rick. "Designing Effective User Interfaces for Batch Processes," 1994 World Batch Forum (Mar. 6-9, 1994), (pp. 1-19).
Burton, P.I. "A personal history of batch control," Measurement + Control vol. 27 (Apr. 1994), pp. 69-73.
Burton, P.I., et al. "Field Bus Based on MIL-STD-1553B: Proposal to ISA-SP-50" ERA Technology Ltd. (Apr. 6, 1988) ISA/SP50-1988-148.
Capetta, L., et al. "From Current Actuators and Transmitters Towards Intelligent Actuation and Measurement: PRIAM Approach," BIAS 93, Milan, Italy 1993.
Caro, Richard H. "Field Bus Applications," ISA (1989) Paper #89-0569, pp. 989-994.
Caro, Richard H. "The Fifth Generation Process Control Architecture," ISA Transactions vol. 28 No. 4 (1989), pp. 23-28.
Chettle, Tim. "Multiplexing techniques optimise data collection," Electrotechnology (Oct./Nov. 1995).
Choi, K.J. et al., "A Modeling Method of Software Configuration Change Control," 1997, IEEE Online, "htttp:/ieeexplorer.ieee.org/stamp/stamp.jsp?tp=&arnumber=619990&userType=inst".
Cisco Systems, Inc., "Cisco Secure Wireless Plant: Security and Quality of Service for Industrial Environments," Copyright 1992-2008.
Coleman, Vernon. "National Electrical Manufacturers Association Field Bus Report to ISA SP50," (Oct. 1988) ISA/SP50-1988-234.
Computer Products "Unbundling the DCS" (approximately 1992).
Conradi, R. et al., "Version Models for Software Configuration Management," Jun. 1998, ACM Computing Surveys, vol. 30, No. 2.
Control Technology Corp. News Releases, pp. 1-23, No Date Available.
Cox, Mark J. and Baruch, Dr. John E. F. "Robotic Telescopes: An Interactive Exhibit on the World-Wide Web," web page print-out from http://www.ncsa.uiuc.edu/SDG/IT94/Proceedings/Museum/cox/markcox.html (11 pages), 1994.
Craig, Lynn W. "SP-88 Defines Batch Control," INTECH Mar. 1994, pp. 34-37.
Crowder, R. S. "A Communication Architecture for Automation & Control," ISA, pp. 669-673. (No date available).
Crowder, R. S. "Generic Data Link Transactions for Simple Devices," Proposal to ISA SP 50 & IEC/SC65C/WG6 (Oct. 15, 1988) ISA Document.
Crowley-Milling, et al, eds. "Proceedings," 1995 International Conference on Accelerator and Large Experimental Physics Control Systems, Chicago, IL Oct. 30-Nov. 3, 1995, [cover pages].
Delahostria. Communication Model Application Layer. (Oct. 14, 1988) ISA/SP50-1988 247, ISA Draft.
Delfino, B. and Pinceti, P. "Fieldbus Applications for Electrical Industrial Systems," IEEE (1993), pp. 2084-2090.
Demetratekes, Pam. "Go with the info flow; state-of-the-art automation in the food industry; includes related article on computer software for food processors," Food Processing, vol. 57, No. 7, Jul. 1996, p. 47.
Distributed Engineering, Institute of Computer-Aided Circuit Design—Test and Test Systems Division, University of Erlangen-Nurnberg, Germany, web page print-out (8 pages) (Oct. 1994).
Dryden, Patrick, "Tribes WebManage Enables Remote Fixes," ComputerWorld, May 22, 1995, p. 14.
Duffey, C.K., et al. "High-Level Control Language Customizes Application Programs," IEEE Computer Applications in Power (1991), pp. 15-18.
Editing Committee Draft Application Layer, Version 12, Oct. 1991.
Editing Committee Draft Application Layer, Version 6, Dec. 1990.
Editing Committee Draft Application Layer, Version 8, May 1991.
Elmer-Dewitt, Philip, "Snowballs in Cyberspace; With a modem and a soldering iron, you too can build an Internet site that is really cool and totally useless," Time, Jan. 16, 1995, p. 57.
ElRakabawy, et al., "Peer-to_Peer File Transfer in Wireless Mesh Networks," University of Leipzig, Copyright 2007 (incl. English Abstract).
Esprit Project 6188, "PRIAM Dictionary: Major Terms and Definitions Used in the PRIAM Project," Prenormative Requirements for Intelligent Actuation and Measurement, May 1995.
Esprit Project 8244, "User Requirements for Intelligent Transmitters and Actuators," European Intelligent Actuation and Measurement User Group, Nov. 24, 1995.
European Office Action, EP Application No. 97305187.3, dated Sep. 22, 2010.
Excerpt from the website of the Society of Manufacturing Engineers (SME)-CyberCut: A World Wide Web Based Design-to-Fabrication Tool, dated Sep. 16, 2010.
Feiler, P., "Software Process Support Through Software Configuration Management," Oct. 1990, Proceedings of the 5th International Software Process Workshop on Experience with Software Process Models, IEEE Computer Society Press.
Ferraiolo et al., A Role-Based Access Control Model and Reference Implementation Whinin a Corporate Intranet, ACM, Feb. 1999.
Fieldbus Inc. "The Foundations fieldbus Primer," Revision 1.1, Released Jun. 24, 2001, 36 pages.
Fieldbus Standard for Use in Industrial Control Systems. Part 2: Physical Layer Specification and Service Definition. (1992) ANSI/ISA-S50.02.
Fisher, Thomas G P.E. "SP88 Update—Now and the Future," 1995 World Batch Forum (May 22-24, 1995), (59 pages).
Foster, Kirsten. "surf's up; lights, camera, but no action; Steve is a Tech-Nomad. He wanders the streets with a camera on his head. And he wants you to join him," The Independent (London), Aug. 13, 1995, p. 10.
Foxboro Fieldbus Proposal (Presented to ISA SP-50 Committee Feb. 24, 1988) ISA/SP50-1988-123B, ISA Draft.
Foxboro, "I/A Series A2TM Software-FoxCTS-Change Tracking Software-Product Specifications," 1997-2003, pp. 1-8.
Foxboro, "I/A Series Software FoxDraw," 1996 (8 pages).
Foxboro, "I/A Series Software-FoxCTSTM—Change Tracking Software-Product Specifications," 1997-2006, pp. 1-12.
Foxboro, "I/A Series-Object Manager Calls—Oct. 31, 1995," pp. 1-124.
Foxboro, "Intelligent Automation Series Human Interface Software", 20 pgs., 1997.
Friscia, Anthony et al. "MES: Manufacturing's Missing Link is a Tool for Change," 1994 World Batch Forum (Mar. 6-9, 1994), (8 pages).
Fuhr et al., "Wireless Technology Review: Radios, Frequencies, and Implications for Industry," Wireless Technology Review, Feb. 2010.
Fulcher, Jim and Dilger, Karen Abramic, "Soft control, Internet spark ISA/96," Manufacturing Systems, vol. 14, No. 12, Dec. 1996, pp. 40-46.
Furness, Harry. "Fieldbus: The Differences Start From the Bottom Up," Control Engineering (Mar. 1994), pp. 75-77.
Gaines, B.R. et al. "Mediator: an Intelligent Information System Supporting the Virtual Manufacturing Enterprise," IEEE .RTM. 1995 (XP 000586326) pp. 964-969.
George J. Thaler, et al., "Automatic Control Systems," pp. 1-60, 1989.
Gertz, Matthew, et al. "A Human-Machine Interface for Distributed Virtual Laboratories," IEEE Robotics & Automation Magazine 1 Dec. (1994) No. 4 (New York) pp. 5-13.
Gillespie, David P., Ph.D. "Comprehensive Information Management: EPA, OSHA, and Beyond," 1995 World Batch Forum (May 22-24, 1995), (14 pages).
Gleick, James. "Fast Forward: Really Remote Control," The New York Times, Section 6, col. 3, p. 42, Dec. 3, 1995.
Goldberg, Ken et al. "Desktop Teleoperation via the World Wide Web," IEEE International Conference on Robotics and Automation, pp. 654-659 (1995).
Goldberg, Ken, et al. "Beyond the Web: Excavating the Real World Via Mosaic," (Conference Paper) The Mercury Project (Oct. 17-21, 1994).
Goldberg, Ken, et al. "Beyond the Web: manipulating the real world," Computer Networks and ISDN Systems 28 (1995) pp. 209-219.
Goldstein, Ira and Hardin, Joseph, "Guest editorial," Computer Networks and ISDN Systems 28 (1995) p. 1.
Goodstein, L.P. et al., "Representation of Process State Structure and Control," Apr. 1987, Riso National Laboratory.
Grant, Dr. R. Peter, "The Impact of Reengineering on the Batch Manufacturing Workplace," 1995 World Batch Forum (May 22-24, 1995), (5 pages).

Greene, Tim. "Sahara puts Java to Management Test," Network World vol. 13, No. 7 (Feb. 12, 1996).
Gutierrez, Jose, "WirelessHART™: The Industrial Wireless Standard," Measurement and Testing, Wireless Technology Focus, Jun./Jul. 2008.
Gyorki, John R. "PLCs drive standard buses," Machine Design (May 11, 1995), pp. 83-90.
Hart Communication Foundation Tech Note, "Peer to Peer Communication with WirelessHART," HCF_LIT-129 Rev. 1.0, Sep. 5, 2008.
Hart Communication Foundation Tech Note, "Peer to Peer Communication with WirelessHART," HCF_LIT-129 Rev. 1.1, Mar. 5, 2010.
HART Communication Foundation, "Wireless Hart Overview," Copyright 2009, available at: http://www.hartcomm.org/protocol/wihart/wireless-overview.html.
Hashemian, et al., "In-Situ Response Time Testing of Thermocouples", ISA 1989, Paper #89/0056, pp. 587-593.
Helson, Ron, Hart Field Communications Protocol, "Hart Tutorial: The Benefits of HART Protocol Communication in Smart Instrumentation Systems," (no date available).
Henry, "A Fault-Tolerant Interface for Self-Validating Sensors", Oxford University, Digest No. 1990/145 (Nov. 1990).
Henry, "A New Approach to Sensor Validation", IMC, Mar. 17, 1992.
Henry, "Intelligent Behaviour for Self-Validating Sensors", Advances in Measurement, pp. 1-7, May 1990.
Henry, et al., "A Standard Interface for Self-Validating Sensors", Tech. Rep. 1884/91, OUEL, University of Oxford, Sep. 1991.
Henry, et al., "Implications of Digital Communications on Sensor Validation," Tech. Rep. 1912/92, OUEL, University of Oxford, Apr. 1992.
Henry, et al., "Signal Processing, Data Handling and Communications: The Case for Measurement Validation," Tech. Rep. 1912/92, OUEL, University of Oxford, Mar. 1992.
Henry, Jim, Ph.D., P.E. "Implementation of Practical Control Systems: Problems and Solutions," web page print-out from http://chem.engr.utc.edu/Documents/MACSCITECH/MACSCITECHpaper1.html (printed on Apr. 10, 2001) (22 pages).
Henry, Jim, Ph.D., P.E. "LabVIEW Applications in Engineering Labs: Controls, Chemical, Environmental," ASEE Conference, Anaheim, CA, Jun. 25-28, 1995, web page print-out from http://chem.engr.utc.edu/Documents/ASEE-95-full.html (22 pages).
Hiertz, Guido et al., "IEEE 802.11s: The WLAN Mesh Standard," IEEE Wireless Communications, pp. 104-111, Feb. 2011.
Hoek, A., Heimbigner, D., and Wolf, A.L.,"A Generic, Peer-to-Peer Repository for Distributed Configuration Management", May 1996, Proceedings of the 18th International Conference on Software Engineering Publisher, IEEE Computer Society.
Holding, David and Wood, Graham. "Communications in microprocessor industrial implementation," Microprocessors and Microsystems vol. 3 No. 10 (Dec. 1979), pp. 443-451.
ICCard Design Sep./Oct. 1995.
International Search Report & Written Opinion, PCT/US09/47901, Mailed Jun. 19, 2009 (11 pages).
Invensys Operations Management, "The Trident's Main Processor and Communication Module Support Modbus, Ethernet, Peer-to-Peerr, and TriStation Protocols," Trident Communication Capabilities, (no date available).
Invensys, "FoxDraw Display Builder and Configurator", 8 pgs., 2004.
IRD Mechanalysis, Inc., "Model 816 Machinery Maintenance Data Collector," 1983, 2 pages.
IRD Mechanalysis, Inc., "Model 817 Machinery Maintenance Data Collector," 1984, 4 pages.
IRD Mechanalysis, Inc., "Model 818 Machinery Maintenance Data Collector," 1985, 6 pages.
Johnson, Dick. "Pressure Sensing Advances: Are They in Your Process' Future?" Control Engineering (Apr. 1995), pp. 67-72.
Johnsson, et al., "High-Level Grafcet and Batch Control", Nov. 1994, Symposium ADPM.
Kelly, D. Mark. "Digital fieldbus cluster cuts plant's wiring costs up to 20%," Intech (Apr. 1995), pp. 62-64.
Kissling, Jeffrey L. "Flexible Software Structure and Change Management," 1995 World Batch Forum (May 22-24, 1995), (16 pages).
Kline, "The Purposes of Uncertainty Analysis", vol. 107, Journal of Fluids Engineering, pp. 153-160 (Jun. 1985).
Ko, Diffu, "Trobe defines net management role for Web browser software," Network World, May 22, 1995, p. 14.
Kohler H. J., et al.,"Integrating UML Diagrams for Production Control Systems," ACM p. 241-251, 2000.
Kostas, et al., "Real-Time Voice Over Packet-Switched Networks", pp. 18-27, IEEE Network (Jan./Feb. 1988).
Koth, H. and Oeder, K. "The Advantages of Intelligent Field Modules for Nuclear Power Plant Operation and Maintenance," Kemtechnik 60 (1996) 5-6, pp. 215-219.
Lenhart, Gerald W. "A Field Bus Approach to Local Control Networks," ISA, Paper #93-281 1993.
Lenhart, Gerald W. "Fieldbus-Based Local Control Networks," INTECH (Aug. 1994), p. 31-34.
Leon, Mark, "Tektronix to add Web software on new printers," InfoWorld, Dec. 4, 1995, p. 6.
Loos, Peter. "Production Management—Linking Business Applications to Process Control," 1995 World Batch Forum (May 22-24, 1995), (pp. 1-16).
Loose, Graham. "Fieldbus—the user's perspective," Measurement + Control vol. 27 (Mar. 1994), pp. 47-51.
Loupos, Konstantinos et al., "VR, HF and Rule-Based Technologies Applied and Combined for Improving Industrial Safety," Lecture Notes in Computer Science, vol. 4555, Universal Access in Human-Computer Interaction, Ambient Interaction, pp. 676-680 (2007).
Lu, S. et al., "An Object-Oriented Power Plant Adaptive Control System Design Tool," Sep. 1995, IEEE Transactions on Energy Conversion, vol. 10, No. 3.
Magnusson, B., Asklund, U., and Minor, S., "Fine-Grained Revision Control for Collaborative Software Development", Dec. 1993, Proceedings of the 1st ACM SIGSOFT Symposium on Foundations of Software Engineering, ACM.
Martin, "Design and Strategy for Distributed Data Processing", Chptrs. 19 & 20, pp. 272-305 (1981).
Maser, K. et al., "Development of a Wireless Global Bridge Evaluation and Monitoring System (WGBEMS)," Building of International Community of Structural Engineers, vol. 2, Proceedings of Structures Congress XIV Apr. 15-18, 1986, American Society of Civil Engineers, Chicago IL, 8 pages.
Meeting Minutes, Ad Hoc Function Block Meeting, Jun. 14, 1990, Chapel Hill, NC (pp. 1-60).
Meeting Minutes, Process Control Working Group of SP50.4, Jan. 21-23, 1991, Atlanta, GA (8 pages).
Meeting Minutes, SP50, International Electrotechnical Commission, Technical Committee No. 65: Industrial-Process Measurement and Control, Sub-Committee 65C: Digital Data Communications for Measurement and Control and Working Group 6: Field BusStandard for Use in Industrial Control Systems, Feb. 28-Mar. 4, 1988, Scottsdale, Arizona (143 pages).
Meeting Minutes, SP50, Signal Compatibility of Electrical Instruments, Dec. 5-7, 1990, Orlando, FL (64 pages).
Meeting Minutes, SP50.4 Application Layer, Oct. 19-21, 1988, Houston, TX (96 pages).
Meeting Minutes, Windows Working Group of Application Subcommittee, Mar. 1-3, 1989, New Orleans, LA (pp. 1-8).
Mirabella, Orazio. "A Short Presentation of IEC Fieldbus Application Layer," Informatics and Communication Institute, Engineering Faculty, University of Catania, Italy, Feb. 14, 1995.
Miyoshi et al., "A Real-Time Java Server for Real-Time Match", 1997, IEEE, pp. 319-325.
Momal, F. and Pinto-Pereira, C. "Using World-Wide-Web for Control Systems," from Proceedings 1995 International Conference on Accelerator and Large Experimental Physics Control Systems, Chicago, IL, Oct. 30-Nov. 3, 1995.
Morel, G., et al. "Discrete Event Automation Engineering: Outline of the PRIAM Project." BIAS '93, vol. 1, pp. 105-116, Milan, Nov. 23-25, 1993.
Mori, et al., "The PCMCIA Developer's Guide, Second Edition," Sycard Technology 1994.
Niagara Framework, http://www.tridium.com/products/niagara.asp, Feb. 10, 2005, 2 pages.

NOAH: Network Oriented Application Harmonisation based on General Purpose Field Communication System. Project description rev. 1.0, Oct. 25, 1995. P-NET, PROFIBUS, WorldFIP.

Nobuhiko, Tsuji, et al. "An Advanced Optical Fieldbus Instrumentation System Using 16 × 16 Reflection Type Optical Star Coupler and Low Powered Transmitter," pp. 755-764, (1995).

Notte, Angelo J. "Multitasking Capability Simplifies Process Control Design" Reliance Electric Company, approximately late 1980s.

Object-Oriented Information Systems Planning and Implementation, David A. Taylor, Wiley Professional Computing, published Apr. 10, 1992, pp. 1-357.

Ochoa, David. "Effects of Alliances and Acquisitions on the Batch Automation User," 1995 World Batch Forum (May 22-24, 1995), (43 pages).

Office Action mailed Dec. 26, 2002, U.S. Appl. No. 09/379,074.
Office Action mailed Feb. 1, 2008, U.S. Appl. No. 10/765,006.
Office Action mailed Apr. 23, 2002, U.S. Appl. No. 09/379,074.
Office Action mailed Jul. 2, 2007, U.S. Appl. No. 10/765,006.
Office Action mailed Sep. 24, 2003, U.S. Appl. No. 09/379,074.

Output to Valve, Revision No. 1.4, Jan. 18, 1991, (Draft Document), Instrument Society of America.

Owen, S., et al. "A modular reconfigurable approach to the creation of flexible manufacturing cells for educational purposes," Fast Reconfiguration of Robotic and Automation Resources (Colloquium) Oct. 20, 1995, The Institution of ElectricalEngineers.

Pace, Hugh W. "Valve Actuators Ready for Fieldbus," Control Engineer (Oct. 1995), pp. 65-73.

Pages from Aspentech.com website as of Jan. 1997, retrieved from Internet archive http://web.archive.org.

Pages from Aspentech.com website as of Oct. 1996, retrieved from Internet archive http://web.archive.org.

Pages from SL.com website as of Apr. 1999, retrieved from Internet archive http://web.archive.org.

Pages from SL.com website as of Dec. 1998, retrieved from Internet archive http://web.archive.org.

Pages from SL.com website as of Feb. 1997, retrieved from Internet archive http://web.archive.org.

Pages from SL.com website as of May 2000, retrieved from Internet archive http://web.archive.org.

Pappalardo, Denise, "Digi Introduces IP/IPX Router," InternetWeek, Apr. 24, 1995, p. 15.

Pappalardo, Denise, "Router Can Be Managed via Net," InternetWeek, May 22, 1995, p. 6.

Peshek, Clifford J., et al. "Recent Developments and Future Trends in PLC Programming Languages and Programming Tools for Real-Time Control," IEEE Cement Industry Technical Conference (May 1993) Toronto, Canada, pp. 219-230.

Petti, Thomas F. and Dhurjati, Prasad S. "A Coupled Knowledge Based System Using Fuzzy Optimization for Advisory Control," IChE Journal vol. 38 (Sep. 1992) No. 9, pp. 1369-1378.

Phinney, Thomas L. "An Analysis of Contending Proposals in ISA SP-50 for an ISA/IEC Field Instrument Bus," ISA (1988) Paper #88-1489.

Pinto, Jim. "The Great Fieldbus Debate-is Over," Action Instruments (www.actionio.com) (originally published in Industrial Controls Intelligence, Nov. 1999).

Product Specification, I/A Series.RTM. RBATCH II, Aug. 31, 1994 (Revised Apr. 1995).

Product Specifications, I/A Series(R) Software FoxGuard(TM) Manager for Triconex(TM) Safety Systems, Copyright 2000-2006, Invensys Systems, Inc.

Proway-Lan Industrial Data Highway. (Approved Feb. 3, 1986) ISA—S72.01-1985.

Redman, Jun, et al. "Intranet and the internal Web server: A standard user interface for integrating manufacturing applicaitons, "Proceedings of the Industrial Comuting conference, vol. 6, No. 1 (1996).

Reklaitis, G. V. "Scheduling Approaches for the Batch Process Industries," 1995 World Batch Forum (May 22-24, 1995), (17 pages).

Renu Electronics Pvt. Ltd., "GWY-800 (HART Gateway) User Manual," Rev. 0, Jul. 13, 2006.

Report from IEC TC65 Working Group 6 Function Blocks, May 1, 1995.

Robinson, D. et al., "Modelling and Synthesis of Configuration Controllers for Dynamically Reconfigurable Logic Systems Using the DCS CAD Framework," 1999, Field-Programmable Logic and Applications, FPL '99, pp: 41-50.

Rodriguez, Karen, "Tribe sets software," Interactive Age, vol. 2, No. 15, May 22, 1995, p, 25.

Rosenof, Howard P. "Dynamic Scheduling for a Brewery," 1995 World Batch Forum (May 22-24, 1995), (6 pages).

Scharf, Ronald, et al, "Using Mosaic for Remote Test System Control Supports Distributed Engineering," Institute of Computer-Aided Circuit Design—Test and Testsystems Division, University of Erlangen-Nurnberg, Germany, web page print-out fromhttp://www.ncsa.uiuc.edu/SDG/IT94/Proceedings/CSCW/scharf/scharf.html (8 pages), 1994.

Schreiber Philip et al. "Process Automation Using SP88," 1995 World Batch Forum (May 22-24, 1995), (7 pages).

Schuur, C. "Comments on 'Analysis and Suggestions for ISA-SP50' as submitted to the SP50 Committee by Honeywell Inc." (Mar. 11, 1988) ISA-SP50—1988-155, ISA Draft.

Schuur, Chris and Warrior, Jay. "Phillips Token Passing Field Bus Controller Timed Token Mode," ISA/SP50—1988-186, ISA Draft. (1988).

Silverman, Dwight. "'Attaboy' for the best software and hardware of 1994," The Houston Chronicle, Dec. 25, 1994, p. 2.

Skabowski, E. L. "Recommendations for Consideration at Oct. 1988 Application Layer Subcommittee Meeting," (Oct. 3, 1988).

Slater, A. F. "Controlled by the Web," Computer Networks and ISDN Systems 27 (1994) pp. 289-295.

Smith, Chris. "Tektronix Pushes Ease-of-Use and Low Cost of Operation With Its New Phaser.RTM. Color Laser Printer," comp. newprod forum (Jan. 11, 1996).

Smith, S. et al., "Cyber Cut: A world wide web based design-to fabrication tool", Journal of Manufacturing Systems, vol. 15/No. 6, Jan. 1, 1996, pp. 432-442.

SNAP Foundation Template "Using the SNAP Development Environment," Version 8.0, Chapters 1-4, 1997.

Solvie, Michael J. "Configuration of Distributed Time-Critical Fieldbus Systems," IEEE (1994), p. 211.

Song, Jianping et al., "Challenges of Wireless Control in Process Industry," Workshop on Research Directions for Security and Networking in Critical Real-Time and Embedded Systems, Apr. 4, 2006, San Jose, CA, USA; available at http://moss.csc.ncsu.edu/~mueller/crtes06.

Soreide, N. N., et al. "Mosaic access to real-time data from the TOGA-TAO array of moored buoys," Computer Networks and ISDN Systems 28 (1995), pp. 189-197.

Stapleton, Nick. "802.3 Working Group DTE Power via MDI Call for interest," 3Com (Jul. 1999), (15 pages).

Stein, R. et al. "Development of a Commercially Successful Wearable Data Collection System," University of CA San Diego, Downloaded Jan. 12, 2009, 7 pages.

Stevens, et al. "TCP/IP Illustrated, vol. 1. The Protocols," TCP/IP Illustrated vol. 1, XP-002106390, pp. 85-96. (1994).

Strack, Bob. "The Hawk is Soaring," Chemical Processing (May 1996) p. 11.

Strobhar, David A. "Evolution of Operator Decision Making," 1995 World Batch Forum (May 22-24, 1995), (6 pages).

Strothman, Jim and Ham, John. "Alliances, Fieldbus, Windows Stir ISA/94 Anaheim Pot," Intech (Dec. 1994), pp. 32-35.

Strothman, Jim and Ham, John. "ISA/95 New Orleans: 'Open', NT winds (not Opal) blow strong," Intech (Nov. 1995), pp. 45-48.

Table of Contents, Automation & Technology Department, 1993.
Table of Contents, Automation & Technology Department, 1995.
Table of Contents, Industrial Computing Society Conference ICS/95, New Orleans, LA, Oct. 1-6, 1995.
Table of Contents, ISA '88 International Conference and Exhibit, Houston, TX, Oct. 16-21, 1988.
Table of Contents, ISA '89 International Conference and Exhibit, Philadelphia, PA, Oct. 23, 1989.
Table of Contents, Proceedings of the 20th International Conference on Industrial Electronics Control and Instrumentation, vols. 1-3, Sep. 5-9, 1994, Bologna, Italy.

Table of Contents, Proceedings of the 7th Mediterranean Electrotechnical Conference, vol. 1, Apr. 12-14, 1994, Antalya, Turkey.
Table of Contents, Proceedings of the Industrial Computing Conference, vol. 3, Sep. 19-24, 1993, Chicago, IL. Industrial Computing Society.
Taylor, Ken and Trevelyan, James, "A Telerobot on the World Wide Web," printed from http://telerobot.mech.uwa.edu.au/ROBOT/telerobo.htm (14 pages) (1995).
The Foxboro Company, "FoxCMS Change Management System Software," 48 pgs., Aug. 14, 1996.
Tinham, "Networks & surprises at C&I and ISA shows; Control and Instrumentation Exhibition and Conference; Instrument Society of America; includes related articles," vol. 26; No. 6, p. 43; ISSN: 0010-8022 (Jun. 1994).
Tinham, Brian, "Getting SCADA by web browsner? Supervisory Control and Data Acquisition," Control and Instrumentation, No. 12, vol. 28, Dec. 1996, p. 5.
Tobin, David. "Southeast Paper Installs Largest Foxboro Distributed Control System." (No date available).
Toner, Mike. "Web's view of world far and wide," The Houston Chronicle, Nov. 5, 1995, p. 6.
Tweney, "Java on Your Mobile Phone?", http://www.business2.com (Mar. 14, 2002).
U.S. Appl. No. 09/573,151, filed May 17, 2000, Linscott, Richard L.
United States Patent and Trademark Office final Office Action for U.S. Appl. No. 11/354,586, mailed Aug. 4, 2009.
United States Patent and Trademark Office final Office Action for U.S. Appl. No. 11/354,586, mailed Jul. 1, 2008.
United States Patent and Trademark Office final Office Action for U.S. Appl. No. 11/781,216, mailed Jan. 8, 2009.
United States Patent and Trademark Office final Office Action for U.S. Appl. No. 11/781,218, mailed Jan. 28, 2009.
United States Patent and Trademark Office final Office Action for U.S. Appl. No. 11/781,219, mailed Nov. 14, 2008.
United States Patent and Trademark Office non-final Office Action for U.S. Appl. No. 11/354,586, mailed Jan. 8, 2009.
United States Patent and Trademark Office non-final Office Action for U.S. Appl. No. 11/354,586, mailed Mar. 6, 2007.
United States Patent and Trademark Office non-final Office Action for U.S. Appl. No. 11/354,586, mailed Nov. 1, 2007.
United States Patent and Trademark Office non-final Office Action for U.S. Appl. No. 11/781,216, mailed Aug. 7, 2008.
United States Patent and Trademark Office non-final Office Action for U.S. Appl. No. 11/781,219, mailed Jul. 14, 2008.
United States Patent and Trademark Office non-final Office Action for U.S. Appl. No. 11/207,816, mailed Apr. 9, 2007.
United States Patent and Trademark Office non-final Office Action for U.S. Appl. No. 11/207,816, mailed Jan. 10, 2008.
United States Patent and Trademark Office non-final Office Action for U.S. Appl. No. 11/207,816, mailed Jul. 3, 2008.
United States Patent and Trademark Office non-final Office Action for U.S. Appl. No. 11/207,816, mailed Oct. 4, 2006.
United States Patent and Trademark Office non-final Office Action for U.S. Appl. No. 11/207,816, mailed Sep. 19, 2007.
United States Patent and Trademark Office non-final Office Action for U.S. Appl. No. 11/781,218, mailed Sep. 15, 2008.
United States Patent and Trademark Office non-final Office Action for U.S. Appl. No. 11/781,219, mailed Jul. 21, 2009.
User Guide for IntelaTrac 2000: Automated Field Data Collection Solutions, Rev. 1.0, Nov. 30, 1999.
Van de Pol. "OmniChem: Real Time Production scheduling in a batch oriented environment," 1994 World Batch Forum (Mar. 6-9, 1994), (23 pages).
Vardy, Joel M. "Integrating Manufacturing Into the Corporate Reengineering Effort for the Batch Industries," 1995 World Batch Forum (May 22-24, 1995), (23 pages).
Wang, Lithui et al. "Agent-based Intelligent Control System Design For Real-time Distributed Manufacturing Environments". Agent-basedManufacturing Workshop, Autonomous Agents '98. Minneapolis/St. Paul, May 9-13, 1998, pp. 152-159.
Webb, Marcus. "Computer System Implementation, Batch Standards and Validation," 1995 World Batch Forum (May 22-24, 1995), (11 pages).
Weinert, A., et al. "RT/OS—realtime programming and application environment for the COSY control system," Nuclear Instruments and Methods in Physics Research A vol. 352 (1994), pp. 277-279.
Welch, Nathalie, "Tribe to manage via Web; Tribe Computer Works Inc.'s TribeLink2 Product Announcement," MacWEEK, vol. 9, No. 21, May 22, 1995, p. 18.
WG1 List of Criteria (Appendix 1), (Oct. 21, 1988) ISA/SP50-1988-242, ISA Draft.
Wilder, Clinton, "Network Management: Russing Nets Via the Web—Trib's WebManage uses popular interface," InformationWeek, May 29, 1995, p. 62.
Williams, Gary, "Wireless Plant and Backhaul in the Industrial Environment," Invensys Operations Management, (no date available).
Wolfe, Alexander, "Strong Brew," Electronic Engineering Times, Apr. 8, 1996, p. 73.
Wood, G. G. "Current Fieldbus activities," computer communications vol. 11 (Jun. 1988) No. 3, pp. 118-123.
Wood, G. G. "Evolution of communication standards for the process industry," Measurement + Control vol. 19 (Jul./Aug. 1986), pp. 183-188.
Wood, G. G. "Survey of LANs and Standards," Computer Standards & Interfaces vol. 6 (1987), pp. 27-36.
Wood, G. G. "The Argus Consul System for On-Line Computer Control," Electrical Engineering Transactions (Mar. 1969), pp. 114-118.
Wood, G. G. "The Challenge of Standards for Plant Communication," IFAC Distributed Computer Control Systems (1982), pp. 191-192.
Wood, G. G. "Towards digital information control," Measurement + Control vol. 21 (Jul./Aug. 1988), pp. 179-180.
Wood, Graeme G. "Data Transmission, Processing and Presentation," pp. 46-54 (no date available).
Wood, Graeme, G. "Standardisation Work for Communication Among Distributed Industrial Computer Control Systems—A Status Report," INRIA (1984), pp. 67-69.
Wood, Graeme. "Fieldbus Status 1995," Computing & Control Engineering Journal (Dec. 1995), pp. 251-253.
Wood, Graeme. "Generic Link Transactions for Simple Devices in Fieldbus." ISA/SP50—1988—240 (Sep. 20, 1988).
Young, Stephen L. "Technology . . . The Enabler for Tommorrow's Agile Enterprise," 1995 World Batch Forum (May 22-24, 1995), (10 pages).
Zeff, Joe. "Maui Sunset in Real Time (Modems not Optional)," The New York Times, Nov. 27, 1995, Section D, col. 2, p. 5.
Zeller, A. and Snelting, G., "Unified Versioning Through Feature Logic," Oct. 1997, Transactions on Software Engineering and Methodology, vol. 6, Issue 4, ACM.

* cited by examiner

Process Control System

Exemplary Controlled Process

Exemplary Profibus Segment

Control Strategy Configurator Components

Component Interaction Diagram

Framework Object Model Components

Object Model Notation Conventions

Parameterized Object model

Creating a Parameter List

Parameter Definition Editor

| AIN | | | | | ☒ |
|---|---|---|---|---|---|
| Standard | Real-Input | Real-Output | Bad-Alarm | More... | ◁ ▷ |

| | |
|---|---|
| Achnge | 0 |
| Crit | 0 |
| Pnt | 0 |
| Prtype | 0 |
| Rawc | 0 |
| Name | |
| Type | AIN |
| Descrp | |
| Period | 1 |
| Loopid | |
| Initma | 1 |
| Inhopt | 0 |
| Manalm | 0 |
| Iomop | 1 |
| Iom_id | |
| Pnt_no | 1 |
| Sci | 0 |
| Meas | 0 |
| Hsco1 | 100 |
| Lsco1 | 0 |
| Delto1 | 1 |
| Eo1 | % |

OK    Cancel    DownLoad

FIG. 12
Parameter Editor Example

Object Types

Object Type Hierarchy Example

Creating New Object Types

Type Awareness Example

Connection Object Model

Parameterized Object-Override-Endpoint Triad

Object Connection Type Object Model

Example of Simultaneous Parent/Child Object Connectivity

Parameter Connection Type Object Model

Example of Simulaneous Source/Sink Parameter Connectivity

Parent/Child Connectivity Example-Case #1

Parent/Child Connectivity Example-Case #2

Parent/Child Connectivity Example-Case #3

Source/Sink Connectivity Example

Users and Security Object Model

Users and Groups Example

Process Area and Assignable Objects Example

IDA Permissions Hierarchy

Switch Group/User Capability

Managing Groups

Assigning Users to Groups

Groups, Object Types and Permissions

Managing Process Areas

Groups and Process Area Permissions

System Tree View

Block Definition Editor

Block Definition Classes

Simple Loop

Composite Block Definition

Composite Block in Loop

Expanded Composite Block In Loop

Block with Connections

Anatomy of a Block Placeholder

Block Connection Dialog

Template/Definition Internal Connections

Template/Definition Exposed Connections

Parameter Property Sheet

Composite Block Property Sheet

Parameter Formula Builder

Control Object Derivations

Block Object Model

Modifier Block Object Model

Modifier Block Parameter Override Precedence

Composite Block Definition Object Model

Loop Template Object Model

Simple Loop Object Model

Composite Block Object Model

Template-Derived Loop Object Model

Object Placeholder Deviations

Persistent Document Object Derivations

Block Execution Scheduler Editor

Station Statistics Dialog

Block Execution Editor Object Model

Download Target Selection

Download Manager Document Object

Download Services Object Model

METHODS AND APPARATUS FOR CONTROL CONFIGURATION WITH CONTROL OBJECTS THAT ARE FIELDBUS PROTOCOL-AWARE

REFERENCE TO RELATED APPLICATIONS

This application is related to U.S. patent application Ser. No. 12/265,837, filed Nov. 6, 2008, entitled "Apparatus for Control Systems with Objects that Are Associated with Live Data," which is a continuation of U.S. application Ser. No. 12/247,872, filed Oct. 8, 2008 and entitled "CONTROL SYSTEM EDITOR AND METHODS WITH LIVE DATA", which is a continuation of U.S. application Ser. No. 11/434,005, filed May 15, 2006 and entitled "METHOD AND APPARATUS FOR CONTROL CONFIGURATION USING LIVE DATA", which is a continuation of U.S. application Ser. No. 09/572,343, filed May 17, 2000, entitled "METHODS AND APPARATUS FOR CONTROL CONFIGURATION WITH VERSIONING, SECURITY, COMPOSITE BLOCKS, EDIT SELECTION, OBJECT SWAPPING, FORMULAIC VALUES AND OTHER ASPECTS" (now issued as U.S. Pat. No. 7,272,815), which is a continuation of U.S. application Ser. No. 09/448,223, filed Nov. 23, 1999, entitled "PROCESS CONTROL CONFIGURATION SYSTEM WITH CONNECTION VALIDATION AND CONFIGURATION" (now issued as U.S. Pat. No. 7,089,530) and is a continuation of U.S. application Ser. No. 09/448,374, filed Nov. 23, 1999, entitled "PROCESS CONTROL CONFIGURATION SYSTEM WITH PARAMETERIZED OBJECTS" (now issued as U.S. Pat. No. 7,096,465) and is a continuation of U.S. application Ser. No. 09/448,845, filed Nov. 23, 1999, entitled "METHODS AND APPARATUS FOR CONTROLLING OBJECT APPEARANCE IN A PROCESS CONTROL CONFIGURATION SYSTEM" (now issued as U.S. Pat. No. 6,754,885) and which claims the benefit of priority of U.S. application Ser. No. 60/134,597, filed May 17, 1999, entitled "INTEGRATED DESIGN AUTOMATION CONTROL STRATEGY CONFIGURATOR ARCHITECTURE"; the teachings of all of the aforementioned applications (including the forms thereof published by the United States Patent and Trademark Office and the patents issued therefrom, including, by way of non-limiting example, U.S. Pat. Nos. 6,754,885, 7,096,465, 7,089,530, 7,272,815), are incorporated herein by reference.

BACKGROUND OF THE INVENTION

The invention pertains to control and, more particularly, to methods and apparatus for configuring control systems.

The terms "control" and "control systems" refer to the control of a device or system by monitoring one or more of its characteristics. This is used to insure that output, processing, quality and/or efficiency remain within desired parameters over the course of time. In many control systems, digital data processing or other automated apparatus monitor a device, process or system and automatically adjust its operational parameters. In other control systems, such apparatus monitor the device, process or system and display alarms or other indicia of its characteristics, leaving responsibility for adjustment to the operator.

Control is used in a number of fields. Process control, for example, is typically employed in the manufacturing sector for process, repetitive and discrete manufactures, though, it also has wide application in utility and other service industries. Environmental control finds application in residential, commercial, institutional and industrial settings, where temperature and other environmental factors must be properly maintained. Control is also used in articles of manufacture, from toasters to aircraft, to monitor and control device operation.

Modern day control systems typically include a combination of field devices, control devices, and controllers, the functions of which may overlap or be combined. Field devices include temperature, flow and other sensors that measure characteristics of the device, process or system being controlled. Control devices include valves, actuators, and the like, that control the device, process or system itself.

Controllers generate settings for the control devices based on measurements from the field devices. Controller operation is typically based on a "control algorithm" that maintains a controlled system at a desired level, or drives it to that level, by minimizing differences between the values measured by the sensors and, for example, a setpoint defined by the operator.

In a food processing plant, for example, a controller can be used to maintain a soup stock at a simmer or low boil. This is done by comparing measurements of vapor pressure in the processing vessel with a desired setpoint. If the vessel pressure is too low, the control algorithm may call for incrementally opening the heating gas valves, thereby, driving the pressure and boiling activity upwards. As the pressure approaches the desired setpoint, the algorithm requires incrementally leveling the valves to maintain the roil of the boil.

Controllers may be networked or otherwise connected to other computing apparatus that facilitate monitoring or administration. The so-called S88 industry standard, described in *Batch Control—Part* 1: *Models and Terminology* (The International Society for Measurement and Control 1995), for example, defines a hierarchy of processing and control equipment ("equipment entities") that can be used to model and control an automated manufacturing process. At the lowest level of the hierarchy are control modules that directly manipulate field devices (e.g., opening and closing valves) and, possibly, other control modules. At a higher level, equipment modules coordinate the functions control modules, as well as of other equipment modules, and may execute phases of the manufacturing process (such as setting controller constants and modes). "Units," at still a higher level of the hierarchy, coordinate the functions of equipment and control modules. Process cells orchestrate all processing activities required to produce a manufacturing batch, e.g., scheduling, preparing and monitoring equipment or resources, and so forth.

The principal function of controllers is executing control algorithms for the real-time monitoring and control of devices, processes or systems. They typically have neither the computing power nor user interfaces required to facilitate the design of a control algorithm. Instead, the art has developed configurators. These are typically general purpose computers (e.g., workstations) running software that permit an engineer or operator to graphically model a device, process or system and the desired strategy for controlling it. This includes enumerating field devices, control devices, controllers and other apparatus that will be used for control, specifying their interrelationships and the information that will be transferred among them, as well as detailing the calculations and methodology they will apply for purposes of control. Once modeling is complete and tested, the control algorithm is downloaded to the controllers.

One well known process control system configurator is that provided with the I/A Series® (hereinafter, "IAS" or "I/A") systems, marketed by the assignee hereof. These provide a graphical interface (FoxCAE) permitting an engineer to model a process hierarchically and to define a control algorithm from that hierarchy. Multiple editors are provided for defining and modifying modules within the hierarchy. A change management system, FoxCMS®, also marketed by the assignee hereof, provides for logging of configuration changes downloaded to controllers by the I/A Series system.

Though prior art process control configuration systems, particularly, the IAS systems and others sold by the assignee hereof, have met wide acceptance in the industry, there remains room for improvement. Such is the case, for example, with respect to the configuration of complex control systems, as well as with the tracking of configuration changes downloaded to those systems.

In this context, an object of the present invention is to provide improved methods and apparatus for control and, particularly, for configuring control systems. A related object of the invention is to provide methods and apparatus for configuring a process control systems.

A further object of the invention is to provide such methods and apparatus as facilitate configuring large or complex control systems Still yet a further object of the invention is to provide such methods and apparatus as can be used in configuring a range of control systems, whether hierarchical or not, whether pertaining to process control or otherwise.

SUMMARY OF THE INVENTION

Field Bus Protocol-Aware Objects

The foregoing are among the objects attained by the invention, aspects of which provide improved apparatus for configuring a control system. The apparatus includes a model made up of objects representing, for example, the field devices and other control devices that make up such a system, including, at least one device that defines and/or controls communications on at least a portion of a network within that system. That device is referred to, here, as a "bus master" and the portion of the network is referred to as a "segment." The object (or objects) representing the bus master can include information defining timings, port assignments and/or other aspects of the configuration of the segment.

A download service transfers configuration information from objects in the model to devices in the control system. These downloads can go directly to the respective devices or can go indirectly, e.g., via other devices in the control system (such as controllers, field bus modules, and so forth). Regardless, the download service can transfer to the bus master communications configuration information for the segment that it (the bus master) configures and/or controls. The download service according to this aspect of the invention generates—e.g., for logging by a change tracking system—indicia of the configuration information transferred to the bus master. It can likewise generate for logging (again, by the change tracking system) information transferred from the model to other devices in control system.

Objects can represent, by way of non-limiting example, field devices, control devices, control processors, blocks, loops, and compounds. They can also represent entities of a control level hierarchy, e.g., sites, areas, process cells, units, and the like. Parameters can include, for example, inputs, outputs, alarm limits, and control functions. Attributes can include, for example, parameter names, data types, data value ranges, and so forth In related aspects of the invention, the object(s) representing the bus master in the model of an apparatus as described above can include configuration information defining timing of transfers on the segment configured and/or controlled by the bus master. That timing information can include and/or be supplanted by information pertaining to one or more of the following: a master station address, a highest station address that can be assigned to the master station address, a minimum slave interval, a data control time, a data transfer rate, a maximum retry limit, a GAP update factor, a slot time, a minimum station delay response time, a maximum station delay response time, a setup time, a quiet time, a target rotation time, and so forth—all by way of non-limiting example.

In other related aspects of the invention, the download service generates, as indicia of the information transferred to the bus master, one or more XML files that include, for example, the names of transferred bus configuration fields, parameters, etc., and their values. That information can be stored by the download service for retrieval and reporting—e.g., independently and/or along with other such information from past and future downloads to the same and/or other devices in the system—to equipment operators, plant owners and other users.

Further aspects of the invention provide apparatus as described above in which in lieu or in addition to object(s) representing a bus master, the model includes one or more objects representing one or more respective devices that are slaves on a segment of the type described above, i.e., a segment defined and/or controlled by a bus master. Such object(s) can likewise include information defining a configuration of the segment. The download service of this and/or related aspects of the invention can transfer that information to the bus slave(s) and can also generate indicia of it for logging to the change tracking system (e.g., for retrieval and reporting, as discussed above).

In related aspects of the invention, the object(s) representing the bus slaves in the model of an apparatus as described above can include configuration information defining the timing of information transfers on the segment. That timing information can include and/or be supplanted by information pertaining to one or more of the following: a minimum station delay response time, a watchdog time, Sync and Freeze mode support, a device failure timeout, groups definition, a DPV1 response timeout, a failsafe flag, and so forth—all by way of non-limiting example.

In other related aspects of the invention, the download service generates, as indicia of the information transferred to the bus slaves, one or more XML files that include, the names of transferred bus configuration fields, parameters, etc., and their values.

Further aspects of the invention provide apparatus as described above in which the segment is a field bus, e.g., that operates in accord with a Profibus standard, a Fieldbus Foundation standard, or otherwise.

In other aspects, the invention provides apparatus for configuring a control system that includes a model as generally described above, as well as a download service that transfers to the control system at least selected configuration information from objects in the model, e.g., again, as generally described above. That download service also generates for logging by a change tracking system indicia of at least selected information transferred to the control system's devices.

The apparatus further includes an editor that permits direct and/or immediate editing of values stored in the bus master device, including, definition and/or modification of values used by it for configuration and/or control of the segment. That editor, which can use a combination of dialog boxes and other edit controls, responds to user input defining and/or modifying one or more the values stored in the bus master by generating indicia of the defined or changed values for logging by the change tracking system. In addition to permitting such direct and/or immediate editing of values in the bus master device, the editor can store those values to one or more objects representing the bus master in the aforementioned model.

In related aspects, the invention provides apparatus as described above in which the editor permits user definition and/or modification of one or more of the following values in the bus master (as well as in the model) defining configuration of the segment: a master station address, a highest station address that can be assigned to the master address, a minimum slave interval, a data control time, a data transfer rate, a maximum retry limit, a GAP update factor, a slot time, a minimum station delay response time, a maximum station delay response time, a setup time, a quiet time, and a target rotation time.

Further aspects of the invention provide apparatus as described above in which in lieu or in addition to supporting immediate and/or direct editing of values in a bus master, the editor supports such editing of values in a bus slave. The editor can, likewise, respond to user input defining and/or modifying one or more those values (in the bus slave) by generating indicia of the defined or changed values for logging by the change tracking system. In addition, it can store those values to one or more objects representing the slave in the model.

Other aspects of the invention provide methods paralleling operation of the apparatus described above.

Change Tracking

Still other aspects of the invention provide improved apparatus for configuring a control system that includes a model that is made up of one or more objects representing one or more devices in the system. The objects have parameters reflecting characteristics of the devices represented by the respective objects. At least one of those parameters is associated with a "track" attribute indicating whether at least selected configuration information transferred from that object to the respective device in the control system is to be logged to a change tracking system.

A download service transfers configuration information from objects in the model to devices in the control system. Those downloads can go directly to the respective devices or can go indirectly, e.g., via other devices in the control system (such as controllers, field bus modules, and so forth). Regardless, the download service according to this aspect of the invention generates for logging by the change tracking system indicia of that transferred configuration information. Generation of those indicia is governed, at least in part, by the "track" attribute associated with one or more of the parameters with which the transferred information is associated.

According to further aspects of the invention, an object can be created and/or otherwise defined as a descendant of an existing object, using edit functionality (or "editor") of the apparatus. A descendant object inherits parameters from its ancestor object(s), such that a change to the latter is effective as to the former. In related aspects of the invention, an editor (or other such functionality) permits a user to edit parameters and attributes of an object, including the "track" attribute.

As above, according to aspects of the invention, the objects of the model utilized in an apparatus as described above can represent, by way of non-limiting example, field devices, control devices, control processors, blocks, loops, and compounds. They can also represent entities of a control level hierarchy, e.g., sites, areas, process cells, units, and the like. Parameters can include, for example, inputs, outputs, alarm limits, and control functions. Attributes can include, for example, parameter names, data types, data value ranges, and so forth.

To illustrate by way of a non-limiting example, an apparatus according to the invention for use in configuring process control systems can employ an object to model a "conventional" analog input (AIN) field device of the type used in a particular product. That object can include output, high-high alarm, high-low alarm and other parameters of the type used for configuring such devices. One or more of these parameters, say, for example, the high-high alarm and high-low alarm parameters, "track" attributes indicating that their respective (alarm) values are to be logged to the change tracking system at download time.

The editor can be used to define a further object, one that models an analog input device for use for high-temperature measurements (throughout). That object can descend from the general AIN object and inherit its parameters, e.g., the high-high alarm and high-low alarm parameters, along with their respective attributes—e.g., their alarm value and track attributes. The editor can be used, for example, to alter those attributes, e.g., changing the alarm values and disabling the "track" attribute, say, for the high-low alarm of the new object.

When downloading the model to the control system, download services can transfer alarm (and other values) from the parameters of the objects to their respective entities in the control system. Depending on the respective track attributes, those services also transmit the downloaded values to change tracking system for logging. In the example, high-high alarm and high-low alarm values from the general AIN object, while only the high-high alarm of the high-temperature AIN object, are logged.

In other related aspects of the invention, the download service of an apparatus as described above generates, as indicia of the transferred configuration information, one or more XML files that include, for example, the names of transferred parameters and their values. That information can be stored by the download service for retrieval and reporting—e.g., independently and/or along with other such information from past and future downloads to the same and/or other devices in the system—to equipment operators, plant owners and other users.

Further aspects of the invention provide an apparatus as described above in which at least one object of the model includes a "lock" attribute. Depending on the value of that attribute, the editor permits or prevents, e.g., a user, from changing the track attribute of the corresponding parameter. In related aspects of the invention, the "track" attribute of an object cannot be edited if an inherited "lock" attribute is defined to prevent such editing—at least until the "lock" attribute of the ancestor is changed and/or the one or both parameters of the descendant are overridden.

Continuing the example, if the "lock" attribute of the high-high alarm of the general AIN object is set to prevent modification of the "track" attribute of that same parameter, attempts by the user to change that attribute in that object or its high-temperature descendant object will fail—thereby ensuring that the high-high alarm will be logged for both objects during download.

In still further aspects of the invention, the download service of an apparatus as described above selectively transfers configuration information from objects of the model to a device in the control system based on information is a characteristic of the device reflected other than in those objects. According to one such aspect of the invention, such transfers can be conditioned on values in a description file associated with the device. In a related aspect of the invention, the user may override settings contained that file and/or otherwise force (or prevent) downloading of configuration information to the respective devices and/or logging of that information to the change tracking system.

Other aspects of the invention provide methods paralleling operation of the apparatus described above.

Still further aspects of the invention provide combinations of the systems, apparatus and methods described above.

These and other aspects of methods and apparatus according to the invention are evident in the drawings and in the description below.

Methods and apparatus according to the invention have numerous advantages over the prior art. Among these is the ability to quickly, flexibly and accurately design and modify control configurations.

BRIEF DESCRIPTION OF THE DRAWINGS

A more complete understanding of the invention may be attained by reference to the drawings, in which:

FIG. 12 is a parameter editor example in a system according to the invention;

DETAILED DESCRIPTION OF THE ILLUSTRATED EMBODIMENT

Figure 1:
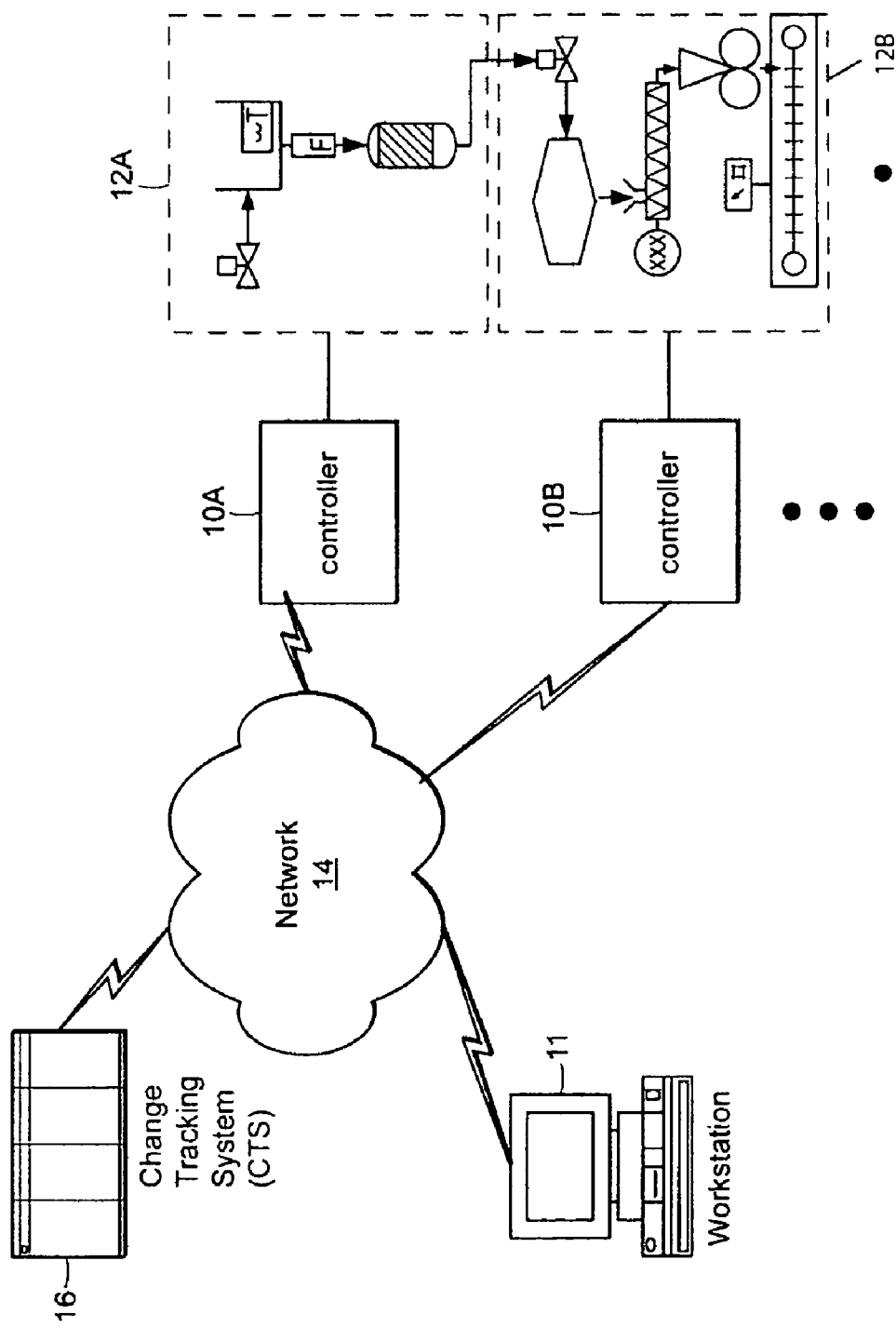
FIG. 1 depicts a a digital data processing environment of the type in which the invention is practiced.

FIGS. 1-2 depict a digital data processing system of the type with which apparatus and methods according to the invention may be practiced. The illustrated system is particularly adapted for use in connection with process control, as discussed further below. However, those skilled in the art will appreciate that apparatus and methods according to the invention can be used in connection with other control systems. In this regard, subsystems 12A, 12B can encompass any industrial, manufacturing, service, environmental or other process, device or system under monitoring or control (hereinafter, collectively, "control").

The system of FIGS. 1-2 include a workstation 11 that is coupled to one or more control devices, here, controllers 10A, 10B, actuators 18, sensors 24, 26, and so forth, on some of which reside process control algorithms for monitoring and/ or controlling one or more processes within subsystems 12A, 12B. These may represent independent processes or different aspects of the same or related processes. Moreover, the processes encompassed in subsystems 12A, 12B may reside within a single plant, site or area, cell or unit or, conversely, they may dispersed among many plants, sites, areas, cell or units.

Workstation 11 represents an engineering workstation, personal computer, mainframe computer or other digital data processing device suitable for operation in accord with the methods described herein for purposes of modeling a control system and configuring controllers 10A, 10B and other control devices (e.g., actuators 18, sensors 24, 26, and other field devices—of the "smart" variety or otherwise) or controlled apparatus in accord with the teachings herein. Though illustrated as being carried out on workstation 11, those skilled in the art will appreciate that the modeling and configuration functions described herein can be executed on suitably configured controllers 10A, 10B or other control devices (e.g., smart field devices or other control devices those having sufficient processing power and interfaces to provide the graphical and other configuration functions described herein). A discussion of the use of smart field devices and other control devices for modeling and control is provided, by way of example, in U.S. Pat. No. 6,788,980, entitled "Methods and Apparatus for Control Using Control Devices That Provide a Virtual Machine Environment and That Communicate Via an IP Network," the teachings of which are incorporated herein by reference.

Network 14 provides a communications medium permitting the downloading of control algorithms and other configuration information to controllers 10A, 10B and other control devices 18, 24, 26 (or controlled apparatus), e.g., from workstation 11. It can also provide a medium for uploading information from controllers 10A, 10B and other control devices 18, 24, 26 (or controlled apparatus) to those other digital data processors 11, 16. Still further, it can provide a medium for communications, real-time or otherwise, among and/or between the controllers 10A, 10B and other control devices 18, 24, 26 (or controlled apparatus) and other devices, e.g., workstation 11 and change tracking system 16. Though illustrated to represent a LAN, WAN, or global network (Internet), those skilled in the art will appreciate that element 14 may represent any medium or mechanism through which control algorithms and configuration and other information may be transported, electronically, physically or otherwise, to and from controllers 10A, 10B.

Change tracking system 16 is a conventional system of such type known in the art for logging configuration information downloaded to the control system, e.g., to controllers 10A, 10B and the other control devices (e.g., actuators 18, sensors 24, 26, and other field devices) or controlled apparatus. This can be for regulatory purposes, safety purposes, maintenance purposes or otherwise, which the system 16 can additionally support, e.g., via retrieval and reporting services (discussed below). That logged information can include, by way of non-limiting example, control algorithms, operational parameters, I/O assignments, and so forth. In the illustrated embodiment, the change tracking system 16 comprises a change tracking (or management) system of the type known in the art and/or commercially available in the marketplace, albeit as adapted in accord with the teaching hereof. By way of non-limiting example, the change tracking system 18 may comprise FoxCMS®, marketed by the assignee hereof, again, as adapted in accord with the teachings hereof.

Figure 2A:
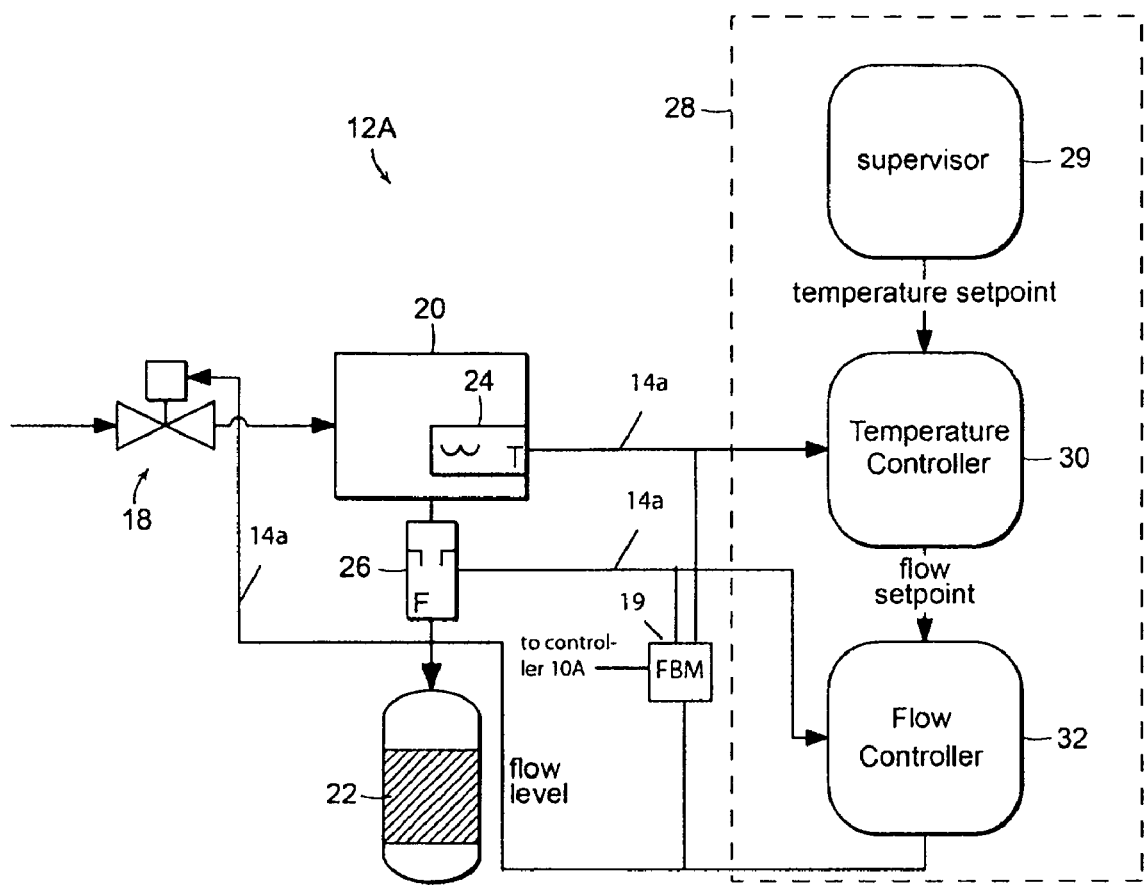
FIGS. 2A-2B depict a process control system of the type with which the invention is practiced.

An exemplary subsystem 12A including a control process is illustrated in greater detail in FIG. 2A. It shows an actuator, such as valve 18 (or other field device), that governs the rate of fluid flow to aeration tank 20 which, in turn, transfers the liquid to storage tank 22. Field devices, i.e., sensors 24 and 26, monitor the state of process 12A and, thereby, facilitate its control by controller 10A which executes a control algorithm 28. Thus, sensor 24 is disposed in or adjacent to tank 20 for measuring the temperature of fluid therein, while sensor 26 measures the flow of fluid from aeration tank 20 to storage tank 22. The illustrated actuator (valve 18), sensors 24, 26 and other field devices (not shown) in the illustrated subsystem may of the "smart" variety or otherwise. In this regard, "smart" field devices are those of the type known in the art that may, for example, include embedded processors and/or other logic suitable for advanced configuration and/or operational modes—including execution of control algorithms of their own.

FIG. 2A further illustrates a control algorithm 28 of the type that can be configured by methods and apparatus according to the invention. Here, the algorithm 28 is executed by controller 10A to communicate with and/or coordinate operations of the field devices 18, 24, 26 and, thereby, to control the processes being carried out in subsystem 12A. The algorithm 28 includes blocks or other entities 29, 30, 32, that model those field devices—and, more generally, that model those and other control devices and other elements within subsystem 12A or, more generally, in system 10—and that monitor and/or control the states and interactions between those entities.

Figure 2B:
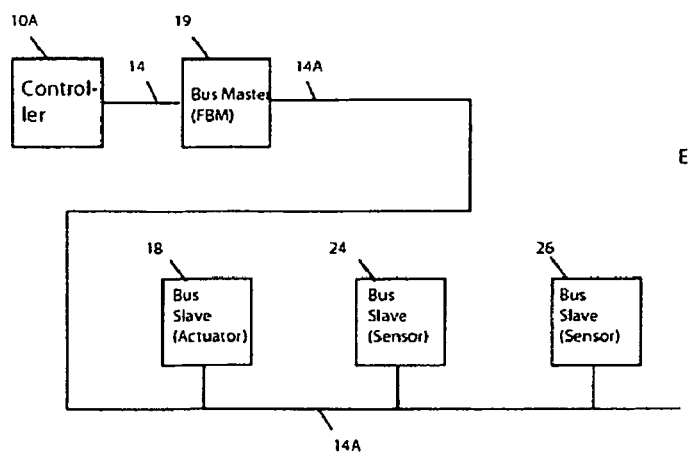

FIGS. 2A and 2B further illustrate that one or more of the control devices—e.g., controllers 10A, 10B and the other control devices (e.g., actuators 18, sensors 24, 26, and other field devices) or controlled apparatus—can be coupled for communication via portions of the network 14, here, network segment 14a. Those segments can comprise any network media known in the art and/or available in the marketplace suitable for such purposes. Thus, by way of non-limiting example, referring to FIG. 2B, the segment 14a of the illustrated embodiment comprises a Profibus field bus and can include a bus master, e.g., by way of non-limiting example, a field bus module or "FBM" 19, that configures and/or controls communications on the segment 14a. It can also include bus slaves, here, actuators 18, sensors 24, 26, and other field devices, whose communications on the segment determined by such a master.

Illustrated FBM 19 comprises any conventional control device of such type (e.g., a field bus module) known in the art suitable for serving as a bus master, as adapted in accord with the teachings hereof. In addition to configuring and/or controlling communications on segment 14a in the conventional manner of a bus master (here, for a Profibus and, again, as adapted in accord with the teachings hereof), the FBM 19 may serve other functions, e.g., providing power to the bus slaves or otherwise, by way of non-limiting example. Though shown here as a field bus module, it will be appreciated that the bus mastering function may be provided by other control devices, instead or in addition.

The bus slaves can comprise any conventional control devices of such type known in the art, as adapted in accord with the teachings hereof, e.g., whose communications on the segment are determined by the bus master. Thus, for example, these are devices that communicate on the segment only in response to polling by and/or queries from the bus master and/or during time slots predetermined by the bus master or otherwise. Those skilled in the art will appreciate that these are only examples of modes of communications by bus slaves and that bus slaves that communicate in other modes are contemplated hereby, as well. As noted, in the illustrated embodiment, the bus slaves comprise actuator 18 and sensors 24, 26. It will be appreciated that these are examples and that other devices may comprise bus slaves instead or in addition.

As noted, illustrated segment 14a operates in accord with the Profibus standard. In alternative embodiments, the segment 14a can be compatible, instead or in addition, with the Fieldbus Foundation standard (i.e., a "Fieldbus Foundation link"), the Hart standard, the Modbus standard, or otherwise, and can include (as applicable) bus masters and/or slaves necessary and/or desirable to practice in accord with those standards.

Entities 29, 30, 32 comprise software components which may include, by non-limiting example, source, intermediate or executable code, databases, of the type conventionally used in the art for operating controllers, field devices, control devices and other control equipment. Referenced in this regard in the discussion below are software components, and process control systems in general, marketed as the I/A Series® systems (hereinafter, "IAS" or "I/A") available from the assignee hereof. Those skilled in the art will appreciate that methods and apparatus according to the invention can be used to model processes and configure control algorithms for use with other control systems, as well.

Described below is a system, referred to here as the Control Algorithm Configurator, the Configurator, the illustrated configuration system, and the like, according to the invention for use in modeling and configuring control processes, as well as for logging downloaded configuration information for change tracking. That system can be constructed and operated in the manner of process control "configurators" of the type known in the art—as adapted in accord with the teachings hereof. Thus, by way of example, it can be constructed and operated in the manner of the process control configurator referred to as the "IDA Control Algorithm Configurator," and the like, in aforementioned incorporated-by-reference U.S. Pat. No. 6,754,885—again, as adapted in accord with the teachings hereof.

Overview

By way of overview, the Configurator employs objects (or other data and/or programming constructs) to represent the devices that make up a control system, the entities that define the control algorithms executed by those devices, the processes or systems being monitored and/or controlled by those devices and algorithms, as well as the entities within the configuration apparatus itself.

In the illustrated embodiment, the objects represent, by way of non-limiting example, field devices, field bus modules (FBMs), control devices, control processors, blocks, loops, compounds, bus masters, bus slaves, networks, field buses, historians, object type categories, object connections, parameter connections, display placeholders, graphical display entities, and reports—all by way of non-limiting example. They also represent entities of a control level hierarchy, e.g., sites, areas, process cells, units, and the like. Thus, by way of non-limiting example, the Configurator utilizes objects to represent the elements shown in FIGS. 1, 2A and 2B, including, but not limited to the bus master (FBM) 19 and bus slaves (e.g., actuator 18 and sensors 24, 26).

By way of further example, the Configurator employs "connection" objects to indicate the permissibility of relationships between other types of objects. Indeed, the Configurator can validate potential relationships between those other objects by comparing their types with the permissible combinations identified in connection objects. To illustrate, a user can employ an editor to select objects that represent field devices and indicate (e.g., via a drag-and-drop operation, a menu option or other command) that she wishes to establish a relationship with an object that represents a control processor. The Configurator validates that relationship, and determine its type, by comparing the proposed combination against permissible pairings in the connection objects.

The objects are stored in the database(s) discussed below and are alternatively referred to as the "database" and/or the "model. They are depicted in the object diagrams provided in the figures attached hereto and discussed herein, as well as by the graphical and textual representations thereof (typically, in the context of the editors), again, in the figures attached hereto and discussed herein.

Parameters, discussed below and elsewhere herein, define characteristics of each object and, therefore, of the element or entity the object represents. Depending on the type of object, these include inputs, outputs, alarm limits, control functions and display characteristics, among others. Each parameter can have attributes that define the parameter's value and other attributes. These include, for example, parameter name, parameter grouping, display label, data type, behavior, help information, edit type, data value range, formula definition, and display format.

Objects used by the Configurator can be defined or modified without recompilation. This is, in part, because the parameters on which they are based can be assigned and modified during configuration and, in this regard, are analogous to data. To this end, the Configurator includes the edit functionality discussed below, by way of non-limiting example, and referred to herein as "editors," that facilitate definition, during configuration, of the association between parameters and their respective objects.

These edit capabilities or "editors" permit, among other things, the user to configure a process control system. Using a graphical user interface of such an editor, for example, a user can "drag-and-drop" an object that models one system component (e.g., a printer) onto an object that models another component (e.g., an applications workstation), indicating that the user wishes to establish a relationship between those two objects.

The editors also permit an object to be defined as a descendant of another object at the time of configuration. An object so defined derives parameters from its ancestor which, in turn, derives parameters from its own ancestors, and so forth. Unless otherwise overridden, a change to the parameters of an ancestor object is effective as to its descendants, regardless of whether that change is made before or after the descendant is defined or instantiated. Thus, for example, the characteristics of an entire ancestral "family" of objects can be changed, simply, by modifying the distant-most ancestor object.

To illustrate by way of a non-limiting example, an apparatus according to the invention for use in configuring process control systems can employ an object to model a "conventional" analog input (AIN) field device of the type used in a particular product. That object can include output, high-high alarm, high-low alarm and other parameters of the type used for modeling such devices. The Configurator can be used to define a further object, one that models an analog input device for use in high-temperature environments. That object can descend from the general AIN object and inherit its parameters, e.g., the high-high alarm and high-low alarm parameters. Configuration-time changes to the parameters of the general AIN object can automatically carry through to the high-temperature AIN object, thus, facilitating configuration of the process control system.

As evident in the discussion below, the Configurator permits association of an object with parameters other than those inherited from ancestors. Thus, for example, a high-temperature AIN object that inherits parameters from a general AIN object can be defined to include additional alarm parameters. Though definition of the additional alarm parameters does not affect the parent object (i.e., the general AIN object), it does carry through to children, grandchildren, etc., of the high-temperature AIN object.

Figure 3:
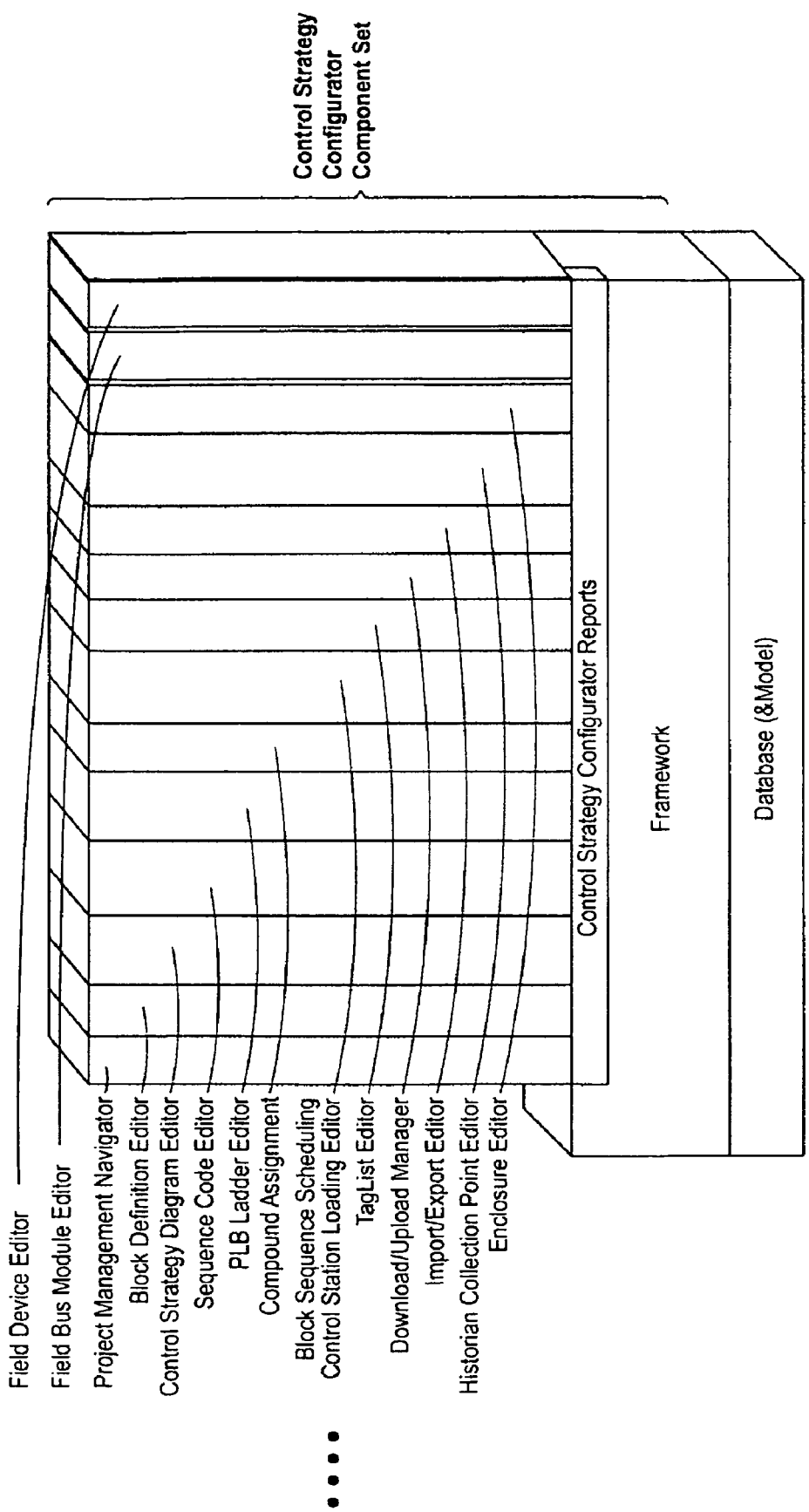
FIG. 3 depicts control algorithm configurator components in a system according to the invention.

Referring to FIG. 3, a configuration system according to one embodiment of the invention includes a Framework, a Database, a project manager and a set of editors. The Framework provides common resources, such as menus, toolbars, dialogs, and security services, used by the editors to manipulate, display and report configuration data stored in the model/configuration database. In one practice of the invention, the Configurator and Framework are packaged as a single application. This software package can be installed on either a stand-alone PC, workstation (e.g., element 11 of FIG. 1) or other digital data processor, e.g., running Windows NT or any other suitable operating system.

Figure 4:
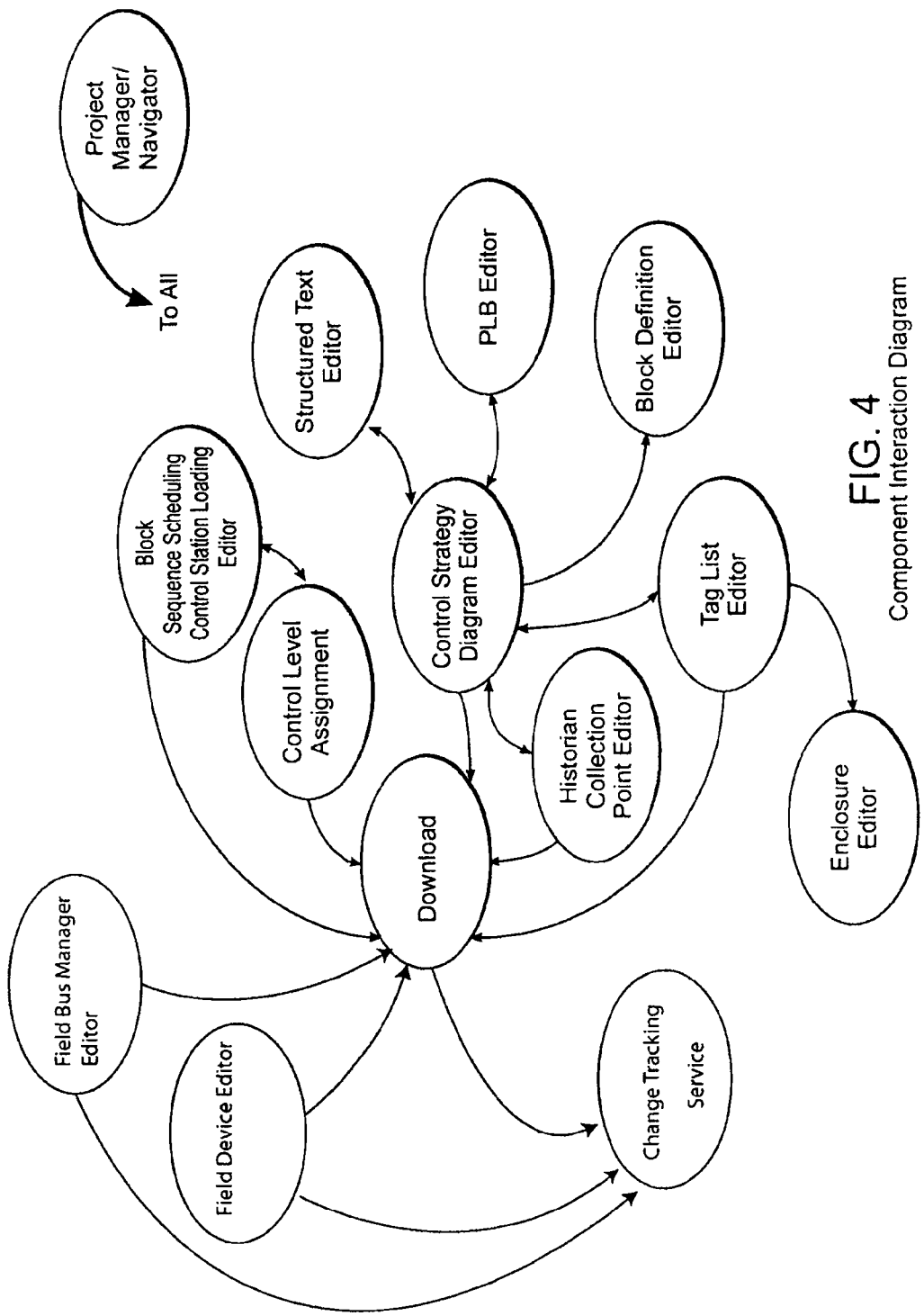
FIG. 4 depicts component interaction in a system according to the invention.

The editors are used by the implementation creator to create and maintain standard control scheme definition objects distributed with the implementation and by users to create their own plant control schemes. The Project Manager allows the user to browse through the project configuration hierarchies and data. Interactions among the editors and the project manager/navigator are shown, by way of non-limiting example, in FIG. 4.

The database forms part of an object oriented database management system (OODBMS), which may be any type commercially available in the marketplace. The database can be deployed in a client/server configuration with a single centralized database per plant servicing multiple clients, or otherwise. In the illustrated embodiment, it resides on the workstation 11, e.g., or on a digital data processor coupled therewith.

Part 1—Framework Classes
1 Framework Object Model

Figure 5:
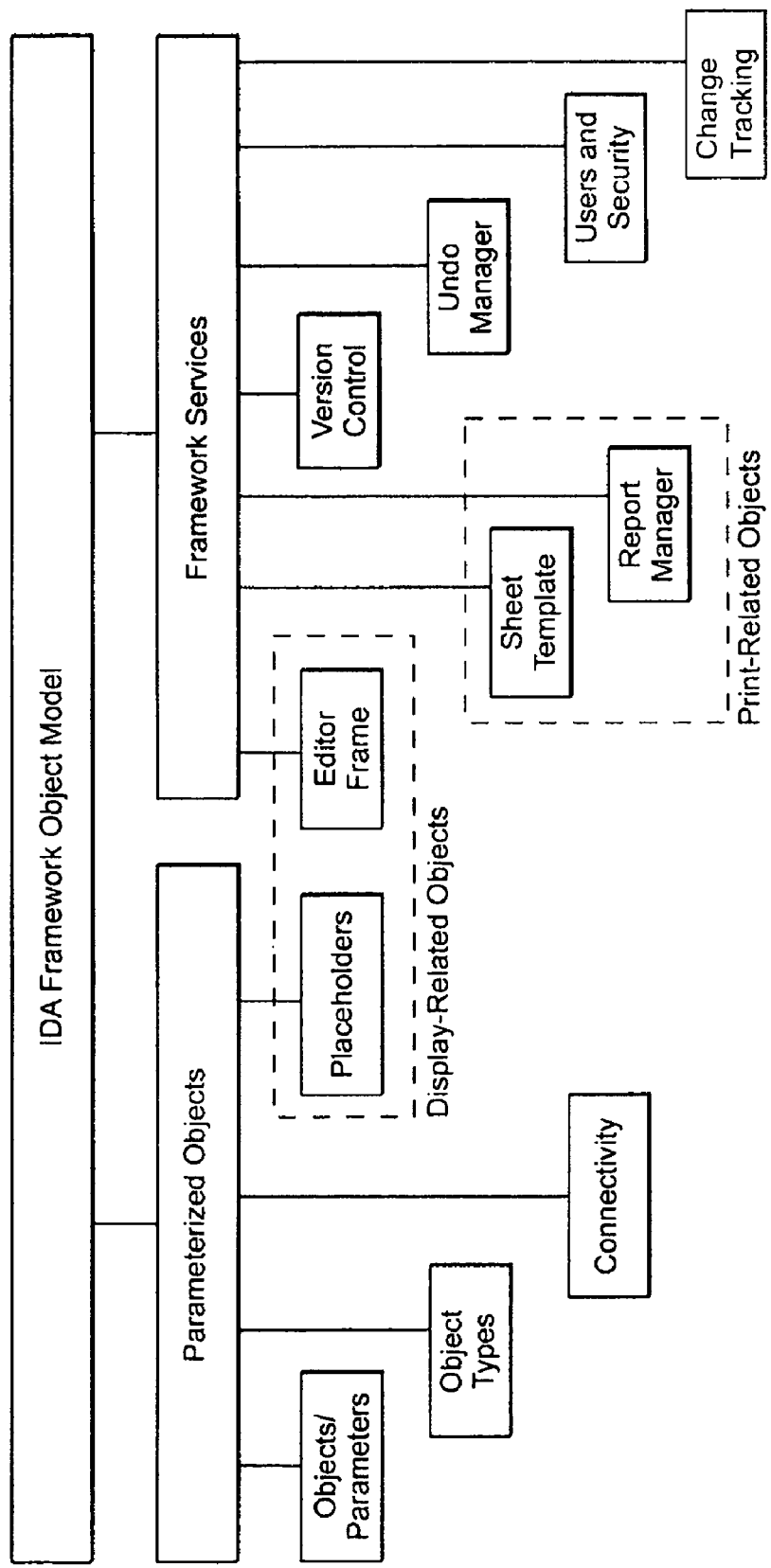
FIG. 5 depicts a framework object model in a system according to the invention.

FIG. 5 presents the primary component parts of the overall Framework object model of a Configurator according to one practice of the invention—in this case, the IDA Configurator described in incorporation-by-reference U.S. Pat. No. 6,754, 885. Though the Framework object model of other embodiments may differ, the illustrated model may be broken into two major areas:

1. Parameterized Objects.
2. Framework Services, which are provided in order to allow controlled access to those objects, and how they might be used to display, print and otherwise manipulate Parameterized Objects.

Figure 6:
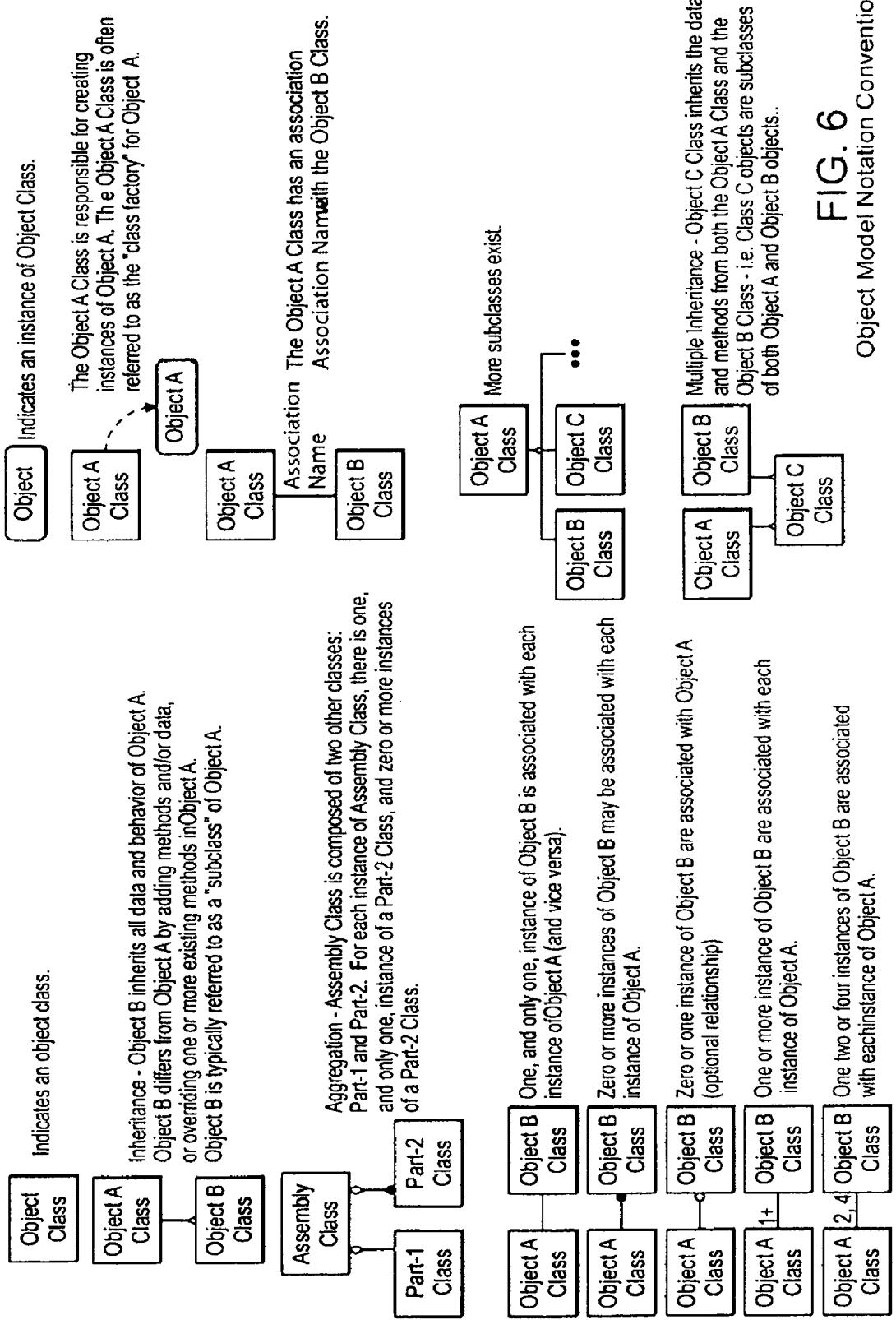
FIG. 6 depicts an object model notation used in this application.

In the discussion that follows object classes and their various associations are represented in the manner shown in FIG. 6.

1.1 Objects and Parameters

Almost all objects in the Configurator are parameterized—i.e., their type is determined by the parameter set they support, and the data that these objects represent is contained within their associated parameters. Parameterized objects have the capability to inherit their parameter set from another Parameterized Object which acts as the definition for the new object. A Parameterized Object's definition is, itself, a Parameterized Object.

Using Parameters to define an object's type, and the data associated with it, provides the following capabilities:

Parameters represent data—they aren't compiled-in behavior.

Parameterized Objects support data inheritance—a Parameterized Object inherits its structure and default values from its defining object.

Any object can override the default value of various attributes of an associated Parameter. Referred to as parameter instantiation by exception, only the Parameter attributes that differ from their defaults are instantiated, and attached to the object.

Parameters associated with a Parameterized Object can also be changed by the application of a modifier object, effectively overriding the default value(s) of any matching Parameters.

A change to a Parameter in a Parameterized Object acting as a definition is reflected in all the Parameterized Objects that are derived from the defining Parameterized Object.

Parameterized Objects can extend their definition by adding additional Parameters.

Parameters are organized into groups, each group containing logically-related Parameters. Groups can be predefined and/or defined by the user.

Given the complex nature of Parameterized Objects and their parameter sets, a simple interface for the developer is provided in which it appears that a Parameterized Object consists of a self-contained, cohesive set of parameters when in reality, data inheritance, parameter overrides, and modifications are all acting together to determine final parameter values.

1.1.1 Object Model

Figure 7:
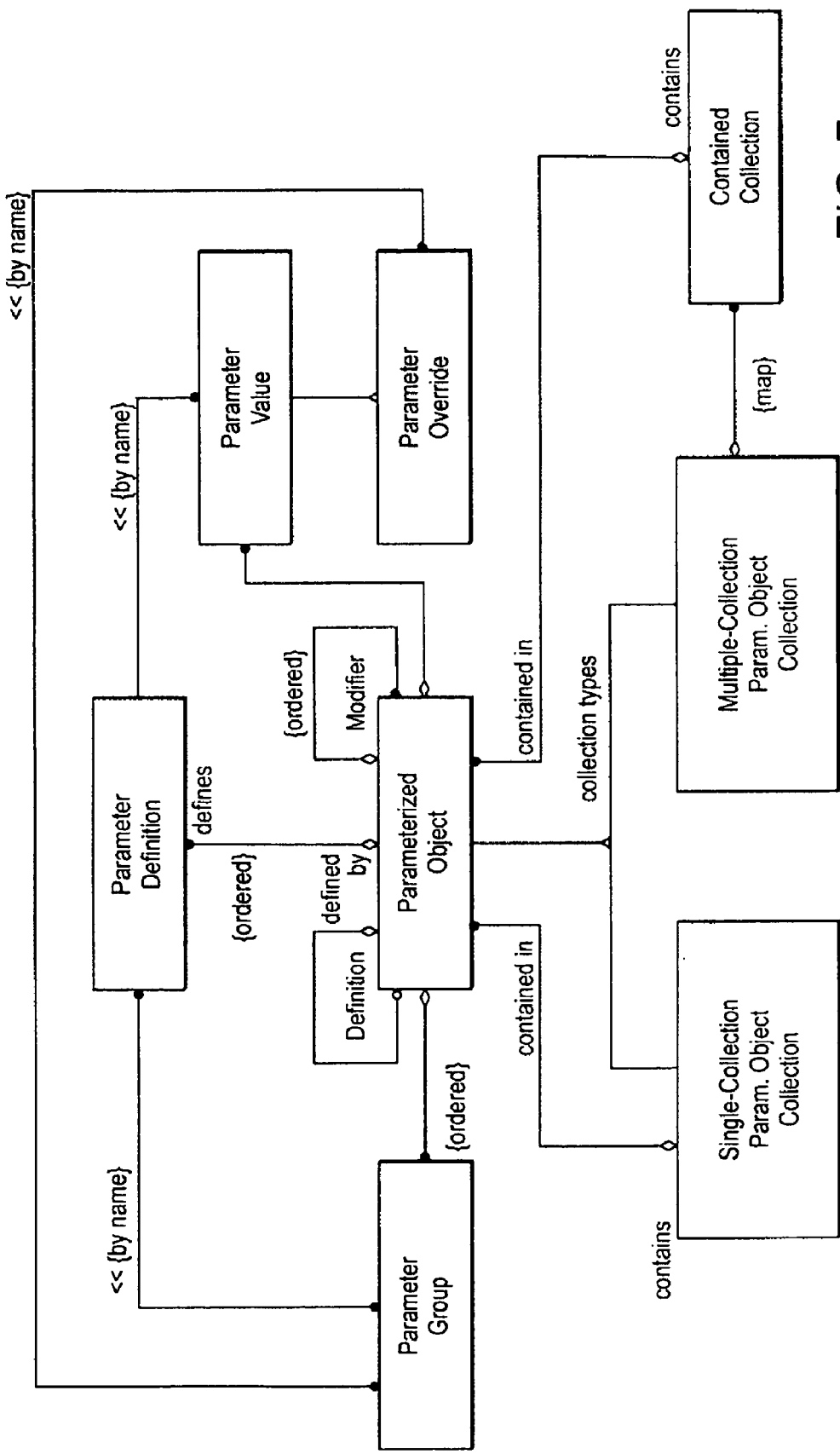
FIG. 7 depicts a parameterized object model in a system according to the invention.

The overall object model for Parameterized Objects, and Parameterized Object Collections is depicted in FIG. 7.

1.1.1.1 Parameterized Object

A Parameterized Object is a persistent object. The parameters associated with a Parameterized Object are both locally defined (as depicted in the object model) and inherited. The locally defined parameters are those defined by the Parameter Definition objects. The inherited parameters are those that are inherited through an association to another Parameterized Object typically serving as a definition.

- A Parameterized Object has an ordered one-to-many association with the Parameter Definition object. This represents the set of locally defined parameters which "belong" to, and ultimately define, this object.
- A Parameterized Object maintains a list of parameter overrides, in the form of Parameter Value and/or Parameter Override objects. Parameter Value objects are used to override the actual parameter value, and other important attributes such as high and low limits. Parameter Override objects are used to override all other editable parameter attributes. Only inherited parameters are overridden—locally defined parameters simply have the appropriate attribute value changed within the associated Parameter Definition.
- A Parameterized Object has an association to another Parameterized Object from which it inherits parameters. It is a zero-or-one association, and is referred to as its Definition, or parent, Parameterized Object. If a Parameterized Object does not have a definition, then it is considered to be a root Parameterized Object. A root Parameterized Object defines all of its parameters, not relying on another object to inherit them from. If a Parameterized Object has a Definition Parameterized Object association, then the Parameterized Object is a derived Parameterized Object. The derived Parameterized Object gets its parameters by inheriting them from the defining object and by adding its own through local Parameter Definition associations.
- A Parameterized Object maintains a list of other Parameterized Objects that inherit its parameters. A Parameterized Object whose parameters are inherited by other parameterized objects is referred to as a Definition, or parent, Parameterized Object. There is no limit as to the number of objects for which a Parameterized Object can act as a definition.
- A Parameterized Object maintains an ordered list of Parameter Groups associated with it. This association gives the Parameterized Object an ordered set of labels to put on the tabs of the Parameterized Objects' property page tabs while being edited, or on tabs at the top of the Parameterized Object editor. Parameter Groups, in turn, maintain an association with zero or more Parameter Definitions.
  - The Parameter Definition order maintained by the Parameterized Object applies across all Parameter Groups that the parameters belong to. In other words, if parameter A comes before parameter B in the association between Parameterized Object and Parameter Definition, then A will preferably appear before B whenever the two parameters are displayed in the same group.
- A Parameterized Object may be contained within a parameterized object collection object, which may be either a single- or multiple-collection instance of Parameterized Object collection. In turn, parameterized object collections may contain zero or more parameterized objects.
- An instance of Parameterized Object may be associated with zero or more other Parameterized Objects that are referred to as Modifier Parameterized Objects. The Parameter Values in the Modifier Parameterized Objects are used to override the parameters of the Parameterized Object. An instance of a Parameterized Object can have zero or more of these modifiers to modify their parameters. If an object has more than one modifier, the modifications are made in the order that the modifier objects were applied, with the resulting overrides representing the accumulative effect of having applied all the modifications.
  - The Framework provides the method(s) necessary in order to determine the behavior of a modifier object. By default, the Parameter Values in the Modifier which aren't associated with any Parameter Definitions (local or inherited) of the object being modified are ignored. However, there may be circumstances under which a developer needs to have all Parameter Definitions applied to the object being modified, potentially adding new parameters to the object.

1.1.1.2 Parameterized Object Collection Classes

A Parameterized Object Collection is just that—a collection of one or more Parameterized Objects. Applications programs can add or delete elements from the collection, and iterate through it. Parameterized Object Collections have the ability to support multiple collections. For example, a loop could collect both blocks and connections, whereas a compound could have a separate collection of blocks for each control zone.

Consequently, the Parameterized Object Collection classes have been separated into two classes, each of which will be able to support many different collection types, which include Lists (insert after/before), Arrays (indexed access, and "null" locations), and possibly Maps (or Dictionaries). These collection classes are:

1. Single-Collection. Instances of this class contain a single collection, presented as a single ordered list of objects.
2. Multiple-Collection. Instances of this class contain multiple, named collections. These named collections are references to instances of collections (i.e., instances of the Contained Collections) which are managed by the Multiple-Collection instance. Each collection within a Multiple-Collection object can be a different type (for example, a list and an array).

1.1.1.3 Parameter Definition

The Parameter Definition object defines the values for the attributes in a parameter. Even though it is only directly associated with one Parameterized Object, it may indirectly belong to many other Parameterized Objects via the parameter inheritance mechanism described in the discussion on Parameterized Objects.

The parameter object consists of a set of attributes. The attribute set is compiled-in behavior, and the value of each attribute is changed as needed to satisfy the requirements of the associated Parameterized Object. A Parameter Definition does not exist alone, but only in the context of a Parameterized Object.

In the illustrated embodiment, the attribute set for a Parameter Definition is as follows:

Name The unique identifier for accessing the parameter within a Parameterized Object. There cannot be more than one parameter in a Parameterized Object with the same name. This is the name used when downloading the parameter to a target machine.

Group A list of Parameter Groups which this parameter belongs to.

Label An internationalizable string used to label the Parameter in the user interface.

Data Type Specifies the data type of the Parameter. Integer, float, boolean, and string are examples of a data type. Depending on implementation, the length of the data can be either an attribute of the data itself or of the Parameter Definition. Can also be implemented via sub-classes of Parameter Definition.

Behavior Specifies a set of behaviors the Parameter exhibits. Examples include whether the parameter could be edited or associated with another Parameter. This can be implemented as a bitmask.

Help Specifies internationalizable help associated with the particular Parameter Definition. The help consists of both a verbose and terse version. The verbose version is used by the help system and the terse version is used for such things as short messages and tool tips.

Edit Specifies a specific control type used to edit the value attribute

Control associated with the Parameter Definition. This edit control type is used Type by any application editing this parameter, whether it is displayed in a property sheet, or in a spreadsheet format.

Range Specifies a range of valid values for the Value attribute.

Value Specifies the value of the Parameter. This value is type specific which is specified by the type attribute.

Formula Provides a placeholder to contain the user-provided formula for Parameter Definitions which have their Value attribute determined by a formula.

Format Specifies a C-printf type specification for displaying the value attribute.

The illustrated embodiment additionally adds the following attributes as part of the standard Parameter Definition:

Track Specifies whether this Parameter should be logged to the change tracking system when the Parameter value (or formula) is downloaded to the corresponding device in the control system. Values are "enabled" (changes should be logged) and "disabled" (changes should not be logged).

Lock Specifies edit permissions for the Track attribute. Values are (i) "unlocked" (the Track attribute can be changed), (ii) "locked" (the Track attribute cannot be changed).

The Parameter Definition object has a many-to-many association to the Parameter Group object. A Parameter Definition can belong to many groups, allowing the parameter to be displayed in multiple tabs on a Parameterized Object property sheet. The order of parameters within any Parameter Group is determined by the ordering maintained by the Parameterized Object.

The Parameter Definition object has a many-to-one association to the Parameterized Object. Although it may be inherited by several Parameterized Objects, a Parameter Definition belongs directly to (locally defined by) one and only one Parameterized Object. A Parameterized Object contains an ordered set of zero or more Parameter Definitions.

1.1.1.4 Parameter Value

An instance of the Parameter Value object is created whenever specific attributes of a Parameter Definition instance are overridden—namely, value, high range and low range. Any other attribute of a Parameter Definition which is overridden is specified by a Parameter Override object. It is important to note that a Parameter Value exists by exception only—in other words, it exists only if the associated Parameter Definition is overridden by a Parameterized Object located "down" the ancestral tree from the Parameterized Object where the Parameter Definition was originally defined. Overrides of a locally defined Parameter Definition simply replace the appropriate value within the Parameter Definition itself.

A Parameter Value is associated with one, and only one, Parameter Definition, by name. Attributes of the same Parameter Definition, however, may be overridden by multiple Parameter Values when viewed in the context of the Parameterized Object hierarchy chain.

The final value of any parameter attribute is determined by traversing the Parameterized Object hierarchy back to the object's root, then sequentially applying overrides (and/or modifiers) appropriately going forward down the object's hierarchy chain.

Each Parameterized Object maintains a list of zero or more Parameter Value objects. This list represents the set of locally defined value overrides associated with this Parameterized Object.

1.1.1.5 Parameter Override

The Parameter Override object is used by a Parameterized Object to override attributes of inherited parameters other than value, high range, and low range. Attributes which are typically overridden using this object include which parameter groups a parameter belongs to, format, and help strings.

A Parameter Override object is derived from the Parameter Value class. As such, it inherits all the behavior and attributes of the Parameter Value class in terms of existing by exception only, and how the final value of attributes modified within a Parameter Definition are determined.

A Parameter Override has a "special" relationship to Parameter Groups, in that one of the attributes of a Parameter Definition is a string containing all of the names of the groups which that parameter belongs to. In this relationship, the same Parameter Override may specify many Parameter Groups. In turn, the same Parameter Group may be referenced by several Parameter Overrides, resulting in a many-to-many relationship. As with other relationships dealing with Parameter Values and Overrides, this one is resolved by parameter name.

1.1.1.6 Parameter Group

The parameter set that defines the structure of a Parameterized Object is segregated into named Parameter Groups. These groups are directly related to the tabs contained within the property sheet for the Parameterized Object when it is edited, as well as the tabs visible on the Parameterized Object editor. Each parameter defined in an object belongs to one or more Parameter Groups.

Figure 8:
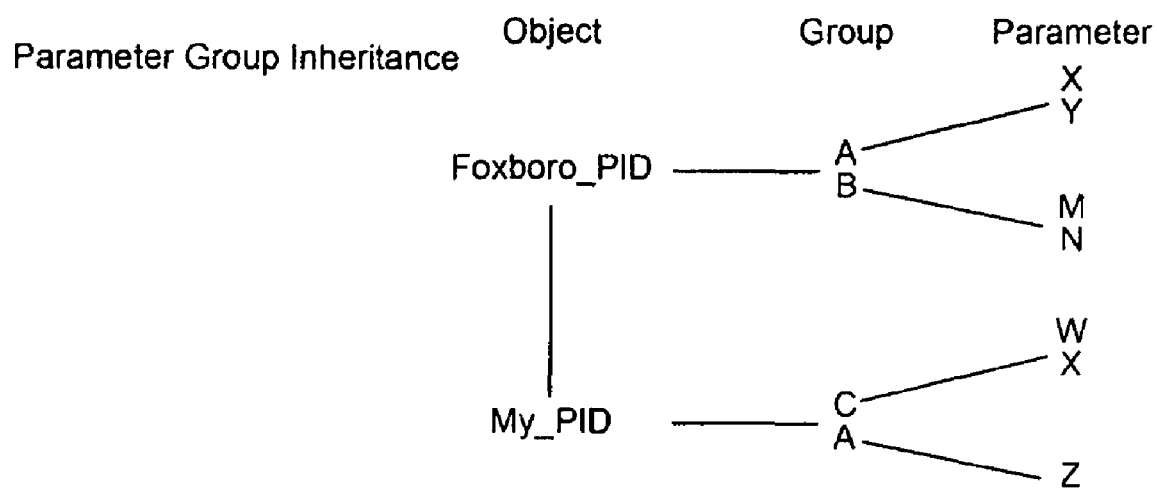
FIG. 8 depicts parameter group inheritance in a system according to the invention.

Parameterized Objects inherit their Parameter Groups in the same way they inherit Parameter Definitions. As depicted in FIG. 8, a Parameterized Object may add additional groups to the inherited list. The order of Parameter Groups, and the parameters within those groups, is also inherited, and is determined by the ordered list of parameters maintained by the Parameterized Object hierarchy chain.

In FIG. 8, an object Foxboro_PID is associated with two groups, A and B. Group A contains two parameters, X and Y, while Group B contains parameters M and N. A new object is created, using Foxboro_PID as it's definition object. A new group, C, has been defined for My_PID, which contains parameters W and X. A new parameter, Z, has been added to the inherited group, A.

When the object My_PID is edited, a property sheet with three tabs appears. The tabs are labeled A, B and C. If the user edits group A, parameters X, Y and Z are shown, in that order. Note that if a change is made to the value for parameter X, and switches to group C, the new value for X will be displayed.

The user can add new parameters (and define their order) to an inherited group, but not change the order of any of the inherited parameters contained in the group. All inherited parameters appear first on the property page, followed by the parameters which were added locally. Similarly, the user can add local groups, but cannot change the order of inherited groups when displayed on the property sheet. Local groups appear after inherited groups.

1.1.2 A Simple Parameterized Object Example

Figure 9:
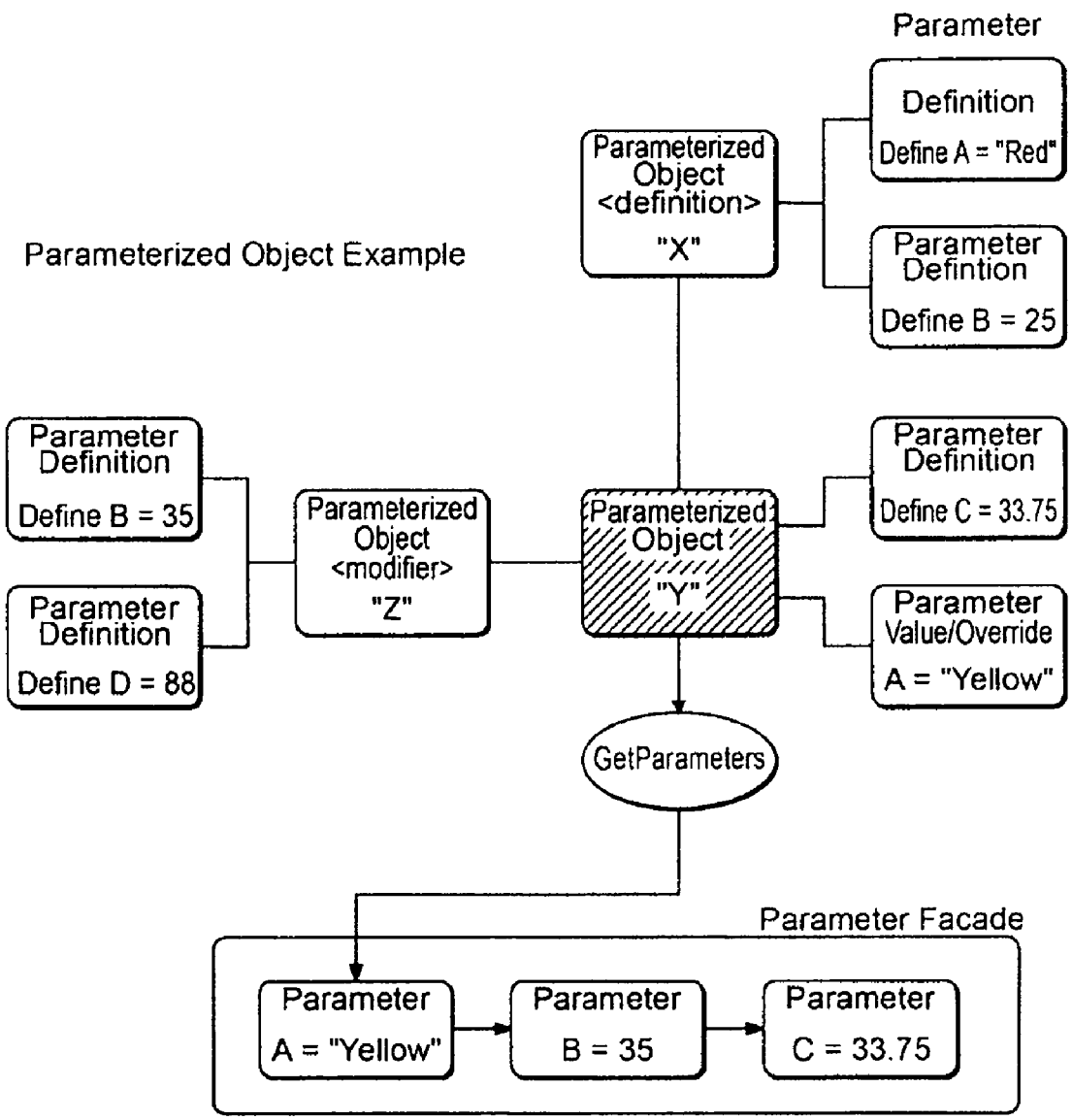
FIG. 9 depicts a parameterized object example in a system according to the invention.

The example in FIG. 9 shows how a parameter set of a simple Parameterized Object is constructed. Parameterized object "Y" has an association to its definition "X", and is modified by "Z". A call to a method to retrieve on parameterized object "Y" (depicted as "GetParameters" in the example) results in the list of parameters as shown.

Figure 10:
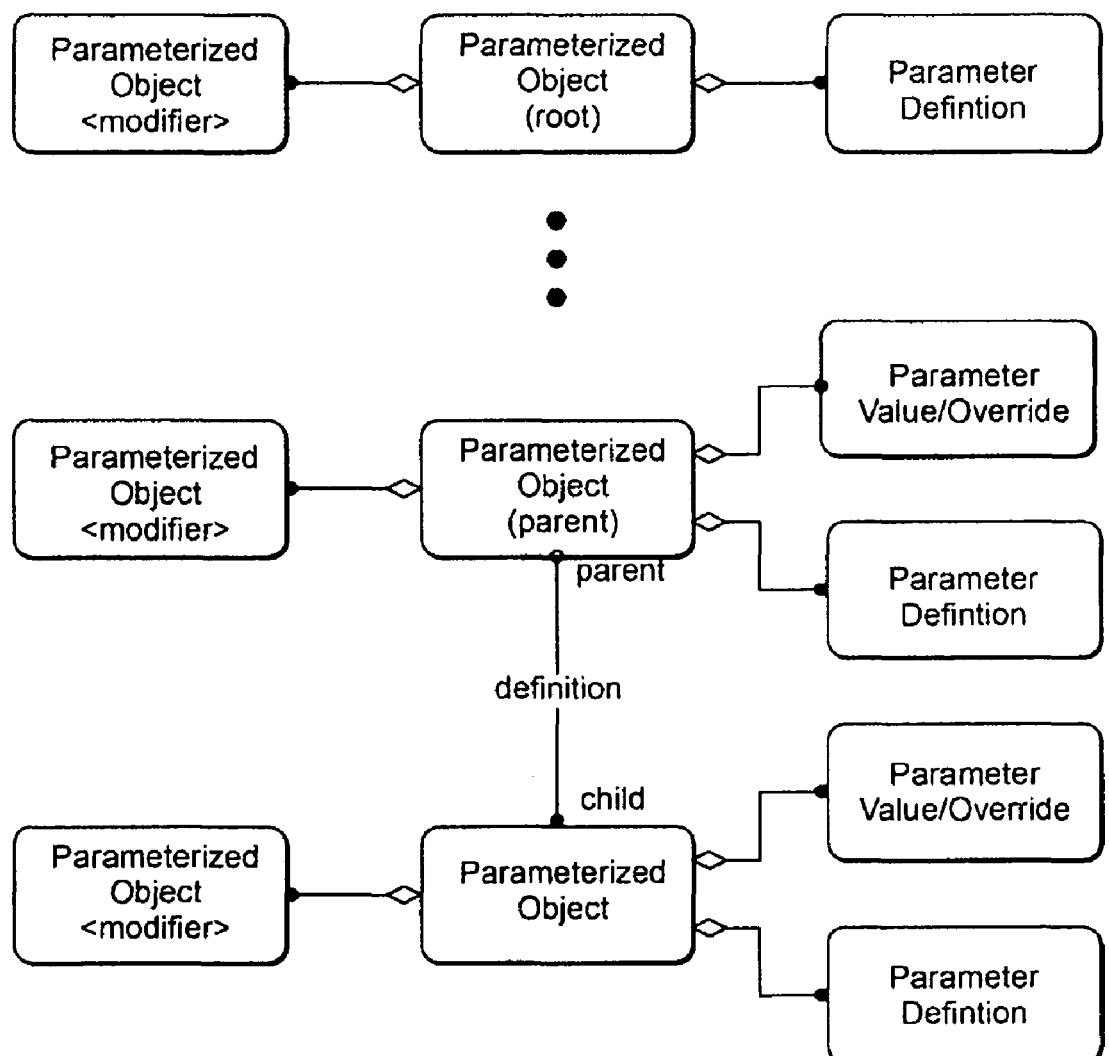
FIG. 10 depicts the creation of a parameter list in a system according to the invention.

The Parameterized Object has the capability to construct a list of parameter objects that are associated with it. The parameter list for a Parameterized Object is composed from two sources: the parameters that are inherited (including all overrides and modifiers, possibly n levels up the parameter inheritance tree), and the parameters which have been defined locally. FIG. 10 shows a instance model of the objects involved in constructing a parameter list for a simple Parameterized Object.

Listed below are the steps that a Parameterized Object takes when it is asked for a list of its parameters. Take note of step 2, which causes recursive behavior in that the inheritance tree is traversed all the way to the root Parameterized Object. The root Parameterized Object constructs a parameter list, finishes all 5 steps outlined below, and then returns that list to the next Parameterized Object down, and so, until the original calling Parameterized Object gets a list from step two. It then finishes steps 2, 3, 4, and 5 and the list is complete.

Step Action
1 The application asks for the parameter list of a Parameterized Object.
2 If there is a definition object, traverse the inheritance tree in order to add its parameters to the list first (this continues back to the root definition object).
3 If there are any Parameter Value and/or Override associations, then apply those to their respective inherited parameters in the parameter list.
4 If there are any Parameter Definition associations, then add those new parameters to parameter list.
5 If there are any Modifier Parameterized Object associations, then apply their Parameter Definition associations as if they were Parameter Override associations to their respective parameters in the parameter list.

1.1.3 Framework User Interfaces for Parameterized Objects

Figure 11:
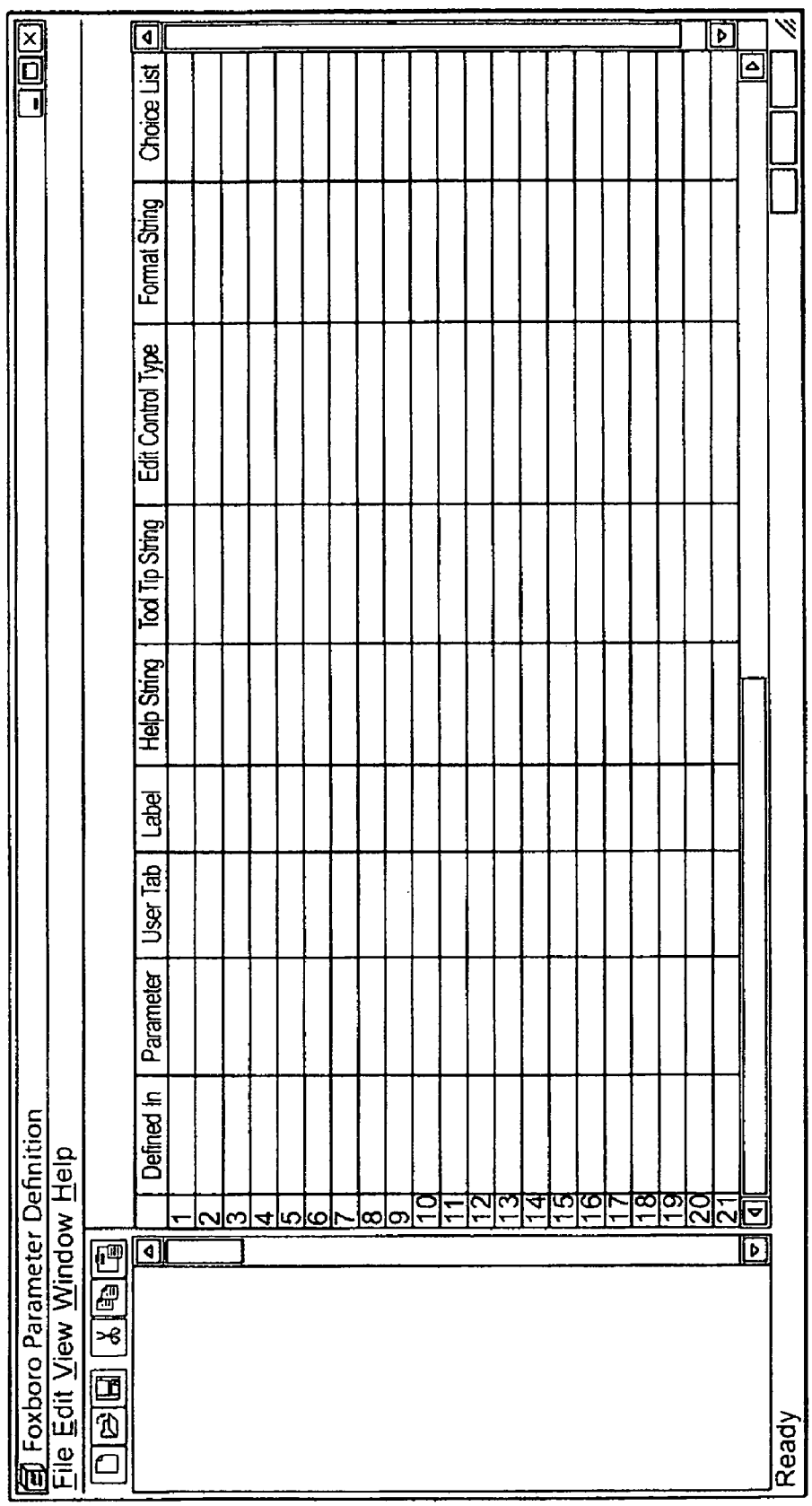
FIG. 11 depicts a parameter definition editor in a system according to the invention.

Two user interfaces are supplied by the Framework for working with Parameterized Objects on a daily basis. The first user interface supplied by the Framework to manipulate Parameterized Objects is a generic Parameter Definition Editor, which could appear as shown in FIG. 11. The Parameter Definition Editor is an interface which allows Parameter Definitions to be created for a Parameterized Object. This interface will most likely be utilized by someone with administrative and/or supervisory capability.

FIG. 11 provides a depiction of the Parameter Definition Editor. The Framework automatically provides the menu and toolbar services which the editor may need, a tabbed tree pane (shown on the left side of the figure), and a generic view pane which the application programmer can use for just about anything—e.g., a graphical "canvas", or a grid control able to display data in a spreadsheet-like format.

The second user interface is a generic Parameter Property Sheet mechanism which is used whenever anyone needs to edit the Value attribute of a parameter on any object. The property sheet can appear as FIG. 12. When the user double-clicks on a Parameterized Object, or in some other way activates an editing session on a Parameterized Object, a property sheet is created and displayed by the Framework. The individual property pages within the sheet correspond to each Parameter Group found to be associated with the object being edited. Each page, in turn, displays only those parameters which have been associated to the corresponding Parameter Group.

The current values of each parameter in the group are displayed, providing the user with the ability to change the values of configurable parameters, possibly creating Parameter Override objects. The "look-and-feel" of each parameter value displayed on the property page is determined by the edit control type which was associated with the corresponding Parameter Definition.

Some parameter values (such as an entire sequence block) require something more sophisticated in order to edit it. In these cases, a button containing an ellipses ( . . . ) appear next to the field, and when pressed, display the appropriate editor. In the event that a Parameter value is derived from a user-specified formula, the formula is also displayed, and allowed to be changed, on the property page.

Track and Lock Attributes

Referring back to FIG. 1, one or more parameters of objects that model controllers 10A, 10B and other control devices (e.g., actuators 18, sensors 24, 26, and other field devices) or controlled apparatus include "track" and "lock" attributes. In the illustrated embodiment, the "track" attribute is a Boolean or other value indicating whether (or not) configuration information contained in that parameter is to be logged to the change tracking system 16 when it (the configuration information) is downloaded to the corresponding device, e.g., control device or controlled apparatus. As with other inherited parameters, the "track" attribute applies not only to the parameter of an object in which it is directly defined or modified in the first instance but, also, to any descendant object that inherits that parameter. Logic for effecting the foregoing behavior and, specifically, this logging (or not) of downloaded configuration information can be provided in the Download Services discussed below, in view of the teachings hereof.

The "lock" attribute is a Boolean or other value indicating whether (or not) the "track" attribute of that parameter of that object can be edited, i.e., defined or modified, to change its value from "locked" (or Boolean "true") to "unlocked" (or Boolean "false") and vice versa. If "lock" is true, editors of the illustrated configuration system will not permit such editing; if false, they will permit such editing. Logic for effecting this behavior and, specifically, permitting (or not) editing of "track" attribute can be provided in the Framework (e.g., as part of the Parameter Definition Editor, the Parameter Property Sheet, or otherwise) in view of the teachings hereof.

In the illustrated embodiment, the "lock" attribute applies not only the the "track" attribute of the corresponding parameter of the same object, but also to that of descendant objects. Thus, for example, if "lock" attribute is defined or modified to a value of "true" in a parameter of one object, editors of the illustrated embodiment will not permit editing of the "track" attribute of any descendant objects—unless a system Process Engineer (or other user with sufficient security permissions) defines an override parameter for the descendant object(s) or alters the value of the "lock" attribute in the ancestor object.

Although in the illustrated embodiment, "track" and "lock" are defined as attributes of specific parameters, it will be appreciated that they may be defined and/or applied at differing levels of granularity. Thus, for example, either or both may be defined just once (e.g., in a designated parameter) for each object and treated as if applying to all parameters of the object.

1.2 Object Types

All configurable objects have an associated classification, or type, which they inherently belong to. An object's type is used to classify what it is, and is used primarily to segregate objects into groupings of objects exhibiting similar appearance and behavior (e.g., an AW70 and AW51, although both application workstations, have different physical characteristics which necessitates distinguishing between them at configuration time. Thus, multiple instances of AW70's would each have a unique identifier in the configuration, but each would have a type of AW70).

As used here and hereinafter, the symbols Awxxx, where xxx is a number, identifies an applications workstation available from the assignee hereof, The Foxboro Company, or other digital data processing apparatus. The term FBM or symbol FBMxxx, where xxx is a number, identifies a field device available from The Foxboro Company, or other field device for use in process control. The term CP refers to a control processor or other digital data processing apparatus suited for that function.

The Framework provides methods to return an object's type to the application. This type information may be used for a number of reasons, including: preliminary lookup to see if two objects can establish a connection; satisfy a search which uses a type filter; display of type information on an object's placeholder.

The concept of type may be further abstracted into the concept of type category, which is a broader classification of type. Several object types may belong to the same category (e.g. an AW70 and AW51 both belong the category Application Workstation). All objects in the same category exhibit the same general behavior as that defined by that category. For example, an FBM would be an object type category, whereas an FBM02 and FBM04 are examples of specific object types.

Consequently, it is convenient to think of object types as being contained within a type hierarchy. Each branch in the hierarchy would correspond to an object type category, whereas the leaves, or endpoints, of each branch would correspond to specific object types. The remainder of this section will present the data model, with examples, of this type hierarchy for the illustrated configuration system.

1.2.1 Object Model

Figure 13:
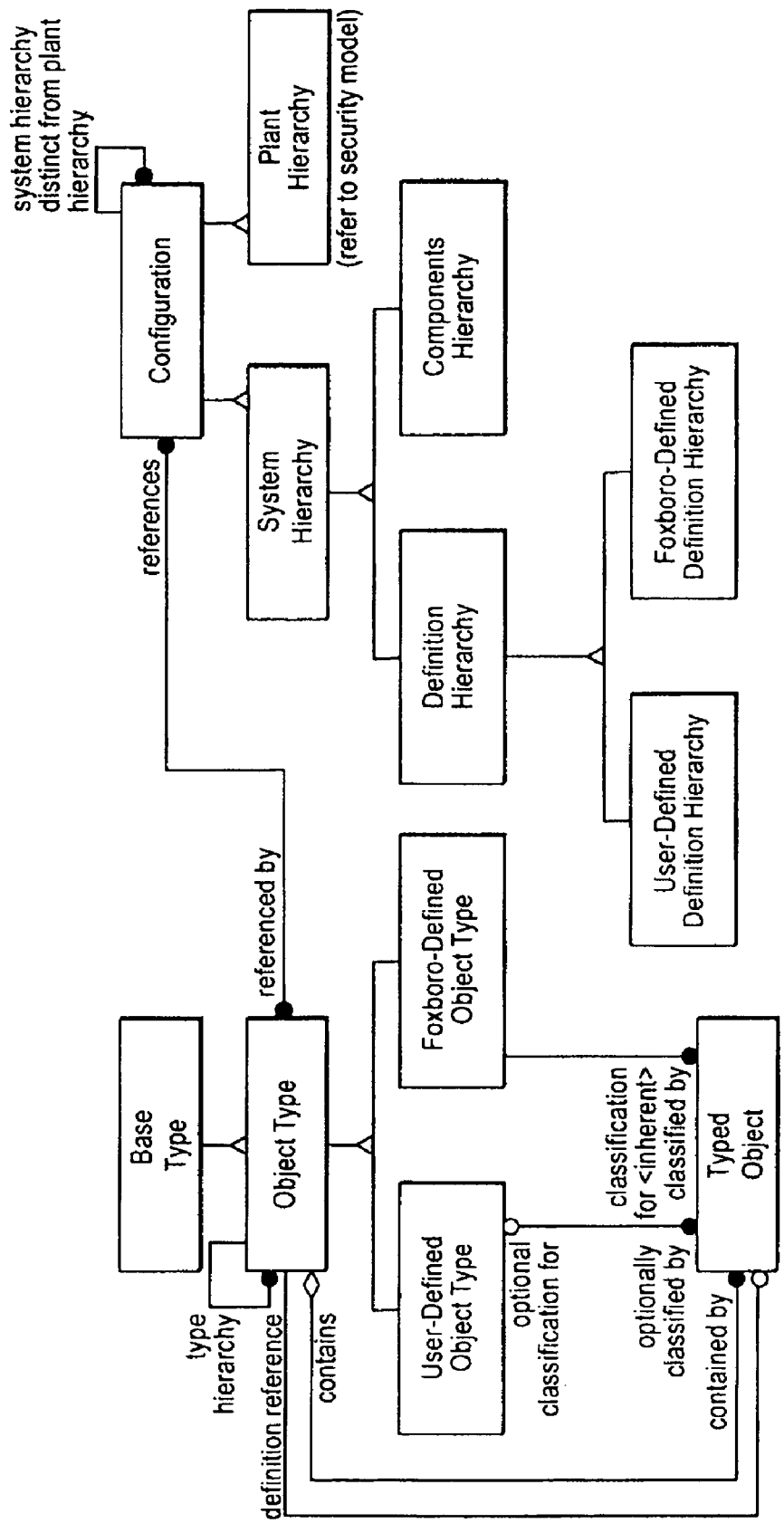
FIG. 13 depicts object types in a system according to the invention.

The object model used in the illustrated embodiment to support the concept of object types is shown in FIG. 13.

1.2.1.1 Base Type

This abstract base class is used only as a placeholder for containing data and methods common to all "type-ish" classes. The only one shown in the illustration is Object Type, but this can be expanded to include other types such as Parameter Type, etc.

1.2.1.2 Object Type

An object's type is used to classify what it is—i.e., all objects of the same type have the same appearance, and behave identically, differentiated only by minimal differences in associated data (e.g. name, ID, etc.) which is used to uniquely identify them.

The Object Type class is hierarchical—the branches of the hierarchy represent type categories, with the leaves, or endpoints, of the hierarchy being actual object types with which objects are associated. Instances of Object Types are Parameterized Objects, and may only be directly associated to a single type category (i.e., a specific object type cannot belong to more than one type category). Note, however, that even though an object type can only be directly associated with one type category, it may indirectly be associated with several type categories depending upon where it is in the type hierarchy. Every instance of Object Type has a pointer back to its containing type category, regardless of whether it's acting as a simple object type, or a type category itself.

All instances in the Object Type hierarchy are able to act as collections of Typed Objects. That is, each Object Type is able to maintain a list of all Typed Objects which are directly associated with the type itself. For example, all instances of an AIN block will contain a pointer back to the AIN instance of Object Type. In turn, the AIN instance of Object Type will maintain a list of all instances of AIN blocks in the configuration. This containment is meant to be only one level deep—in other words, there is no need for I/A Block, the containing instance of AIN, to also maintain a list of all AIN blocks (although nothing in the design would prevent it, if desired).

Additionally, each instance of the Object Type hierarchy which serves as a reference for a Typed Object requires a definition reference to the defining Parameterized Object which defines that Typed Object. This relationship provides quick access to the definition object when a symbolic representation of that definition is dragged and dropped into a view. For example, if the user clicks and drags an AOUT definition (either from the System Hierarchy, or from a library template) to a view, then drops it, this relationship provides access to the Parameterized Object which actually defines an AOUT block so that it can be created quickly.

Since an Object Type which can be referenced by a Typed Object requires a reference to the defining Parameterized Object, only those instances in the Object Type hierarchy be used to serve as the collection point for those same types of objects as they are created. If an Object Type doesn't have a defining reference, is not a container of Typed Objects.

The Object Type class is an abstract class—no instances of Object Type may exist in the database. Subclasses of Object Type are the implementation-standard Object Type class, and the User-Defined Object Type class. The Object Type class contains those methods common between the two subclasses, e.g. methods used to support the hierarchical relationship(s) in the type hierarchy, the containment relationship to Typed Object class, and the reference to its associated definition Type Object instance.

Summarizing relationships:

An instance of an Object Type is directly associated with one, and only one, other Object Type in the type hierarchy, and may represent either a type category, or an actual object type, depending upon where it resides in the hierarchy. For example, in the hierarchy Module→FBM→FBM04, object types Module and FBM represent type categories, and FBM04 represents an object type.

The Object Type class is an abstract class, and instances of this class cannot exist. An instance of an Object Type is preferably either a User-Defined Object Type, or a implementation-standard Object Type.

The Object Type class is hierarchical, with branches representing type categories, and leaves being object types. The hierarchy is restrictive—that is, an implementation-standard Object Type is preferably contained within a implementation-standard hierarchy, whereas a User-Defined Object Type can appear virtually anywhere in the hierarchy (but ultimately also contained within a implementation-standard type category).

Instances of the Object Type class contain a reference to their containing type category.

Instances of the Object Type class which can serve as a reference for a Typed Object maintain a list of all the Typed Objects of that same type which exist in the configuration.

Those same instances of the Object Type class maintain a reference to the Parameterized Object which is capable of acting as the defining object for creating Typed Objects of that type.

Figure 14:
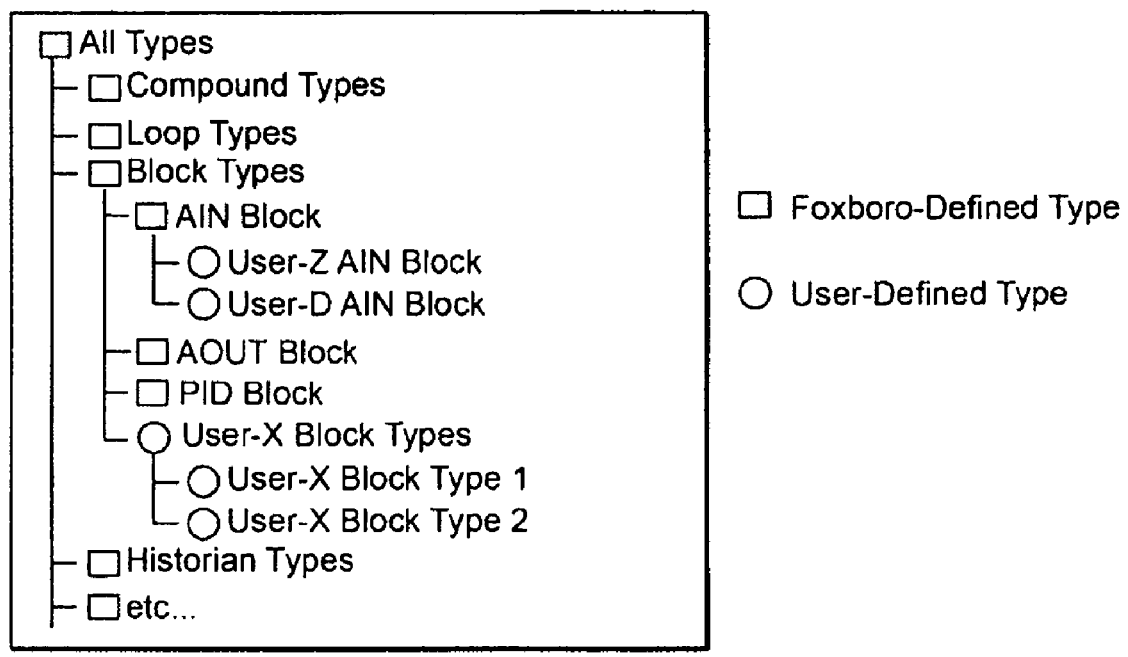
FIG. 14 depicts an object type hierarchy in a system according to the invention.

FIG. 14 depicts an example of how the object type hierarchy can appear in the Configurator. As mentioned previously, within the type hierarchy, branches form type categories, to which one or more object types belong. In the example shown in FIG. 14 are all examples of type categories. Within the category Block Types, AIN Block, AOUT Block, and PID Block are examples of implementation-standard object types, and User-X Block Types is an example of a user-defined object type.

1.2.1.3 Implementation-Standard Object Type

All objects which can be typed inherently belong to one Object Type (or type category)—that is the implementation-standard Object Type. Additionally, these objects may also optionally be associated with a User-Defined Object Type.

Each instance of implementation-standard Object Type defined in the database may be specified as the inherent type for one or more configuration objects. All Implementation-standard Object Types have a direct association with a type category, which is preferably also be Implementation-standard. In other words, a Implementation-standard Object Type may not be associated with a user-defined type category.

All Implementation-standard Object Types have three additional attributes—they are: configurable—all instances of this object type are able to be configured in an I/A configuration; assignable—all instances of this object type are able to be assigned to a process area; and downloadable—able to be realized (as an entity) on a target platform. Whether an object type is configurable, assignable and/or downloadable is determined at the time the instance of the Implementation-standard Object Type is created.

Summarizing relationships:

The Implementation-standard Object Type class is a subclass of Object Type.

An instance of a Implementation-standard Object Type is inherently associated with one or more instances of Typed Object (e.g., there can be many instances of an FBM04 in the configuration).

An instance of a Implementation-standard Object Type preferably belongs to a type category which is in the Implementation-standard Object Type hierarchy. In other words, going back along the type hierarchy chain from a Implementation-standard Object Type, one would only find Implementation-standard type categories.

When created, an instance of a Implementation-standard Object Type may be designated as needing to appear in the system hierarchy.

1.2.1.4 User-Defined Object Type

Users may create their own, customized object types, which may be assigned to typed objects. The primary purpose of a User-Defined Object Type is to allow the user to create their own object classification system in the event that the set Implementation-standard Object Types doesn't satisfy all their needs.

Summarizing relationships:

The User-Defined Object Type class is a subclass of Object Type.

An instance of a User-Defined Object Type may be associated with one or more instances of Typed Object (e.g., there can be many instances of User X Block Type 1 in the configuration). This relationship is strictly optional, and User-Defined Object Types may exist without ever having been referenced by an object.

An instance of a User-Defined Object Type may appear anywhere in the type hierarchy. In other words, a User-Defined Object Type may be directly associated with either a Implementation-standard, or user-defined, type category.

When created, an instance of a User-Defined Object Type may be designated as needing to appear in the system hierarchy.

1.2.1.5 Typed Object

A Typed Object is a Parameterized Object which is able to be inserted into an I/A configuration, and is considered an integral part of the configuration, in such a way that the configuration would be considered incomplete without it. Examples of typed objects include CPs, FBMs, blocks, loops, and compounds. Objects such as graphical objects used to enhance documentation would not be considered Typed Objects.

Typed objects inherently have an associated Implementation-standard object type. The fact that an object is configurable is determined by whether or not its inherent object type is or not. Typed Objects may also have a User-Defined Object Type associated with them, although this relationship is optional.

One further restriction: at creation, a Typed Object is prevented from associating with an Object Type (and thereby prevented from being created), unless that Object Type also references an associated defining Parameterized Object which acts as the definition for the Typed Object being created. In an alternate embodiment, when a Typed Object is created and a reference made to its associated Object Type, if that Object Type doesn't have a reference to the defining Parameterized Object, it simply uses the one from the Typed Object itself.

Summarizing relationships:

The Typed Object is a subclass of Parameterized Object.

An instance of a Typed Object has an inherent Implementation-standard Object Type associated with it, which the user cannot modify, or change. This object type determines whether or not the Parameterized Object is configurable, assignable to a process area, and/or downloadable to a target system.

An instance of a Typed Object may have an optional User-Defined Object Type associated with it. This association is in addition to the Implementation-standard Object Type.

There may be occasions where it would be desirable to change the type of an object, without having to delete the original object, then create an object of the correct type. One example of where this capability could be useful would be being able to change a station type after a configuration has already been created, and all associations and connections established (this happens often). An alternate embodiment accordingly, permits the type of an object to be dynamically charged.

1.2.1.6 Configuration

The Configuration class exists to serve as an entry point into the two primary hierarchies which comprise the configuration itself—the System Hierarchy, and the Plant Hierarchy. These two hierarchies are, however, by no means mutually exclusive. The primary method(s) and data incorporated in this class exist to serve the establishment and maintenance of hierarchical relationships. Other configuration-wide data and/or methods may also reside with this class.

1.2.1.7 System Hierarchy

The System Hierarchy represents those objects which are contained within the configuration, and are organized by various categories, primarily object type. There are potentially several subclasses of System Hierarchy objects in the System Hierarchy itself. However, for present purposes, only two of these subclasses are discussed:

- Definition Hierarchy. This portion of the System Hierarchy deals with the display of definition objects, or those objects which act to define other Typed Objects (e.g., an AIN block definition). Within the Definition Hierarchy, definition objects may be organized in a number of libraries. These libraries are either implementation-standard or defined by the user.
- Components Hierarchy. This portion of the System Hierarchy deals with the display of actual instances of configured objects, and may not, themselves, act as definition objects.

All other subclasses within the System Hierarchy simply represent another view of existing configuration components. For example, a Network Hierarchy could display a view of the configuration from a System Definition point of view, showing a hierarchy of networks, nodes, stations, FBMs and other hardware. Since the only grouping of configuration objects in the current design is by object type, these subclasses have to use the relationships specified in the Connections discussion in order to know what to display (i.e., by network, by location, etc.).

The primary reason that subclasses exist within the System Hierarchy is due to the differences in behavior when dealing with objects in each subclass. For example, the act of dragging and dropping an object from the definition portion of the System Hierarchy results in the creation of a Typed Object of the proper type, whereas when an object from the components portion of the System Hierarchy is dragged and dropped, it results in that object being copied and placed in the view, or connected to another object, depending upon where it was dropped.

The visible portion of the System Hierarchy tree control actually consists of two types of elements: actual instances of System Hierarchy objects (of which there are very few), and derived (non-persistent) instances of tree control objects. Actual instances of the System Hierarchy may reference one or more instances in the Object Type Hierarchy. This relationship provides the mechanism by which the majority of the visible System Hierarchy is constructed dynamically as elements are "exploded" by the user in the tree control.

1.2.1.8 Plant Hierarchy

The Plant Hierarchy also represents those objects which are contained within the configuration, but are organized by location, rather than by type. This hierarchy represents another view of already-existing configuration components, and may be constructed using a subclass of System Hierarchy.

1.2.2 Managing Object Types

The user can create a new instance of an Object Type by selecting "New" on a pulldown menu within the definition portion of the System Hierarchy. Alternatively, a "New|Object Type" menu selection is available on any Configurator application. However the user chooses to perform this task, the action can result in the display of a dialog box similar to that in FIG. 15. In this example, the user enters the new Object Type, and provides a description for the new type. Additionally, the user picks an already existing object type in the type hierarchy to act as its "template" type, or object type to be used to create from. The user can create a new object type from an existing one in two ways:

- Copy. In this create method, the new object type is created by copying the existing object type, and is instantiated in the type hierarchy at the same level as the object type which was copied.
- Derive. In this create method, the new object type is created by using an existing object type as its parent, thereby treating the old object type as a type category.

In order to finish creating the new object type, the user additionally specifies such things as:

- Configurable. Specifies whether or not all objects associated with this object type are able to be configured in terms of security (i.e., a user's access to an object is determined by the user's group access to the object's type). If an object type is not configurable, objects created which are associated with that object type will not be affected by security mechanisms.
- Downloadable. Specifies whether or not all objects associated with this object type are downloadable to a hardware target. Note that this option will be dimmed, and not available for selection if the object type being described is a User-Defined object type.
- Assignable to System Hierarchy. Determines whether or not an object is visible within the System Hierarchy when the hierarchy is viewed from the tree control.
- Assignable to Process Area. Determines whether or not an object associated with this object type can be assigned to a process area.

Figure 15:
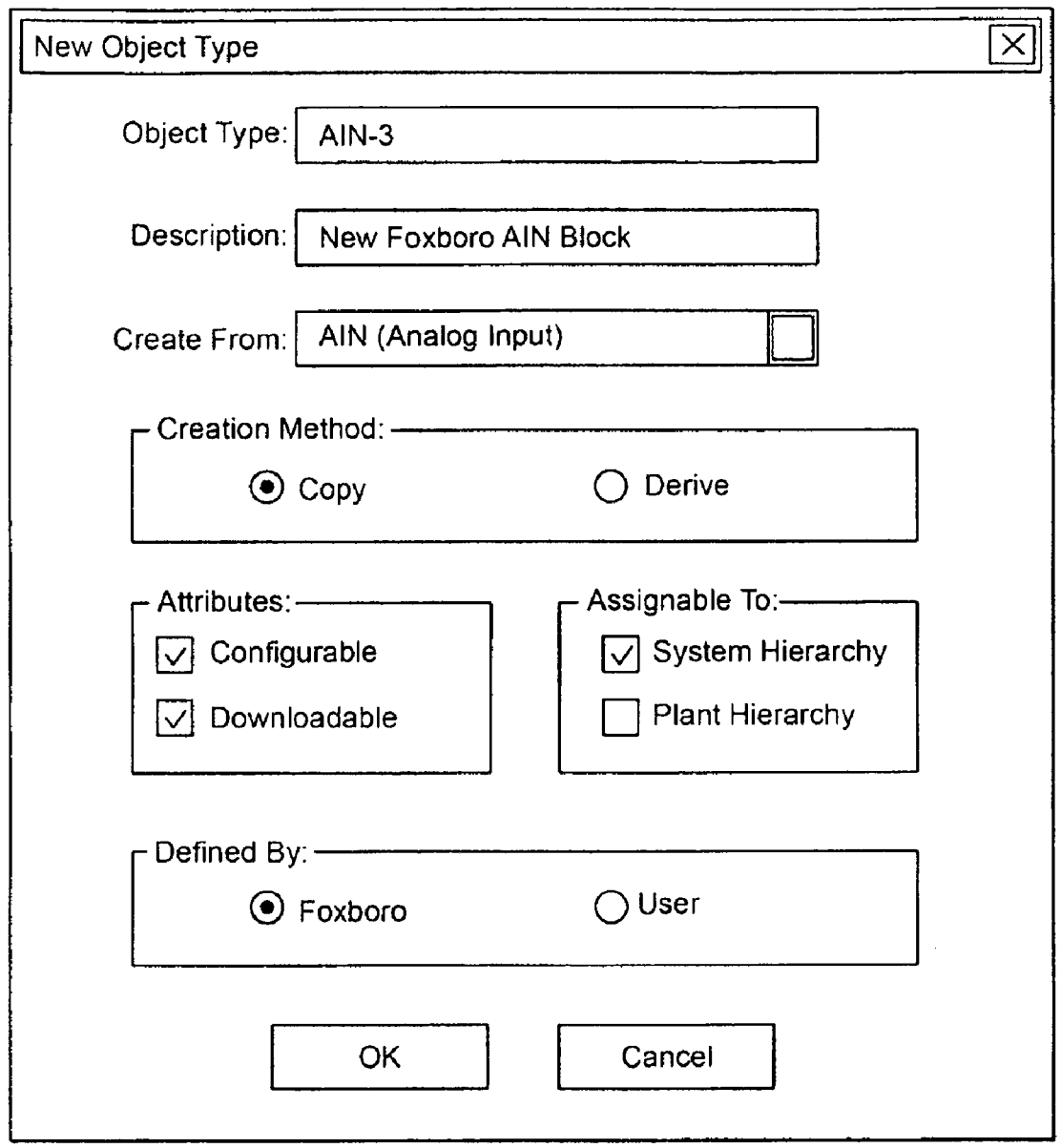
FIG. 15 depicts the creation of new object types in a system according to the invention.

To edit an existing instance of an Object Type, a dialog similar to the one shown in FIG. 15 is displayed, already populated with the information dealing with this object type (i.e., the configurable, assignable and/or downloadable flags checkboxes are selected appropriately).

When an object type is edited, the only things that can be changed are the object's description, and whether or not the object is configurable, assignable and/or downloadable. Some of the attribute and assignable selections may be disabled when the object type is displayed, depending upon the settings of the object type's containing category.

To delete an instance of an Object Type in the hierarchy, the user must preferably explicitly decide to remove it. If the object being deleted is a type category, the user is informed, and asked if they wish to continue—if they confirm the delete, then everything in the type hierarchy from the object type downward is removed.

1.3 Parameterized Object Connections

A configuration consists not only of objects, but objects which are related to each other in a number of ways. These relationships may be physical (e.g. a serial connection between a serial printer and a station) or logical (e.g. a host relationship between an AP and a CP, or a collection point relationship between a block and an historian). These relationships are all called connections.

Establishing a connection actually requires two different levels of "hand-shaking" between the two objects involved. Consequently, the subject of connectivity is divided into two sections:

1. The first level represents the connectivity which is established between two objects. Although easy to envision (e.g. the connection between a block and a compound), there is no actual database association which is actually created at the object level.
2. The second level represents the connectivity which is established between two parameters. The database association is established at this level, and is the mechanism by which two objects establish a relationship.

1.3.1 Type Awareness

Any Parameterized Object in the illustrated has an inherent Implementation-standard object type. This object type, in turn, has a direct relationship to a single type category, but may be indirectly related to several type categories.

Figure 16:
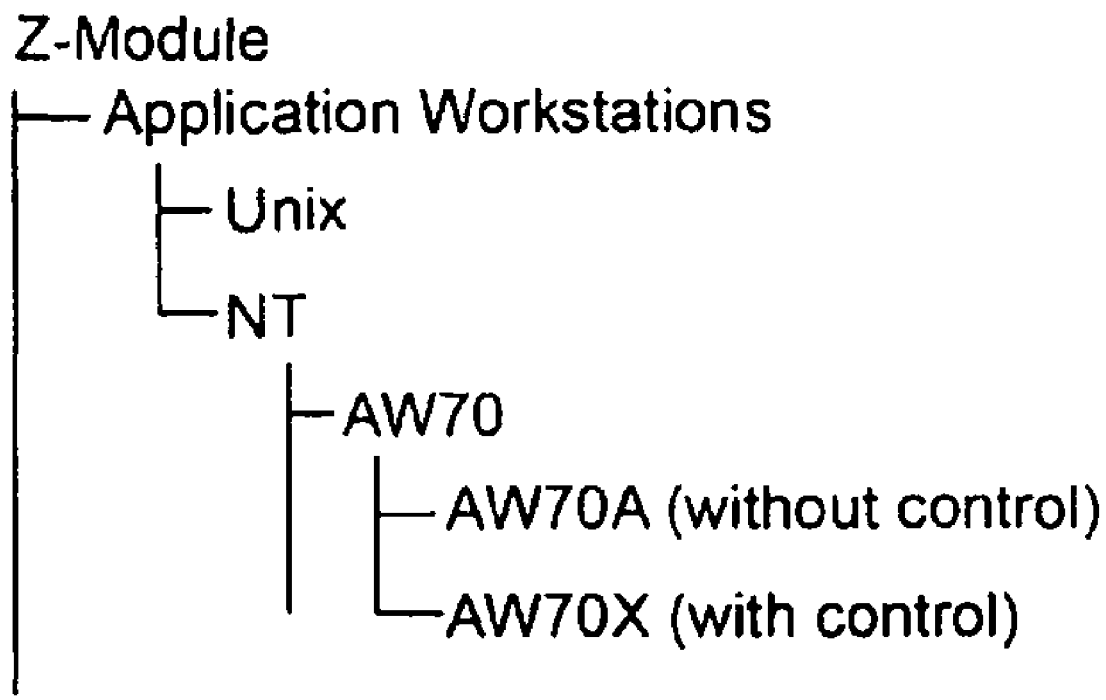
FIG. 16 is a type awareness example in a system according to the invention.

In FIG. 16, an instance of an AW70X (with control) knows that it's an AW70X, by virtue of the fact that AW70X is its inherent Implementation-standard object type. However, the instance is preferably also "aware" that it is also an AW70, NT Application Workstation, or control processor (here, identified as a "Z-Module," in reference to a control processor available from the assignee hereof, The Foxboro Company), going backward through the type hierarchy. This awareness may be used in a number of ways, particularly when a process is dealing with the concept of object types at different granularities. For instance, when dragging a specific serial printer across a representation of the AW70X mentioned above, the printer may not "know" that it can connect to an AW70X, but it may know that it could establish a connection to an NT Application Workstation. The Framework provides methods for allowing the application developer to "walk" the type hierarchy tree in order to obtain the direct, and all the indirect, type categories which a specific object type is related to.

1.3.2 Source/Sink Vs. Parent/Child Relationships

A connection in the illustrated system can describe a Source/Sink, or Parent/Child relationship between two objects. There are very subtle differences in the two types of relationships, but they are different enough to warrant separation of behavior. A Parent/Child relationship is typically used to model the relationship between two objects in a hierarchical, or containment relationship whereas a Source/Sink relationship is usually used in a peer-to-peer type of relationship. These differences are presented in the table below:

| Relation | Data | Data Description |
| --- | --- | --- |
| Parent | Capacity | Data represents the maximum combined "weight" of the children which can be associated to that object. |
| Child | Weight | Data represents the weight of a single instance of the child object. |
| Source | Min, Max | Specifies the minimum and maximum number of connections to other objects, or sinks, which can be supported by that object. Supports the concept of a "fan-out" capability. |
| Sink | Min, Max | Specifies the minimum and maximum number of connections from other objects, or sources, which can be supported by that object. Supports the concept of a "fan-in" capability. |

An example of a Parent/Child type relationship would be that of a CP to its connected FBMs. The CP acts as a parent in that it acts as a common control connection for all the FBMs which are physically connected to it. The CP is able to support a certain number of FBMs. Each FBM, in turn, acts as a child in that it relies on the CP to perform certain duties, and it contributes a specific weight toward the total capacity supported by the CP.

In both Parent/Child and Source/Sink connections, the concept of fan-in and fan-out is valid. A fan-out connection can be used to model a relationship in which the source (parent) object supports connections to one or more sinks (children) objects in the database. One example of such a connection type is a output (or "PNT") parameter on an AIN block and its associated output signal flows. The PNT parameter, acting as a source, would provide measurement values to one or more input parameters (conventionally referred to as "MEAS" or "SPT") in other blocks, each input parameter acting as a sink.

1.3.3 Connection Object Model

Figure 17:
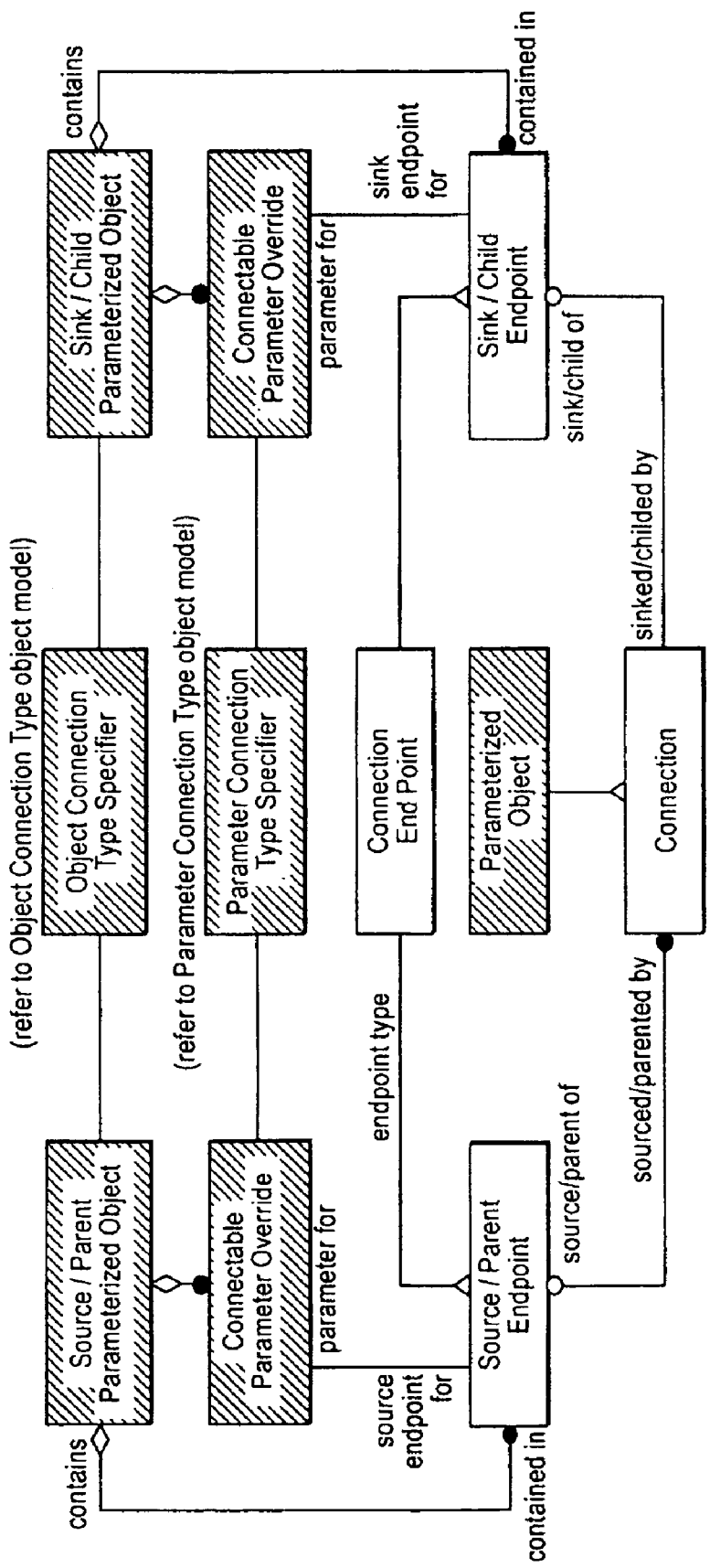
FIG. 17 depicts a connection object model in a system according to the invention.

FIG. 17 depicts the classes used in the illustrated embodiment to support connectivity at the object level. This shows the model used to support a source (parent) Parameterized Object, connecting to the sink (child) Parameterized Object. The model is not intended to suggest that two connectable parameters of the same object can't be connected together (i.e., the same Parameterized Object can be both source and sink at the same time). An example of when this might occur is a calculation output parameter (conventionally referred to as "BCALCO") parameter acting as calculation input parameter (conventionally referred to as "BCALCI") parameter in the same I/A block.

Figure 18:
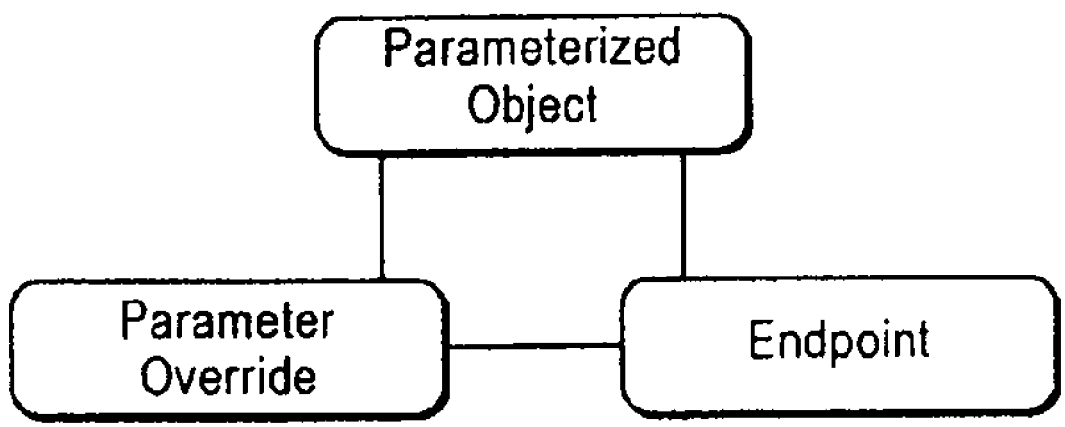
FIG. 18 depicts a parameterized object override endpoint triad in a system according to the invention.

One aspect of the object model needs to be explained in order to understand it fully. When a Parameterized Object is created, no Parameter Override or Endpoint objects exist. The Override and Endpoint objects only get created whenever a Connection is about to be established. When a Connection is about to be established, the appropriate Parameter Override object and Endpoint object are instantiated, and as depicted in FIG. 18, these two objects each maintain a reference to their associated parameterized object, as well as to each other, allowing iteration over an object's connections from either direction.

1.3.3.1 Connection

A Connection contains the data and methods that defines a relationship, or link, between two Parameterized Objects (or more specifically, between two connectable parameters). In an I/A relationship, a connection could can be used to model the logical relationship between two blocks, or the host relationship between two stations, etc.

In order to take into account the complex relationships that a Connection can have with other classes (esp. Placeholder classes), a Connection is a Parameterized Object. This allows Connections to be primarily data driven, rather than compiled behavior, allowing the establishment of connections with new objects to be done in an easier fashion. For example, some Connections probably are not displayed in a graphical environment (such as the relationship between an historian and its associated historizable points). Whether or not to display a Connection is, preferably, parameter-driven.

A Connection in the illustrated system can be a Parent/Child relationship, or a Source/Sink. In order to exist, a Connection preferably has exactly one Source (or Parent) Endpoint, and one Sink (or Child) Endpoint. However, the two endpoints may exist without a Connection having yet been established between them. As mentioned previously, the endpoints of the Connection will not be instantiated until the Connection itself is about to be established. Conversely, endpoint objects remain persistent even after the associated Connection has been removed.

Graphically, connections between two objects will be connected at the edge of the rectangular area representing each object. The system will also support connections connected to a point at the center of the object as well. Connections are represented by segmented polylines made up of alternating horizontal and vertical segments. The system also supports single segment lines representing an association.

Summarizing relationships: a Connection is a Parameterized Object; a Connection, if it exists, preferably has both a Source (or Parent) and a Sink (or Child) Endpoint. Note, however, that certain operations (e.g. selection state) deal with the Association, and only one (or none) of its associated Endpoints; a Connection has a relationship to an Association Placeholder.

1.3.3.2 Connection Endpoint

A Connection Endpoint is an abstract class from which all connection endpoints are derived. No instances of this class may exist by themselves. The Connection Endpoint contains a reference to the Parameter Override which is either the source (parent) or sink (child) parameter representing one end of a connection.

Connection Endpoints provide a mechanism for associating the connection to the object. The endpoints relate the Connection to the Parameter Override to (or from) which the Connection is attached. Endpoints also relate the Connection to the position (side/direction, or center) where the Connection is attached to the object. Each Connection Endpoint is described by two coordinates, the side of the object it is on, and the relative position of the endpoint along the side of the rectangle representing the parameterized object. This allows the endpoint to retain its relative position along the side, even if the object is resized.

Connection Endpoints only come into existence whenever a connection between any two objects (or parameters) is about to be established. Once the Framework approves the creation of the connection, it instantiates the endpoint class instances, along the associated parameter overrides, inserting a reference to the parameterized object in each.

Connection Endpoints have a direct relationship to a Point Placeholder, allowing a depiction of the endpoint itself to be displayed on the screen.

Summarizing relationships:
The Connection Endpoint class is an abstract class, and no instances of it may exist in the illustrated configuration system. This class is further specialized into Source/Sink Endpoints, and Sink/Child Endpoints.
Each instance of a Connection Endpoint has a reference to a Point Placeholder.

1.3.3.3 Source/Parent Endpoint

A Source (or Parent) Endpoint is the endpoint which is specific to the source (or parent) end of the Connection between two Parameterized Objects, and is a simple sub-class of the abstract Connection Endpoint class. The Parameterized Object maintains a list of its Source/Parent Endpoints. The Source/Parent Endpoint can be the source of several connections, supporting "fan-out" connectivity. The Source/Parent Endpoint may exist without a Connection to a Sink-Child Endpoint.

Summarizing relationships:
An instance of a Source/Parent Endpoint is associated with one, and only one, Parameterized Object. The Parameterized Object, in turn, maintains a list of all Source/Parent Endpoints associated with it.
Each instance of a Source/Parent Endpoint may be associated with one or more Connections. This supports the concept of a "fan-out" relationship, which is valid for both Parent/Child as well as Source/Sink type relationships.
Each instance of a Source/Parent Endpoint is directly related to the connectable Parameter Override it represents.

The Endpoint object can support the concept of a reference counter, which represents the number of connections currently associated with it.

1.3.3.4 Sink/Child Endpoint

A Sink (or Child) Endpoint is the endpoint which is specific to the sink (or child) end of the Connection between two Parameterized Objects, and is a simple sub-class of the abstract Connection Endpoint class. The Parameterized Object maintains a list of its Sink/Child Endpoints. The Sink/Child Endpoint may only be the sink (child) of a single connection. The Sink/Child Endpoint may exist without a Connection to a Source/Parent Endpoint.

Summarizing relationships:
A instance of a Sink/Child Endpoint is associated with one, and only one, Parameterized Object. The Parameterized Object, in turn, maintains a list of all Sink/Child Endpoints associated with it.
Each instance of a Sink/Child Endpoint may be associated with only one Connection.
Each instance of a Sink/Child Endpoint is directly related to the connectable Parameter Override it represents.

1.3.4 Object Connection Type Object Model

Figure 19:
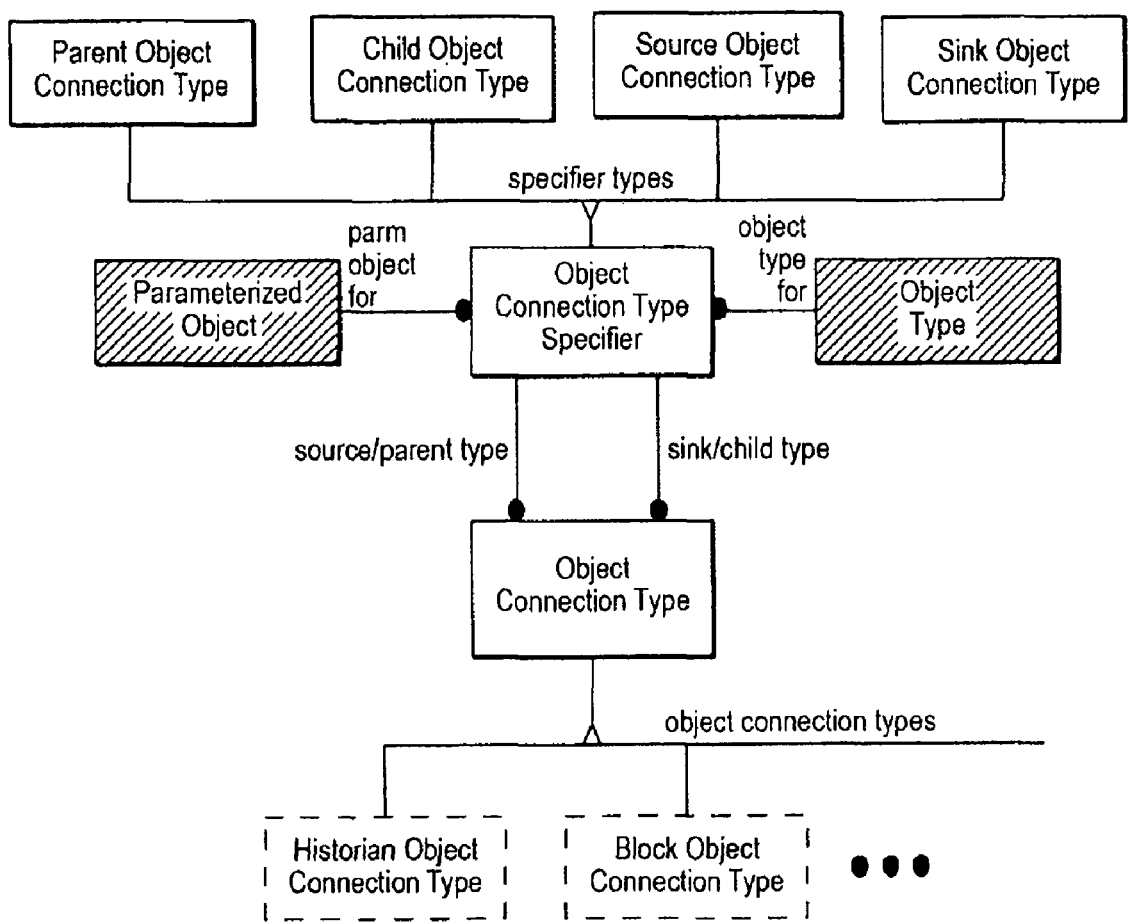
FIG. 19 depicts an object connection type object model in a system according to the invention.

FIG. 19 depicts additional classes used in the illustrated embodiment to support connectivity at the object level.

1.3.4.1 Object Connection Type Specifier

The primary function of the Object Connection Type Specifier is to provide a list of Object Types to Parameterized Objects, allowing objects to be "extended" such that they encapsulate the behavior of an object in terms of being a parent/child, or source/sink. The Object Connection Type Specifier is an abstract class from which four basic object connection type specifiers are derived: parent, child, source and sink.

Figure 20:
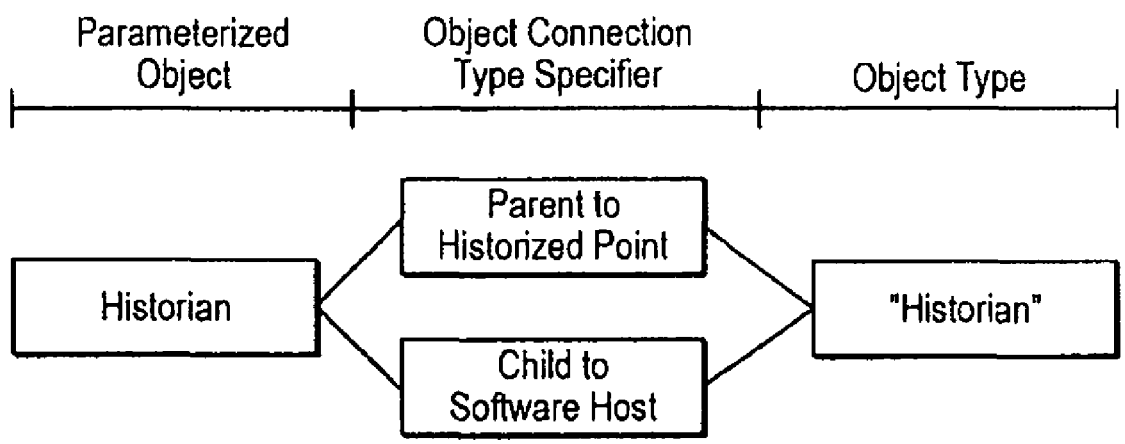
FIG. 20 is an example of simultaneous parent/child object connectivity in a system according to the invention.

Each Object Connection Type Specifier is directly related to a Parameterized Object, and is used to help determine the nature of connectivity that the Parameterized Object is allowed to participate in. The same Parameterized Object can act simultaneously as a parent (or source) and a child (or sink). This gives rise to the one-to-many relationship between Parameterized Object and Object Connection Type Specifier shown in the model In the example shown in FIG. 20, an Historian acts as a parent to all historized points associated with it, yet simultaneously acts as a child when discussed in terms of being associated with a software host. As used herein and throughout, a "historian" is a block or other functionality used to track parameter values during runtime operation of a process control system configured in accord with the teachings hereof. Each parameter so tracked is referred to as a "point," a "historized point," or the like. In the illustrated embodiment, the object type for a Historian is the same, no matter how many Object Connection Type Specifiers a Parameterized Object may be associated with.

Summarizing relationships:
The Object Connection Type Specifier class is used to relate instances of Parameterized Objects with Object Types
Each instance of an Object Connection Type Specifier sub-class is directly related to the Object Type it represents. The same Object Type may be associated with one or more Object Connection Type Specifiers.
Each instance of an Object Connection Type Specifier sub-class is directly related to the Parameterized Object it represents. It is possible for the same Parameterized Object to be associated with more than one Object Connection Type Specifier.
Each instance of an Object Connection Type Specifier is referenced in one or more instances of the Object Connection Type class, with the added sense of whether or not the referenced specifier represents a source/parent, vs. sink/child in a potential connection.

1.3.4.2 Parent Object Connection Type Specifier

Parent Object Connection Type Specifiers extend the abstract Object Connection Type Specifier class to handle object types capable of fulfilling a parent role when connecting to another object. As such, they specify the capacity, or total weight, of all the child objects which they are capable of supporting, and provide other functionality used by a parent object.

Examples of a Parent Object Connection Type Specifier would include a CP which has the capacity to support 48 FBMs in an I/A field bus relationship, an AP which allows two serial printers to be connected via a serial connection, or an historian able to support 4000 collection points.

In a preferred embodiment, any object capable of playing a parent role keeps track of the total "weight" of the connections which have been established for each connection type it is able to support. This value can be associated with the parameter associated with the endpoint of a connection.

1.3.4.3 Child Object Connection Type Specifier

Child Object Connection Type Specifiers extend the abstract Object Connection Type Specifier class to handle object types capable of fulfilling a child role when connecting to another object. As such, they specify their weight which they will contribute to the total accumulative weight when connecting to a parent. Examples of Child Object Connection Type Specifiers include an FBM connecting to a CP, or a serial printer connected to an AP. Each connection causes the total accumulative weight for that connection type to be incremented by the child's weight. Prior to actually establishing a connection, the Framework checks to ensure that the weight supported by the parent object does not exceed its capacity for that connection type. If it does, the connection attempt will fail, and the application program will be informed that the pending connection is no longer feasible.

1.3.4.4 Parent/Child Object Connection Type Specifier Examples

The table below illustrates the data which needs to be considered at the object level for each valid parent/child connection—namely:

Capacity (This value specifies the total weight which the parent object type is able to support for the associated connection type); and Weight (This value specifies the amount of capacity consumed whenever a child object of this type is attached to the parent).

| Parent Object Type | Capacity | Connection Type | Child Object Type | Weight |
|---|---|---|---|---|
| Historian | 4000 | Historian | Historizable Point | 1 |
| CP40 | 48 | Fieldbus | FBM | 1 |
| AW70 | 2 | Serial | Serial Printer | 1 |
| IE32 | 4 | Nest | 1x8Cell | 1 |
| AP51 | unlimited | Software Host | CP40 | 1 |

1.3.4.5 Source Object Connection Type Specifier

Source Object Connection Type Specifiers extends the abstract Object Connection Type Specifier class to handle object types capable of fulfilling a source role when connecting to another object. There are no additional data or methods beyond those provided by the Object Connection Type Specifier class. This subclass provides consistency and flexibility during implementation.

1.3.4.6 Sink Object Connection Type Specifier

A Sink Object Connection Type Specifier extends the abstract Object Connection Type Specifier class to handle object types capable of fulfilling a sink role when connecting to another object. There are no additional data or methods beyond those provided by the Object Connection Type Specifier class. The subclass provides consistency and flexibility during implementation.

1.3.4.7 Source/Sink Object Connection Type Specifier Examples

The table below illustrates the data which needs to be considered at the object level for each valid source/sink connection.

| Source Object Type | Connection Type | Sink Object Type |
|---|---|---|
| AIN | Block Connection | PID |
| PID | Block Connection | AOUT |

1.3.4.8 Object Connection Type

Instances of the Object Connection Type class provide a means of establishing the outermost layer of connectivity between any two objects. This class is used to describe the "legal" combinations of object types or type categories (i.e., Source/Sink vs. Parent/Child) which are able to form a connection. These connections can be physical (e.g. an electrical signal flow between a serial port and a serial device) or logical (e.g. a host relationship between an AP and a CP, or a collection point association between a block and an historian).

There are two relationships that each instance of an Object Connection Type has with the Object Connection Type Specifier class—one is used to specify the source (parent) type, and the other is to specify the sink (child) type. In this way, the Object Connection Type class acts as a join table, relating two object types to determine whether there is a potential connection possible. This class is therefore used as an initial "filter" to determine whether two objects are able to establish a connection before the more complex negotiation between two parameters is allowed to continue.

When examining instances of the Object Connection Type class to see if two object types can form a valid connection, the Framework may encounter more than one instance which satisfies the criteria. If this occurs, the user will have to manually resolve the ambiguity, and select the connection type being sought.

While making a determination as to whether two object types can connect together or not, the Framework takes into account the fact that instances of Object Connection Types may not go all the way "down" to the object type level, but may specify type categories instead. In this manner, for example, a specific type of serial printer could be specified as being able to be connected to all NT application workstations, rather than specific types of NT stations. The Framework takes into account type "awareness", which was discussed in a previous section, in order to accomplish this.

Summarizing relationships:

Each instance derived from an Object Connection Type contains references to two Object Types—one for a Source (Parent) Object Type, the other for a Sink (Child) Object Type. These object types are paired together to determine whether a request to connect two objects together is "legal", or valid, depending upon what types of objects they are.

The Object Connection Type class contains methods which, when given two object types, allows the application developer to determine which object type is acting as the source (parent) object, and which one is acting as the sink (child) object.

In order to efficiently implement type "awareness", a bit-masking operation can be used, in which each unique type category, as well as object type, gets assigned a unique bit-mask value. By "or'ing" all of the bitmasks together of all the type categories which an object belongs to, the matter of comparing an object's type bitmask with that of the types contained in each instance of the Object Connection Type class becomes a single operation, rather than a series of string compares.

1.3.5 Parameter Connection Type Object Model

Figure 21:
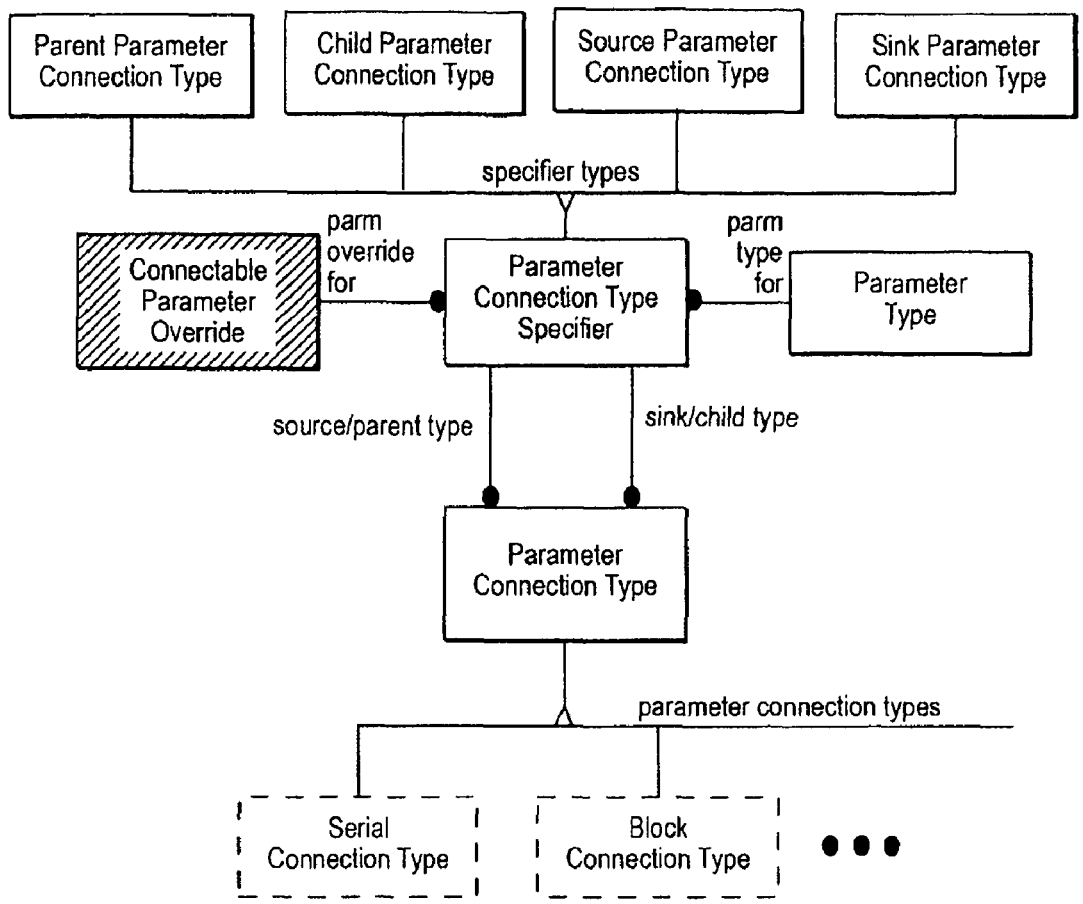
FIG. 21 depicts a parameter connection type object model in a system according to the invention.

FIG. 21 depicts the classes used in the illustrated embodiment to support connectivity at the parameter level. Note that the class structure presented in FIG. 21 closely parallels that of the object connection type object model presented in FIG. 19.

1.3.5.1 Parameter Type

The Parameter Type class is just that—a class used to describe all the various types of connectable parameters which can exist in I/A. Examples of Parameter Types includes serial ports, serial devices, analog input, analog output, historian hosts, and historizable points. Any "connectable" parameter in I/A preferably has an associated Parameter Type. Summarizing relationships:

A Parameter Type is a base class providing I/A with types of connectable parameters. No parameters will be allowed to be related to an endpoint in a Connection unless it is also represented by a Parameter Type found in an instance of this class.

Each Parameter Type may be associated with one or more Parameter Connection Type Specifiers, which provide additional information regarding connectability for that specific Parameter Type.

The Parameter Type class can be implemented as another type category in the Object Type hierarchy. In this manner, any code developed to deal with object types (esp. if implementing bitmask operations) may also be used to deal with parameter types.

1.3.5.2 Parameter Connection Type Specifier

The primary function of the Parameter Connection Type Specifier is to provide a list of Parameter Types to Parameter Definitions, and to fine-tune the "connectable-ness" of that Parameter Definition with the connection. The Parameter Connection Type Specifier class is an abstract class, from which four basic parameter connection type specifiers are derived: parent, child, source and sink.

Each Parameter Connection Type Specifier is directly related to one or more connectable Parameter Definitions, and is ultimately used to describe the nature of connection that the parameter is allowed to participate in. The parameter to act simultaneously as a parent/source, and a child/sink, thus the one to many relationship between Parameter Override and Parameter Connection Type Specifier.

Figure 22:
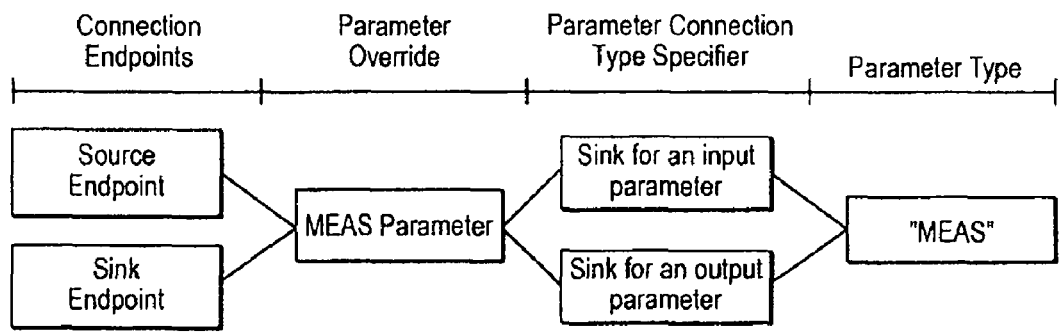
FIG. 22 is an example of simultaneous source/sink parameter connectivity in a system according to the invention.

In the example shown in FIG. 22, a MEAS parameter override acts as a source for other input parameters (e.g., a MEAS parameter in a REALM block), yet simultaneously acts as the sink when connected to a parameter such as a PNT parameter in an AIN block. Note that the parameter type "MEAS" is the same, no matter how many Parameter Connection Type Specifiers a parameter override may be associated with.

Summarizing relationships:

The Parameter Connection Type Specifier class is used to relate instance of Parameter Overrides with Parameter Types.

Each instance of a Parameter Connection Type Specifier subclass is directly related to the Parameter Type it represents. The same Parameter Type may be associated with one or more Parameter Connection Type Specifiers.

Each instance of a Parameter Connection Type Specifier subclass is directly related to the Parameter Override it represents. It is possible for the same Parameter Override to be associated with more than one Parameter Connection Type Specifier.

Each instance of a Parameter Type Specifier is referenced in one or more instances of the Parameter Connection Type class, with the added sense of whether or note the referenced specifier represent a source/parent, vs. sink/child in a potential connection.

1.3.5.3 Parent Parameter Connection Type Specifier

Parent Parameter Connection Type Specifiers extends the abstract Parameter Connection Type Specifier class to handle parameters capable of fulfilling a parent role when connecting to another object. There are no additional data or methods beyond those provided by the Parameter Connection Type Specifier class. The subclass provides consistency and flexibility during implementation.

1.3.5.4 Child Parameter Connection Type Specifier

Child Parameter Connection Type Specifiers extends the abstract Parameter Connection Type Specifier class to handle parameters capable of fulfilling a child role when connecting to another object. There are no additional data or methods beyond those provided by the Parameter Connection Type Specifier class. The subclass provides consistency and flexibility during implementation.

1.3.5.5 Parent/Child Parameter Connection Type Specifier Examples

The table below presents some examples that have a parent/child relationship.

| Parent Parameter Type | Connection Type | Child Parameter Type |
|---|---|---|
| Serial Port | Serial Connection | Serial Device |
| Historian | Logical Historian | Historizable Point |
| Parallel Port | Parallel Connection | Parallel Device |

1.3.5.6 Source Parameter Connection Type Specifier

Source Parameter Connection Type Specifiers extend the abstract Parameter Connection Type Specifier class to handle source-type endpoints of a connection. As such, they will specify the minimum and maximum number of sinks with which they are able to establish a Connection. Examples of a Source Parameter Connection Type Specifier would be an I/O point in I/A, represented by the PNT parameter in a AIN block. The PNT parameter acts as the source for signals flowing to one or more input parameters.

1.3.5.7 Sink Parameter Connection Type Specifier

Sink Parameter Connection Type Specifiers extend the abstract Parameter Connection Type Specifier class to handle sink-type endpoints of an association. As such, they will specify the minimum and maximum number of sources with which they are able to establish a connection. An example in I/A of a Sink Parameter Connection Type Specifier would be a MEAS or SPT parameter in a PID block, either of which is able to receive signal input from another block.

1.3.5.8 Source/Sink Parameter Type Specifier Examples

The table below presents some examples which that have a source/sink relationship.

| Source Parm Type | Min/Max | Connection | Sink Parm Type | Min/Max |
|---|---|---|---|---|
| PNT | 1/unlimited | Block Connection | MEAS | 1/1 |
| PNT | 1/unlimited | Block Connection | SPT | 0/1 |
| BCALCO | 1/1 | Block Connection | BCALCI | 0/1 |

The "Min" data associated with a Sink represents an optional/required feature, with a zero (0) representing an optional connection, and a one (1) representing a required connection.

1.3.5.9 Parameter Connection Type

Instances of the Parameter Connection Type class represent the innermost layer of associativity between any two objects. This class is used to describe the "legal" combinations of parameter types which are able to form a connection. These connections can be physical (e.g. an electrical signal flow a serial port and a serial device) or logical (e.g. a collection point connection between a MEAS parameter and an historian).

There are two relationships that each instance of a Parameter Connection Type has with the Parameter Connection Type Specifier class—one is used to specify the source (parent) type, and the other is to specify the sink (child) type. In this way, the Parameter Connection Type class acts as a join table, relating two parameter types together to determine the connection endpoints. This class is therefore used as the final "filter" to determine whether two objects are able to establish a connection.

1.3.6 Establishing a Connection

The listing below represents the sequence of events which preferably occur before a Connection can be made between two parameters. This logic is used when an object is being "dragged" around the view, looking for a drop target. Additionally, this logic is valid whether the object being dragged is a potential Source/Parent in a relationship, or Sink/Child.

Level 1—Object to Object

Step Action Performed

1 Click and begin "dragging" object in view—cursor changes to a drag cursor.
2 Using the Object Connection Type Specifier of each object, check to see if there is any instances of the correct pairing in Object Connection Types.
3 If an instance in Object Connection Types is found, then change cursor to indicate that the drop target is potentially valid, otherwise perform no action. If valid, retain the sense of which object is now acting as Source(Parent), and which one is acting as the Sink(Child), as well as the type of Connection being sought.
If no instance is found, then cursor remains unchanged, and the user will not be allowed to drop the object.

Level 2—Parameter to Parameter (Perform Only if Level 1 Above Passed)

Step Action Performed

4 Iterate through instances of the Parameter Connection Type class to find the proper Source (Parent) and Sink (Child) parameter types necessary to fulfill this connection. Note that there may potentially be several instances of the Parameter Connection Type class which satisfy the conditions imposed by the connection—keep track of all of them since we're not sure yet what parameters the objects have.
5 For the Source(Parent) object, find the proper Parameter Definition based on the Source(Parent) parameter type found in step (4) above.
6 Perform the same action for the Sink(Child) object parameter definition using the Sink(Child) parameter type which was paired with the Source(Parent) parameter type used in step (5) above.
7 Create the appropriate Parameter Override(s) with their associated Source(Parent) and Sink(Child) Endpoints (note that they may already exist from previous connection).
8. Create the instance of the Connection. If more than one connection is permissible, a preferred or default connection is automatically selected.

The final responsibility for establishing a connection between two objects rests with the methods responsible for negotiating the "handshake" between the two parameters. These methods check for adequate capacity on the source (parent) object, and establish the actual connection instance itself. This code resides with the source object or the sink object.

Parameter-level connections can be automatically established as described in steps 4-8 above. In addition, they can be established via direct operator intervention. Through a drag-and-drop operation, menu selection or otherwise, the operator identifies two parameters between which a connection is to be established. After verifying that a relationship can exist between the objects themselves (e.g., as described in steps 1-3, above), the Parameter Connection Type Specifier is checked to insure that the combination is permissible. If so, the necessary Parameter Overrides are created.

In some embodiments, the creation of certain connections between parameters causes other to be automatically established. These are referred to as master and slave connections (or "connection propagation"). By way of example, once a connection is established between the PNT parameter of an AIN object and the MEAS input parameter of a PID object, related (or "slave") connections are made between related parameter pairs (e.g., low and high scale parameters) of these objects. These slave connections can be modified by the operator, as desired. Slave connections are automatically updated or destroyed when the corresponding master connection is updated or destroyed. Thus, for example, the destruction of a connection between the PNT parameter of an AIN object and the MEAS input parameter of a PID object automatically results in destruction of low-scale, high-scale and other parameter-level slave connections between these objects.

1.3.7 Connectivity Examples

1.3.7.1 Parent/Child Connectivity—Case #1

Figure 23:
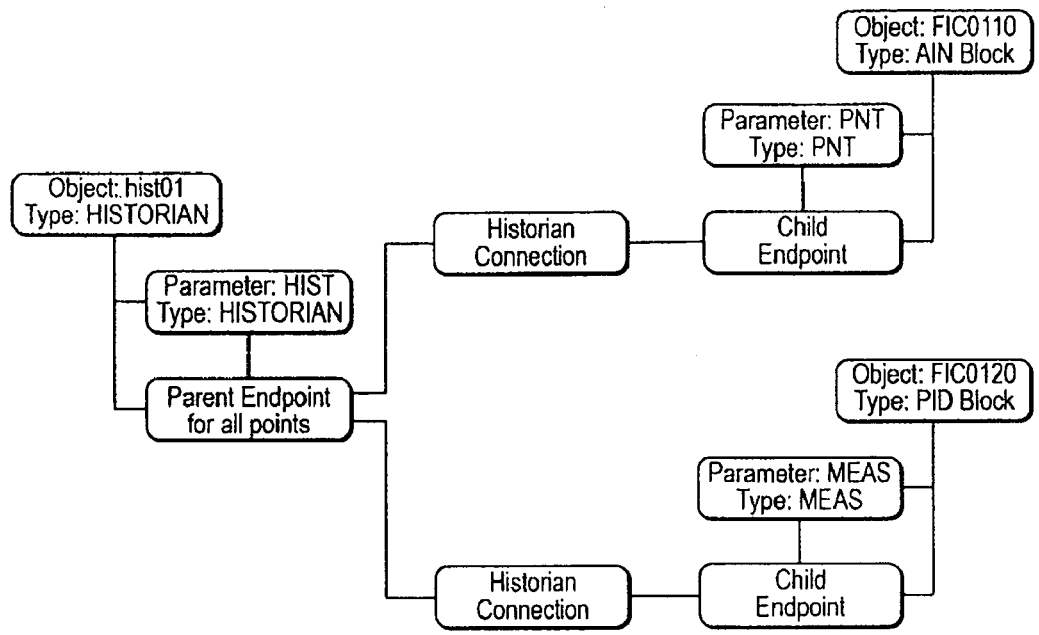
FIGS. 23-25 are parent/child connectivity examples in a system according to the invention.

FIG. 23 depicts the connections between an Historian to all the historizable points which have been assigned to it. The following table depicts the connectivity data needed to support these connections at the object level:

| Parent Object Type | Capacity | Connection Type | Child Object Type | Weight |
|---|---|---|---|---|
| HISTORIAN | 4000 | Historian Connection | AIN Block | 1 |
| HISTORIAN | 4000 | Historian Connection | PID Block | 1 | whereas this table depicts the connectivity data need to support these connections at the parameter level:

| Parent Parameter Type | Connection Type | Child Parameter Type |
|---|---|---|
| HISTORIAN | Historian Connection | PNT |
| HISTORIAN | Historian Connection | MEAS |

This example depicts how data can be structured to handle the parent/child situation where the child does not need to have a sense of which point it is (e.g., the MEAS parameter doesn't need to know it's the 2nd historized point in this example), simply that it's connected the HIST parameter of the historian. This example also provides the means to establish a "fan-out" relationship for a parent/child connection.

1.3.7.2 Parent/Child Connectivity—Case #2

Figure 24:
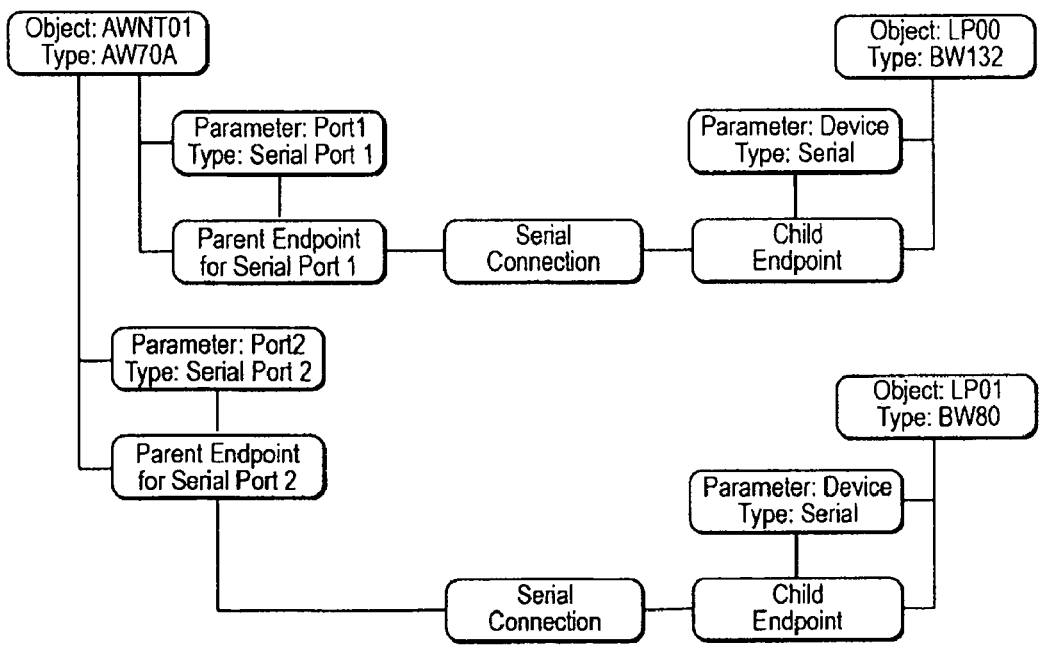

FIG. 24 is similar to the first, except that now the Parameter Definitions have been provided in such a way so as to "split" the parameter representing two serial ports into two separate parameters, each parameter representing a single serial port. The following table depicts the connectivity data needed to support these connections at the object level:

| Parent Object Type | Capacity | Connection Type | Child Object Type | Weight |
|---|---|---|---|---|
| AW70A (NT Station) | 2 | Serial Connection | BW132 (Serial Printer) | 1 |
| AW70A (NT Station) | 2 | Serial Connection | BW80 (Serial Printer) | 1 |

Whereas the following table depicts the connectivity data need to support these connections at the parameter level:

| Parent Parameter Type | Connection Type | Child Parameter Type |
|---|---|---|
| Serial Port 1 | Serial Connection | Serial |
| Serial Port 2 | Serial Connection | Serial |

This example depicts how data is structured to handle the parent/child situation where the child has to "know", or be aware of, the specific parent parameter instance they are connected to. In other words, in this scenario, it's important to know that Printer #1 is connected to Serial Port 1, and that Printer #2 is connected to Serial Port 2. If this level of detail is unimportant, then the parameter definitions for the AW70 could be modeled in such as way that there was only one Serial Port parameter, and one endpoint object, to which all serial devices would connect.

1.3.7.3 Parent/Child Connectivity(Nest)—Case #3

Figure 25:
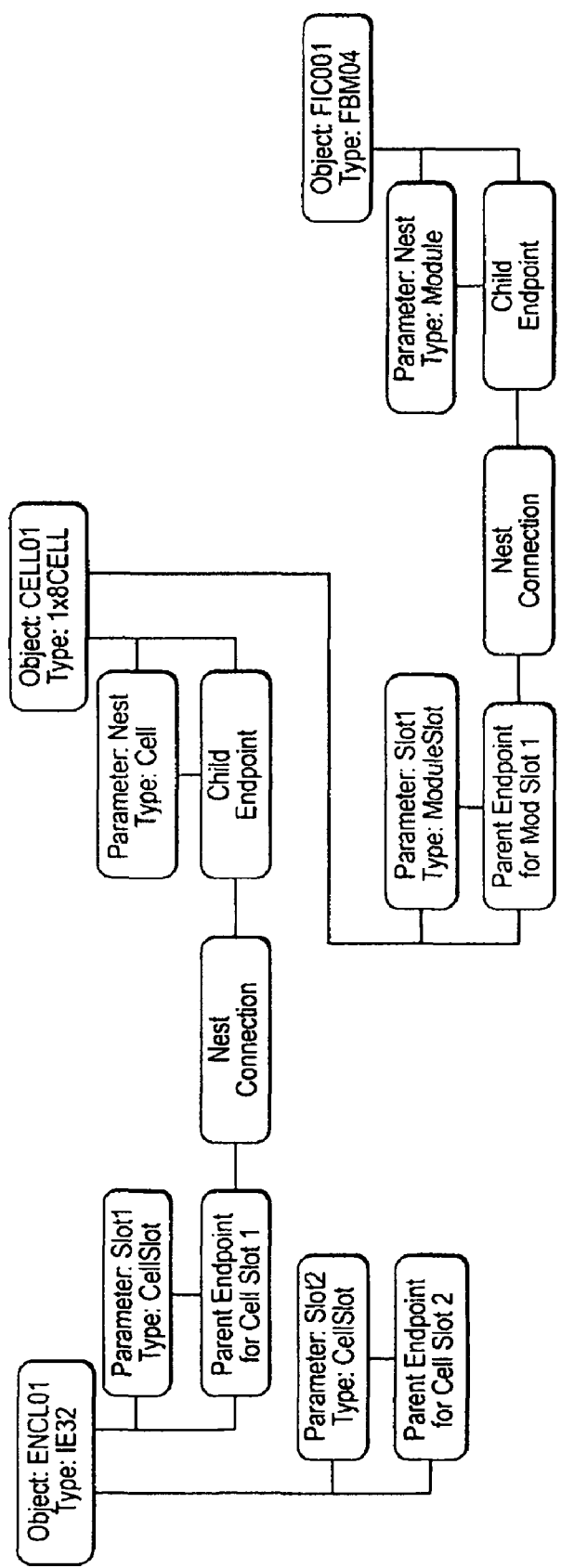

FIG. 25 depicts how a nest can be implemented within the illustrated configuration system. The following table depicts the connectivity data needed to support these connections at the object level:

| Parent Object Type | Capacity | Connection Type | Child Object Type | Weight |
|---|---|---|---|---|
| IE32 (Enclosure) | 4 | Nest Connection | 1x8CELL (Cell) | 1 |
| 1x8CELL (Cell) | 8 | Nest Connection | FBM04 (FBM) | 1 |

The following table depicts the connectivity data need to support these connections at the parameter level:

| Parent Parameter Type | Connection Type | Child Parameter Type |
|---|---|---|
| CellSlot | Nest Connection | Cell |
| ModuleSlot | Nest Connection | Module |

This example depicts how data can be structured to handle the parent/child connections used to support a multilevel nesting scenario. This implementation takes into account that each object connecting to its parent needs to know which "slot" it occupies, and in turn, each "slot" needs to know what object is currently occupying it (if any).

This design allows object differentiation between the slots. For example, it is easy to model (in the parameter definitions) the fact that the first two slots of a cell (represented by the first two parameter overrides) can only accommodate a power supply, and the remaining slots available for modules.

1.3.7.4 Source/Sink Connectivity

Figure 26:
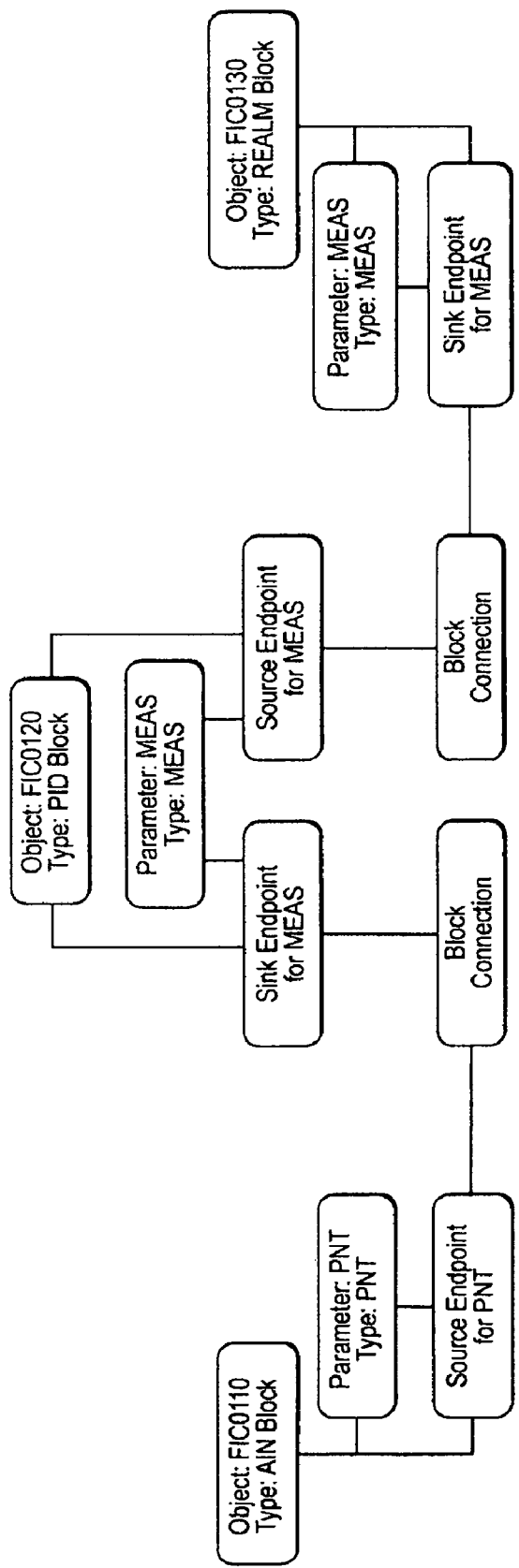
FIG. 26 is a source/sink connectivity example in a system according to the invention.

FIG. 26 depicts an implementation of how source/sink relationships can be implemented in the illustrated configuration system. The following table depicts the connectivity data needed to support these connections at the object level:

| Source Object Type | Connection Type | Sink Object Type |
|---|---|---|
| AIN Block | Block Connection | PID Block |
| PID Block | Block Connection | REALM Block |

The following table depicts the connectivity data need to support these connections at the parameter level:

| Source Parm Type | Min/Max | Connection | Sink Parm Type | Min/Max |
|---|---|---|---|---|
| PNT | 1/unlimited | Block Connection | MEAS | 0/1 |
| MEAS | 1/unlimited | Block Connection | MEAS | 0/1 |

This example depicts how data can be structured to handle a source/sink connection. More importantly, it shows how the same parameter (i.e., in this case, the MEAS parameter of the PID block) can function as both source and sink simultaneously.

1.4 Placeholders

Placeholders preserve the location and appearance of objects on a Persistent Document, enabling an object to retain its appearance between viewings. Placeholders present an object model, depicting all the objects, their connections, and the endpoints of those connections in a single diagram. The illustrated configuration system supports Placeholders, including an attendant object model dealing therewith, in the manner disclosed in incorporated-by-reference U.S. Pat. No. 6,754,885 and, particularly, by way of non-limiting example, in Sections 1.4-1.4.2.6 and FIGS. 27-29b thereof, the teachings of which are particularly incorporated herein by reference—all as adapted in accord with the teachings hereof.

1.5 The Generic Editor Framework Classes

The illustrated configuration system in general, and the editors in particular can be based on the Microsoft Foundation Classes' (MFC) Document/View model, e.g., in the manner disclosed in incorporated-by-reference U.S. Pat. No. 6,754,885 and, particularly, by way of non-limiting example, in Sections 1.5-1.5.7 and FIGS. 30-35 thereof, the teachings of which are particularly incorporated herein by reference—all as adapted in accord with the teachings hereof. Other embodiments of the Configurator may be based on alternatives to the MVC document/view model known in the art and/or available in the marketplace.

1.6 Sheet Template Editor

Sheet Template objects are used to allow the user to define a template, or sheet layout, to be used during the printing and/or print preview process. A Sheet Template typically includes combinations of graphical symbols which have been defined (e.g. rectangles, circles, bitmaps, etc. . . . ) to satisfy a customer's unique requirements for documentation. The illustrated configuration system supports Sheet Templates, including through use of Sheet Template objects and a Sheet Template Editor, e.g., in the manner disclosed in incorporated-by-reference U.S. Pat. No. 6,754,885 and, particularly, by way of non-limiting example, in Sections 1.6-1.6.2 and FIGS. 36-38 thereof, the teachings of which are particularly incorporated herein by reference—all as adapted in accord with the teachings hereof.

1.7 The Report Manager

The Report Manager allows users to create, edit, and print reports. A report is an association between a collection of configurable objects (possibly filtered) and templates describing how to print them. Reports are composed of report templates that organize the data to be printed—describing what should be printed, how it should be printed, and in what order. This enables the user to produce a printed document that combines information from various sources organized in one of many different ways.

The illustrated configuration system supports reporting, including through use of a Report Manager, e.g., in the manner disclosed in incorporated-by-reference U.S. Pat. No. 6,754,885 and, particularly, by way of non-limiting example, in Sections 1.7-1.7.2.4.2 and FIGS. 39-44 thereof, the teachings of which are particularly incorporated herein by reference—all as adapted in accord with the teachings hereof 1.8 Version Control Version control provides the ability for the system to record changes made to the control database. It allows the user to be able to tell what the state of the system is now, what the state of the system was at a specific time in the past, and the history of changes made to a specific object over time. With version control, the change history of an object is tracked from the moment it was created through its current version.

The illustrated configuration system supports version control, e.g., in the manner disclosed in incorporated-by-reference U.S. Pat. No. 6,754,885 and, particularly, by way of non-limiting example, in Sections 1.8-1.8.4.7 and FIGS. 45-56 thereof, the teachings of which are particularly incorporated herein by reference—all as adapted in accord with the teachings hereof.

1.9 Undo Manager

The illustrated configuration system supports an Undo/Redo capability, e.g., The illustrated configuration system supports reporting, including through use of a Report Manager, e.g., in the manner disclosed in incorporated-by-reference U.S. Pat. No. 6,754,885 and, particularly, by way of non-limiting example, in Sections 1.9-1.9.1.4 and FIG. 57 thereof, the teachings of which are particularly incorporated herein by reference all as adapted in accord with the teachings hereof.

1.10 Users and Security

The illustrated configuration system provides security functions to allow users and other personnel to restrict access to objects which need to be protected from unauthorized modification or access. User-level security is optional, and is disabled by default. Implementation-standard security restricts modification of implementation-standard standard objects (such as standard I/A Block definitions) to authorized personnel, and is preferably always enabled.

When user-level security is enabled, the security functions provide authentication by presenting a log-in dialog requesting a user name and password when a user starts any Configurator application. Similar to the Windows NT security model, access control is provided by assigning users to groups which have various access permissions (read, write, create, etc.). Groups are based on roles, such as Process Engineer or Advanced Operator, and users can assume multiple roles by being assigned to multiple groups. Implementation-standard default groups and permissions are provided, but users can create their own groups, and can modify the permissions of the default groups. Permissions are assigned by object type (such as Loops) and by Plant Area (such as East Plant Section). This provides selective access by geographic area.

A switch user/group function is also provided which allows users to assume a subset of their permissions or allows another user to temporarily log-in. Users use this function to assume a more restrictive set of permissions to ensure that they do not make an inadvertent change if they were only interested in viewing configuration data. The ability to temporarily log-in would be used to allow a supervisor to assist another user in making changes which may require special access permission to an existing configuration work space, and then return control to the original user.

The Framework supplies user interface dialogs to allow developers to register objects and permissions to assign permissions to the default groups. The Framework also supplies an API to allow the various configurator applications to check for access permission before responding to access requests for objects they control. A consistent "access-denied" mechanism will be provided to advise the application of a security access violation.

1.10.1 Object Model

Figure 27:
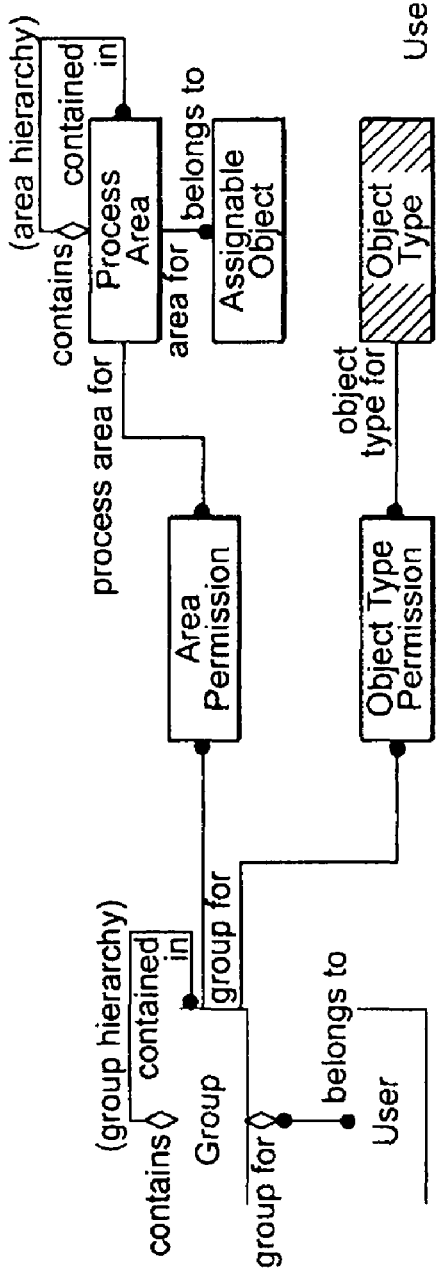
FIG. 27 depicts an users and security object model in a system according to the invention.

The illustrated configuration system uses a security system to control access to configuration objects by users. Given a particular user and a particular object, the security system determines what permissions the user has (e.g. read, write) with respect to the object. The security object model is depicted in FIG. 27.

1.10.1.1 Group

In the Security model, the Group object is used to categorize Users, with many instances of Users belonging to the same Group object (e.g., Operator, Engineer, etc.). These broad categories are each associated with a specific set of permissions. These permissions pertain to various areas throughout the plant, as well as to object types within the plant.

Instances of Groups may form a hierarchy, and contain other Groups (e.g., Test Operator within the Operator Group). However, an instance of a Group can only be contained by one, and only one, other Group. For example, the Test Operator group could be in the Operator group, but not also in the Engineer group. Each Group has permissions of its containing Group, and may add additional permissions. See "Users and Groups Example" in FIG. 28.

Members of a Group can have permissions objects via the object's association to instances of the Process Area and Object Type classes. To have a permission to access an object within a Process Area, the group preferably has that permission to both the Process Area, and the Object Type. If the object is not assignable to a Process Area, then the group only needs type permission against the object in order to access it.

In summary, relationships are:
 A Group object maintains a list of all User objects associated with it.
 A Group object maintains a list of all other Group objects which are contained within it.
 A Group object can be in only be directly related with one other Group object (i.e., Groups can occur in only one place in the Group hierarchy)

A Group object has all the permissions of its containing Group, and may have additional permissions.

User objects within a Group object access objects assigned to specific Process Areas if that Group has permission to do so. Since permissions form a hierarchy, it's possible for a Group to have multiple object permissions within the same Process Area, as well as permission to access objects in multiple areas. This relationship is managed by the class Area Permissions.

Similarly, User objects within a Group object can access many different types of objects. Since permissions form a hierarchy, it's possible for a Group object to have multiple permissions within the same Object Type, as well as permission to access different Object Types. This relationship is managed by the class Object Type Permissions.

Listed below are sample Groups provided with one embodiment of the invention:

| Group Title | Group Description |
| --- | --- |
| Advanced Operator | Tuning specialized or critical loops. |
| Default User | General user capabilities to read, but not change configuraton data. |
| Developer | Develop and maintain Configurator framework and applications which run inside the framework. Note that this particular group object may not be visible to a "normal" user. |
| Operator | Tuning general loops. |
| Process Engineer | Build and maintain process loop configurations. |
| Process Engineer Administrator | Develop and approve customer default block parameters, loop templates, proprietary control schemes, batch administration, etc. |
| Software Engineer | Develop and install customer applications and third party software, such as custom reports and database applications. |
| System Administrator | Configure system, security, backups, fault tolerance, etc. |

1.10.1.2 User

In the illustrated configuration system, a User object is someone who initiates an Edit session using a unique identifier. This identifier is captured from within the Framework in order to determine security permissions. A User preferably belongs to at least one Group. A User may belong to more than one Group, limited only by the number of Groups defined in the system. When a User logs onto the Configurator initially, they acquire the sum of the permissions of all of their associated Groups. Since a User can belong to different Groups, they should be able to change which Group or Groups they belong to dynamically (refer to FIG. 31). The groups which a User belongs to at any point in time is referred to as the Active Group Set. The Active Group Set will be used for determining permissions. The permissions which a User has at a specific point in time are determined by the sum of the permissions of all the Groups within the Active Group Set. A User can change groups at any time, but only to groups within the set which have been defined for him in the Group hierarchy. Summarizing relationships:

A User object belongs to one or more Group objects in the security hierarchy. Groups objects, in turn, maintain a list of all associated User objects.

A User object is able to dynamically change its Active Group Set, thereby changing the permissions by which the User object can access objects within the illustrated configuration system.

Figure 28:
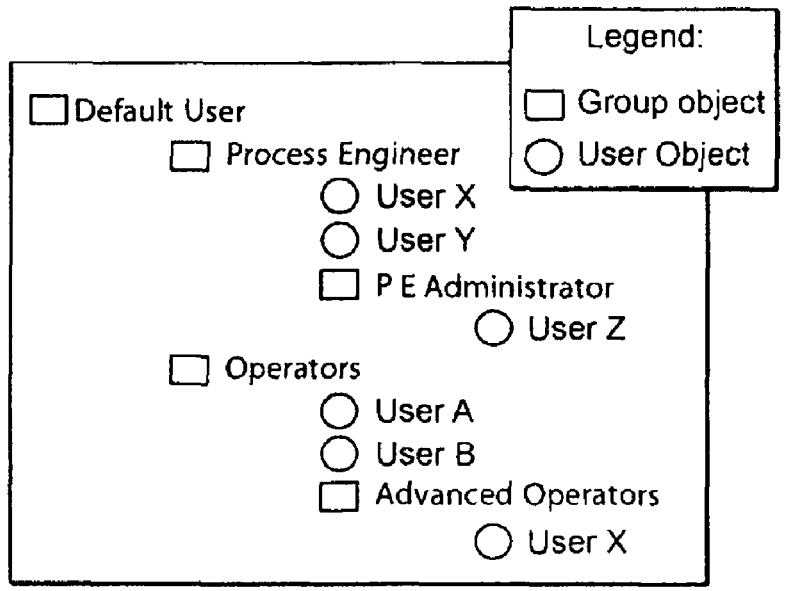
FIG. 28 is an users and groups example in a system according to the invention.

Users and Groups form a hierarchy as illustrated in FIG. 28. A Group can only be in one other Group, so that for example, Test Operators could not appear more than once in the hierarchy.

In the example shown in FIG. 28, the group "PE Administrator" has all of the permissions of "Process Engineer", and may have additional permissions. Note that user "User X" belongs to both the "Process Engineer" and "Advanced Operators" groups.

1.10.1.3 Process Area

Instances of the Process Area class form a hierarchy, and reference such things as individual buildings, or areas within a building in which logically-related processes are performed. Process Area objects can contain other Process Area objects, and they can be associated with one or more configurable objects which are capable of being assigned to that Process Area. Examples of such configurable objects are Loops and Compounds. Each instance of a Process Area object has permissions of its containing Process Area, and may add additional permissions.

Objects may be indirectly associated with a Process Area. For example, a Block may be associated with a specific Process Area as the result of being part of a Loop or Compound associated with that area. The ramifications of this on the design needs to be explored further. Summarizing relationships:

User objects within a Group access objects assigned to specific Process Area object if that Group object has permission to do so. Since permissions form a hierarchy, it's possible for a Group object to have multiple permissions within the same instance of the Process Area class, as well as permission to access objects in multiple areas. This relationship is managed by the class Area Permissions.

An instance of a Process Area can contain other Process Areas. Permissions are "inherited" from the containing Process Area.

Configurable objects can only belong to a single instance of a Process Area (i.e., an object can't belong to two or more Process Area objects at the same time).

1.10.1.4 Area Permission

The Area Permission class is used to restrict a user's access to an object by considering where the object resides in the plant hierarchy. Area Permission objects allow system administrators to set user access permission to the objects assigned to Process Areas by groups that the user belongs to. Area Permission objects contain a reference to the permission in the permission hierarchy for the indicated Group/Process Area object pair. Summarizing relationships:

An Area Permission object represents the permission in the permission hierarchy that the associated Group has on objects which have been assigned to the associated Process Area.

Permissions get more restrictive, not less, as you go down the area hierarchy.

1.10.1.5 Assignable Object

An Assignable Object is an instance of an object associated with an Object Type (refer to object model depicted in FIG. 13) capable of being assigned to a Process Area. One or more instances of Assignable Object may be assigned to the same Process Area object. Objects associated with an instance of the Object Type class are deemed "assignable" when they are created. Access to an Assignable Object is dictated first by the user's group access to the object's type, then by the user's group access to the Process Area object which the object has been assigned to. Summarizing relationships:

An Assignable Object can be assigned to one, and only one, Process Area object. The object maintains a reference to the Process Area to which it has been assigned.

Figure 29:
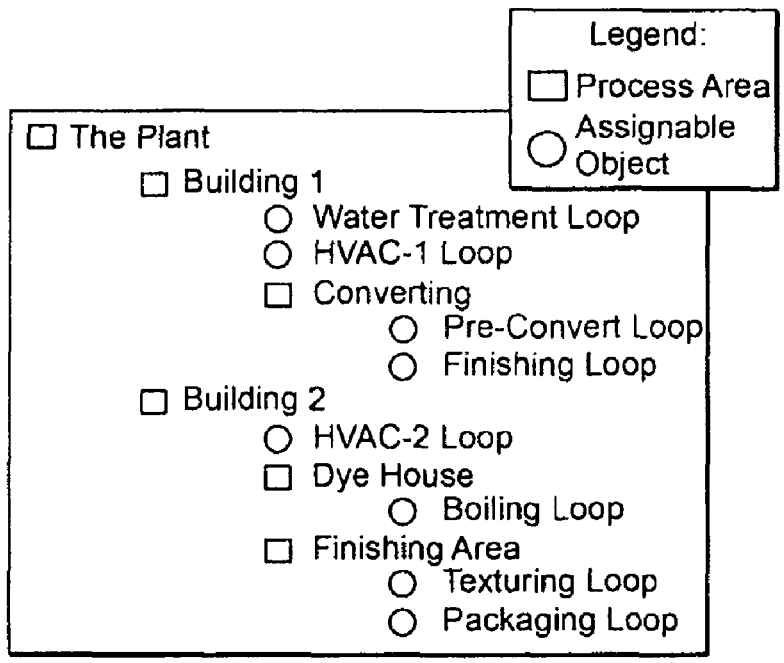
FIG. 29 is a process area and assignable objects example in a system according to the invention.

FIG. 29 depicts the hierarchical relationships between instances of Process Areas, and Assignable Objects.

1.10.1.6 Object Type Permission

Instances of the Object Type Permission class control access to objects by considering what type they are. Object Type Permission objects allow system administrators to set user access permissions to the object types by groups that the user belongs to. Object Type Permission objects contain a reference to the permission in the permission hierarchy for the indicated Group/Object Type pair. Summarizing relationships:

An instance of the Object Type Permission class represents the permission that the associated Group object has on objects of the associated Object Type.

User objects within a Group may access many different types of objects. Since permissions form a hierarchy, it's possible for a Group object to have multiple permissions within the same Object Type, as well as permission to access different Object Types. This relationship is managed by the class Object Type Permissions.

1.10.2 Security Administration
1.10.2.1 Permissions Hierarchy

Figure 30:
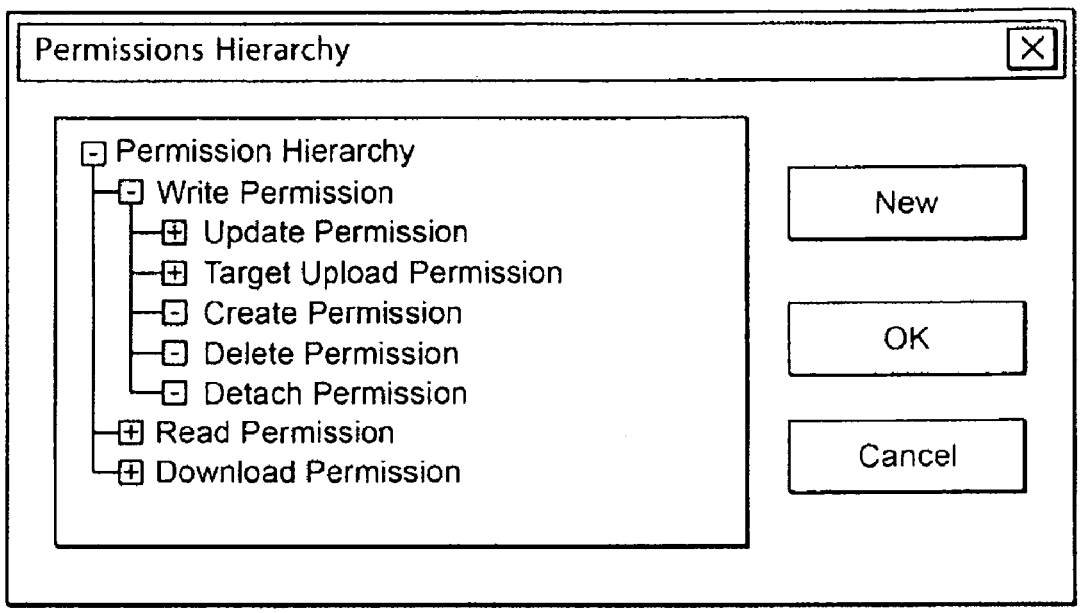
FIG. 30 depicts a permissions hierarchy in a system according to the invention.

Permissions (both Process Area and Object Type Permissions) for the Configurator form a hierarchy defined by static data within the illustrated configuration system, and not allowed to be changed by the user (FIG. 30). General read and write permissions will need to be more fine grained than simply read vs. write. Permissions stated in the Process Area Permissions and Object Type Permissions objects are stated in terms of one of the higher entries in the hierarchy, but can be as fine grained as needs dictate.

1.10.2.2 Download Permission

Download permission governs who is allowed to download configuration data to the targeted I/A system. The download is the process by which edited configuration information gets transferred to the target. A download permission is a special case of Configurator security—although effectively it is only an Model/configuration database read, the fact that it affects a running target makes it special. As with other permissions, download permissions may be set on an object type basis, and/or on process areas.

1.10.2.3 Switch Group/User Facility

A mechanism by which a user can switch groups is provided in the illustrated configuration system. The mechanism allows a user to perform the majority of his daily operations with a default minimal security setting, then switch to a more restrictive security setting by changing the Active Group Set they are currently associated with.

Another mechanism allows the user to switch user ID's. This is accomplished by the same mechanism described above. The mechanism would also allow a supervisor to temporarily "log-in" to a user's session, perform a restricted operation, then "log-out" and return security (and user ID) to its previous settings. A simple dialog box like the one presented in FIG. 31 is provided to perform this switching.

Figure 31:
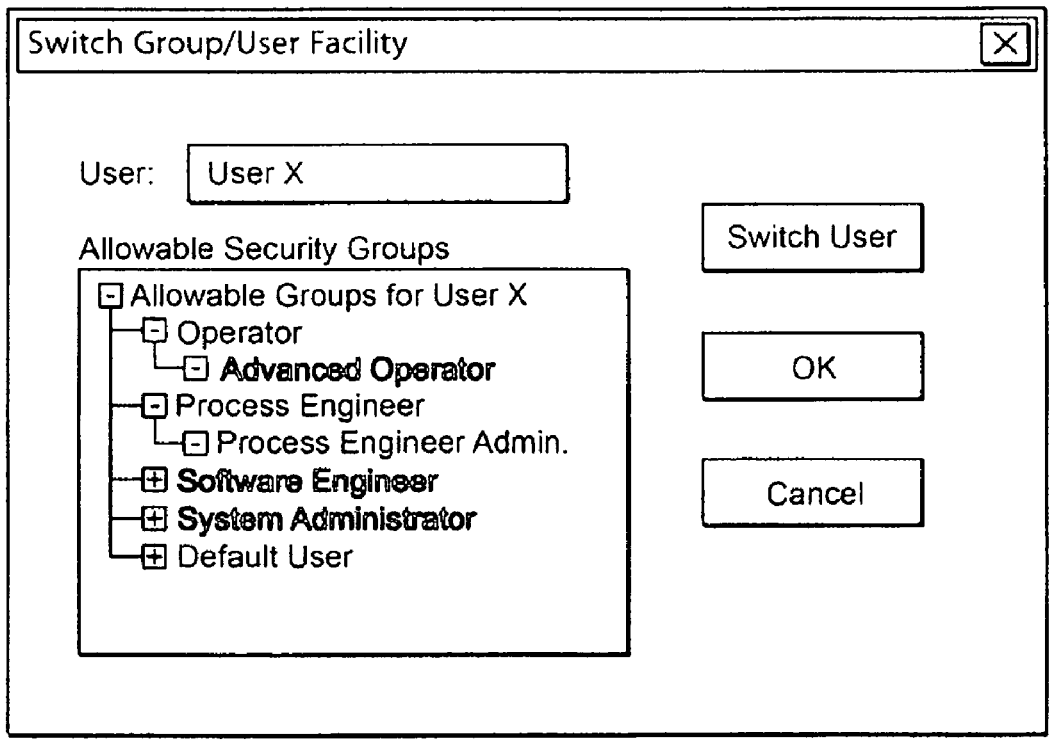
FIG. 31 depicts a switch group/user capability in a system according to the invention.

In the example shown in FIG. 31, User X is currently logged in, and has activated the Switch Group/User Facility. The application will allow User X to select (or deselect) Groups which he is currently allowed to be associated with, thereby establishing his Active Group Set.

Notice in the sample dialog that some groups are dimmed, or "greyed-out". These groups represent those groups which are not currently in the user's Active Group Set. Clicking on the text of a Group will toggle it back and forth between the normal "on" state, and the dimmed "off" state. This is only an indication of the functionality which is used in the illustrated embodiment, not a restriction on other implementations.

Additionally, by selecting the "Switch User' pushbutton, a screen equivalent to the log-in screen appears, prompting for a new user's ID and password. This user ID would be "stacked", in that the Configurator remembers the previous user ID as a new one logs in, so that when the new user finishes an edit session and exits, they will effectively be reverting back to the original user's identity and permissions. A user stack of only one-deep will suffice for this purpose.

1.10.2.4 Managing Groups and Users

This section presents sample property pages which used to maintain groups and users. All dialogs presented in this section are meant to be used in the performance of ongoing Security Administration.

Figure 32:
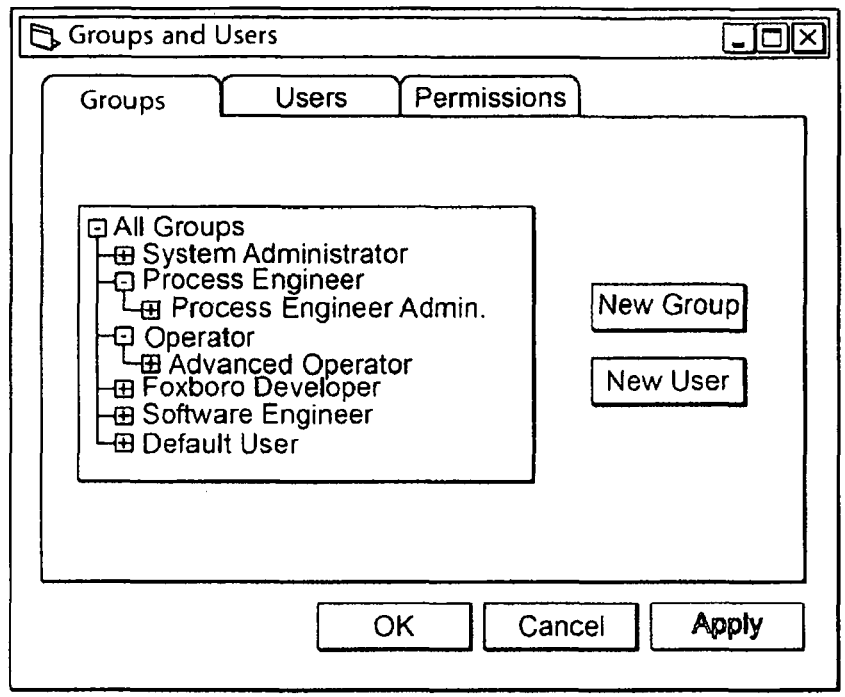
FIG. 32 depicts managing groups in a system according to the invention.
Figure 33:
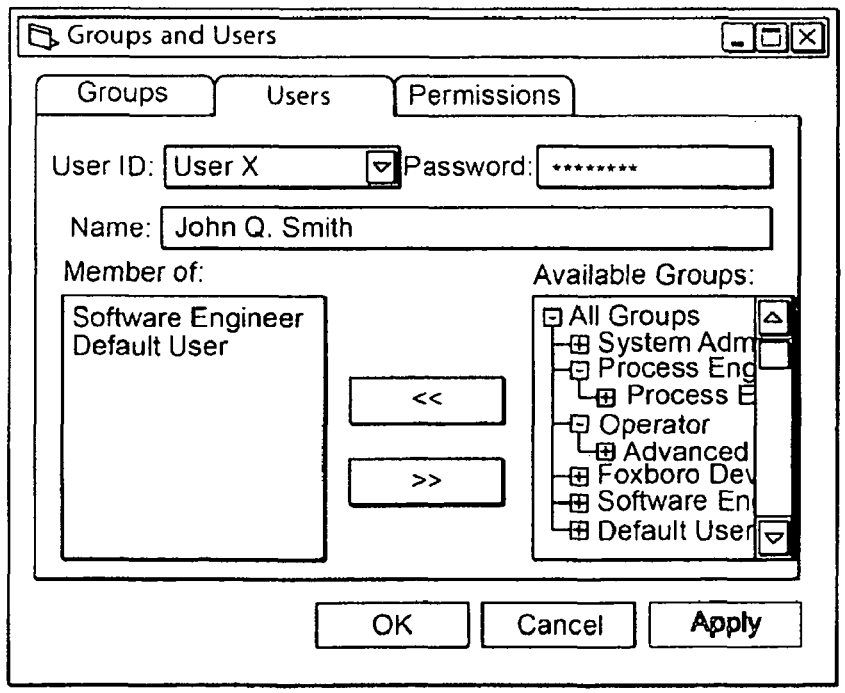
FIG. 33 depicts assigning users to groups in a system according to the invention.

The first property page presented in FIG. 32 represents a way in which the security administrator manage Groups. The existing Group structure is placed into a type of tree hierarchy control, which is imploded/exploded as necessary to gain an entry point into the Group hierarchy. To add a new Group, the administrator finds the proper spot in the control where the new Group could be inserted, and press "New Group".

At that time, a dialog box (not shown) pops up, prompting the administrator for information to create a new Group. Upon exiting that dialog, the new Group is displayed at the proper point in the hierarchy. A Group automatically inherits all Object Type and Area Permissions associated with its root Group.

To add new users to the Configurator, the security administrator presses the "New User" button, and a dialog box (also not shown) pops up, prompting the administrator for any information the illustrated configuration system requires to establish a User. This information contains the User's name, password, and possibly some other information which is needed for administrative purposes by the illustrated configuration system. Upon exiting the dialog, the new User will have been established as a valid User within the Configurator administrative system, but not yet assigned to a specific Group (or Groups). To assign a new User to a Group, or modify the Groups to which an existing User belongs, the administrator would select the "Users" tab on the property sheet.

In this example (shown in FIG. 33), the administrator is able to select the User from the combobox depicted by "User ID". Once the User was selected, the administrator would be able to modify their password and/or description in the edit fields provided, and pick the Group(s) that the User would need to be associated with.

Figure 34:
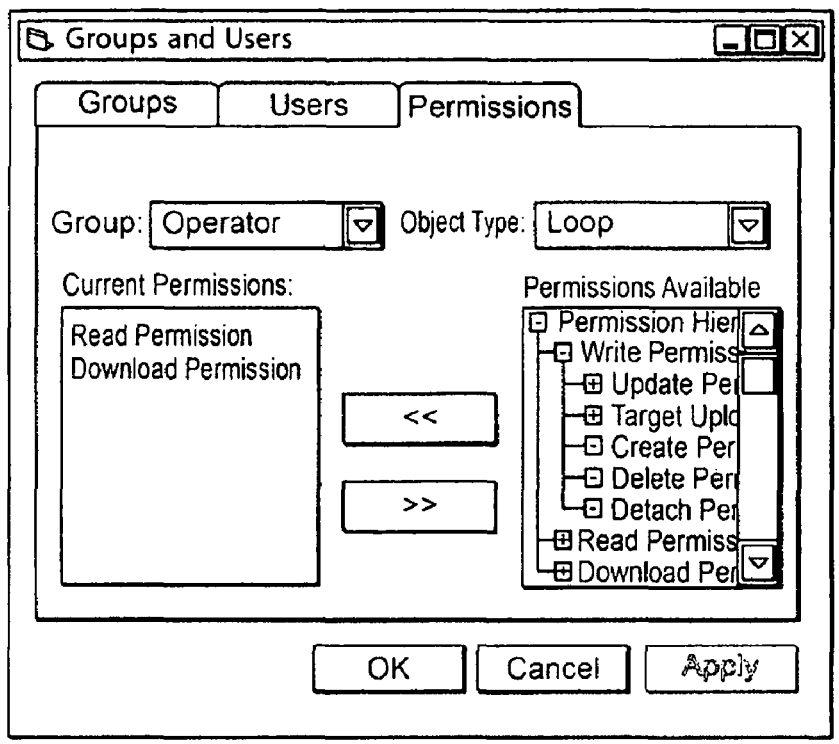
FIG. 34 depicts groups, object types and permissions in a system according to the invention.

And finally, the following property page shown in FIG. 34 represents a method by which Group access, or permission, could be given to specific Object Types. In this example, the administrator picks the Group and Object Type to be "linked" together via a permission, then picks from a list of available permissions all those which apply for this Group. The mechanism allows for permissions to be added, as well as deleted.

Permissions can be established at any level in the Permission Hierarchy, since the Permission Hierarchy is allowed to be as fine-grained as necessary for the customer's unique requirements.

1.10.2.5 Managing Process Areas

This section presents sample property pages used to maintain process areas. All dialogs presented in this section are meant to be used in the performance of ongoing Security Administration.

Figure 35:
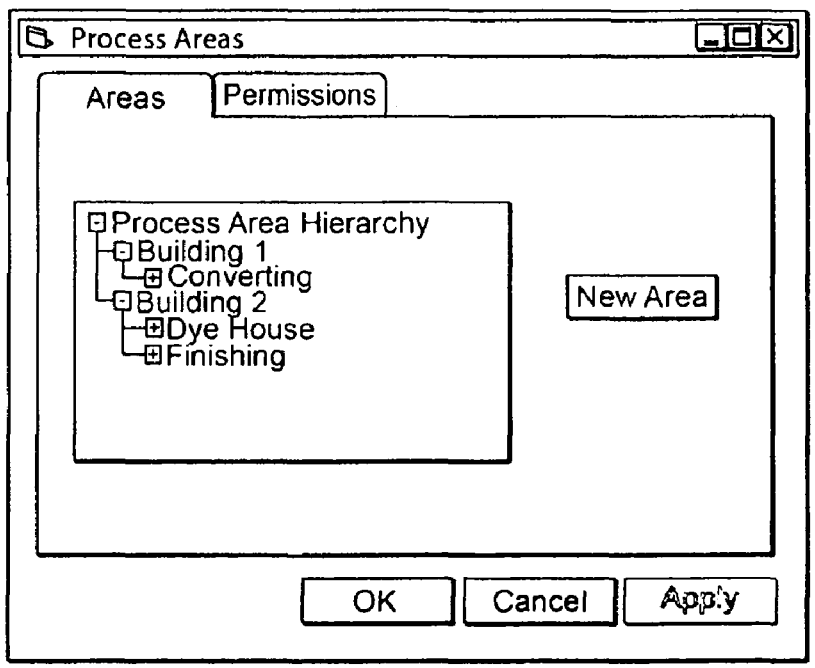
FIG. 35 depicts managing process areas in a system according to the invention.

The property page shown in FIG. 35 represents a way in which the security administrator manages Process Areas. The existing Process Area hierarchy are placed into a type of tree hierarchy control, which is imploded/exploded as necessary to determine an entry point into the Process Area Hierarchy. To add a new Process Area, the administrator would find the proper spot in the control where the new area is to be inserted, and press "New Area". At that time, a dialog box (not shown) pops up, prompting the administrator for information to create a new Process Area. Upon exiting that dialog, the new Process Area is displayed at the proper point in the hierarchy. When a Process Area is first created, it will automatically inherit all Assignable Objects, and Area Permissions associated with its root Area.

Figure 36:
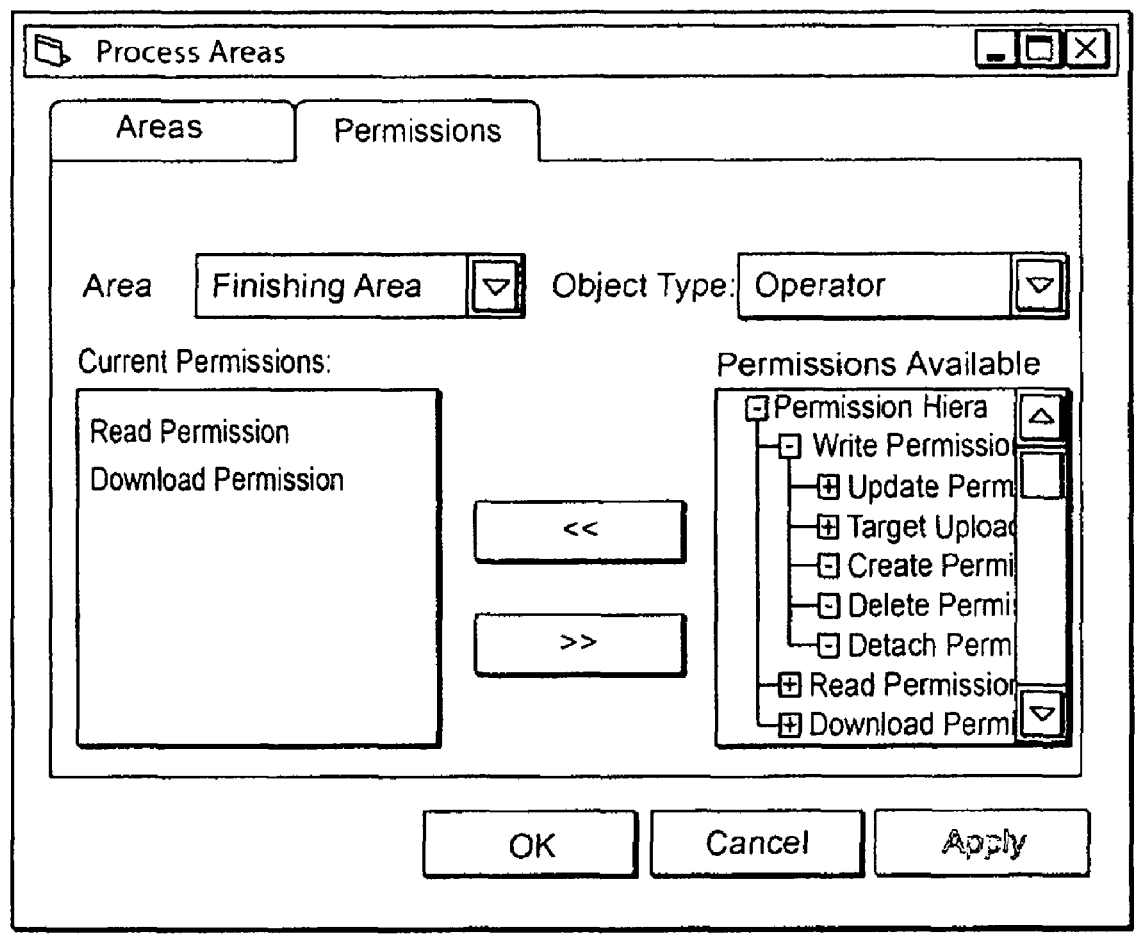
FIG. 36 depicts groups and process area permissions in a system according to the invention.

And finally, the following property page in FIG. 36 represents a method by which Group access, or permission, could be given to specific Process Areas. In this example, the administrator picks the Process Area and Group to be "linked" together via a set of permissions, then picks from a list of available permissions all those which apply for this Process Area/Group combination. Permissions can be established at any level in the Permission Hierarchy, since the Permission Hierarchy is allowed to be as fine-grained as necessary for the customer's unique requirements.

1.10.2.6 User Authentication Service

Closely associated with the Configurator security subsystem, but separate, is a User Authentication Service. This service is responsible for providing the security service with the identity of an authorized user of the illustrated configuration system. The authentication service is responsible for providing the application's security mechanism with the name of an authorized user. Whenever the security system needs to evaluate a user's permissions to an object, it will ask the authentication service for the name of the user. The first time this happens, the authentication service queries the operating system for the name of the user, and responds with the name of that user. The name is then cached for use in later calls.

Another implementation results in the user being presented with a "login" dialog box asking for a username/password combination the first time the authentication service is asked for the name of the user. Again, the user's name, once captured and verified, is cached for later use. This implementation is desirable in certain I/A installations in which all users commonly log-in as "root" or "administrator", making an operating system query for the name of the user meaningless.

Part 2—Control Algorithm Configurator Architecture

2 Functions

This section describes major functions of the configurator architecture, including sample user interface representations. Note that these user interface sample are intended to illustrate functionality described in the text and are not intended to show all design details, such as menus and toolbars. In the object model diagrams included in this section, shading indicates classes supplied by the illustrated Framework and a dashed line border indicates classes described in another subsection of this document.

2.1 Project Manager/Navigator Interface

2.1.1 Overview

The Project Manager is the navigator's view into the project database. It allows the user to browse through the project configuration hierarchies and data. The GUI interface is similar to the Microsoft Explorer's look and feel. The Framework described in Part 1 provides a common Project Manager navigational capability. This section describes the functionality specific for Control Algorithm Configuration.

2.1.1.1 System Tree View

Figure 37:
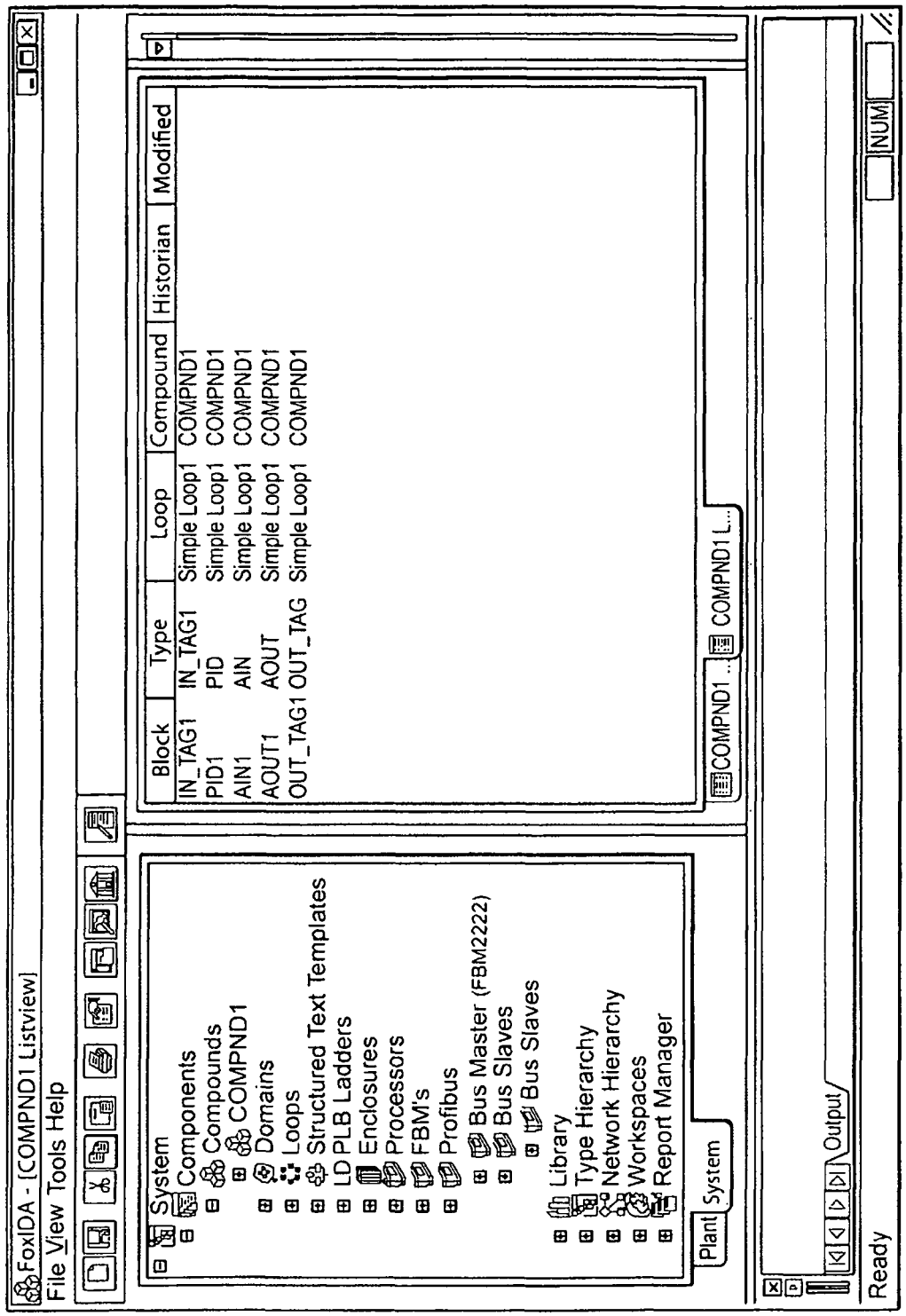
FIG. 37 depicts a system tree view in a system according to the invention.

FIG. 37 shows the Navigation Manager's System Tree View. The Components item holds the main items involved in control configuration: Control Levels (shown as compounds in the figure), Control Algorithm Diagrams (shown as Loops in the figure), and processors. Also shown, by way of example, are items (icons) pertaining to field bus segments—here, by way of non-limiting example, a Profibus segment—including their respective bus master(s) and slaves. Although a Profibus segment is shown in the drawing, it will be appreciated that the invention can be similary practiced with Fieldbus Foundation segments ("links") and their respective devices (e.g., link masters and link slaves), ModBus segments, Hart segments and other field buses (or network portions) that are configured and/or controlled by one or more devices (e.g., "masters") and/or on which one or more devices (e.g., "slaves") configured to for communication.

2.1.1.2 Control Algorithm Diagrams

The Control Algorithm Diagram Editor supports adding and connecting blocks to specify control algorithms. Blocks are only created through Control Algorithm Diagrams. The blocks in a Control Algorithm Diagram must preferably be assigned to a Control Level. A default Control Level may be set for a Control Algorithm Diagram, setting all blocks in the diagram to that level. However, blocks may be reassigned to any Control Level.

2.1.1.3 Control Processors

Control processors execute the control applications created by the users. The blocks specifying the control application are contained within the control processor in Control Levels. The Control Levels are assigned to Control Processors.

2.1.1.4 Control Levels

The Control Levels act as a logically named container for control applications. Within control processors, the control algorithm blocks are contained in Control Levels. The control levels provide a hierarchy structure following the IAS S88 standard. This standard defines seven levels of plant hierarchy with each level serving as a logical container for the next lower level.

Enterprise
An organization that coordinates the operation of 1 or more sites
May contain 1 or more Sites
Site
A physical, logical, or geographical component of the enterprise
May contain 1 or more Areas
Area
A component of a site identified by physical, geographical or logical segmentation
May contain 1 or more Process Cells
Process Cell
Defines the span of logical control of one set of process equipment within an area
Preferably contain 1 or more Units
Unit
A collection of associated control modules and/or equipment modules in which 1 or more major processing activities can be conducted May contain 1 or more Equipment Modules Equipment Module A functional group of equipment that can carry out a finite number of specific minor processing activities May contain 1 or more Control Modules Control Module The lowest level of equipment that can carry out basic control The control naming hierarchy implemented by IAS does not address the top two levels of the ISA S88 hierarchy. The control hierarchy begins with the "Area". In addition to the ISA S88 hierarchy, the implementation defines three additional levels: blocks, parameters, and attributes. Every level of the naming hierarchy may contain blocks. There is no restriction that only the "Control Module" level contains blocks.

2.1.1.5 Control Level Syntax and Assignment Rules

The following rules characterize the naming hierarchy:

Total name length of 128 bytes, including delimiters

A total of 32 bytes for each level name

The name can be any mix of numeric (0-9) or alphabetic (A-Z) characters and the underscore (Internationalization issues are not currently decided)

Names may not contain spaces

Each naming level, except possibly the last, is a compound.
  Each level may contain:
  Other levels
  Blocks
  Parameters A delimiter using the greater than symbol ('>') between levels There is no delimiter before the first level name A delimiter of colon (':') between a level and a block A delimiter of period ('.') between a block and a parameter A delimiter of period ('.') between a parameter and an attribute At a given level, the names of any contained levels must preferably be unique At a given level, the names of any contained blocks must preferably be unique At a given level, names for blocks, levels, and parameters do not have to be unique between themselves.

The full naming hierarchy does not have to be used.
  At least one level must preferably be specified. This provides compatibility with I/A naming convention—compound:block
  Any number of levels up to the maximum may be used Given these rules the following two names specify blocks:

Area1>ProcCell2>Unit1>Equipment1>CtlMod2: FT104.STATUS

Area1>ProcCell2>Unit1:CTLBLOCK.STATUS
  The first name defines a block named FT104 with a parameter of STATUS.
  The second name defines a block named CTLBLOCK with a parameter of STATUS.
  The FT104 block is contained within the Control Module level.
  The CTLBLOCK is contained within the Unit level.

Since names for blocks, levels, and parameters do not have to be unique, the following is legal:

Area1>ProcCell2>Unit1>Equipment1>CtlMod2: FT104.STATUS

Area1>ProcCell2>Unit1.STATUS

Area1>ProcCell2:Unit1.STATUS
  The ProcCell2 level contains a level called Unit1
  The ProcCell2 level contains a block called Unit1
  The Unit1 level contains a parameter called STATUS
  Each of these objects can be uniquely resolved.

Names do not have to span the full naming hierarchy:

Area1:FT104.MEAS

This provides with backward compatibility with I/A names

Compound:Block.Parameter

A second set of rules specify the relationships to control stations:

Blocks are never directly assigned to control stations

Blocks are assigned to compounds expressed as a level name

The compounds, or levels, contain not only blocks but also other compounds

The compound, or levels, also contain parameters

Each level contains a parameter that allows the grouping of contained blocks, and blocks within contained levels, for shared name scope in structured text programs, the unit grouping flag.

Once the unit grouping flag is enabled, the unit grouping flag in contained levels is ignored.

Compounds, or levels, are assigned to control stations

Any level, regardless of it's position in the hierarchy, may be assigned to a control station All contained levels are also assigned to the control station when a level is assigned to a control station Contained levels may be reassigned to a different control station. Lower levels contained by the reassigned level are also reassigned Contained levels may not be reassigned to a different control station if the unit grouping flag for a parent level is set. All lower levels contained by the reassigned level are also not allowed to be reassigned All referenced levels are preferably assigned to a control station All blocks assigned to a level preferably execute within a single control station.

Although contained levels may execute in a different control station, all of the blocks at a given level preferably execute within the same control station. (All blocks in a compound execute in the same control station.)

More than one level may be assigned to a CP

More than one level which are at the same point in the hierarchy may be assigned to a control station (i.e. Area1 and Area2 may both be assigned to the same control station)

The block processing order is a function of the control station and is specified in control station documents.

The levels in a control hierarchy are not only divisible between control stations in a child relationship; they can also be divided among parent control stations:

Area2>ProcCell1 assigned to CP001

Area2>ProcCell2 assigned to CP003

OR

Area2>ProcCell1>Unit1 assigned to CP001

Area2>ProcCell1>Unit2 assigned to CP003

All of the blocks contained by a level (a compound) preferably execute in the same control station.

Area2>ProcCell1>Unit1:FT104 If block FT104 executing in CP001

Area2>ProcCell1>Unit1:FT105 then block FT105 preferably also executes in CP001

Area2>ProcCell1>Unit1>Equipment1:FT105 block FT106 could execute in a separate CP All compounds and all blocks could be assigned to a single control station Area1 Assigned to CP003

Area2 Assigned to CP003

Any level could be assigned to a control station

Area2>ProcCell1>Unit1>Equipment1>CTLMod1
assigned to CP003
All used levels are preferably assigned to a control station
Area2>ProcCell1 assigned to CP003
Area2>ProcCell2 assigned to CP001
If these are the only two assignments made, then
Area2 is not assigned to any control station, this is illegal 2.2 Block Definition Editor 2.2.1 Overview The Block Definition Editor allows control blocks and their parameters to be defined for use on IAS. Through the editor, users create entirely new block definitions or derive new blocks from existing definitions. Only blocks derived from implementation standard control blocks download to control stations. User-defined blocks also appear in the list of defined blocks when viewed with this or the Control Algorithm Diagram Editor, but are not installed into a control station. This list contains only single Block definitions; no Composite Block Definitions appear.

Figure 38:
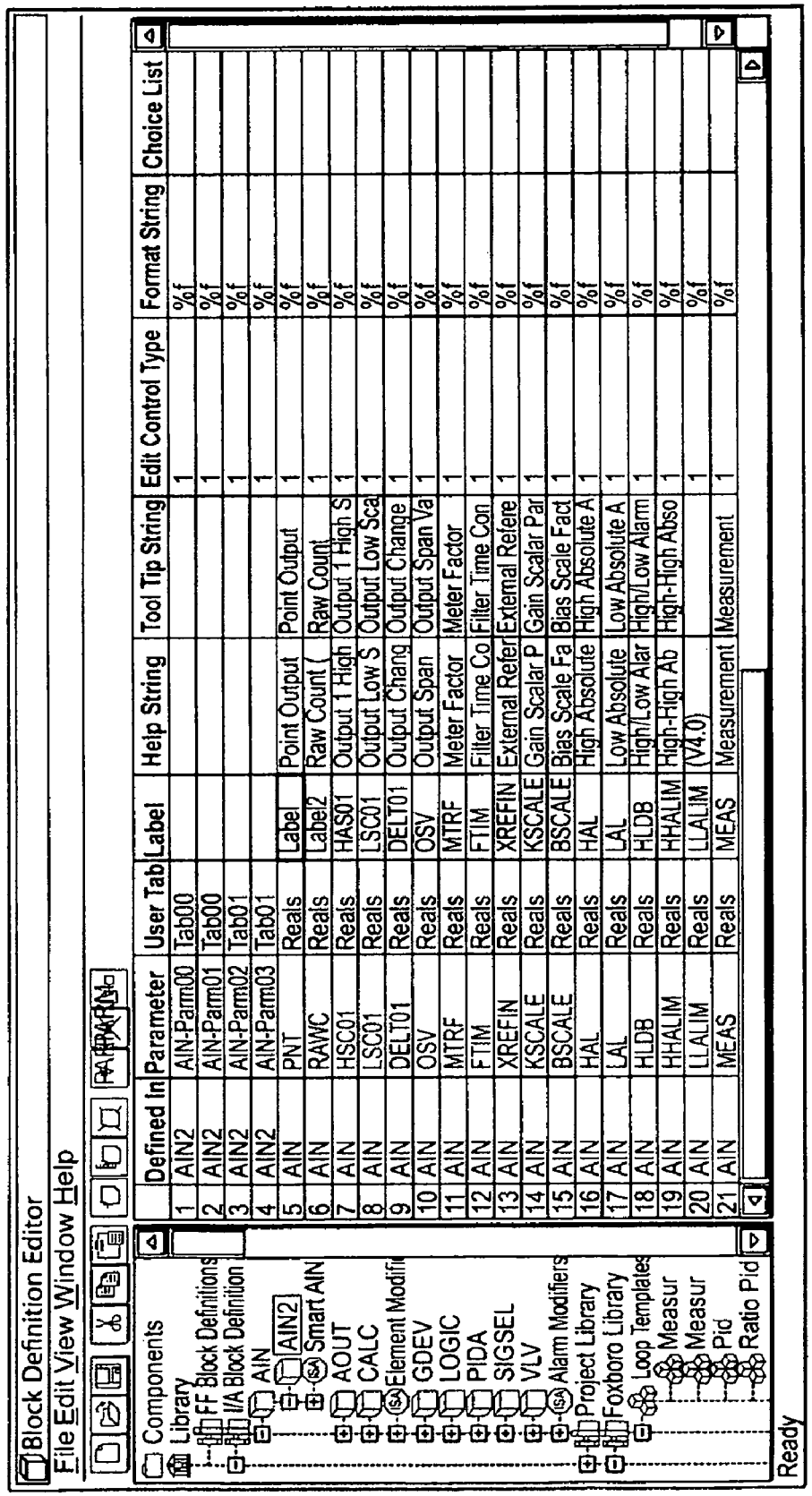
FIG. 38 depicts a block definition editor in a system according to the invention.

FIG. 38 shows the main display for the Block Definition Editor. The user is presented with the Project Manager tree branch representing the hierarchy of block definitions. All block definitions derived from the base types show as lower branches in the tree. A grid view shows the parameters for each block. Each row is a block parameter with the columns representing the parameter attributes. The attribute values for each parameter can be modified by the user. However, some inherited parameters cannot be overridden in the derived block definition: parameter name, value type, etc. Values that are overridden are displayed differently from those defined in the local block definition or in the parent block definition. Both the tree and grid views are based on Framework supplied editor classes.

Definitions for derived blocks can add parameters or modify the attributes of inherited parameters, but inherited parameters cannot be removed. Blocks are derived from exactly one other block definition.

The user cannot modify the implementation-standard blocks. This block set is part of the illustrated configuration system. Personnel with the appropriate security permissions can add, modify and remove any parameters when creating the standard set of IAS blocks. Users can add parameters to definitions derived from these standard block definitions or create new "base" block definitions (not derived from an IAS block type). The first four rows in FIG. 38 show examples of user-added parameters in the Block Definition for block AIN2. These parameters are available for documentation and calculation purposes only, but are not downloaded into running control stations.

There are two classes of parameters, those that are integrated directly with the control system (control parameters) and those that are not (non-control parameters). Control parameters are those downloaded to Control Processors and participate in the running of the control system, such as parameters associated with the standard control block types AIN, PID, AOUT, etc. Non-control parameters can be used for calculations, documentation, etc. and are not downloaded to the CP. Normal users can only add non-control parameters, only authorized personnel (e.g., engineers) can add control parameters.

Each parameter in a block definition contains a fixed set of predefined attributes. Values can be given to all of these attributes in the block definition where the parameter is defined. A subset of these parameter attribute values can be changed in derived blocks, which results in the creation of a parameter override object being created.

The value of a parameter can be defined in two ways—by setting the "value" attribute to a constant value or by setting the "formula" attribute to a formula. In the "value" attribute of a parameter, users can supply constant default values for parameters in block definitions. If a formula is supplied, the result of the formula calculation is used as the parameter value. These formulas are executed when the value of the parameter is requested. Formulas can consist of references to other parameters in the current block, mathematical operations, etc.

Modifier Block Definitions are defined in a manner identical to that of Block Definitions. In Modifier Block Definitions, references to other parameters in formulas are not restricted to existing parameters. See Part 1 for a detailed description of modifier blocks. Parameter groups can be defined to contain any or all parameters defined in the local definition or parent definitions. Parameter groups correspond to the tabs on the Block Property sheet display. The parameter group definition contains information on ordering for parameters contained in the group. All parameters are contained in at least one parameter group, but can be assigned to multiple groups. The user can select the group(s) to which each parameter belongs. Versioning of blocks is supported via standard versioning features supplied by the Framework classes. Each time a block definition is changed, the block version is incremented. This data is used for reporting and tracking of block definition history. A security mechanism is used to verify that the user has privileges to edit the selected block. No customer will have privileges to edit implementation-standard block definitions. These defined blocks can be derived from, but not changed. Reports can be generated on block definitions, changes in the current edit session, and audit trails. The report for changes between versions is helpful internally to facilitate version upgrades to customer systems.

2.2.2 Functions

The following functions are implemented by the Block Definition Editor:
Create new, derived or copied block definitions
Create new, derived or copied modifier block definitions
Add, remove, or modify parameters
Override parameters inherited from parent block definition, revert to parent value
Group parameters into categories displayed on property sheet during configuration
Provide a mechanism for ordering parameters on property sheet page
View parameters as they would appear on property sheet
Define parameters to be control or non-control types
Define configuration-time formulas for parameter values, recalculate values. These formulas will support math statements, references to other parameters in blocks, etc.
Save/load definition(s) to/from diskette or file
Import definitions from pdef files or FoxCAE tables
Upgrade to new version of standard IAS block definitions
Maintain block version information
Report block/parameter definitions, changes, definitions in use, block derivations
Provide audit trails for definition changes
Provide security which allows only certain people access to block definitions
Provide security against changing implementation standard control block definitions and standard parameter group assignments.
Provide standard editing capabilities: cut, copy, paste, etc.
Provide search capabilities for parameters or content, allowing the user to find parameters of a specified name or containing a specified value The following functions are provided in support of the Block Definition Editor:
   Maintain standard set of control blocks
   Version upgrade mechanism for redistribution of control blocks

2.2.3 Object Model
2.2.3.1 Block Definition

Figure 39:
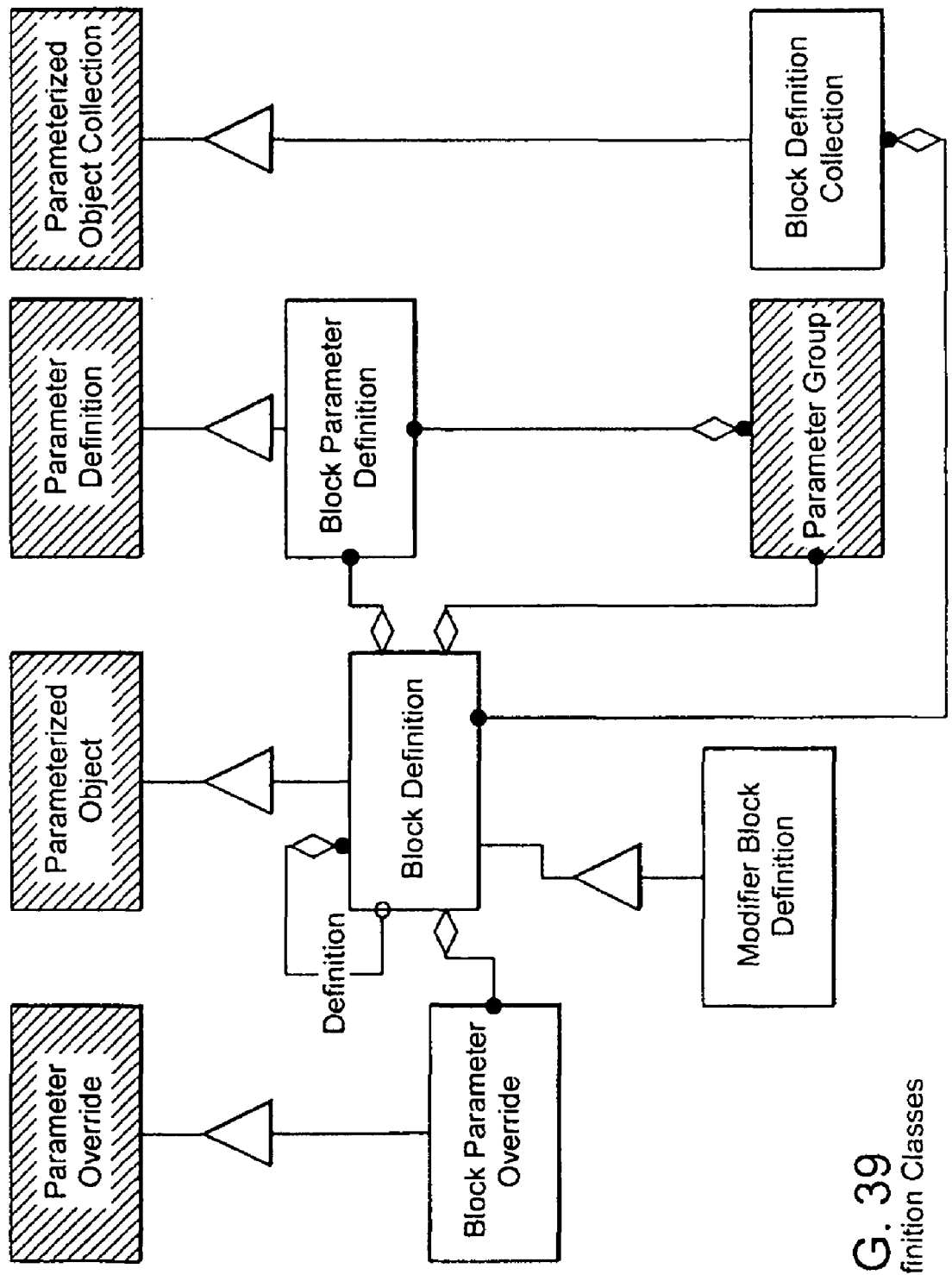
FIG. 39 depicts a block definition classes in a system according to the invention.

Referring to FIG. 39 Block definitions follow the basic paradigm defined for Parameterized Objects. Block definitions contain lists of parameter definitions and overrides and maintain a pointer to their parent definition. Block definitions can be "base" definitions—those with no parent definitions, or "derived" definitions—those that inherit parameter definitions and overrides from a parent block definition.

The implementation includes a set of base definitions that correspond to control algorithms in Control Processors, called control blocks. Users can derive definitions from this set or create their own base definitions that do not correspond to Control algorithms, called non-control blocks. Only block definitions derived from control blocks will be downloaded into a CP when instantiated in a running system.

Class Relationships:
   Block definitions are parameterized objects.
   Block definitions can create instances of blocks of their type or block definitions derived from their type. The blocks or block definitions created are also instances of parameterized object-derived classes.
   Block definitions contain parameter definitions. The parameter set defines the type and characteristics of the block definition, not the class of the block definition object. All block definitions are of the class "Block Definition", while the type of the block definition varies according to the parameter set. (AIN, PID, etc.)
   Block definitions may contain parameter overrides. These overrides modify the inherited parameter definitions.
   Block definitions can refer to 0 or 1 parent block definitions. The parent block definition defines a set of parameters that are inherited and can be overridden.
   Block definitions maintain an ordered list of Parameter Group Definitions to use in creating a Property Sheet view for modifying block parameter values. Each group corresponds to a Separate Property Page within the Property Sheet. See Part 1 for further discussion of Parameter Groups.
   All block definitions are collected in Block Definition Collections for use in reporting, viewing and listing block definitions. These collections reside in the Project Manager "System" hierarchy.

2.2.3.2 Block Parameter Definition

Block parameter definitions consist of a standard, framework defined set of attributes. The attributes of name and type compose the basic definition for a parameter. Other attributes such as default value, limits, description, etc. all contribute to the definition and can be overridden in derived block definitions.

Block parameter definitions contain attributes which indicate whether it is a control or non-control parameter. Control parameters are those recognized by the control algorithms in Control Processors. Only implementation standard blocks can contain control parameters. Non-control parameters can be used for calculation or documentation purposes and do not get downloaded into a CP when they are part of a compound in a running system.

Some block types contain special parameters which cannot be viewed, edited or overridden by the user. Blocks like PLB and Sequence have parameters which are not standard parameter types such as string, float, int, etc. but contain compiled ladder or sequence code.

Class Relationships:
   Block parameter definitions are parameter definitions. They provide all of the attributes of a parameter, such as name, type, description, limits, etc.
   Block definitions contain parameter definitions. The parameter set defines the type and characteristics of the block definition.
   Parameter Groups collect block parameter definition for displaying or reporting of parameters by Group identifier.

2.2.3.3 Block Parameter Override

Block parameter overrides can modify a value or attribute of an inherited parameter definition. When a new block definition is derived from another block definition, any attribute modifications which are made to inherited parameters are stored in the current block definition as an override. Overrides are cumulative. Overrides which appear in a parent apply to derived block definitions as well.

Class Relationships:
   Block parameter overrides are parameter overrides. They provide the ability to override a most of the parameter attributes of inherited parameter definitions. (Not included are parameter name, type, etc.)
   Block definitions contain parameter overrides. These overrides modify the inherited parameter definitions.

2.2.3.4 Block Definition Container

A Block Definition Container provides a grouping mechanism for all block definitions. Separate containers exist for block definitions, modifier blocks, and user work areas for block definitions. At system installation time, the single block definition container for system block definitions is created. Users can create other containers for working copies of block definitions.

A Block Definition Container provides a mechanism for iterating over all of the definitions it contains. This feature is inherited from the standard Parameterized Object Container. Additional iteration methods are supplied by this class to report on block definitions alphabetically or hierarchically. Block Definition Containers take many forms: nodes of the Project Manager "System" hierarchy which are used to hold Block Definitions, palettes of Block Definitions for use in the Control Algorithm Diagram Editor, and others. Class Relationships:
   A Block Definition Container contains block definitions.
   A Block Definition Container is a generic Parameterized Object container restricting the Parameterized Object contents to Block Definitions.

2.2.3.5 Modifier Block Definition

A Modifier Block Definition is a block definition. It can contain parameters exactly like a standard block definition. Derived modifier blocks can override parameter attributes from parent modifier blocks. A modifier block instance can be contained in a loop or composite block just like any other block, but does not behave in the same manner. All parameters in a modifier block instance override parameters matching by name in the block to which it is attached. Modifier block definitions, however remain identical to block definitions. A Modifier Block can contain formulas which reference parameters not necessarily defined in the Modifier Block. Like Block Definitions, the calculations are executed whenever the value of the calculated parameter is requested.

2.2.3.6 Parameter Group Definition

A Parameter Group Definition maintains parameter grouping information to allow reporting or displaying parameters by selective groupings. Standard parameter groupings (such as Input/output, High/Low Alarms, Tuning) are provided for implementation standard block definitions. Users can add their own groupings but are not allowed to change the standard groupings. Class Relationships:

A Parameter Group Definition is a Parameter Group, from which it inherits the ability to maintain an ordered list of parameters.

A Parameter Group Definition maintains associations with parameter definitions to define its group.

2.3 Control Algorithm Diagram Editor 2.3.1 Overview

The Control Algorithm Editor is the single editor for all Control Algorithm related work. With this editor, the user can graphically create and edit Loop Templates, Simple Loops, Composite Block Definitions, Blocks and Connections. The user can also view and edit some properties of Composite Blocks and Template-Derived Loops. Composite Blocks and Template-Derived Loops are shown graphically based on their definition or template.

Figure 40:
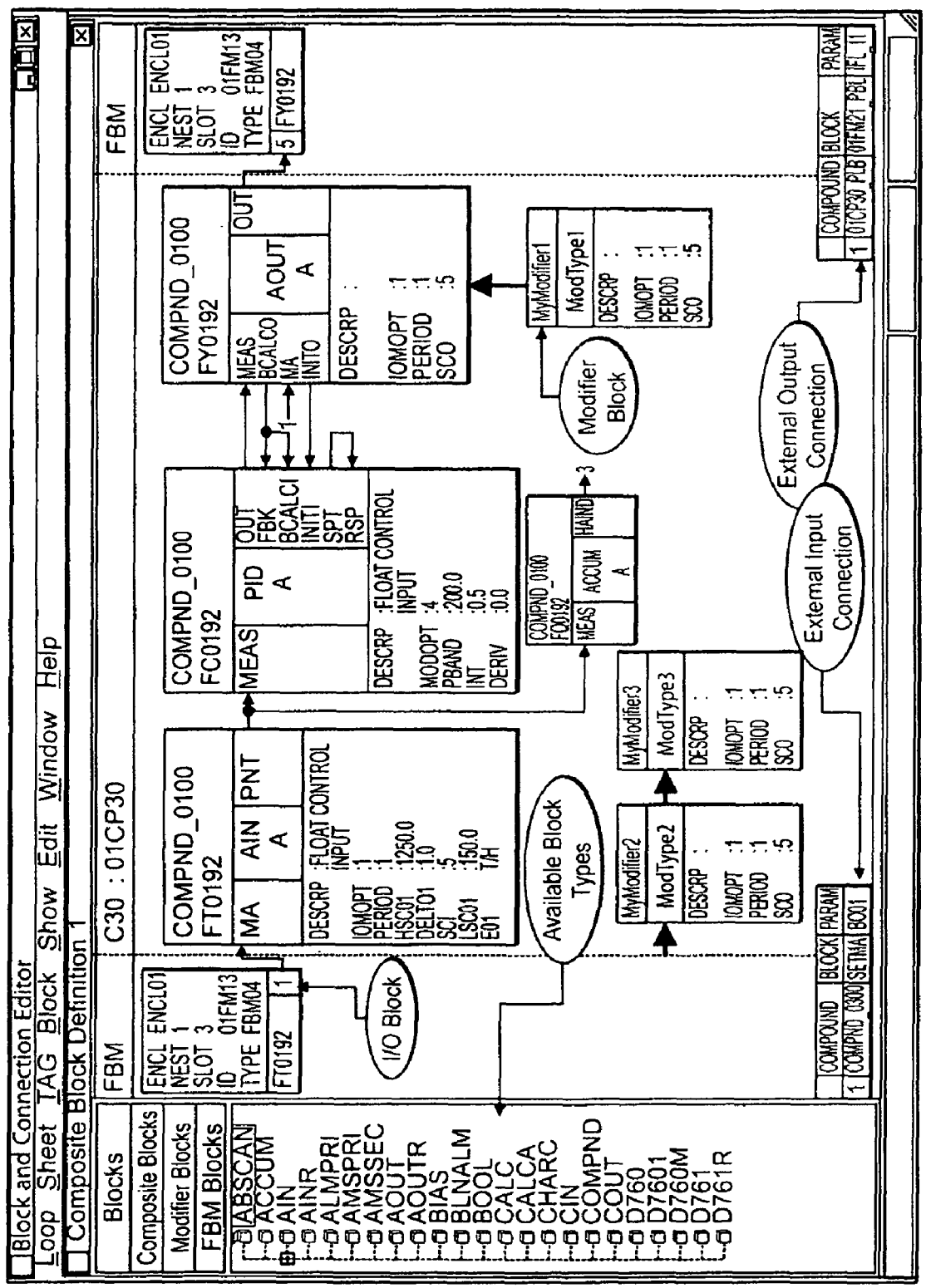
FIG. 40 depicts a simple loop in a system according to the invention.

FIG. 40 shows a single Simple Loop in the Control Algorithm Editor. All control algorithm diagrams graphical views look similar to this display, allowing new Blocks to be added by dragging and dropping from a palette of available Blocks and positioning and connecting Blocks through mouse actions. The block or blocks which compose a loop or Composite Block are displayed in the center of the display. Modifier blocks which are applied to individual are shown in the center with arrows indicating which blocks they are modifying (ModType1). Modifier Blocks which apply to the entire Loop or Composite Block are shown attached to the drawing boundary (ModType2 and ModType2).

Loop Templates define the blocks, block parameters, internal connections, and connections to external hardware points (Tags) for a loop. Any defined block or Composite Block type can be inserted into a Loop Template. When modifications are made to the Loop Template, the user is prompted to download all of the derived loops. Changes made to the Loop Template are automatically inherited by the derived Loops, since the Template is referenced whenever the derived Loops are accessed for display or download.

The user defines any parameter values or connections for the loop and connects the externally exposed block source and sink parameters to I/O Blocks. When instantiated, the placeholder I/O Block attributes (Name, type, enclosure, etc.) are assigned values. Tags are then assigned to connections made within the I/O Block. The I/O Block Placeholders serve to group Tag List Row Placeholders associated with the same I/O device (FBM). When building loops, the user can add and remove I/O Block and Tag List Row Placeholders from the drawing.

Template-Derived Loops are loops which are instantiated from Loop Templates. Individual block parameters and connections to I/O hardware devices can be customized in each separate instantiation. When instantiated, the user assigns the loop to a compound, assigns "real" block names, connects the I/O points to actual tags, and modifies values of parameters in the loop. This is either done manually or via the Loop generation function of the Tag List Editor. Any changes made to information specified in the Loop Template (Blocks included in the Loop, internal Block connections, etc.) result in the user being prompted to convert the Loop to a Simple Loop, which will result in breaking the link to the Loop Template. Parameters for Blocks in a Template-Derived Loop can only be modified if they have been exposed as Loop parameters, as described below.

Simple Loops are loops which have no template. They are edited nearly identically to Loop Templates but can be created in the context of a compound and assigned to "real" blocks and I/O Blocks.

Figure 41:
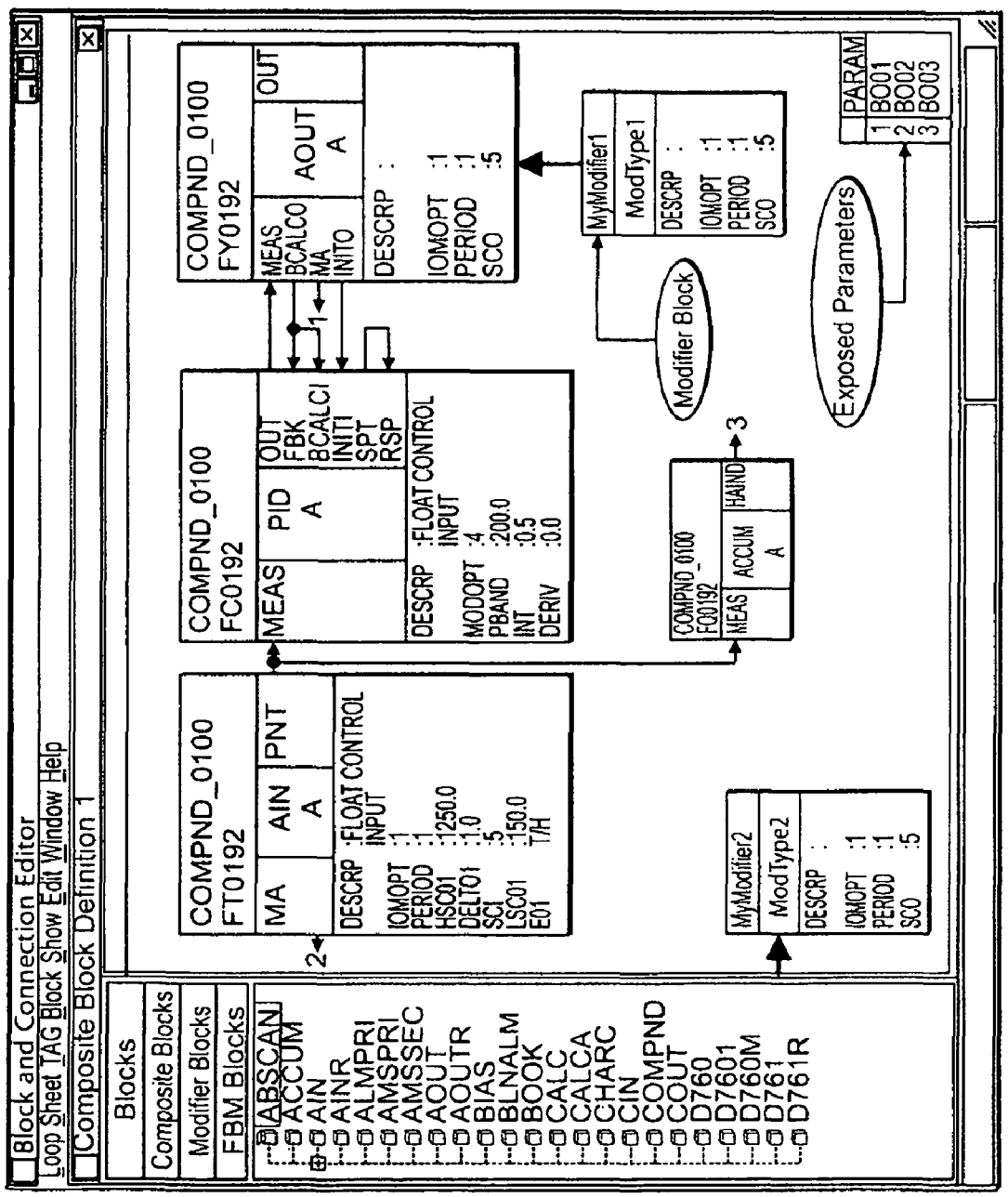
FIG. 41 depicts a composite block definition in a system according to the invention.

Composite Block Definitions define the blocks, block parameters, internal connections, and externally exposed connection points for a Composite Block, as shown in FIG. 41. When a Composite Block is instantiated, it maintains an association with its defining Composite Block Definition. Individual block parameter values can then be modified, or "overridden", in the Composite Block instance. There is no concept of a single-instance Composite Block, a Composite Block Definition is preferably used for every instance of a Composite Block. Like Simple Loops and Loop Templates, the user assigns block parameter value overrides and connections within the Composite Block.

No external connections are created directly for Blocks contained within Composite Block Definitions. Instead, the user defines which internal Block parameters are exposed to users of the Composite Block. Internally, the user is creating a connection between a parameter created for the Composite Block Definition and the internal Block parameter that is to be exposed. These Composite Block Definition parameters inherit their attributes from the parameters they are exposing.

Composite Blocks are instances of Composite Block Definitions. They can be used like standard blocks in anything which can contain blocks. (Loops, Composite Blocks, etc.) Users cannot modify the defined values or connections within the Composite Blocks unless the parameters have been exposed by the Composite Block Definition. Users modify and connect to or from the exposed parameters of the Composite Block, similar to other Blocks. The exposed parameters can be edited on a loop sheet via the parameter property sheet like the parameters of any standard Block.

Figure 42:
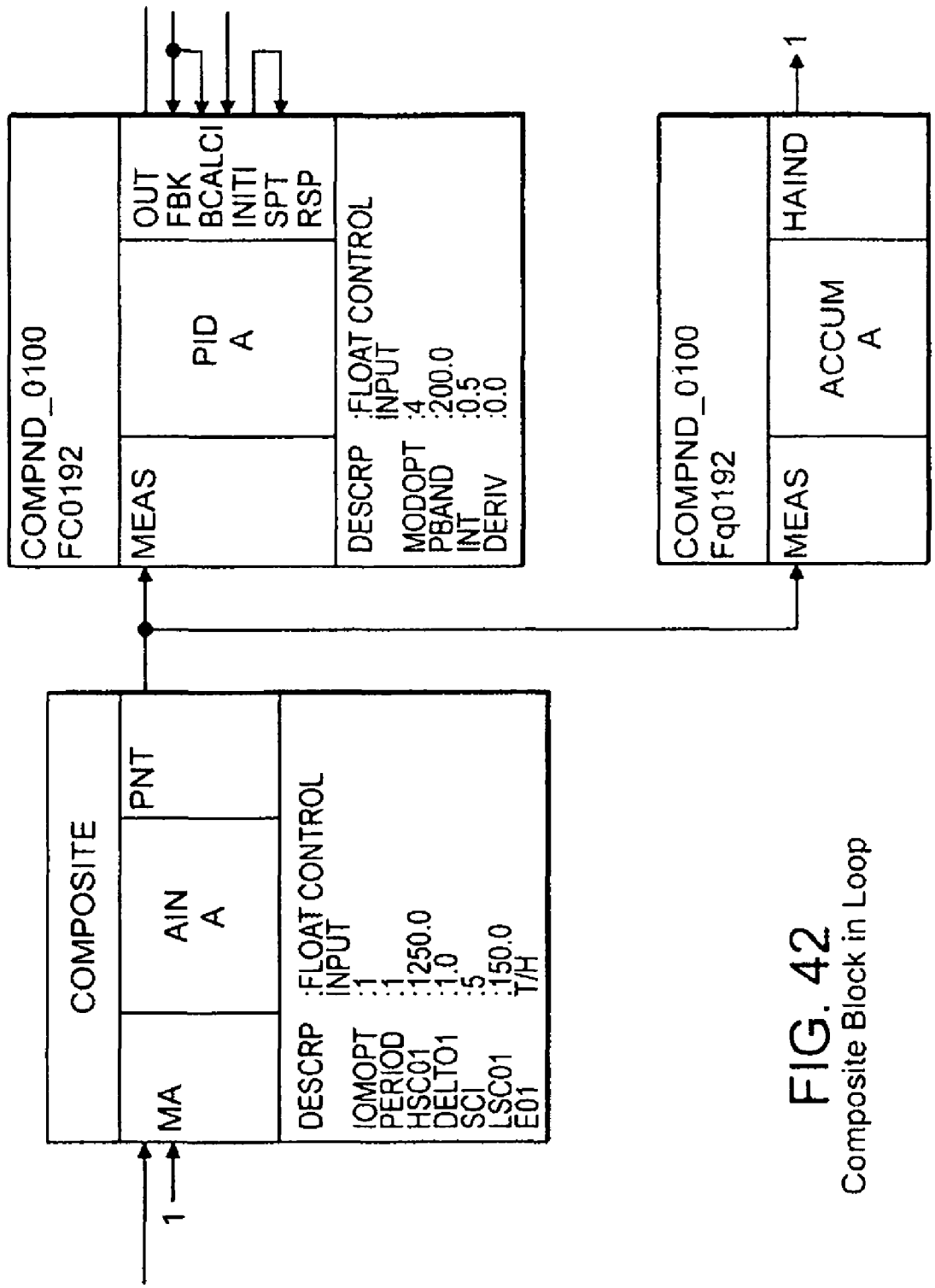
FIG. 42 depicts a composite block in loop in a system according to the invention.
Figure 43:
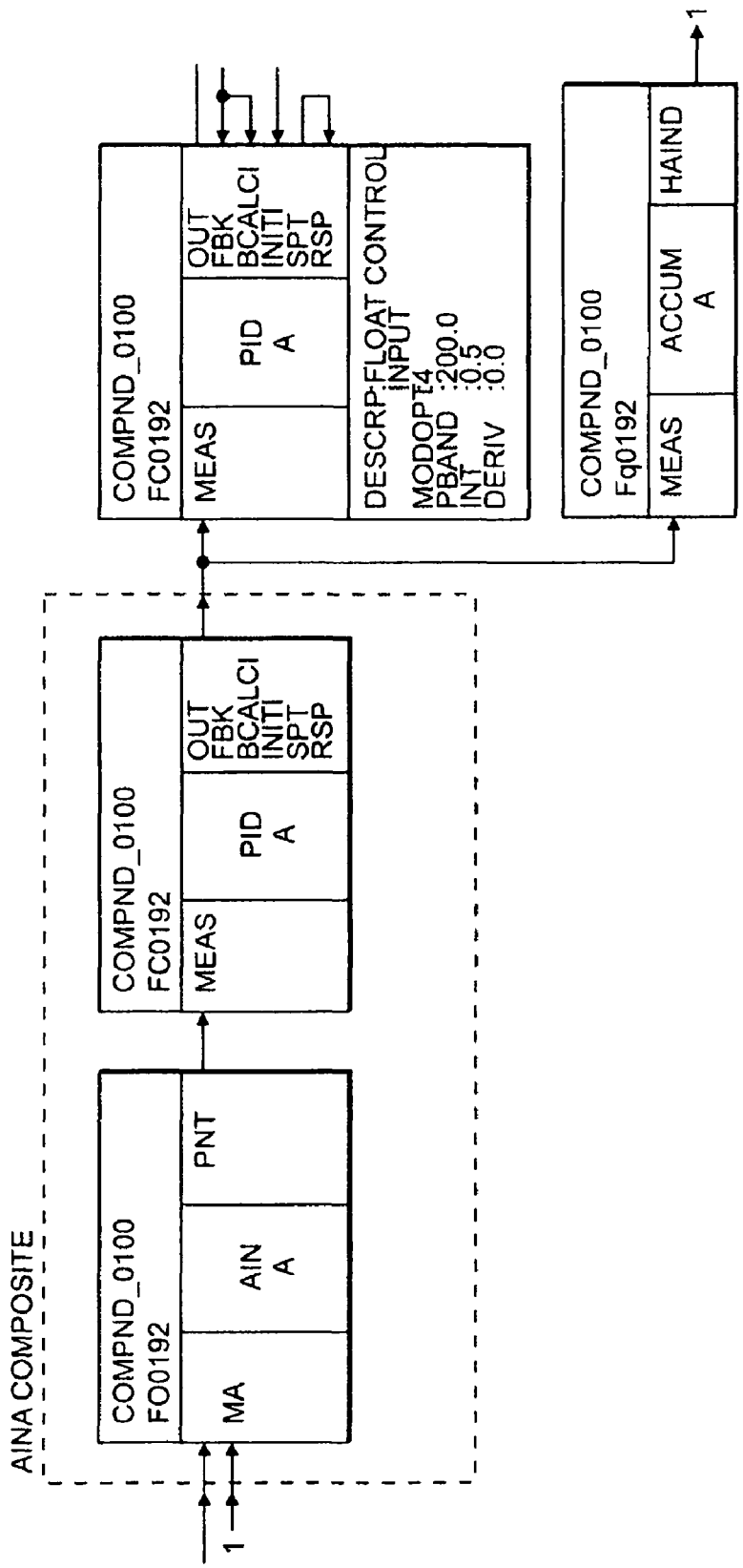
FIG. 43 depicts an expanded composite block in loop in a system according to the invention.

FIG. 42 shows an instance of a Composite Block in a loop diagram. Some exposed parameters for internal blocks are shown like parameters for any standard block. FIG. 43 shows the same loop diagram with the Composite Block expanded in-place to show its internal structure. While Composite Block internals can be viewed this way on a Loop drawing, they cannot be edited. Any attempt to add, delete, or manipulate the Blocks within the Composite Block outline results in the user being prompted to invoke the Composite Block Definition editor view.

All of the Control Algorithm Diagram objects can be stored in the user's workspace or the appropriate branch of the System tree. Simple Loops, Template-Derived Loops and Composite Blocks can be created in the context of a Compound.

Composite Blocks and Composite Block definitions define groups of blocks, connections between them and specific values for the contained block parameters. Simple Loops, Loop Templates and Template-Derived Loops extend this to connect the blocks to external I/O points, represented by an I/O Block.

Figure 44:
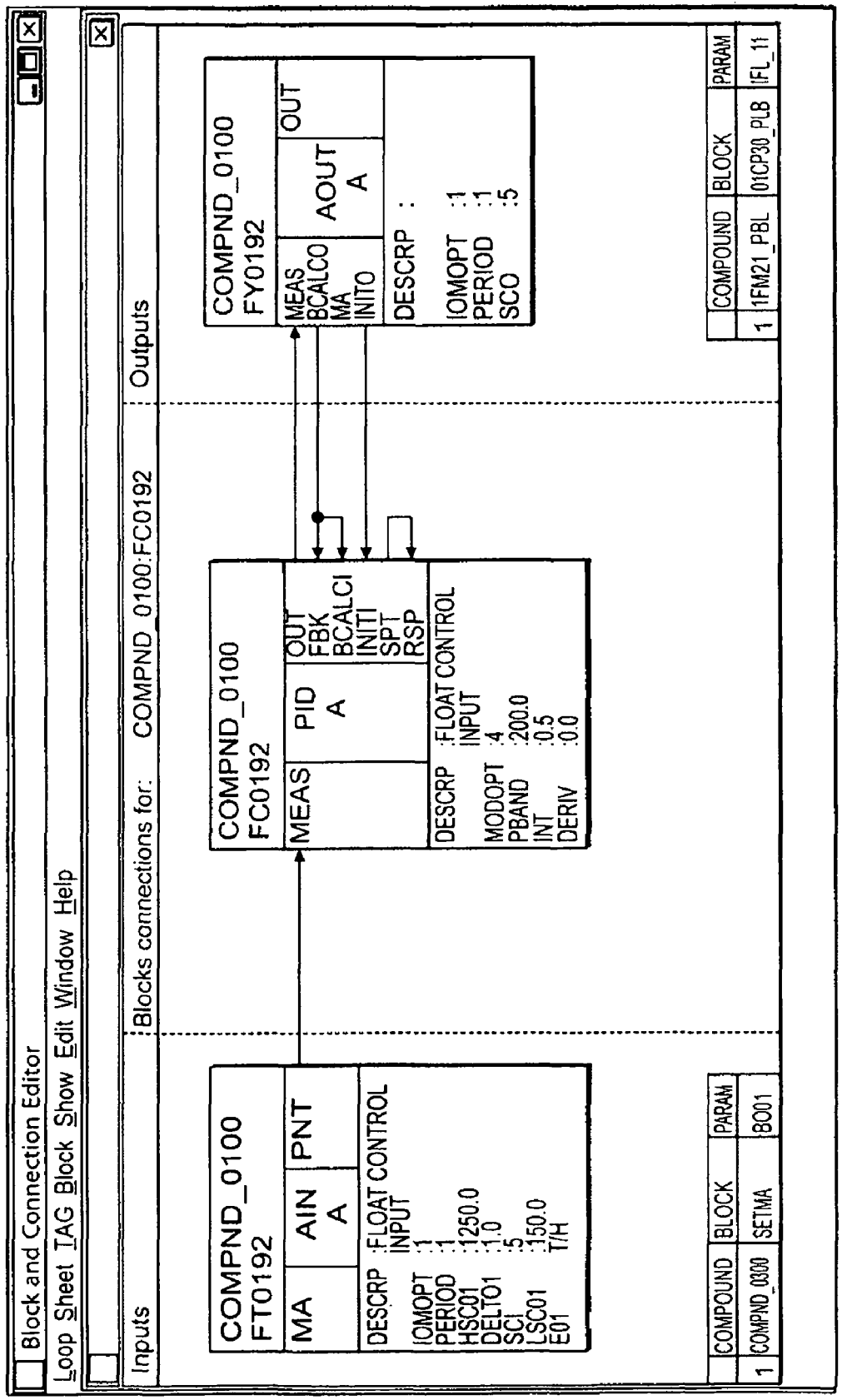
FIG. 44 depicts a block with connections in a system according to the invention.

Blocks and Connections for standalone blocks in compounds can be made with this editor. The user can edit parameter values and make connections to other standalone blocks graphically as shown in FIG. 44. Blocks containing parameters which supply inputs to the current block appear in the left margin and blocks containing parameters receiving outputs appear in the right margin. Only blocks not associated with Loops or Composite Blocks can be edited in this manner.

Each block on a control algorithm diagram is represented internally by a Placeholder. This Placeholder holds information about the geometry, placement, and size of the visual block representation. The placement of the object is user-modifiable. The basic appearance, geometry and size information for an object is maintained in the user-definable Appearance object. The object's Placeholder maintains a reference to its Appearance object. From this representation of a block, the user can access parameter and connection information or navigate to other loops, composite blocks or blocks by accessing the block's context menu.

The user can perform different functions on different parts of the Block Placeholder by right-clicking to bring up the context menu. Context menus contain unique functions depending on the object on which they are invoked. For example, the user has the option to edit connections, parameters, block information, etc. The default double-click function for the Compound/block name section is to prompt for new Compound and Block Names. The default function for the source/sink parameters sections is to bring up a connection dialog. In the Relevant block parameters section, the default action is to select parameters displayed from a list of block parameters. The default action for the center of a block is to bring up the block's Property Sheet.

Figure 45:
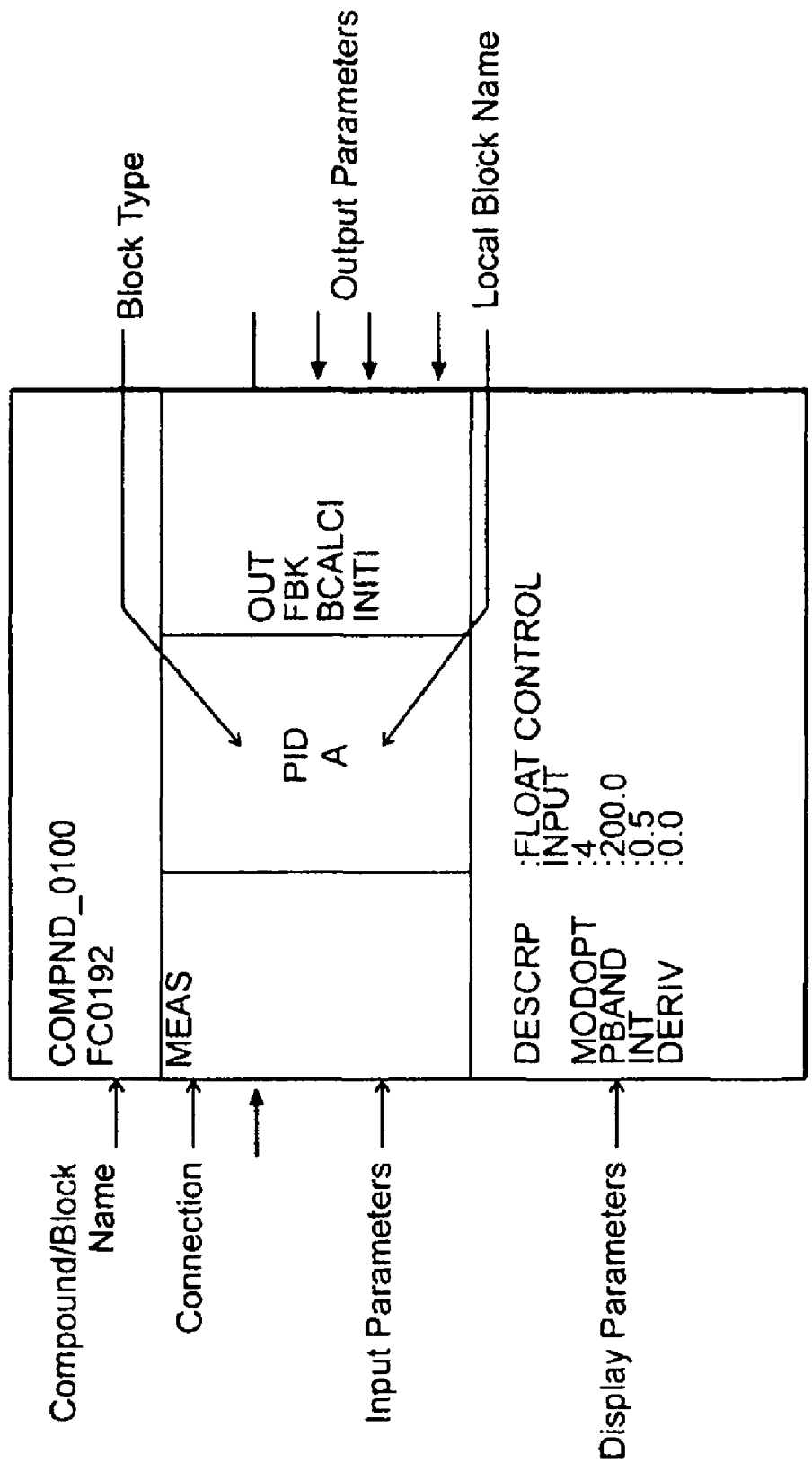
FIG. 45 depicts the anatomy of a block placeholder in a system according to the invention.

Each Block Placeholder on the display has the same basic graphical structure. FIG. 45 shows a typical block on a graphical display. The type of the block is displayed in the center in a larger font than any other in the block for easy viewing. The optional compound name and block name appear at the top in a medium font. On Loop Templates, Composite Block Definitions or any block not downloaded, the compound and block name fields are empty. Connected parameters appear in the source/sink regions of the block. A small font is used for showing parameters. Sink parameters are shown on the left, source parameters on the right. Parameter values that the creator of the diagram have considered to be relevant to the drawing appear at the bottom. When parameters are added or removed from the lists of source, sink, or display Parameters, the block is automatically resized.

Parameters are selected for display from a list presented in a dialog. Internally, these parameter selections are stored with the Placeholder, probably as part of the Appearance Definition. See Part 1 for a more complete discussion of Placeholders and related objects.

Composite Blocks have additional functionality which allows them to be expanded in place on a control algorithm diagram. Composite Blocks can expand to show the internal block representation in a trimmed-down view of the actual Composite Block diagram. The expanded view is shown outlined, to still denote the original Block, as shown in FIG. 43.

The Control Algorithm Diagram Editor has the ability to generate a default graphical representation of a Template-Derived Loop or Composite Block. When loops are automatically generated via the Tag List Editor, for example, the Loop is created, but the graphical representation is not. When the Loop is first printed or displayed, a default representation is created.

All objects on the diagram are "active." Each area of an object has a context which is used for displaying popup menus. For example, the default action for the block type area is to show the property sheet for the block. The default action for the relevant block parameters area is to bring up a list of parameters available to be displayed there. Clicking and dragging from within one of the sink or source areas to another blocks source or sink generates a new connection. If the parameters to be connected are exposed on the Block Placeholders, the connection can be made directly. If the parameters to be connected are not shown on the Placeholders, the user can invoke a connection dialog.

Figure 46:
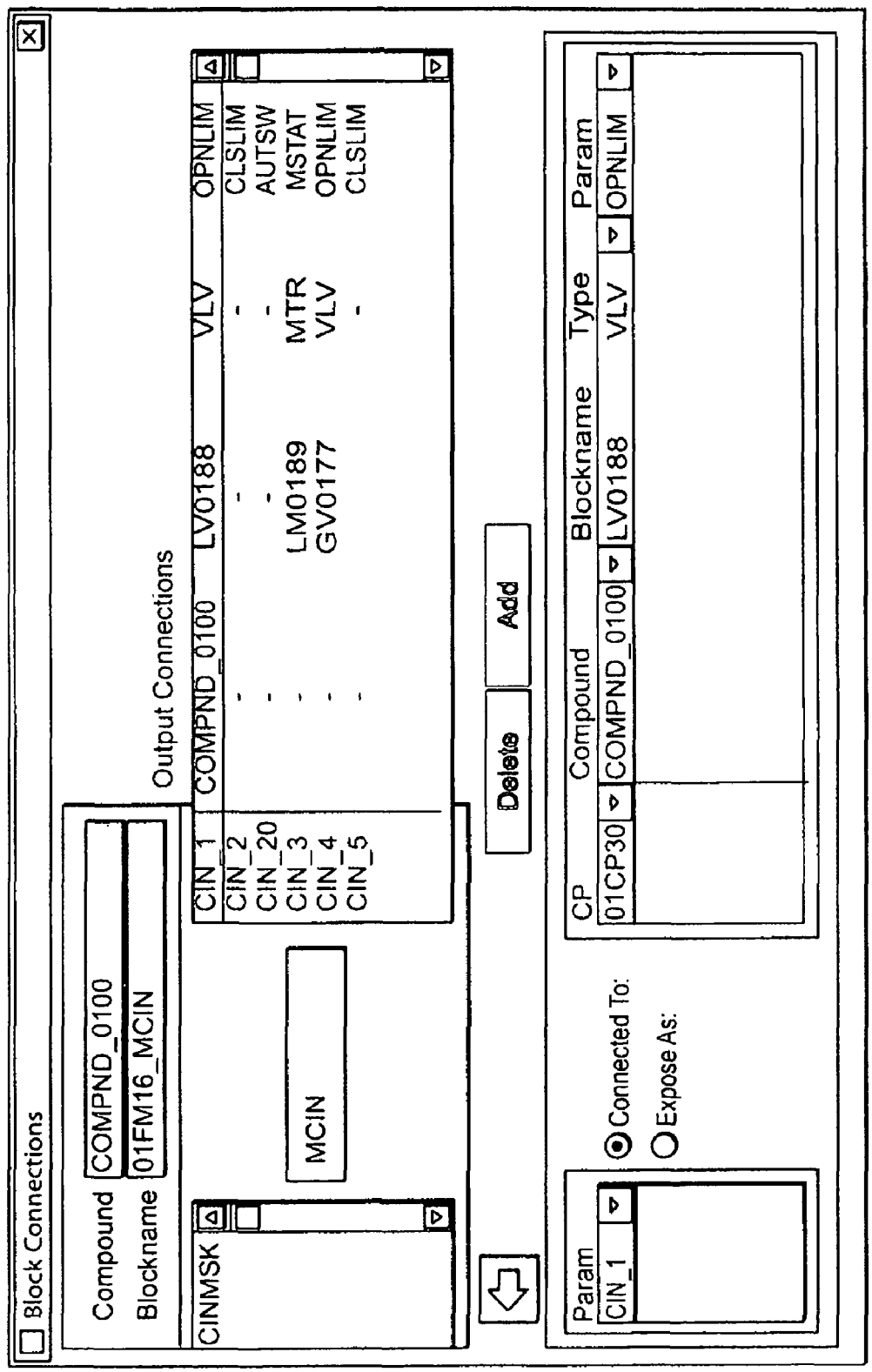
FIG. 46 depicts a block connection dialog in a system according to the invention.
Figure 47:
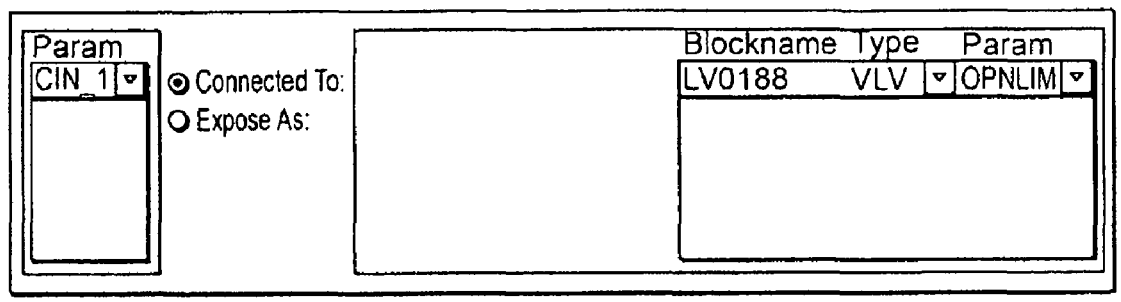
FIG. 47 depicts template/definition internal connections in a system according to the invention.
Figure 48:
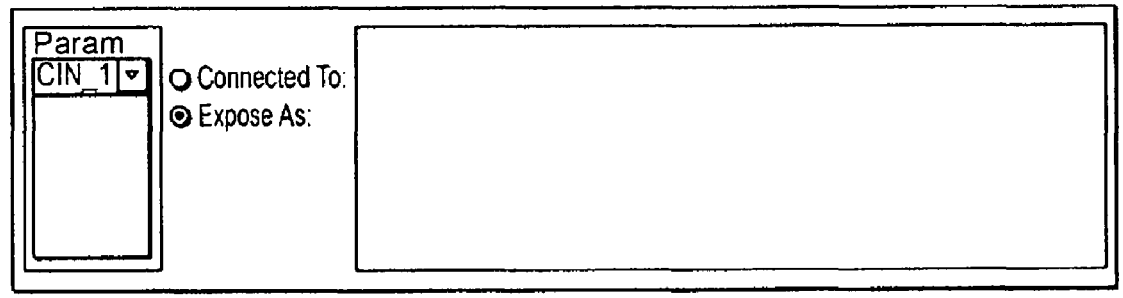
FIG. 48 depicts template/definition exposed connections in a system according to the invention.

Using the dialog presented in FIG. 46, users can connect Block parameters in Simple Loops and Template-Derived Loops to parameters in other Blocks in the loop, parameters in blocks outside of the loop, I/O points from a Tag List, or "expose" the parameter as a tuning parameter of the loop. When the user is making connections within a Loop Template or Composite Block Definition, the connection definition portion of the Connection Dialog looks like FIG. 47. Users can only make internal connections or expose parameters as tuning parameters for templates and definitions. FIG. 48 shows the connection definition portion of the dialog when the user has decided to expose a parameter as a tuning parameter or for external connection for a Composite Block.

Connections between blocks and their respective source and sink parameters are indicated with arrows from source to sink parameter. External connections are displayed in the margins—inputs to the Loop, Block, or Composite Block are to the left and outputs are to the right. Connections to and from these blocks and placeholders are indicated in the same manner as internal connections. Connections to Blocks outside the loop or "exposed" parameters in Composite Blocks and Loop Templates are shown as Connections that come out of a Block Placeholder and terminate at a label a short distance from the point of origin. This label then appears in a table at the lower corner of the screen. Inputs are in a table in the lower left, outputs in the lower right. These tables contain the label and the actual C:B.P to which the point is connected.

Figure 49:
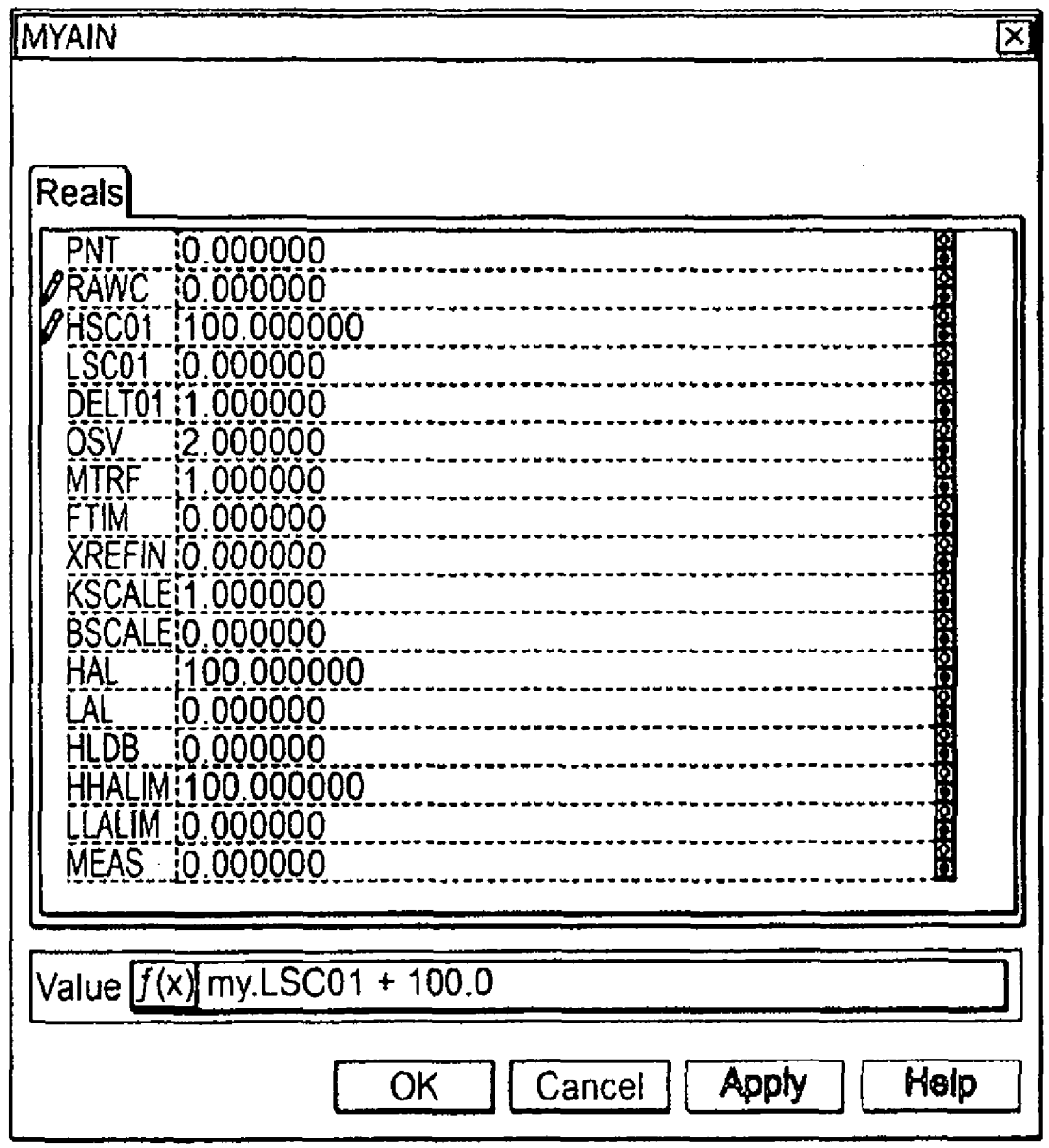
FIG. 49 depicts a parameter property sheet in a system according to the invention.
Figure 50:
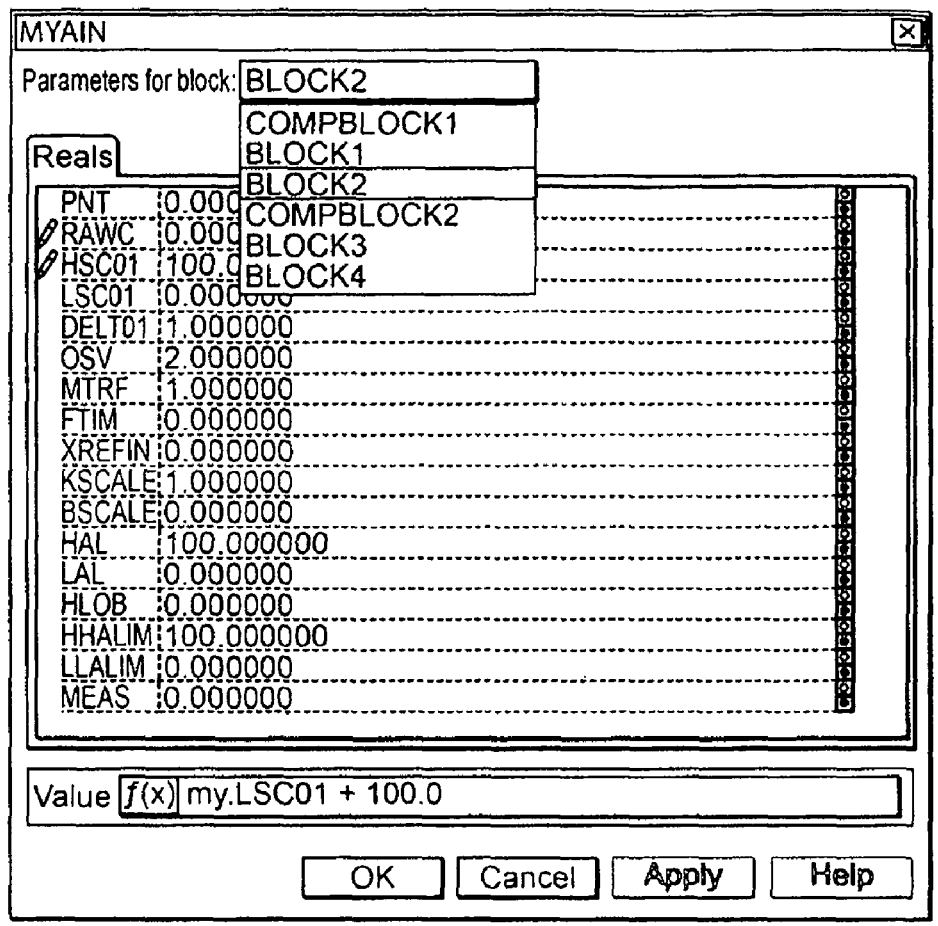
FIG. 50 depicts a composite block property sheet in a system according to the invention.

Users have full control over placement of blocks in the center region and ordering of connections in the source and sink parameter lists. Connection lines are automatically drawn. Blocks in the input and output margins can be reordered or moved between margins. Blocks, Loops, and Composite Blocks can be assigned to Compounds and downloaded via main menu or context menu picks on the individual blocks. Users may select "Edit Parameters . . . " from the context menu of any block. This brings up the property sheet for the block as shown in FIG. 49. From the Parameter Property Sheet, the user can modify values for the Parameters of the selected Block. For Composite Blocks and Template-derived Loops, the user is presented with a dialog like that in FIG. 50. From this dialog, the user can set values for the "exposed" parameters of any contained block. Refer to Part 1 for a more complete description of Property sheets. The pull-down list box shown on the Composite Block Property sheet is a shortcut to navigate to all the internal Block parameters which are exposed. An alternative to this approach is to group all the exposed parameters onto separate Property sheet pages, grouped by Block. The pull-down menu is also useful to incorporate in the Property sheet for Simple Loops, as a shortcut to access Block parameters without having to navigate the Loop drawing.

Figure 51:
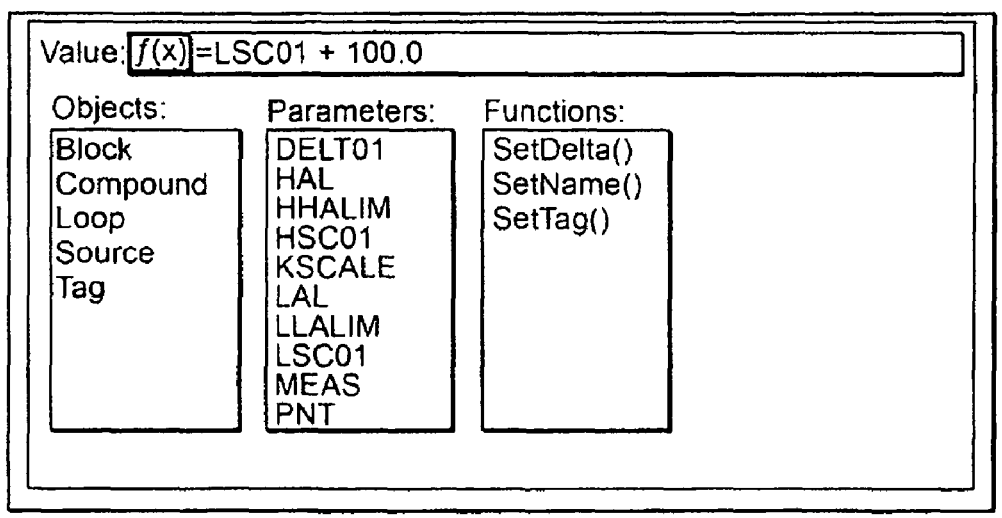
FIG. 51 depicts a parameter formula builder in a system according to the invention.

In addition to entering constant values, the user can enter formulas for Block Parameters to be calculated based on other Parameters, Tags, Connections, etc. as shown in FIG. 51. Refer to the discussion of this document on Smart Blocks for a more detailed description of these formulas.

2.3.2 Functions

The following sections describe functions that are implemented by the Control Algorithm Diagram Editor. Most graphical functions apply to all of the visual block/connection type objects which can be configured. Functions specific to the object being edited are in their respective sections.

2.3.2.1 General Graphical Control Algorithm Diagram Editor Functions

Graphical Functions
    Graphically create, view, and edit Composite Block Definitions, Composite Blocks, Loop Templates, Template-Derived Loops, Simple Loops
    Display status information (Editing template, editing loop X in C:B.P, online, offline, etc.)
    Undo/redo data or graphical changes, revert to previous version Provide standard diagramming and document functions like object alignment, snap to grid, cut, copy, paste, zoom, multiple selection Allow user placement of blocks on sheet Specify restrictions on instantiation of Loop Template or Composite Block Definition: blocks are preferably in the same compound, fixed block ordering, etc.

Navigate to other block display by selecting referenced block in current display View and edit CALC Block calculations, PLB Block ladder logic, Sequence Block logic, and Logic Block logic.

Create a Loop which spans multiple Loop Sheets

Display Composite Block details on diagram.

Invoke Block Property Sheets from Loop drawing

Invoke Property Sheet for Block Collection objects (Loop, Loop Template, Composite Block Definition) from drawing sheet Display live values for parameters in blocks on current drawing. This can only be done when viewing checked-in copies of drawings, not on user workspace copies.

Database Functions

Create and edit Composite Block Definitions, Composite Blocks, Loop Templates, Template-Derived Loops, Simple Loops Create instances of Blocks and Composite Blocks on a control algorithm diagram Connect parameters between blocks on diagram Move connections Generate Display file for loop or composite block Define parameters to display in block display, source and sink regions Enter diagram title, description, info, local block names Define general formulas used for all blocks in diagram Attach Modifier blocks to blocks in diagram or entire object Add, delete blocks to sheet Edit block parameters via property sheets Copy blocks from one instance of editor to another or within single editor via drag-drop.

Create new loops, composite block definitions, loop templates from groups of selected blocks Maintain version history and audit trail of templates, definitions, instances Security based on default and administrator-configurable read, write, download, etc. permissions, as provided by Framework security functions Allow only authorized developers to modify implementation standard Block Definitions and Loop Templates Assign Blocks in Loops to different Compounds or all Blocks in Loops to a single Compounds Define block processing order for blocks in a loop. This value is a suggested order which can be overridden by actions in the Compound Editor.

Determine Block names at Loop instantiation time based on name macros, loop macros, and Modifier Blocks applied Download Blocks/Loops to CP Provide "Save As" functionality—Composite Block can be saved as Loop, vice-versa Ensure valid connections between blocks Assign Blocks to Compounds either individually or by Loop Provide back documentation capability in support of Import/Export Manager. This includes the ability to generate a default drawing layout for Loops and Loop Typical (templates) imported from FoxCAE.

Provide bulk Loop generation capability in support of Tag List Editor capability to generate Loops from the Tag List.

Import and export Blocks, Block Definitions, Composite Block Definitions, Loops, Loop Templates, Template-Derived Loops to/from diskette using the illustrated configuration system format Other General Functions Print sheet Optionally show/print Sequence, CALC, and PLB Block Logic on secondary sheets Report on definitions, instances, connections, instances of specified definition or template Interact with other editors:

Invoke Block Definition Editor

Modify/create Block Definitions

Invoke Historian Collection Point Editor

Assign Parameters, Blocks, or Loops to Historian Collection Group

Invoke Import/Export Manager

Import and export Blocks, Block Definitions, Loops, Loop Templates to/from external packages Invoke Compound Editor Assign blocks to compounds Assign block ordering within compounds Invoke Download/Upload Manager Download Loop/Blocks to CP Upload current parameter values Invoke Enclosure Editor Assign Tags to FBM Modules Invoke Tag List Editor Assign tags to loops Generate loops from tags Automation Interface Functions Create/delete Blocks, Template-Derived Loops Upload/download Blocks, Loops Set/get parameter values Get lists of available Blocks, Compounds, Loop Templates, etc.

2.3.2.2 Loop Template Unique Functions

Create Loop Template exposed parameters, connect internal Block parameters to exposed parameters Connect parameters to I/O Block Show blocks which are targets for external point connections on sheet, different from blocks contained in template Create "soft connections—Connections which are created based on Tag List information Example: Connect to shared MAIN block parameter based on correlation with tag associated with MAIN inputs from I/O Edit Loop Template which has instances Mark all derived instances of Template-Derived Loops as "needs to be downloaded"

Prompt to download all affected Template-Derived Loops

Provide information on what blocks/compounds may be affected 2.3.2.3 Template-Derived Loop Unique Functions Connect parameters to I/O Block parameters Generate Template-Derived Loops from Loop Templates Assign I/O Block placeholders to Tags Override internal block parameter values on database upload, including parameters which are not exposed Disconnect from Loop Template—convert to Simple Loop

2.3.2.4 Composite Block Definition Unique Functions

Create Composite Block exposed parameters, connect internal block parameters to exposed parameters Prohibit external parameter connections, all connections are preferably through exposed parameters

2.3.2.5 Composite Block Unique Functions

Override internal block parameter values on database upload, including parameters which are not exposed Create instance of Composite Block in Simple Loop/Loop Template/Composite Block Definition, connect exposed points Show as single block or expanded block detail on sheet, including block structure and internal connections

2.3.2.6 Simple Loop Unique Functions

Connect parameters to I/O Block parameters

2.3.3 Object Model

Figure 52:
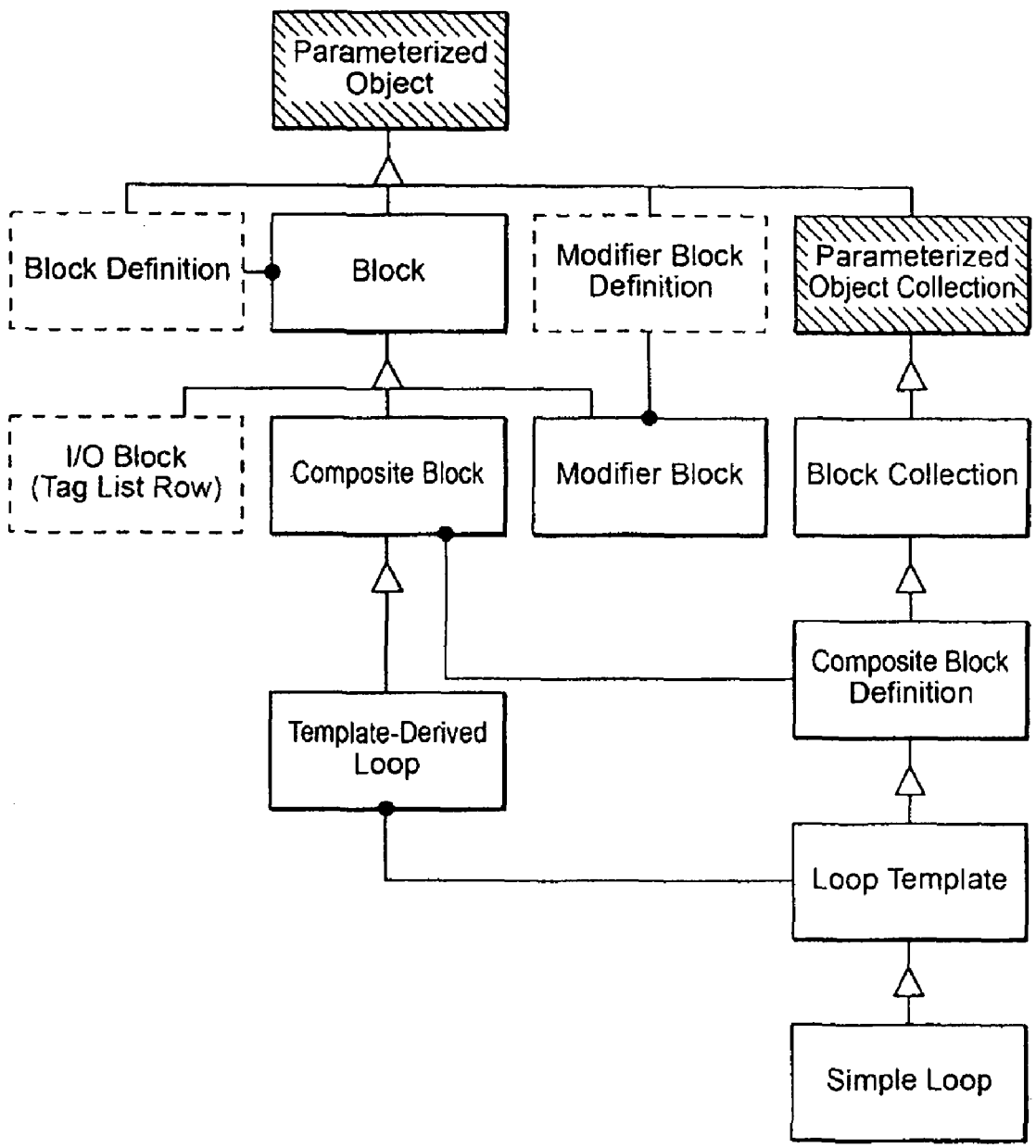
FIG. 52 depicts control object derivations in a system according to the invention.

The following sections describe the object model used by the Control Algorithm Diagram Editor. FIG. 52 shows the basic control objects and the Framework objects from which they are derived. These objects are shown in greater detail in later figures. Note that the I/O Block described in these sections is actually a Tag List Row, as described in the Tag List Editor section of this document.

Modifier Block Definitions, Composite Block Definitions, and Loop Templates are unique definitions in that unlike Block Definitions, other definitions cannot be derived from these objects. If a user wants to create a variant of these definitions, this can be done by copying the definition and then modifying the copy.

2.3.3.1 Block

Figure 53:
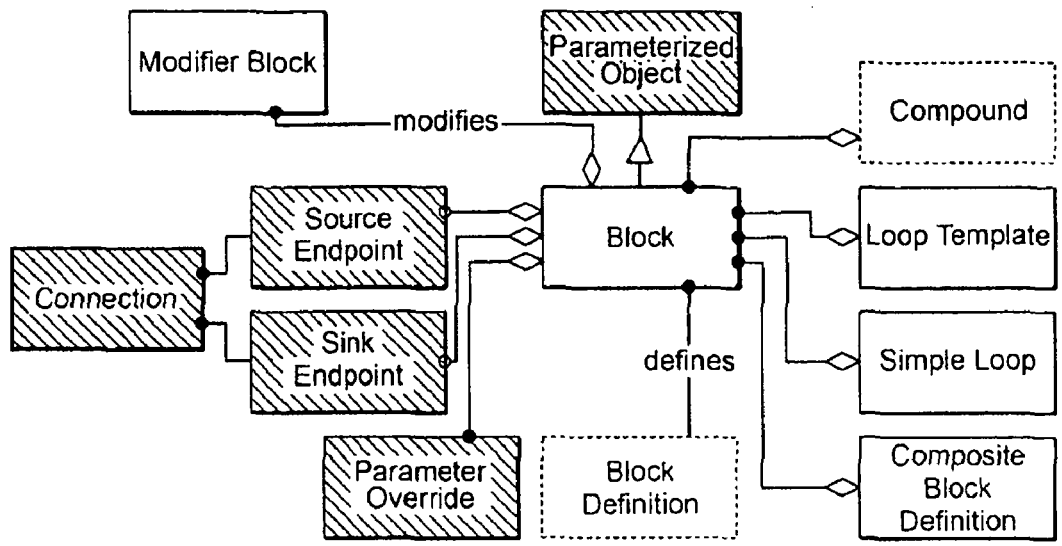
FIG. 53 depicts a block object model in a system according to the invention.

Referring to FIG. 53 Block is the foundation for all control on the IAS system. All of the control structures defined in this editor are based on Blocks and collections of Blocks. A Block is a container for Parameters. Each of these parameters has a type (float, string, integer, etc.) and attributes (connectable, high range, low range, length, etc.) which define the range of values it can contain. These parameters can also be connected to parameters in the same block or any other block in the system via the Source Endpoint and Sink Endpoint lists. Each Endpoint object represents a parameter in the current block. A single parameter can be the source for many other parameters, but may only be a sink of one parameter. Therefore, only one Sink Endpoint may exist for each parameter while many Source Endpoints can exist for each parameter. Blocks must preferably have a definition. A Block Definition defines the set of parameters names, types, attributes and values for a block. The set of parameters defines the block type. See Part 1 for a detailed description of Parameters, Parameter Definitions, and Parameter Overrides. The Block Definition can be a simple Block Definition, a derived Block Definition or a Block Instance. In any case, the Block contains a list of Parameter Overrides which override the default values in the definitions.

Blocks contain a list of Modifier Blocks which are applied to them. Modifier Blocks contain a list of parameter values. For any parameter values in the Modifier Block which have matching names, the values in the Modifier Block override the values in the Block.

When a Block's parameter values are needed, they are determined by the following algorithm. For each parameter defined in any parent Block Definition, all Modifier Blocks are searched for matching parameter names. If there is a match, the value is used. Otherwise, the heritage tree is searched for any overrides or default values. The exact logic is encapsulated into Parameters, described in the Part 1. If the root Block Definition for this Block is defined as an implementation standard Control Block, the control parameter values then can get installed to a IAS control station.

Blocks can be contained in Compounds, Loop Templates, Simple Loops, and Composite Block Definitions. Blocks are not actually contained, but logically contained in Composite Blocks and Template-Derived Loops by way of their parent definitions or templates. Blocks which are in Template-Derived Loops, Simple Loops, Composite Blocks, or single Blocks can be assigned to a Compound in an IAS system. When Blocks are installed, they are then contained by both the loop or composite block to which they belong and the Compound to which they are assigned.

Blocks contain lists of Source Endpoints, Sink Endpoints, Parameter Overrides, and Modifier Blocks. All of these lists and their handling are inherited from Parameterized Object. The list of Modifier Blocks inherited is a Parameterized Object list, Block enforces that only Modifier Blocks are placed in that list. Blocks are capable of interacting with the IAS via its application programming interface (FoxAPI) and the DB Installer. When a block is told to download or upload to/from a CP, it establishes a connection to the CP and performs the requested function. When viewing live data on a loop diagram in the future, the Block will be capable of creating an list via FoxAPI and retrieving live values for displayed parameters and connections.

Both Block and Block Definition are derived from Parameterized Object to take advantage of the services provided by that class. Block and Block Definition are separate classes because they perform different roles in the Control Algorithm Diagram object model. Block Definitions are static objects, which cannot be downloaded, can contain definitions of Parameters and Overrides, and can only reside in the Block Definition portion of the database. Blocks can be downloaded, can only contain Overrides, and reside in the Project portion of the database.

Class Relationships:

The Block object maintains a reference to its Block Definition. This definition could also be another Block instance, which in turn, refers back to its Block Definition.

Block is derived from Parameterized Object. It inherits its ability to maintain a list of parameters, be contained in a Parameterized Object Collection, maintain endpoints to connections, and keep a list of Modifier Blocks from this parent class.

Block maintains a list of Parameter Overrides. These values override the values or default values of parent Block or Block Definition.

Block maintains a list of Source Endpoints and Sink Endpoints for connections made between Parameterized Objects.

Block can contain references to one or more Modifier Blocks. Modifier Block parameters act as overrides to the current Block.

Blocks can be contained in Compounds, Loop Templates, Simple Loops and Composite Block Definitions. They are also logically contained in Composite Blocks and Template-Derived Loops via reference to their respective definitions or templates. Blocks maintain associations with their containers for use in "where used" reporting, supported as part of the Framework.

2.3.3.2 Modifier Block

Figure 54:
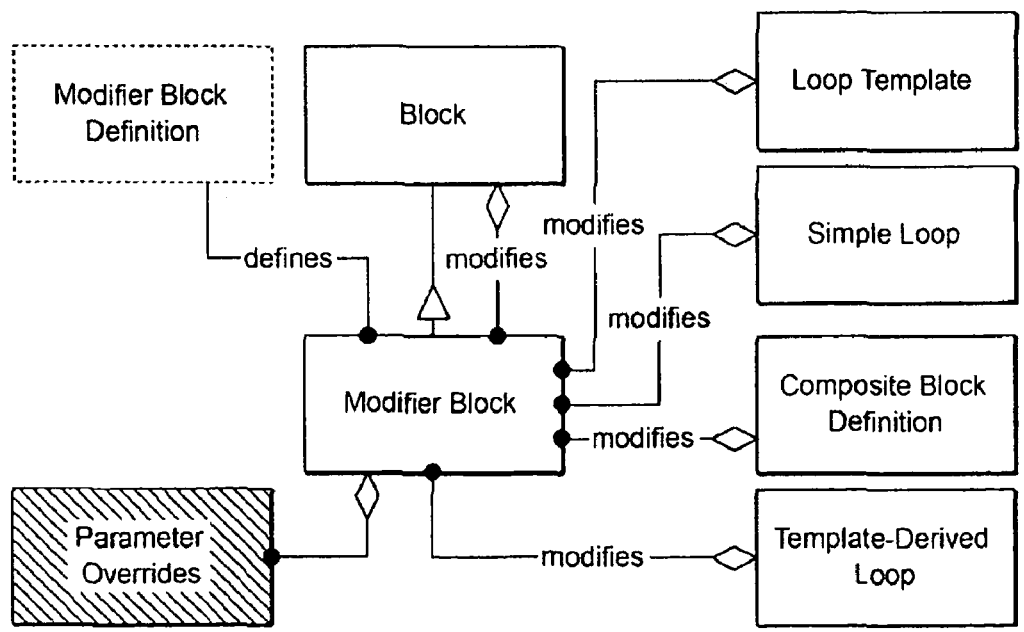
FIG. 54 depicts a modifier block object model in a system according to the invention.

Referring to FIG. 54, a Modifier Block is an object that modifies all matching parameters in an associated Block or block collection object. Whenever an object needs to reply to a request for parameter values, any associated Modifier Block parameter values override Block values and Block Definition default values. Handling of the Parameter Values is managed by the inherited Block class. No Source Endpoints or Sink Endpoints are used by Modifier Block. Connections cannot be made to parameters in a Modifier Block.

Like any Block, Modifier Blocks have definitions which give each Modifier Block its type. Modifier Block maintains a reference to its parent definition. This mechanism is identical to that of the Block object. Modifier Blocks can be attached to all types of block collection objects, but do not appear in Compounds. They contain parameters but do not get downloaded like other Block types. The Modifier Block parameters apply to the matching parameters of all Blocks or block collections which contain it. Modifier Blocks do not apply Parameter Overrides to Blocks within Composite Blocks or Template-Derived Loops. Parameters are preferably be exposed for Modifier Blocks to affect Parameters in Blocks inside the Composite Block or Loop. Parameter values for a block are determined by looking at related objects in the following order:

1. Block Definition Hierarchy
2. Global Modifier Block (attached to entire Loop)
3. Local Modifier Block (attached to specific Block)
4. Local Block Any values found along this path become the value for the Parameter. For example, if a Global Modifier Block contains MEAS=5 and a Block on the Loop has a value of MEAS explicitly set to 4, then MEAS=4 for that Block because the Local Block value overrides all other values.

Figure 55:
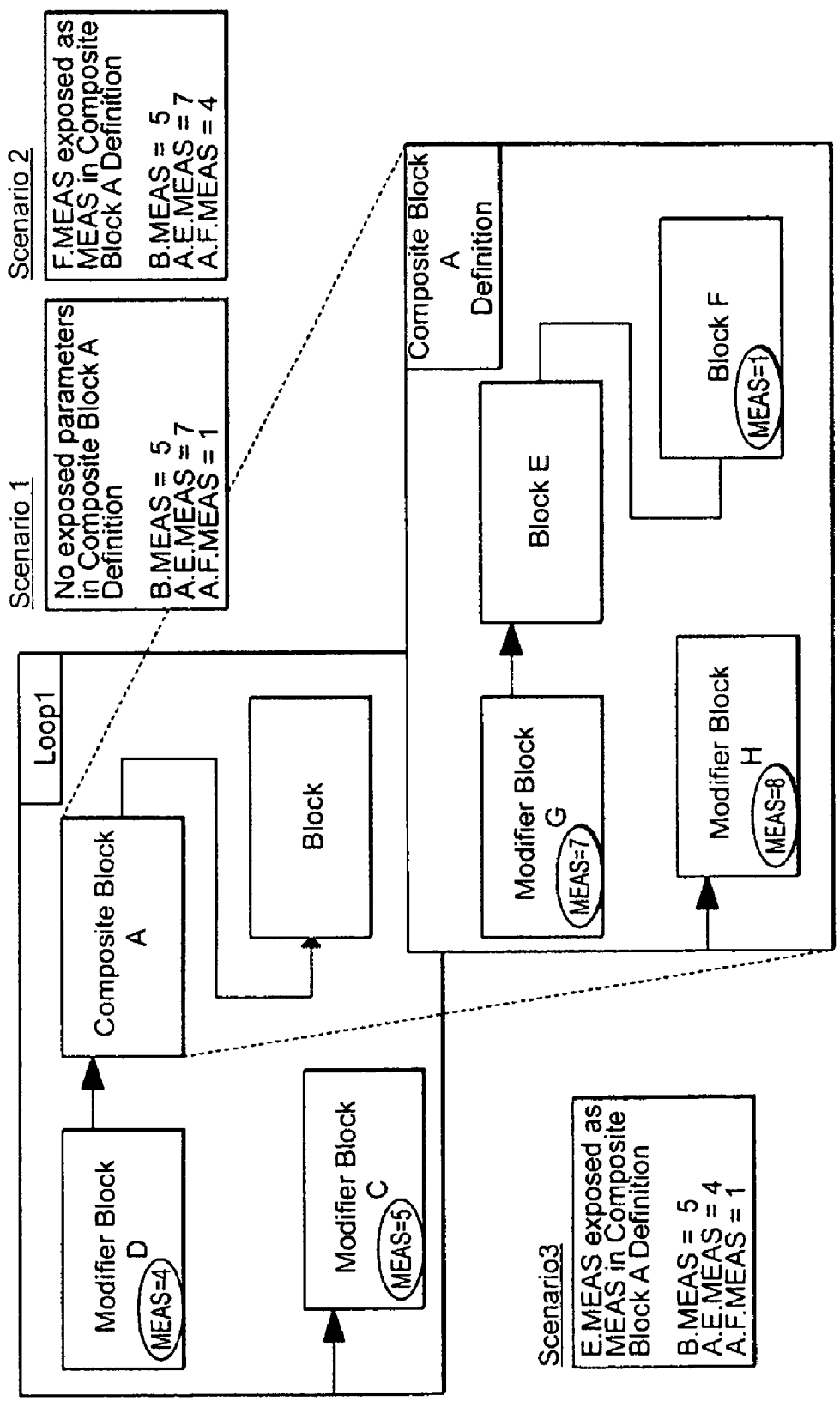
FIG. 55 depicts a modifier block parameter override precedence in a system according to the invention.

FIG. 55 presents a Simple Loop containing a Composite Block with several Modifier Blocks. Three scenarios are presented for the configuration.

Scenario 1: In this scenario, no parameters of Composite Block A are exposed. Therefore, Modifier Blocks in Loop1 can have no effect on Block E and Block F. Modifier Block H applies to both Block E and Block F, but Modifier Block G overrides this value.

Scenario 2: In this scenario, the MEAS parameter of Block F is exposed in Composite Block A. This allows the Modifier Blocks in Loop1 to adjust the Parameter value. Again, the local Modifier Block (Modifier Block D) affects the value of MEAS.

Scenario 3: In this scenario, the MEAS parameter of Block E is exposed in Composite Block A. The MEAS parameter of Block E now takes on the value of the local Modifier Block in Loop1.

Class Relationships:

Modifier Block is derived from Block. From Block it inherits the ability to be contained in a block collection and its ability to manager Parameter Overrides.

Multiple Modifier Blocks can be contained by Composite Block Definition-derived object or Block-derived objects.

Modifier Block maintains a reference to its definition, if any, which can be an instance of a Modifier Block.

2.3.3.3 Composite Block Definition

Figure 56:
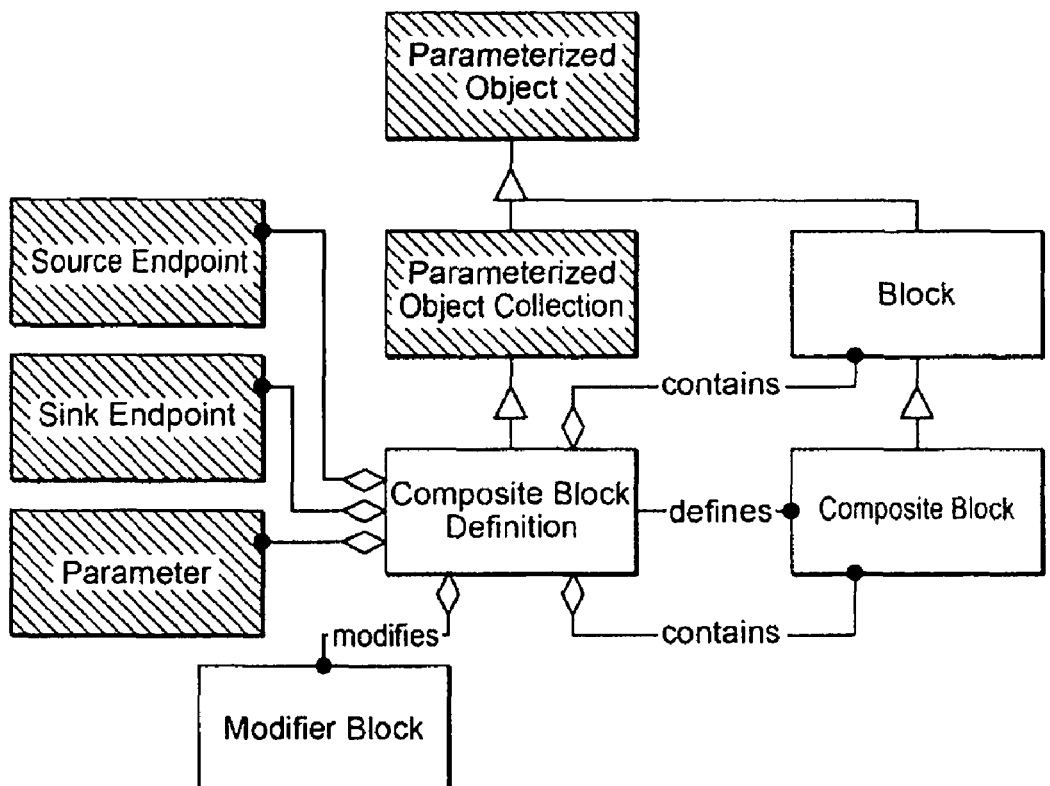
FIG. 56 depicts a composite block definition object model in a system according to the invention.

Referring to FIG. 56, a Composite Block Definition is a Parameterized Object Collection derivative. Composite Block Definition provides the common functionality for all objects that contain collections of Block objects: Composite Block Definitions, Loop Templates, and Simple Loops. It is an extension of the Parameterized Object Collection class which restricts the Parameterized Objects it contains to objects derived from the Block class.

Composite Block Definition inherits from Parameterized Object Collection the ability to manage Parameterized Objects, (in this case, Blocks) its own parameters, (a Parameterized Object Collection is a Parameterized Object) attached Modifier Blocks, and its Connection Endpoints. Like the Block class, Composite Block Definition is responsible for ensuring that only Modifier Blocks are stored in the Modifier Block list. From Parameterized Object Collection it inherits the abilities to maintain lists of Connection Endpoints, Parameters, Modifier Blocks, and Blocks. To Parameterized Object Collection it adds special handling of the lists of Parameters and Connection Endpoints inherited from parent classes. Composite Block Definition defines Composite Blocks to be instantiated in other Composite Block Definition-derived Collections.

The Parameters that are owned by this class represent the "exposed" parameters of the Composite Block. These Parameters are linked to the parameters in the contained Blocks that they "expose" through the Connections maintained by this class. These parameters are the only parameters that any container of the instantiated Composite Block can access. The initial values for the attributes of the parameters are copied from the parameters they expose. These attributes can then be modified.

Composite Block Definition is not responsible for maintaining any Connections outside of this object. All Connections maintained in this object refer to "exposed" parameters. Connections can be made in instances of Composite Blocks from parameters defined here to other Blocks. With the "exposed" parameters defined and their values connected to internal parameters, the Composite Block defined looks like a Block to other Composite Block Definition-derived classes. The instantiated Composite Block derived from this definition can be used like any other block in Composite Block Definition-derived Classes.

Modifier Blocks contained by Composite Block Definition apply to all blocks contained by the object. Composite Block Definition is responsible for adding Modifier Block references to all of its contained Blocks when a Modifier Block is attached to it. This allows the Parameter Facade classes defined by the Framework to access Modifier Block parameters.

Composite Block Definitions can create instances of the Composite Blocks they define. These instances maintain a pointer to this class as their definition. These instances maintain overrides of the "exposed" parameters and of parameter value changes made via an Upload operation to retrieve current parameter values from the Control Processor. Composite Block Definitions supply their instances with the actual block names of "exposed" parameters on request. This is useful when displaying the value of a connected point or when the value must actually be placed in a running control system.

Class Relationships:

Composite Block Definition is a Parameterized Object Collection. From Parameterized Object Collection it inherits the ability to manage parameters, connections, and Blocks.

Composite Block Definition maintains a reference to a parent definition, if any. Many Composite Block Definitions can be derived from a single definition.

Composite Block Definition can contain any number of Composite Blocks and Blocks. Modifier Blocks can be attached to Composite Block Definitions. When they are attached, the parameter value overrides of the Modifier Block apply to all blocks in the Composite Block Definition.

A Composite Block Definition cannot contain a I/O Block.

Composite Block Definition maintains a list of Source Endpoints and Sink Endpoints. These are used to connect "exposed" Parameters to their actual points within the Composite Block Definition.

Parameters are used to store the "exposed" parameter definitions for the defined Composite Block.

The Composite Block Definition class can create Composite Blocks derived from itself. This ability is inherited from Parameterized Object Collection.

2.3.3.4 Loop Template

Figure 57:
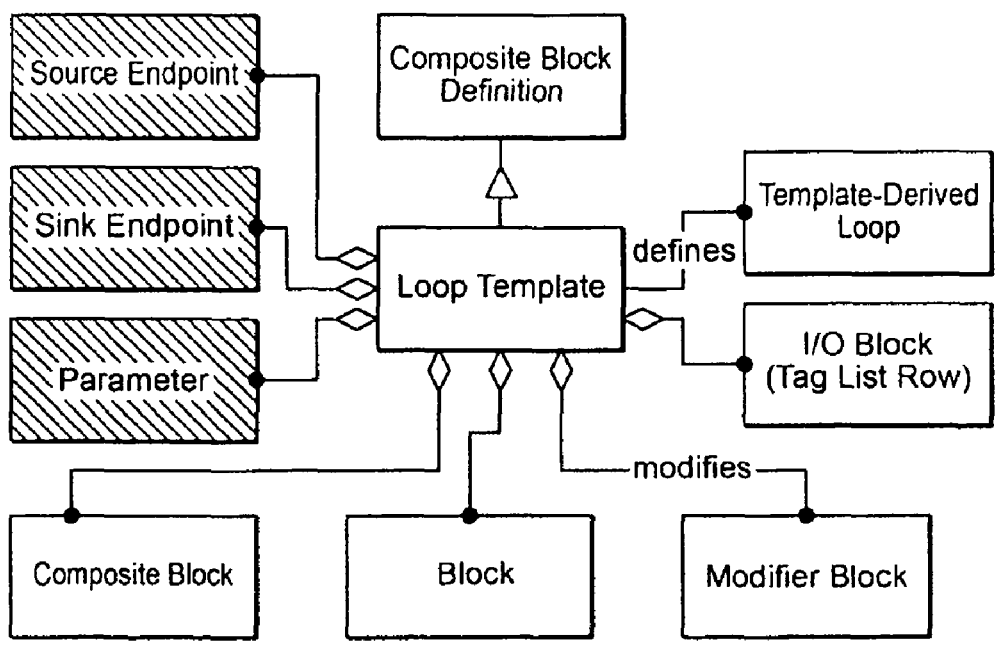
FIG. 57 depicts a loop template object model in a system according to the invention.

Referring to FIG. 57, Loop Template is a Composite Block Definition derivative. It defines the Blocks and Connections contained in a control loop. From Composite Block Definition and its ancestors it inherits the abilities to maintain lists of Connection Endpoints, Parameters, Modifier Blocks, and Blocks. It also inherits the ability to "expose" parameters of blocks in the loop from the Composite Block Definition class. These parameters are then available as tuning parameters or to connect to other Loops or Blocks. To Composite Block Definition it adds the ability to add I/O Blocks. The I/O Blocks added to a Loop Template do not represent real tag points, but are placeholders for actual Tags in the derived Template-Derived Loop instances.

The Parameters that are owned by this class represent the "exposed" parameters of the Loop. These Parameters are linked to the parameters in the contained Blocks that they "expose" through the Connections maintained by this class. These parameters are the only parameters that are available for tuning or external connections. The initial values for the attributes of the parameters are copied from the parameters they expose. These attributes can then be modified.

Loop Template is not responsible for maintaining any Connections outside of this object. All Connections maintained in this object refer to "exposed" parameters. Connections can be made in instances of Template-Derived Loops from parameters defined here to other Loops. With the "exposed" parameters defined and their values connected to internal parameters, the Template-Derived Loop defined looks like a Block to other Composite Block Definition-derived classes. This allows connections to be made into the Loop look like Composite Block connections. Modifier Blocks contained by Loop Template apply to all blocks contained by the object. Loop Template is responsible for adding Modifier Block references to all of its contained Blocks when a Modifier Block is attached to it. This allows the Parameter classes defined by the Framework to access Modifier Block parameters.

Like Composite Block Definitions, Loop Templates can create instances of the Template-Derived Loops they define. These instances maintain a pointer to this class as their definition. These instances can maintain overrides of the "exposed" parameters only. Instances which are created from this definition in the context of a definition library are allowed to override parameter attributes and values for "exposed" parameters. Instances created from this definition in a usage context as a stand-alone Template-Derived Loop can only override values. Class Relationships:

Loop Template is a Composite Block Definition. From Composite Block Definition it inherits the ability to manage parameters, connections, and Blocks.

Loop Template maintains a reference to a parent definition, if any. Many Loop Templates can be derived from a single definition.

Loop Template can contain any number of Composite Blocks and Blocks.

Modifier Blocks can be attached to Loop Templates. When they are attached, the parameter value overrides of the Modifier Block apply to all blocks in the Loop Template.

Loop Template contains Source Endpoints and Sink Endpoints. These are used to connect "exposed" parameters to their actual points within the Loop Template. Parameters are used to store the "exposed" parameter definitions for the defined Loop. These are the parameters tunable in Loop instances.

2.3.3.5 Simple Loop

Figure 58:
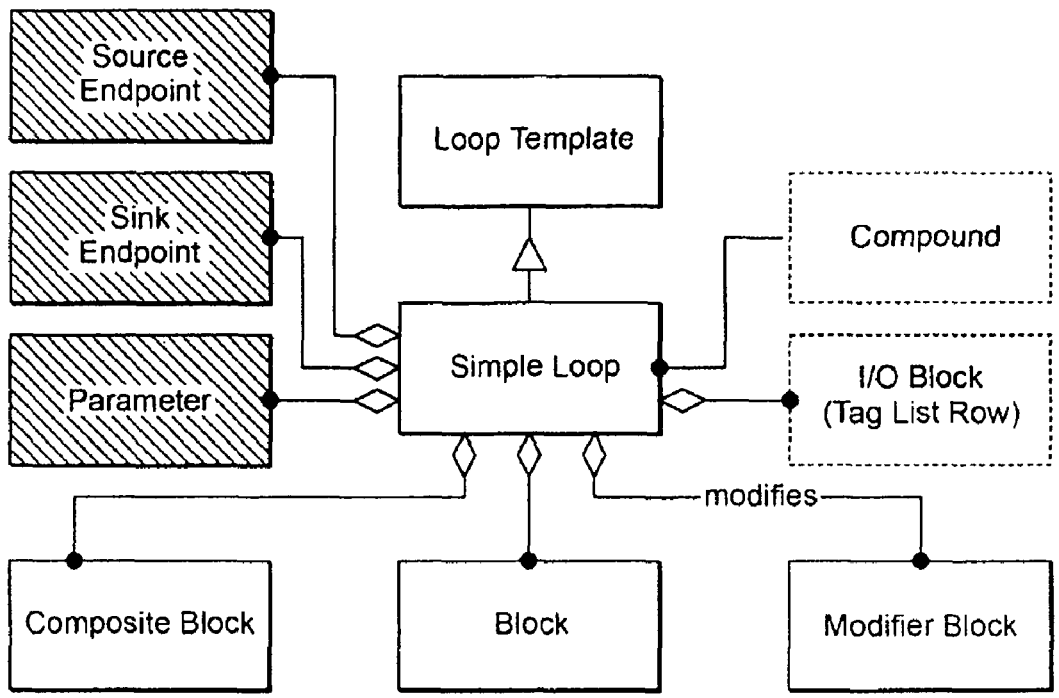
FIG. 58 depicts a simple loop object model in a system according to the invention.

Referring to FIG. 58, Simple Loop is derived from Loop Template. From Loop Template and its parent classes, Composite Block Definition and Parameterized Object Collection it inherits all of the collection and connection functionality of Loop Templates. Simple Loop adds to Loop Template the ability to connect to actual I/O Blocks and to install its Blocks into an online Compound. Class Relationships:

Simple Loop is derived from Loop Template. It performs all of the same functions as a Loop Template with the additional capabilities of referencing real I/O Blocks and installing its contained Blocks to a Compound.

Simple Loop can contain any number of Composite Blocks and Blocks.

Modifier Blocks can be attached to Simple Loops. When they are attached, the parameter value overrides of the Modifier Block apply to all blocks in the Simple Loop.

Loops can optionally be "assigned" to a Compound. This is a virtual assignment, since Compounds do not have any notion of what a Loop is and the Blocks in a Loop can be downloaded to different Compounds. This association is used as the default for assigning Blocks in a Loop to a Compound. When a Loop is assigned to a Compound, all unassigned Blocks within the Loop are assigned to the Compound, and all Blocks added to the Loop in the future are automatically assigned to the Compound. Blocks can be reassigned by selecting the Block and choosing the "Assign to Compound" menu selection.

Parameters are used for user-customized purposes, such as value propagation to Block parameters within the Loop, or grouping commonly accesses Block Parameters onto the Loop Property sheet.

2.3.3.6 Composite Block

Figure 59:
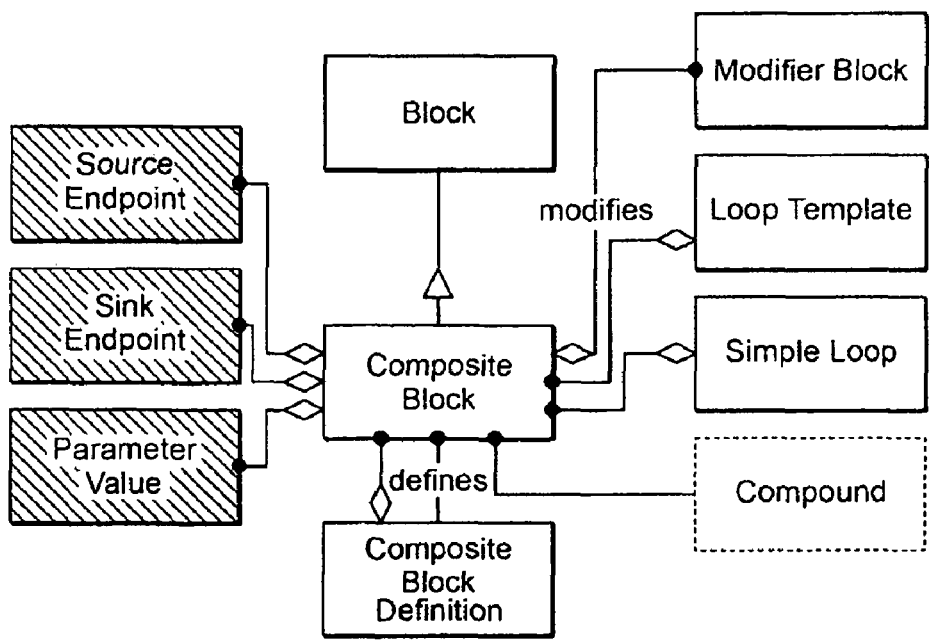
FIG. 59 depicts a composite block object model in a system according to the invention.

Referring to FIG. 59, a Composite Block is a Block. It can be inserted into any block collection as if it were a Block. It maintains a list of parameter overrides which, if present, override the default values and attributes of the Composite Block Definition "exposed" parameters, just like a Block. Connections can be made to parameters in the Composite Block, just like a Block.

A Composite Block uses the Parameter list inherited from Parameterized Object to maintain a mapping of internal block parameters to exposed parameters. A Composite Block instance simply overrides the values of the "exposed" parameters. It cannot add Blocks or Connections to the Composite Block definition. In the context of an upload of parameters from a running station, overrides can be attached to this object which override parameters in blocks contained in the Composite Block Definition. These overrides refer to the parameter in a hierarchical manner, using local block names. If a Composite Block Definition contains Blocks A and B, the Composite Block can override the value of the contained Block B by creating an override of "B.parm". This behavior is supported by the Framework. Class Relationships:

Composite Block inherits from Block the ability to act like a block in Loops, other Composite Blocks, etc. as well as parameter and connection management.

Composite Blocks can be contained in Loop Templates, Simple Loops, and Composite Block Definitions. In each instance, Composite Block looks just like a Block to the container.

Modifier Blocks can be attached to Composite Blocks. When they are attached, the parameter value overrides of the Modifier Block apply to all blocks in the Composite Block.

Composite Blocks contain Parameter Overrides, Source Endpoints, and Sink Endpoints just like Blocks. Their usage is identical.

2.3.3.7 Template-Derived Loop

Figure 60:
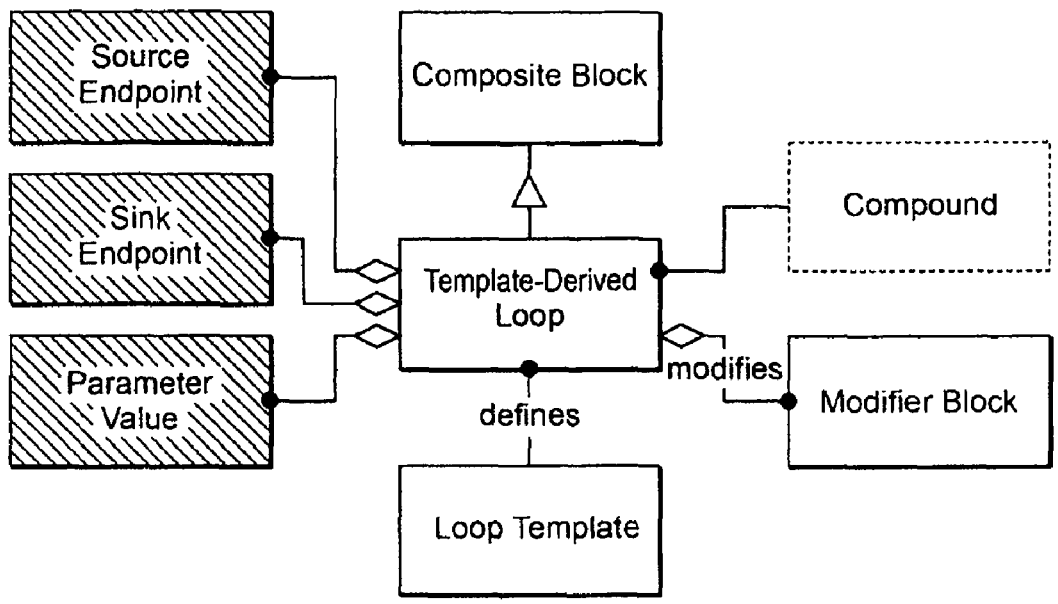
FIG. 60 depicts a template derived loop object model in a system according to the invention.

Referring to FIG. 60, Template-Derived Loop inherits all Parameter Override, external Connection handling, instantiation/definition relationship, and contained-Block name mapping functionality from Composite Block. Template-Derived Loops have the additional responsibility that they preferably manage the mapping of I/O Blocks to actual parameters. I/O Blocks contain the name of the point they represent, so mapping is preferably done from that point to a contained Block parameter, via the same mechanism outlined in the Composite Block description. Template-Derived Loops add the restriction that they cannot be contained in block collections. See the description of the Block class for how this is accomplished. Class Relationships:

Template-Derived Loop is a Parameterized Object. From Parameterized Object it inherits the ability to manage parameters and connections. Compounds maintain a reference to Template-Derived Loops.

Template-Derived Loop maintains a reference to a parent definition. Many Loop Templates can be derived from a single definition.

Modifier Blocks can be attached to Template-Derived Loops. When they are attached, the parameter value overrides of the Modifier Block apply to all exposed Block parameters in the Template-Derived Loops.

Template-Derived Loop contains Source Endpoints and Sink Endpoints. These are used to connect "exposed" parameters to other Loops.

Parameters are used to store the "exposed" parameter definitions for the defined Loop. These are the parameters tunable in Loop instances.

2.3.3.8 Block Placeholder

Figure 61:
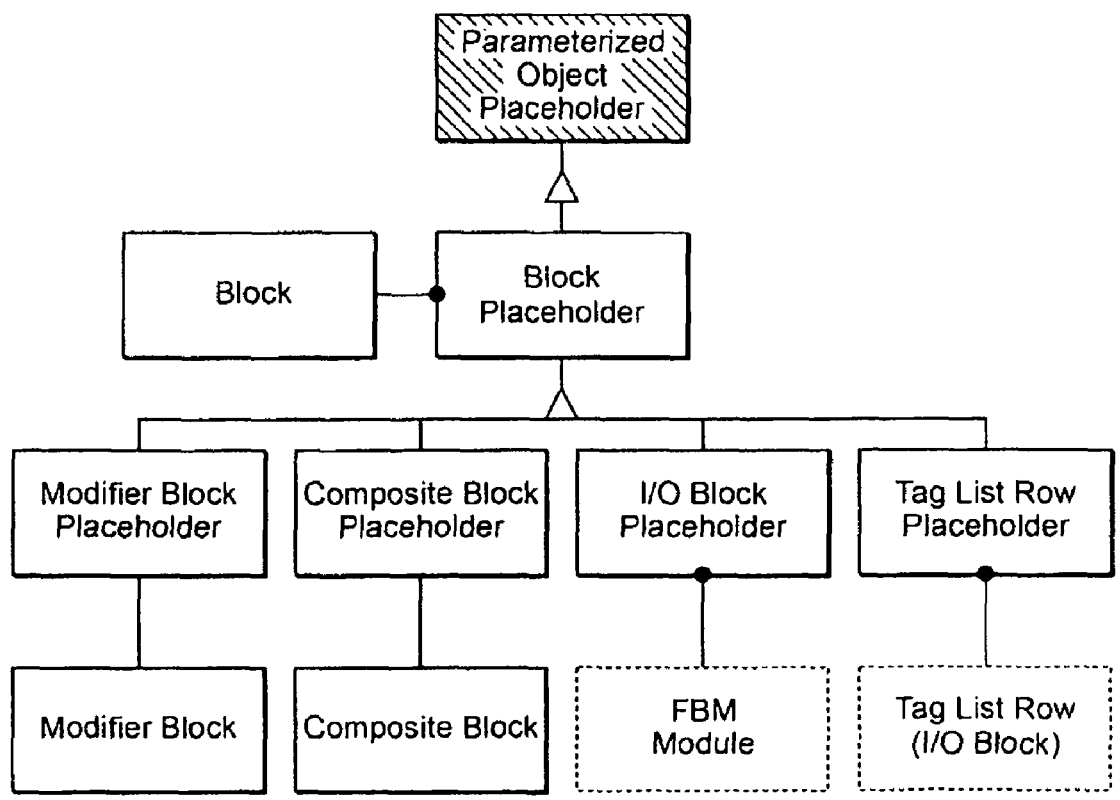
FIG. 61 depicts object placeholder derivations in a system according to the invention.

Block Placeholder is the base Placeholder class for all Block objects. It is derived from Parameterized object Placeholder. FIG. 61 shows an example of a graphical Block representation. Block Placeholder maintains the graphical representation of the rectangular dimensions of the block, the location for the associated Compound and Block names, the location for the Block type, the location and list of parameters displayed in the "relevant block parameters" section, and the location, order and list of parameters displayed in the source and sink sections.

The model shown in FIG. 61 shows the I/O Block Placeholder collecting the Tag List Row Placeholders that are associated with its related FBM Module. Alternate embodiments can allow for connecting Tag List Row Blocks to other Blocks (AIN, AOUT, etc.) before it is known which FBMs will be used. This requires the ability to integrate a number of existing Tag List Row Placeholders into a common I/O Block Placeholder rather than starting with the I/O Block Placeholder and adding Tag List Rows. Class Relationships:

Block Placeholder is the base class for all blocks placed on any control algorithm diagram.

Block Placeholder is derived from Parameterized Object Placeholder, from which it derives the ability to retrieve information from its associated Parameterized Object.

Block Placeholder maintains a reference to the Block it represents. Many placeholders can exist for any given Block. Each Block maintains references to its Placeholders.

2.3.3.9 Modifier Block Placeholder

This class inherits all functionality from Block Placeholder, except handling of source and sink parameters. Parameters in a Modifier Block are not connectable. Class Relationships:

Modifier Block Placeholder is derived from Block Placeholder.

Modifier Block Placeholder maintains a reference to the Modifier Block it represents. Many Modifier Block Placeholders can exist for any given Modifier Block.

2.3.3.10 Composite Block Placeholder

All functionality is inherited from Block Placeholder with no additions. Class Relationships:

Composite Block Placeholder is derived from Block Placeholder.

Composite Block Placeholder maintains a reference to the Composite Block it represents. Many Composite Block Placeholders can exist for any given Composite Block.

2.3.3.11 I/O Block Placeholder

This class inherits all functionality from Block Placeholder including the ability to manage Tag List Row Placeholders. Class Relationships:

I/O Block Placeholder is derived from Block Placeholder.

I/O Block Placeholder maintains a reference to the FBM it represents. Many I/O Block Placeholders can exist for any given FBM.

I/O Block Placeholder maintains references to Tag List Row Placeholders. These represent the I/O points for the FBM.

2.3.3.12 Tag List Row Placeholder

This class inherits all functionality from Block Placeholder with no additions. Class Relationships:

Tag List Row Placeholder is derived from Block Placeholder.

Tag List Row Placeholder maintains a reference to the I/O Block Placeholder which contains it.

Tag List Row Placeholder maintains a reference to the Tag List Row it represents. Many Tag List Row Placeholders can exist for a single Tag List Row (for example, when using a common hardware contact for multiple CIN Blocks).

2.3.3.13 Control Algorithm Diagram Document

Figure 62:
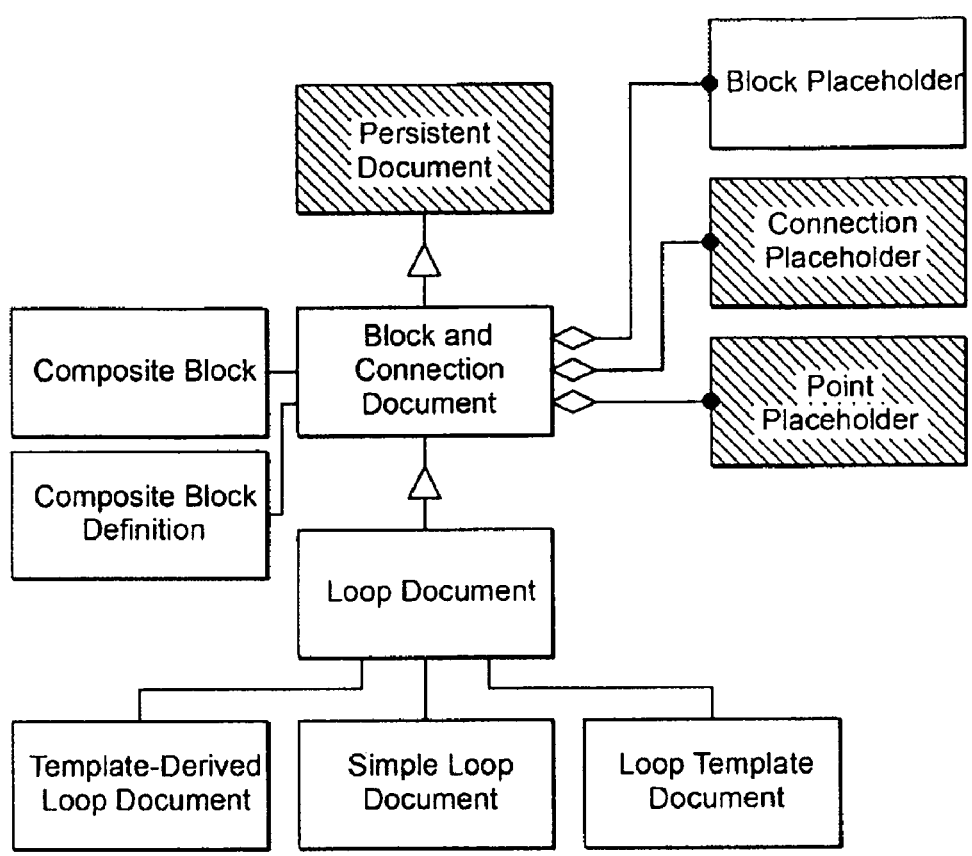
FIG. 62 depicts persistent document object derivations in a system according to the invention.

Control Algorithm Diagram Document is the basic Persistent Document class (see FIG. 62) for all graphical drawings of block collections. It derives its persistence and management of Placeholders from the Persistent Document Framework class. This class is responsible for maintaining all information necessary to graphically reproduce a Control Algorithm Diagram Document. Control Algorithm Diagram Document maintains information about the overall view of the block collection it represents. This information includes title, subtitle, and scale. Information about each individual object is stored in its respective placeholder. This information includes location, size, color, font, or any attribute which can be specified about an individual Control Algorithm Diagram object. Control Algorithm Diagram Document supplies lists of placeholders to the Control Algorithm Diagram Editor. The placeholders are then queried for specific drawing information.

This class is used as the persistent drawing class for Composite Block Definition drawings and Composite Block drawings.

The object model, as described above, provides Template-derived Loops and Composite Blocks with their own Control Algorithm Diagram Document objects. This allows more flexibility for adding Modifier Blocks and for repositioning Blocks defined in the definition objects. An alternative approach to consider during detailed design is to have Template-derived Loops and Composite Blocks use the document objects associated with the Loop Templates and Composite Block Definitions, instead of having their own documents. Class Relationships:

Control Algorithm Diagram Document derives from Persistent Document, from which it inherits persistence and handling of Placeholders.

All Control Algorithm Diagram drawings are derived from this class.

Control Algorithm Diagram Document contains Block Placeholders, Connection Placeholders, and Point Placeholders. These supply the base functionality for Block and Loop Documents.

2.3.3.14 Loop Document

Loop Document derives all Control Algorithm Diagram functionality from its parent class, Control Algorithm Diagram Document. This class adds management of two margin areas reserved for I/O Blocks. The ordered list of I/O Block Placeholders is maintained for both input and output margins. I/O Block placement within the margin is maintained by the I/O Block Placeholder. This class is used as the persistent drawing class for Loop Template drawings, Template-Derived Loop Documents, and Simple Loop Documents. Class Relationships:

Loop Document is a Control Algorithm Diagram Document, from which it inherits all of the standard block placement, movement and connection functions. Loop Document adds additional special handling for I/O Blocks.

All Loop Documents are derived from this class.

2.4 PLB Ladder Diagram Editor 2.4.1 Overview

The illustrated configuration system supports Programmable Logic Blocks (PLBs), e.g., in the manner disclosed in incorporated-by-reference U.S. Pat. No. 6,754,885 and, particularly, by way of non-limiting example, in Sections 2.4-2.4.3.16 and FIGS. 94-98 thereof, the teachings of which are particularly incorporated herein by reference—all as adapted in accord with the teachings hereof.

2.5 Swap Editor

The illustrated configuration system provides a Swap Editor and allows mapping parameters between different Block types, e.g., in the manner disclosed in incorporated-by-reference U.S. Pat. No. 6,754,885 and, particularly, by way of non-limiting example, in Section 2.5 and the accompanying drawings thereof, the teachings of which are particularly incorporated herein by reference—all as adapted in accord with the teachings hereof.

2.6 Block Execution Editor 2.6.1 Overview

The Block Execution Editor provides the capability to view and edit a control station's block processing order. This includes providing the capability to reorder blocks within a control level, reordering child control levels within a parent control level, and control levels within a control station. The Block execution Editor manipulates a single control station's block processing order per instance.

2.6.2 Block Execution Editor Detailed Functionality

The Block Execution Editor is invoked from the Navigation Tree of the illustrated configuration system by selecting a control level or control station and selecting Block Execution Editor from the context popup menu. The Block Execution Editor provides a view of the control levels and blocks assigned to a selected control station. Only those control levels assigned to a single selected control station will be displayed. The Block Execution Editor provides controls necessary to allow the user to adjust the block processing order for a selected control level, as well as adjust the processing order of control levels within a control station. The Block Execution Editor provides automatic algorithms to optimize processing order, as well as validate processing order. Control station statistics for the selected control station are available upon user request. The Block Execution Editor also provides the capability to reassign blocks between different control levels as well as reassigning control levels to other control stations. The reassignment of blocks to control levels and control levels to control stations may be accomplished either by dragging a block from the editor to the Navigation Tree of the illustrated configuration system, or by invoking the assignment editor on a selected block.

2.6.2.1 Block Execution Editor User Interface

Figure 63:
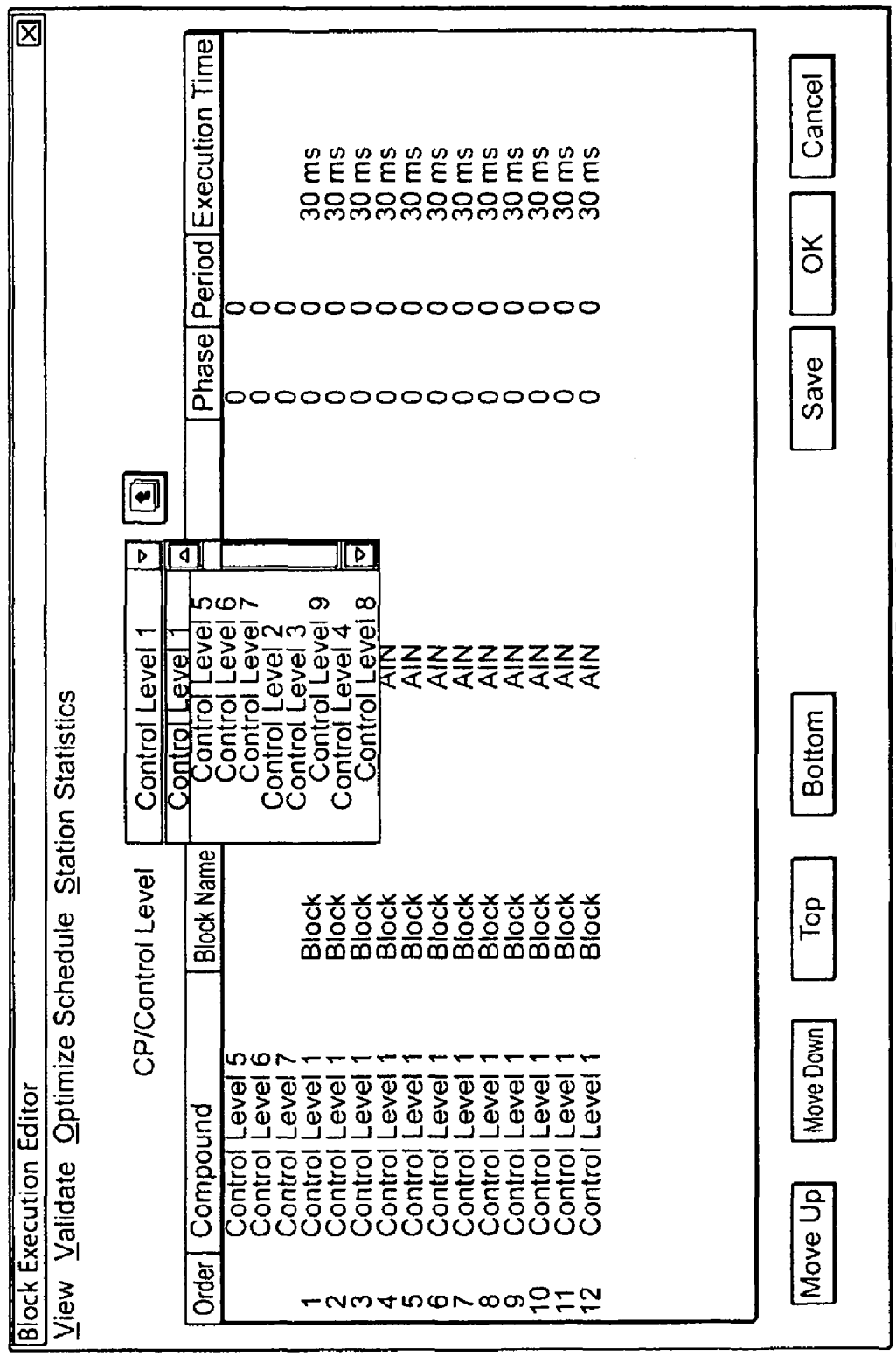
FIG. 63 depicts a block execution scheduler editor in a system according to the invention.

The default Block Execution Editor user interface is as presented in FIG. 63. The user interface is provided as an Grid Editor view. The Block Execution Editor provides two distinct views of control levels and blocks in the tabular grid. The first view displays all blocks for a selected control level, as well as any child control levels of the selected control level which are assigned to the same CP as the selected control level. This view, which is referred to as the control level hierarchy view, is displayed when the Block Execution Editor is invoked from a control level in the Navigation Tree. The second view displays all control levels assigned to a selected CP. This view, which is referred to as the CP Hierarchy view, is displayed when the Block Execution Editor is invoked form a CP in the Navigation Tree.

2.6.2.2 Common User Interface

The user interface provides the name, type, phase, period, relative execution order, and estimated execution time for each block in the list. For each control level in the list, relative execution order, the phase, period, and execution time is displayed. Upon initialization of the Block Execution Editor, the blocks and control levels are sorted by execution order. The user is provided the capability to sort the rows of the grid by block type as well. Resorting is accomplished by selection of the tab at the top the block type or execution order column. Double clicking control level in the list of control levels results in display of that control level's blocks and child control levels. The previously selected control level's blocks and child control levels are removed from the display. The control level schedule editor provides a popup menu to allow the user to invoke the Control Algorithm Diagram Editor from any block in the tabular grid, as well as the property page for any control station, control level or block. Execution Order Modification. The Block Execution Editor provides the user the capability to manually and automatically modify the execution order of blocks and control levels within a CP.

2.6.2.2.1 Manual Modification of Block/Control Level Scheduling Order

The Block Execution Editor provides the user the capability to manually modify the execution order of blocks and control levels within a CP. This may be accomplished in several ways. First, the user may manually modify the period and phase of a selected block or control level or a group of blocks or control levels. This is accomplished by manually editing the period or phase field for the block or control level in the tabular grid. The grid allows inline editing of these fields. A second way to modify the scheduling order is by moving block and control level rows up and down in the grid. Selecting one or more rows in the grid and then selecting the move up, move down, top, or bottom buttons will accomplish this.

2.6.2.2.2 Schedule Optimization Algorithms

The Block Execution Editor will also provide automatic scheduling of blocks based on optimization algorithms. Execution of the schedule optimization algorithms will be user selectable via menu items. Optimization algorithms will include block type and signal flow.

Results of optimization algorithms are displayed in the output window in its own tab. In addition, the Block Execution Editor provides algorithms to perform load leveling for a CP. The Block Execution Editor provides the capability to perform load leveling by compound.

2.6.2.3 Execution Order Validation

The Block Execution Editor provides the user the capability to validate the currently scheduled execution order. The validation is either by phase overrun or signal flow. Phase order validation predicts phase overruns, and reports any overruns to the user. Signal flow validation assesses the relationship of connections and scheduled execution order, and reports any possible conflicts.

Problems
 detected by either type of validation do not prevent the user from assigning execution order, but instead are intended to provide warning of possible scheduling problems. The results of validation are displayed in the output window in its own tab. Execution order validation is made available outside of the Block Execution Editor for use by other applications of the illustrated configuration system, including but not limited to download services.

2.6.2.4 Reassignment of Blocks and Control Levels

The Block Execution Editor provides the capability to reassign blocks to different control levels, as well as reassign control levels to different control stations. This is accomplished by dragging the selected block or control level from the tabular grid and dropping it onto a control level or control station on the Navigation Tree.

2.6.2.5 Station Statistics

Figure 64:
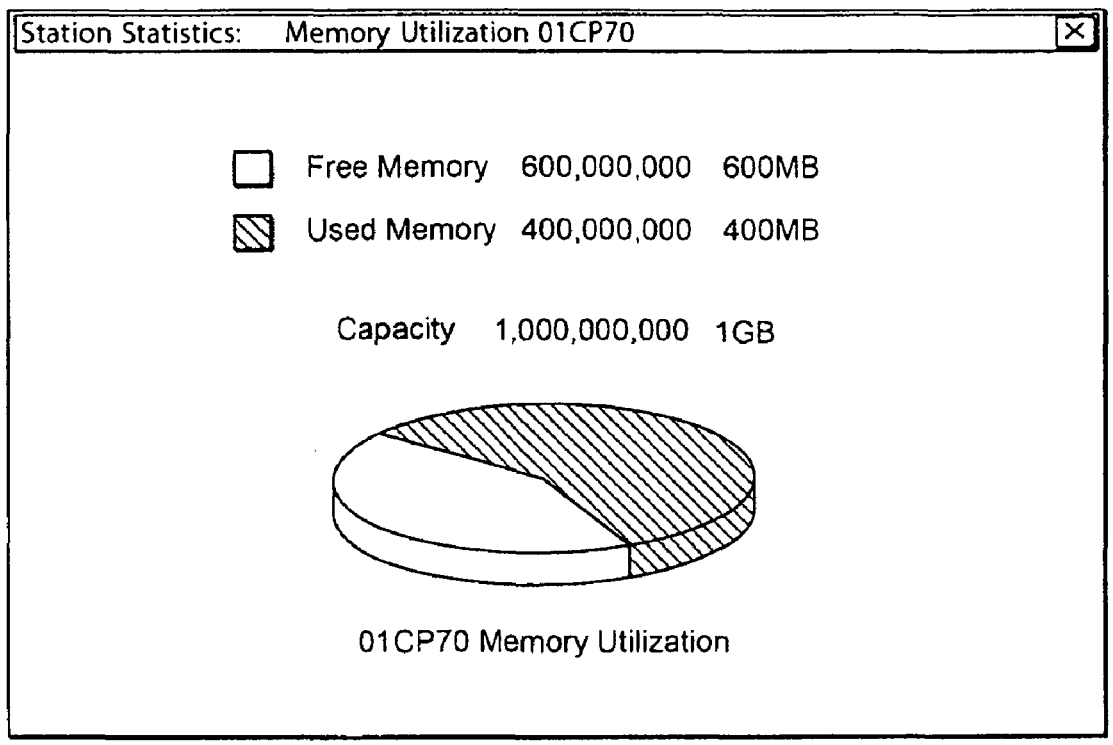
FIG. 64 depicts a station statistics dialog in a system according to the invention.

The Block Execution Editor provides the user the capability to view station statistics for the selected CP. Statistics include total, free, and used station memory (as depicted in FIG. 64), relative phase loading, overall processor load, BPC, and total blocks assigned to CP. The Block Execution Editor provides textual and graphical representation of station statistics.

2.6.3 Tutorials

Tutorials on adjusting the control levels and block process order and phasing are part of the editor.

2.6.4 Object Model

Figure 65:
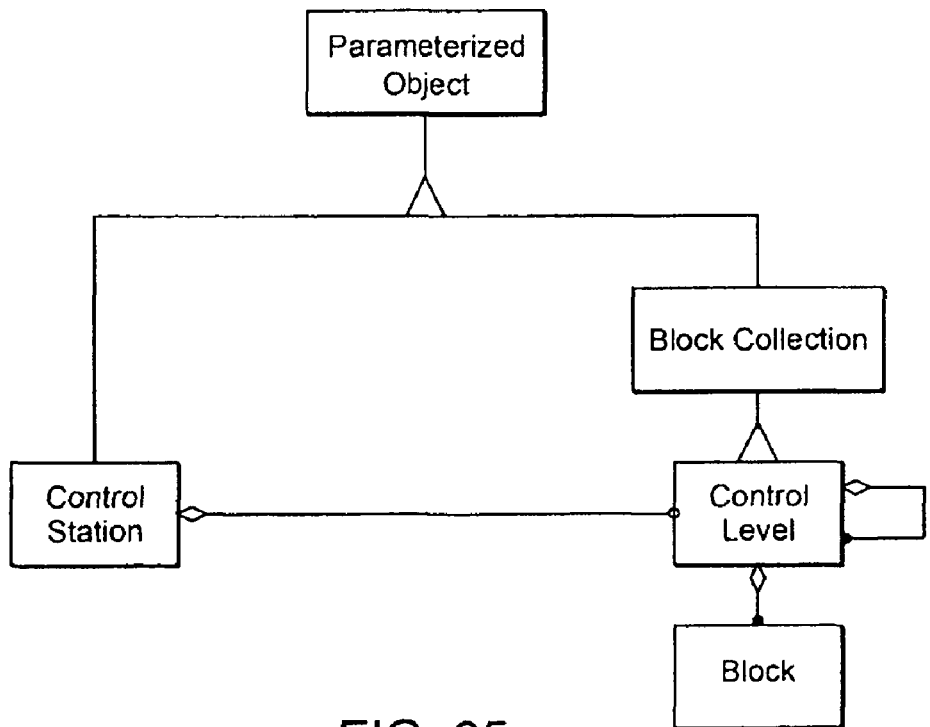
FIG. 65 depicts a block execution editor object model in a system according to the invention.

The object model for Control level and Control Stations/Processors is shown in FIG. 65.

2.6.4.1 Control Station

This class holds an ordered list of control levels associated with a Control Station. Class Relationships:

- Control Station is derived from Parameterized Object Collection, from which it inherits the ability to maintain ordered lists.
- Control Station maintains references to its associated Control levels, which are used to provide access to Control level data.

2.6.4.2 Control Level

This class holds an ordered list of Blocks associated with a Control level. The Block, Loop, and Block Collection classes are discussed in other sections of this document. Class Relationships:

- Control level is derived from Block Collection, from which it inherits the ability to maintain ordered lists.
- Control level maintains a reference to its one associated Control Processor.
- Control level maintains references to an ordered list of associated Blocks, which are used to provide access to Block data.
- Control levels maintain references to an ordered list of child control levels
- Control levels maintain assigned execution order
- Control level maintains references to associated Loops. This association is used by Loops to aid in bulk and default Block assignments to a Control level and by Control levels for "where used" reporting.

2.6.4.3 Blocks

This class holds a reference to the control level to which it is assigned. Blocks maintain a reference to the control level to which they are assigned

2.7 Tag List Editor

2.7.1.1 Overview

The illustrated configuration system supports a Tag List Editor and an ability to create, import, merge, edit and export tag lists, e.g., in the manner disclosed in incorporated-by-reference U.S. Pat. No. 6,754,885 and, particularly, by way of non-limiting example, in Sections 2.7-1.7-2.7.1.3.5 and FIGS. 102-106 thereof, the teachings of which are particularly incorporated herein by reference—all as adapted in accord with the teachings hereof.

2A.1. Field Bus Module Editor

Figure 69:
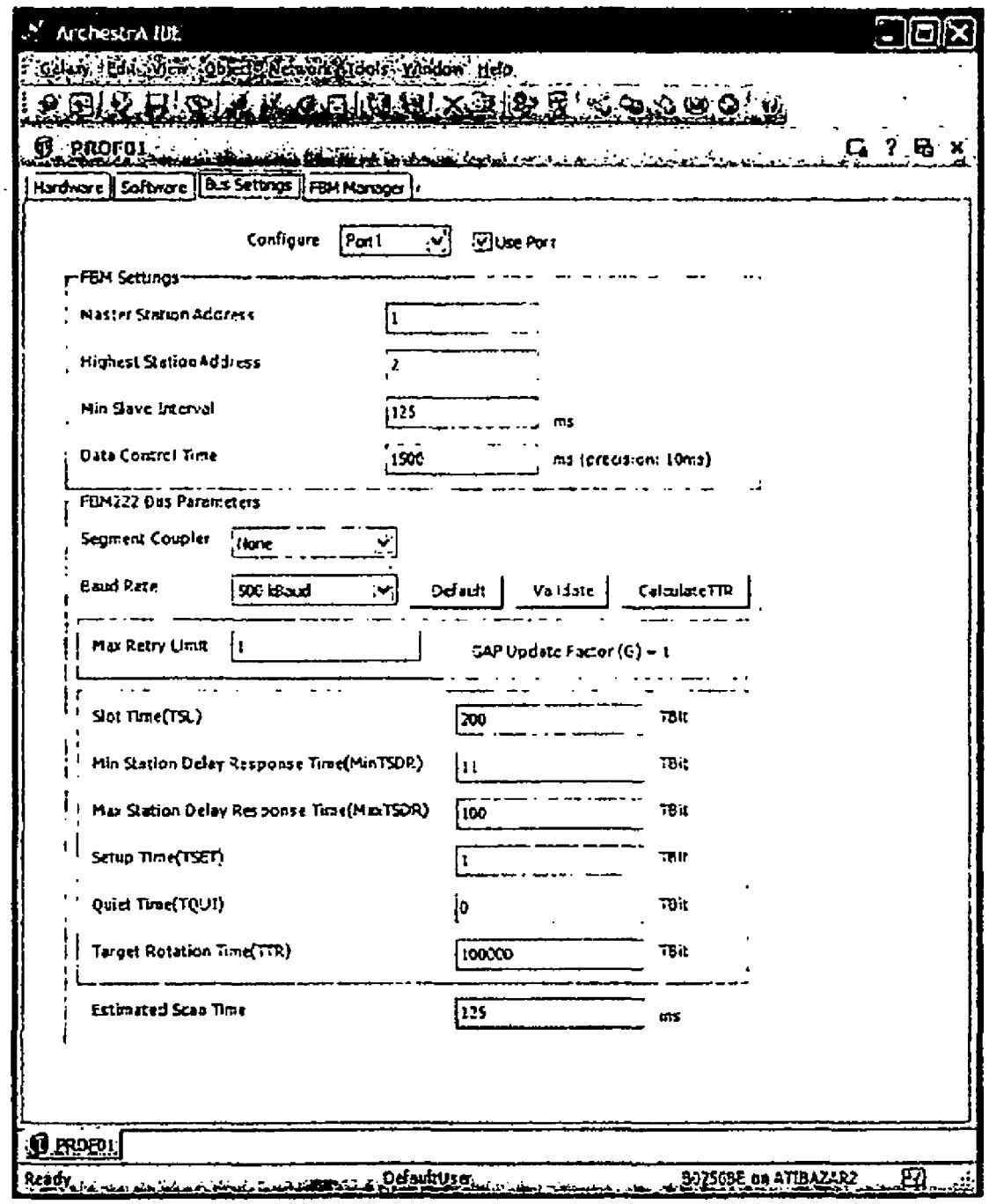
FIGS. 69-70 depict a field bus module editor and a field device editor in a system according to the invention.

Referring to FIG. 69, the Field Bus Module editor permits a user to define and/or modify parameters of objects in the database that represent devices that serve as field bus masters, i.e., devices that configure and/or control communications on field buses 14A or other sections of the network 14 (see FIGS. 1 and 2A-2B). This can include, by way of non-limiting example, parameters defining timings, port assignments and/or other aspects of the configuration of the respective segments that those bus masters are responsible for configuring and/or controlling. As discussed elsewhere herein, the Download Service transfers that configuration information from objects to the devices that they (the objects) model. More particularly, for example, this includes transferring, to the respective bus masters, communications configuration information for their respective segments. At the same time, the Download Service logs those transfers to the change tracking system 16 (e.g., for regulatory compliance, safety considerations, maintenance records, or otherwise).

Through a Direct Download feature of the illustrated embodiment, the Field Bus Module editor also permits users to make direct and immediate (or "real-time") edits of configuration values stored in the bus master devices. Thus, for example, as the user defines and/or modifies parameter values using the editor's dialog boxes and other edit controls, the editor invokes the FDT or other interface (hereinafter, "interface") of the corresponding device to cause those values to be loaded into it (the device) while, at the same time, updating the corresponding model objects so that they maintain an accurate representation of the device. The editor also logs the changes to the change tracking system 19, e.g., in the same manner as the Download Service logs transfers it makes to such devices (e.g., via the use of XML files), as discussed below.

In the illustrated embodiment, objects that represent bus masters are represented via edit panes or edit windows displayed by the field bus module editor representing the object's respective parameter values. The objects may also be represented in other ways (e.g., icons) in other editors of the illustrated configuration system. In the discussion that follows and the accompanying drawings, the editor is shown in use defining and/or modifying the parameters of an object (or objects) representing a single bus master, here, by way of non-limiting example, the so-called "FBM222."

In practice, the capabilities of the Field Bus Module editor discussed below are incorporated into one or more of the editors discussed herein and/or into editors for specific types and/or classes of field bus modules. Indeed, in the example discussed below and shown in the corresponding drawings, the "field bus module editor" is implemented as an editor for a specific such device, again, referred to herein as the "FBM222," which can serve as the bus master of one or more Profibus segments. It will be appreciated that similar functionality can be provided for purposes of configuring that or other devices for use with field bus segments other than Profibus (e.g., Fieldbus Foundation links, Hart segments, Modbus segments, and so forth).

As noted above, the field bus module editor can be employed to define and/or modify configuration parameter values of an object (or objects) so that they may be subsequently downloaded to a corresponding field bus master device. As also noted, the editor can be used in Direct Download mode to provide direct editing of those values on the device. For sake of simplicity, the discussion that follows will focus on use of the editor to view, define and/or modify parameters values in an object. In view of the discussion above and elsewhere herein it will be appreciated that the editor, as well, can be placed in so-called Direct Download mode so that those edits are directly and simultaneously transferred to the device (e.g., through its interface) and logged to the change tracking system.

Referring to FIG. 69, the field bus module editor can be invoked, by way of example, by selecting, in the navigation manager's system tree view (e.g., the "Bus Master (FBM222)" icon shown in FIG. 37), the ID (or name) of device whose modeling objects are to be edited. Or, put another way, upon selecting the device ID in the navigation manager tree view, the field bus module editor displays graphics (and otherwise configures its edit controls) to permit the user to view, define and/or modify configuration parameter values contained in the object (or objects) that model that device.

Illustrated Field Bus Module editor includes panes or tabbed windows by which a user can activate its various configuration functions. In the illustrated embodiment, these include a "Hardware," "Software," "FBM Manager," and "Bus Settings," providing access to those respective functions. Thus, for example, dialog boxes and/or other widgets associated with the "Hardware" tab can be employed by the user to assign a unique system ID to the bus master-representative object (and, thereby, through downloading, to the device itself).

The "FBM Manager" tab can be used to open a live link to the device (e.g., taking advantage of its so-called DTM interface) for purposes of online diagnostics, live list display of Profibus ports, and access to user-configured links to application notes, drawings, specification sheets and other resources for the device. The tab also includes a notepad for collecting diagnostics, troubleshooting tips and other operator information.

The "Bus Settings" tab is used to view, define and/or modify parameters of the bus master-modeling object(s) defining timings, port assignments and/or other aspects of the configuration of the respective segment that the respective bus master device is responsible for configuring and/or controlling. The dialog boxes and other edit controls of that tab are shown in FIG. 69, along with some of the object parameters they are used to set (i.e., view, define and/or modify).

A detailed listing of those parameters, their possible values and preferred instructions for their settings follow:

To configure FBM222 bus parameters:

1. Click the Bus Settings tab.

Bus parameters are set for each port; port 1 is displayed when the tab is selected. The Configure pull-down list at the top of the tab is used to select either Port1 or Port2.

By default the Use Port option is checked and the port is enabled. Uncheck the option box to disable the port.

When the option is not checked, the parameter fields in the tab are grayed out, indicating that they cannot be edited. Note, however, that the values are maintained, and will be displayed when the port is enabled.

2. Click Use Port if the option box is not already checked.

3. Change the default values in the FBM Settings group as needed. The FBM Settings Parameters are described in the table below:

| Field | Description |
| --- | --- |
| Master Station Address | Enter the Profibus network address for the FBM222. The range is 1 to 124 for a redundant FBM, and Ito 125 for a non-redundant FBM. It is recommended that the address he set to 1 (the default), so that the FBM has an address lower than any slave device on the network. When configuring a redundant FBM222, this field determines the address for the module in the Master role; the module in the Tracker role is automatically assigned the next higher number. |
| Highest Station Address | The FBM222 supports multimaster configurations, in which case each FBM222 module and third-party master musthave a unique address on the network served by this port. If the masters are redundant pairs, assign an odd number for each Master Station Address. Specify the highest address that can be assigned to a master address. The range is Master Station Address + 1 to 125. Stations with an address higher than this limit are not involved in token passing. It is a good practice to reserve single-digit network addresses for the Master Stations and Class 2 configurators, and assign slave device addresses in the range 10 to 125. |
| Min Slave Interval | Set the time in milliseconds that the FBM must wait between two consecutive polls of the same device. The purpose of this interval is to ensure that function requests from the FBM can be handled by the slave device. The range is 32 ms to 655350 ms. The default is 125 ms. Entering any value below 32 results in the interval being set to 32 ms.) The value should be greater than or equal to the Minimum Slave Interval parameter of the slowest device on the network. However, the interval for most slave devices is 100 microseconds. and thus the FBM222 default of 125 ms is more than sufficient. The slave device interval is specified in Min Slave interval in the GSD file.. Min Slave Interval should also be smaller than or equal to the watchdog timeout set for the slave devices. |

| Field | Description |
|---|---|
| Data Control Time | Set the maximum time allowed for a data exchange between the FBM and a slave device. The range is 10 ms to 655350 ms. The default is 1500 ms. The value should be greater than or equal to six times the Watchdog time of the slowest device on the network. Refer to "Modifying a DeviceConfiguration" on page 139 for information on setting the slave device parameter.<br>When Field Device Editor validates the FBM222 configuration (the Validate button is active once the slave devices have been added to the port), it displays an error message if the Data Control Time is less than six times the watchdog time of the slowest device on the port. The precision for Data Control Time is 10 ms, and the value you enter is rounded up to the nearest allowed value. |

4. Use the Segment Coupler pull-down to select None or one of the three P+F couplers.

5. Set the network speed using the Baud Rate pull-down list, and then click Default to set the remaining parameters in the group to the defaults for the selected speed. These additional bus parameters are described in the table. These can be modified at this time or adjusted later to respond to specific requirements once the network is in operation. In most cases, the parameters do not need to be modified once they have been set to the defaults for the selected baud rate.

| Field | Description |
|---|---|
| Max Retry Limit | Specify the number of times the FBM will re-attempt to communicate with a slave before determining there is a communications failure. |
| GAP Update Factor | This read-only field shows the number of token rounds between GAP Maintenance cycles. This value is always set to 1. |
| Slot Time | Set the maximum wait in TBits for a slave device to respond to a transaction request. The range is 37 to 16383. |
| Min Station Delay Response Time (MinTSDR) | Enter the minimum time in TBits the FBM should wait before generating a reply frame. The range is 11 to 1023. The FBM222 sends this time to each slave device during startup of the device to ensure that the device does not respond to requests too quickly. |
| Max Station Delay Response Time (MaxTSDR) | Specify the maximum time in TBits the FBM should wait for a slave to process a request and respond. The range is 37 to 65535. The value must be greater than largest Maximum TSDR configured for any slave on the port. |
| Setup Time (TSET) | Set the time in TBits between an event such as a timer being interrupted and the FBM's response to the event. The range is 1 to 494. |
| Quiet Time (TQUI) | Enter the time in TBits the FBM must wait after transmitting a frame before enabling its receiver. The range is 0 to 493. The value should be less than Min Station Delay Response (Min TSDR). |
| Target Rotation Time (TTR) | Set the anticipated time in TBits for one token round on the segment, allowing for both high and low priority transactions, errors and GAP maintenance. The range is 256 to 16777215.<br>In a multimaster environment, each master must be configured for the same target rotation time, and that time must be sufficient for all master stations to complete all their cyclic data exchange tasks. One method for setting this time is to determine the target rotation time for each master as if it were the sole master on the network, and then enter the sum of the individual times as the target rotation time for all the masters. |
| Estimated Scan Time | This read-only field is set to the Min. Slave Interval in ms. |

Validation

The Validate button in the Bus Parameters group becomes active when slave devices are added to the FBM222 configuration. Validation checks the port configuration to verify the following:

The FBM222 and the Profibus devices on the port each have a unique address in the range I to 125.

Max Station Delay Time (MaxTSDR) is less than Time Slot (TSL).

Min Station Delay "Time (MinTSDR) is greater than Quiet Time (TQUI).

The number of slaves on port is less than the number defined by Max_Slaves_suppin the FBM222 GSD file.

The baud rate configured for FBM222 port is supported by all the Profibus devices on the port.

Max Station Delay Time (MaxTSDR) is equal to or greater than the max TSDR from the GSD file of each Profibus device on the port.

Min Slave Interval is less than or equal to the configured watchdog timeout for each of the associated Profibus devices.

Min Slave Interval is less than or equal to the Min_Slave Interval specified in the GSD file of the slowest associated Profibus device on the port.

Data Control Timeout configured for FBM222 port is equal to or greater than six times the configured watchdog timeout for each of the associated Profibus devices.

Validation is performed each time one of the devices or the FBM222 is checked in. Errors are shown in the FBM222 Validation dialog box. A device cannot be deployed if it (or one of its devices) has validation errors. To validate the bus setting for a port on demand:

1. Click Validate to verify that the port configuration is consistent with the devices that are configured in the galaxy, that addresses are unique and within range, and so on. Errors are displayed in a Validation Messages dialog box.

2. Click OK to close the dialog box, edit the settings for the listed device, and run the validation again.

2A.2. Field Device Editor

Figure 70:
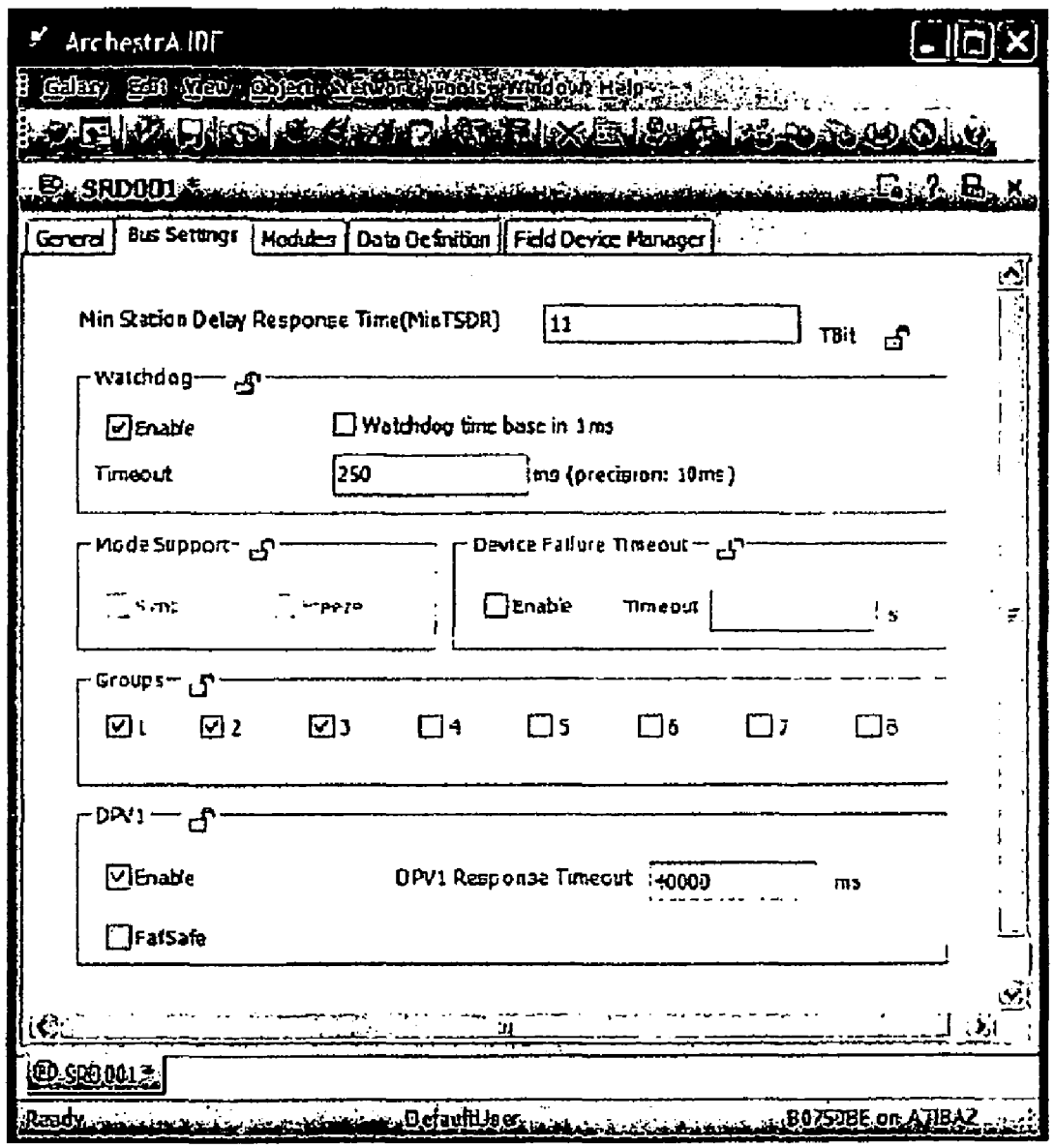

Referring to FIG. 70, the Field Device editor permits a user to define and/or modify parameters of objects in the database that represent devices that serve as field bus slaves, i.e., devices whose communications on field buses 14A or other sections of the network 14 (see FIGS. 1 and 2A-2B) are governed by a bus master device, as discussed above. This can include, by way of non-limiting example, parameters defining timings, port assignments and/or other aspects of the configuration of those segments.

As with the objects representing field bus masters, the Download Service transfers configuration information from objects that represent field bus slaves to the devices that they model. More particularly, for example, this includes transferring, to the respective bus slaves, communications configuration information for their respective segments. At the same time, the Download Service logs those transfers to the change tracking system 16.

As with the field bus module editor discussed above, the Direct Download feature of the illustrated field device editor permits users to make direct and immediate (or "real-time") edits of configuration values stored in the bus slave devices. The editor also logs the changes to the change tracking system 19, e.g., in the same manner as the field bus module editor.

As above, in the illustrated embodiment, objects that represent bus slaves are represented via the edit panes or edit windows displayed by the field bus module editor representing the object's respective parameter values. The objects may also be represented in other ways (e.g., icons) in other editors of the illustrated configuration system. In the discussion that follows and the accompanying drawings, the editor is shown in use defining and/or modifying the parameters of an object (or objects) representing a single bus slave, here, a device named SRD001.

As above, the capabilities of the field device editor discussed below may be incorporated into one or more of the editors discussed herein and/or into editors for specific types and/or classes of field bus modules. It will be appreciated that, as above, similar functionality can be provided for purposes of configuring slaves for that or other devices for use with field bus segments other than Profibus (e.g., Fieldbus Foundation links, Hart segments, Modbus segments, and so forth).

As noted above, the field device editor can be employed to define and/or modify configuration parameter values of an object (or objects) so that they may be subsequently downloaded to a corresponding field slave device. As also noted, the editor can be used in Direct Download mode to provide direct editing of those values on the device. For sake of simplicity, the discussion that follows will focus on use of the editor to view, define and/or modify parameters values in an object. In view of the discussion above and elsewhere herein it will be appreciated that the editor, as well, can be placed in so-called Direct Download mode so that those edits are directly and simultaneously transferred to the device (e.g., through its interface) and logged to the change tracking system.

Referring to FIG. 70, the field device editor can be invoked, by way of example, by selecting, in the navigation manager's system tree view, the ID (or name) of device whose modeling objects are to be edited.

As above, illustrated field device editor includes panes or tabbed windows by which a user can activate its various configuration functions. In the illustrated embodiment, these include a "General," "Modules," "Data Definition," "Field Device Manager," and "Bus Settings," providing access to those respective functions. Thus, for example, the "Modules" tab provides for configuring devices with plug-in modules and displaying fixed I/O configuration of compact devices; the "Data Definition" tab provides inter alia for creation of parameters based on the I/O data in modules selected in the Modules tab, as well as for naming and typing of data points provided by a device or module; the "Field Device Manager" tab can be used to open a live link to the device (e.g., taking advantage of its so-called DTM interface) for purposes of online diagnostics, and so forth.

In particular regard to the "Bus Settings" tab, this, too, is used to view, define and/or modify parameters of the bus slave-modeling object(s) defining timings, port assignments and/or other aspects of the configuration of the respective segment that the respective bus masters device is responsible for configuring and/or controlling. The dialog boxes and other edit controls of that tab are shown in FIG. 70, along with some of the object parameters they are used to set (i.e., view, define and/or modify).

A detailed listing of those parameters, their possible values and preferred instructions for their settings follow:
1. Click the Bus Settings tab.
2. Set the parameters as described in table below.

3. When the parameters have been set, click another tab in the Field Device Editor, or click in the title bar to close the editor, save changes to the device and check the device in.

| Field | Description |
| --- | --- |
| Min Station Delay Response Time (MinTSDR) | Specify the minimum time in TBits the device must wait before generating a response after a transaction request from the FBM222 master (or other bus master). |
| Watchdog | When enabled, the watchdog timer is started each time the slave device receives a communication from the FBM222. If the specified time expires without another communication, the slave automatically switches its outputs to the fail-safe state (as defined in the device). |
| Mode Support | Use the checkboxes in this group to enable or disable two global functions:<br>Freeze: On receiving a Freeze command, the slave device reads its input into a buffer. On the next read request from the FBM, the device sends the contents of the buffer, and ignores any changes in the data since the freeze command.<br>Sync: On receiving a Sync command, the previously transmitted output values are transferred to the output ports. The output values transferred by data exchange are stored and not transferred to the output ports until another Sync command follows or the sync mode is switched off.<br>When enabled, the device responds to sync and freeze commands sent by the FBM to one, several or all slave devices on the port (see Groups below). |
| Device Failure Description | Click the Enable checkbox to configure the FBM222 to disable communications with this device if the device is disconnected for longer than a specified period, and then specify the Timeout period in seconds. The range is 1 to 240 seconds (the default). If the option is not checked or the value is 0, communication remains enabled and the FBM brings the device online when it is re-connected. |
| Groups | Check one or more of the numbered boxes to assign the device to groups that the FBM uses for global commands such as Sync and Freeze. Uncheck a box to exclude the device from the group. |
| Enable DPV1 | Click the checkbox to enable DPV1 functions. |
| DPV1 Response. | Set the time in milliseconds. The range is the C2_Response_Timeout from the GSD file (the default) to 655350 milliseconds<br>The DPV1 Response Timeout should be greater than the C2_Response_Timeout from the device's GSD file. |

2.8 Download/Upload Manager
2.8.1 Overview

Configuration data needs to be exchanged between the Operator Interface (OI) applications of IAS and the illustrated configuration system. This involves loading control algorithms into control stations as well as loading configuration information into OI applications. Loading a list of collection points into a Historian is an example of loading configuration information into OI applications.

The context menu associated with the illustrated configuration system objects includes download selections for appropriate objects. The download selection invokes the Download Manager Editor to select targets for the download and to monitor the download process. Some objects may provide a second non-GUI selection. This non-GUI download function invokes the Download Manager who determines the download target from the selected object and does not provide validation or error recovery. The non-GUI download provides a quick download mechanism for simple downloads such as downloading a control algorithm to a control station.

The Download Manager is a dialog editor of the illustrated configuration system. The Download Manager uses the context of the object from which it was selected to display a list of target systems. The Download Manager interacts with the user to select the download targets, validates configurations, and provides error recovery. The Download Manager uses the Download Service functions for executing the download. Since download involves data transmission either to control stations or OI applications, there are two Download Services, Download Service for Control Stations and Download Service for Applications. Separate sections in this document detail these services.

Similarly to the need to load configuration data into OI applications is the need to merge in OI modified data. The Security Subsystem provides an example of this need. Configuration of the IAS Security Subsystem is through the illustrated configuration system, using the download functions. However, the Security Subsystem contains the ability to change user passwords. The upload functions of the Download-Upload Manager provide the functionality for modifying the illustrated configuration system objects from external sources.

The download functionality requires objects of the illustrated configuration system to be in a checked in state. A user preferably completes modifications to the objects before downloading configuration data. Interactions with control stations in a simulation mode may be an exception to this rule. The upload functions similarly require objects of the illustrated configuration system to be in a checked in state. However, the upload functions force a check out of the object before merging in the uploaded data. The user is responsible for the check in of the modified objects, it is not done automatically by the Download-Upload Manager.

2.8.2 Functions

The Download-Upload Editor is divides into four related categories:

Interaction with the user to define a download.
Interaction with Download Agents to perform the download
Uploading external data, displaying differences, and providing merge functionality.
Error recovery The following subsections describe the user interface displays and functional details.

2.8.2.1 User Interaction

The illustrated configuration system provides the ability to download and upload configuration data to/from applications running in the various hardware stations. Download functions are provided for downloading process displays, historian configuration data, and alarm configuration data to the appropriate stations/applications. Download functions provide options for downloading just the changes or downloading the entire object.

Figure 66:
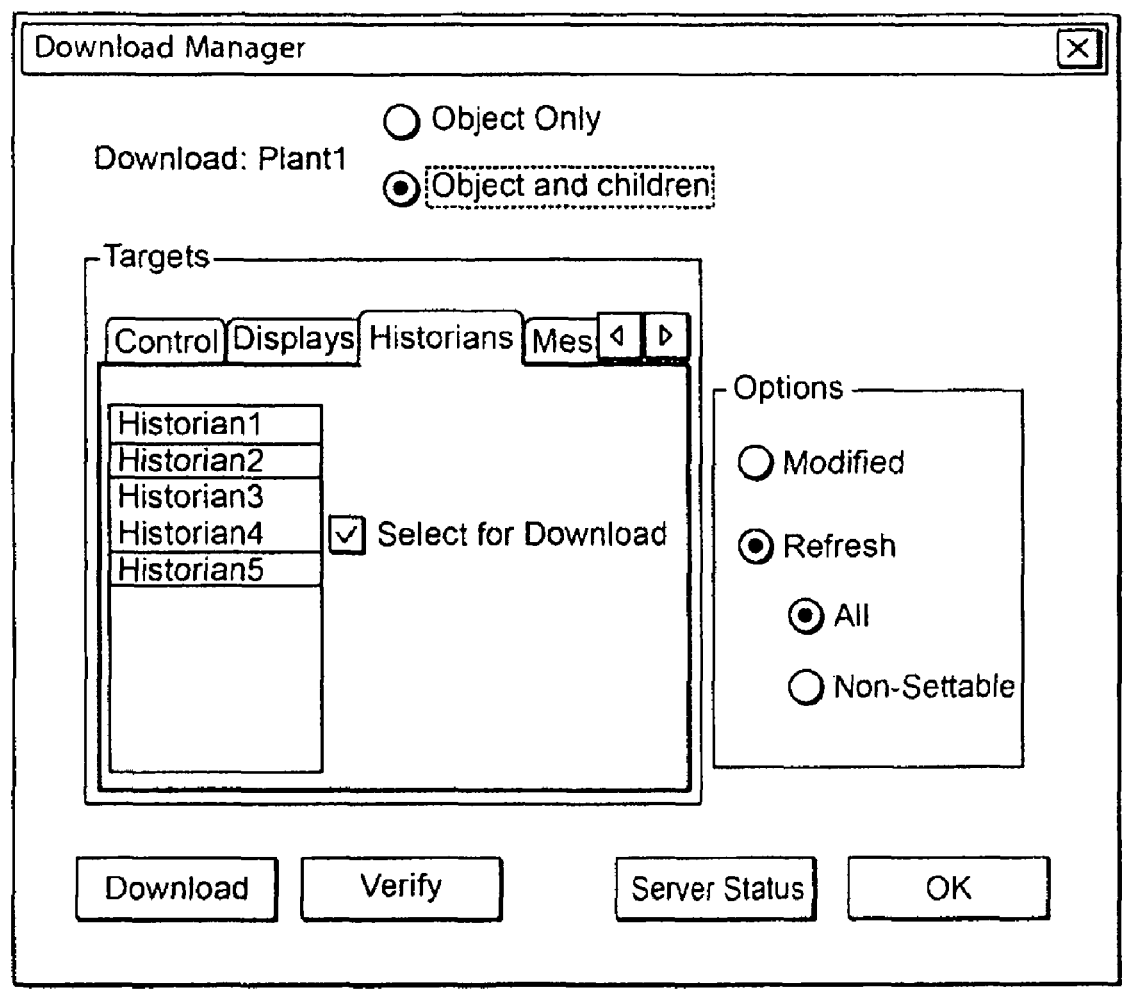
FIG. 66 depicts download target selection in a system according to the invention.

A dialog, such as in FIG. 66, displays the possible targets for downloading the selected object. The dialog is invoked either through a menu selection or through the context menu of an object. The dialog uses the currently selected object in the Navigation Tree to determine the download source. The dialog gives the user the option of downloading just the object selected or the object and all of its children. The object to download, or the object and its children, determine the possible download entities. These targets display as a tab control within the dialog. In FIG. 66 tabs show that control algorithms, FoxView displays, and Message Manager information is available from the Plant1 object or one of its children. Selecting the tab for a download target displays the possible targets for the download. In FIG. 66, a Historian download is selected, displaying a list of all configured Historians. From the list, the user selects the Historians to receive the download. A check box specifies that Historians will download. The user does not have to download to all possible targets or all possible types. If the "Select for Download" check box is unchecked, Historian information does not download. The dialog also allows the user to define what parameters to download, just modified parameters or all parameters. The all parameters choice provides a second choice between downloading all the parameters or downloading the non-user settable parameters. Through these selections the user controls the download process.

A download button initiates the download process. Part of the download process is the verification of the object to download. A second button provides the ability to invoke the object verification without performing a download. It is possible for a download to a target to not complete and remain pending. The Download Service servers maintain the list of pending request. Another button provides the ability to view the queue of pending requests in each server.

2.8.2.1.1 Validation

During the editing process, it is legal for information to be left incompletely defined. The connections between blocks in a loop may be linking to blocks not yet defined. Prior to downloading, the configuration must preferably be completed. The validation process requests each object to validate itself. A window displays information about validation failures. The validation process does not stop after errors are found; the process completes to find all errors. However, if validation finds any errors the download process does not initiate.

2.8.2.1.2 Download Agent—Control Stations

The Control Station Download Agent transmits control algorithms to control stations. The Download Manager invokes the Download Agent for each object to download to a control station. For control algorithms, the target is determined not by the user but by the block to compound assignment and by the compound to control station assignment. For control stations downloads the Download Manager only sends the Download Agent the object to download and the download options.

2.8.2.1.3 Download Agent—Operator Interface Applications

Operator Interface (OI) Download Agents provide extraction of data from objects of the illustrated configuration system for download to Operator Interface (OI) applications. The Download Manager interacts with each OI Download Agent to determine whether the agent interacts with the selected object. If the agent does not interact with the object, then it will not appear in the target tabs. The Download Manager queries each OI Download Agent for a list of potential targets. These targets are displayed in the list control for the target tab. The Download Manager invokes each OI Download Agent selected with the source object and the selected target objects to perform the download.

2.8.2.1.4 Download Progress

As the Download Manager process each object, it provides the user information about the progress. In addition to displaying how many objects have been downloaded, the Download Manager interacts with the Download Agents to display the progress from the Download Agents in processing the requested object.

2.8.2.1.5 Download Server Status

The Download Agents rely on Download Servers to transmit the information to the target systems. A target system may not respond to the server. Rather than fail the entire download, servers may queue up download requests. Whenever the target system becomes available, they communicate with the server to request queued downloads. A dialog, displays the queued requests in a server. This dialog allows the user to remove requests from the pending queue. The dialog is provided by the Download Manager through interactions with the Download Agents.

2.8.2.2 Error Handling

During a download, if a Download Agent reports an error, the user is given the choice whether to continue with the download or whether to stop the download. The Download Manager maintains a record of all initiated downloads in the Model/configuration database. In the event that the illustrated configuration system itself crashes during a download, during subsequent startup, a message reports incomplete downloads. The message allows the user to restart the Download Manager with the interrupted request. Any objects successfully downloaded do not re-download. Status information in each object indicates whether the download completed for that object.

2.8.3 Class Descriptions

Figure 67:
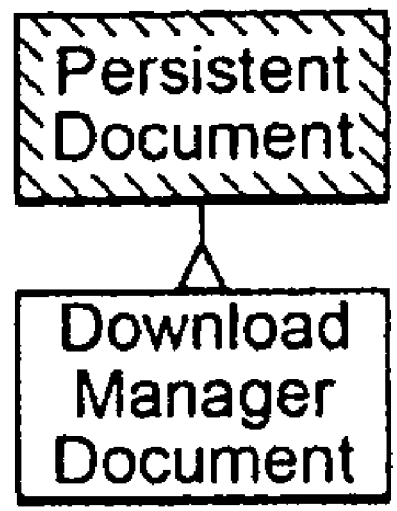
FIG. 67 depicts a download manager document object in a system according to the invention.

Referring to FIG. 67, the Download Manager maintains a persistent document derived from the framework Persistent Document object. The Download Manager Persistent Document maintains information about initiated downloads and their status. This information is used for error recovery. The Download Manager Persistent Document also contains parameters defining the relationship between download types and Download Agents. The Download Manager relies on the objects requesting download services to contain parameters specifying the download types and the OID to a download target.

2.9 Control Station Download Services

2.9.1 Overview

The Control Station Download Services is responsible for downloading control algorithms to IAS control stations. As changes are made to add, modify or delete Blocks, or Control Levels, action records are created by the Block and Control Level objects to keep track of what actions are required to download the changes. Download requests are handled by the Download Agent, which is a non-persistent object created by other objects which have download methods (Blocks, Control Stations, Control Areas). Once the Download Agent is created, the requesting object passes it an OID or a list of OIDs and an argument indicating what type of download operation to perform: download just the required changes, or download all parameters to refresh the Control Station data.

The Download Agent uses the OID(s) to create action records and obtain parameter values from the Control Levels and Blocks and builds an optimized ordered list of actions to ensure proper delete/add sequences and to group actions by Control Station and Control Level. The Agent then contacts the Download Service to request a reference to an ICCAPI object. The Download Service manages Control Station interfaces and creates request queues when there are concurrent download requests for the same Control Station. The Download Service returns either a busy indication (if another Download Agent is currently using the requested Control Station) or a reference to the ICCAPI object created by the Service for a specific Control Station. The Download Agent uses the reference to make the appropriate ICCAPI calls as it processes its Download list. If a busy indication is received (meaning the CP is being accessed by another process), the Download Agent will abort the download and inform the user. Likewise, if any Block download returns an error, the Download Agent will abort the download. The Download Manager will be responsible for querying the user for the next action to take—retry or abort altogether.

As each successful download action is completed, the Agent notifies the Control Level and Block to delete its action record. Upon completing the download request, the Download Agent returns a copy of the OID list to the original object which requested the download, indicating the success or failure of each requested download entry.

As a download is initiated, the Download Agent will mark the associated Control Station as "Downloading". If the download is successful, the Control Station state becomes "Downloaded". In the event of a download failure, the Control Station state will remain "Downloading". At startup of the illustrated configuration system, a check of Control Stations will be made, and if any Control Station indicates a download failure (by having the Control Station state of "Downloading"), the user will be notified of the past download failure.

The Download Agent will also handle requests for Control Station checkpoints and initializations.

Download operations will fully comply with and support the versioning described in Part 1 as versioning becomes available.

2.9.2 Functionality

2.9.3 Download Agent

The Download Agent is a non-persistent object that is temporarily created by objects or editors of the illustrated configuration system to process download requests to Control Stations. The Agent accepts download requests in the form of OIDs (a list of Block or Control Level OIDs, or a Control Area OID) and creates action record information from the Control Levels' Block list to build an optimized list for issuing ICCAPI calls to the respective IAS Control Station. Block ordering is a function of the Control Level. The download request also contains arguments indicating what type of download to perform. The download type argument is used to specify one of the following download actions:

only changes made since the last download all Block parameters

The Download Agent contacts the Download Service to obtain a reference for an ICCAPI object to use for each Control Station. The Agent formats ICCAPI instructions, based on the action records in its optimized list, and invokes the appropriate method of the ICCAPI object to process the actual download to the physical Control Station.

For successful download actions, the Download Agent notifies the respective Block to delete the action record and logs the action as successful in the download request list. Unsuccessful download actions are marked as failed in the download list and further processing is aborted. When the Download Agent is finished processing the download request it passes the original request list, with download status filled in for each entry, back to the original requester. A successful download will be followed by a checkpoint of the Control Station. The Agent then notifies the Download Service when download processing is complete, so that the Service can delete the ICCAPI object.

The Download Agent will process one download request at a time. If the Download Agent is currently downloading, any subsequent attempts to download will be rejected until the current download is complete. To provide a means of recovery in the event of a system or Control Station failure during a download, the Download Agent will mark each object with a "Downloading" attribute just prior to calling the ICCAPI. Once the download of the object is successful, the "Downloading" attribute is cleared. If the download of the object fails, the "Downloading" attribute remains and the download is aborted.

2.9.3.1 Download Service

The Download Service is a service that runs on the Model/configuration database server platform and manages requests to create ICCAPI objects to be used for issuing download actions to specific Control Stations. The Service keeps tracks of which Control Stations are currently in use by Download Agents. If multiple requests for the same Control Station are received, a "busy" error is returned. This error is returned to the calling object, allowing the object to query the user for what action to take—abort the download or wait for the current download for the given Control Station to complete. The Download Service creates ICCAPI objects for specific Control Stations and passes references to these objects back to the requesting Download Agents. Upon receiving notification that a Download Agent has completed its download tasks, it deletes the ICCAPI object. The Download Service processes multiple downloads to multiple different Control Stations at one time. In the event of a Download Agent or network failure, the Download Service terminates a Control Station connection if no communication is received from the station's Download Agent within the preceding three minutes.

2.9.4 Class Descriptions

Figure 68:
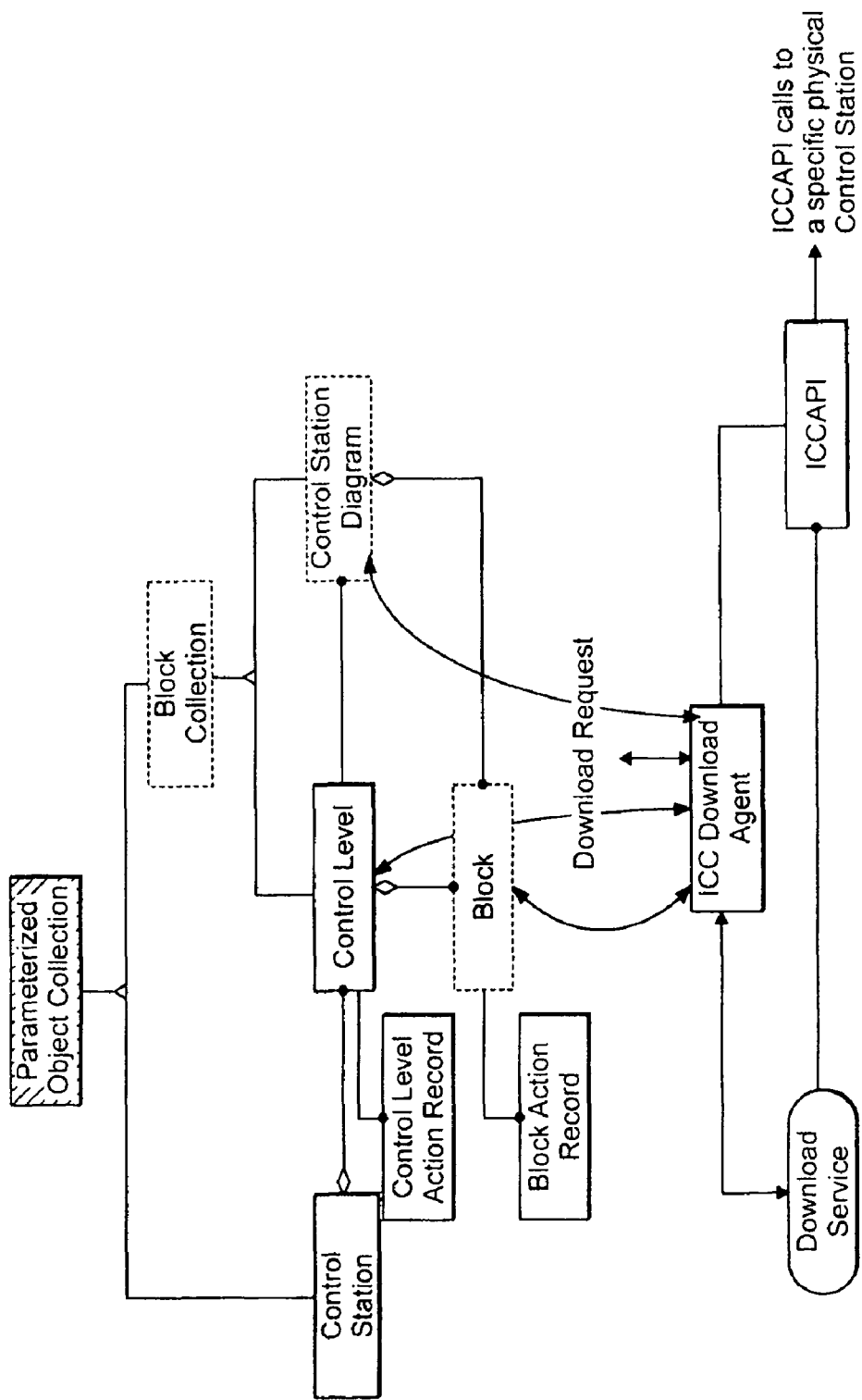
FIG. 68 depicts a download services object model in a system according to the invention.

Since the Download Services only reads and writes existing Application and Framework database objects, it has no object model (aside from the MFC objects used in its implementation and human interface). The verification features of the services use the Framework-supplied revision and change management functions of the objects involved in its operation. See FIG. 68.

2.9.4.1 Blocks

Blocks maintain a status attribute, indicating their current download state:

Downloaded—no modifications since last download
Added—not yet created in a physical Control Station
Deleted—deleted by user, but not yet deleted from the physical Control Station
Modified—changed since previous download
Moved—moved to another Control Level or renamed, but not yet deleted from the physical Control Station The status attribute is kept consistent with any existing action records and is used to indicate to other objects or applications if the Block needs to be downloaded, or if a special visual attribute needs to be set. For instance, the Project Manager would use a special icon on a Tree or List view to indicate that a Block had been deleted, but not yet downloaded.

Blocks add the appropriate action records in response to user actions, including:

Adding a Block
Deleting a Block
Modifying Block Parameters
Reassigning a Block to a different Control Level
Renaming a Block
Changing the Block processing order within a Control Level Blocks also provide the appropriate parameter list and values in response to Download Client requests to download:

New actions—action records not yet processed
All parameters
All non-settable parameters—only those parameters which cannot be modified by operators at run-time Blocks have two-way associations with a Control Level. A Control Level uses its associations to keep an ordered list of its Blocks. A Block uses its association to identify the Control Level to which it is currently assigned. When a Block is re-assigned to another Control Level, it creates a Delete action record that contains the Name and OID of the old Control Level and deletes its association with the old Control Level. It then creates an association with the new Control Level and creates an Add action record with the Name and OID of the new Control Level. The old Control Level maintains its association with the Block until the reassignment is downloaded, at which time the Block notifies the old Control Level to delete its association.

2.9.4.1.1 Block Action Records

Action records are non-persistent objects created in response to users adding, deleting or modifying the Block. They are used to determine what actions are required in response to a download request. Each action record has attributes to indicate:

Action Type:
  Add—download all parameters
  Modify—download only parameters marked as modified since last download, including changed Block processing order within a Loop.
  Delete—delete block from the Control Level
  Block Name—needed to handle cases where Block name is changed
  Control Level Name
  Control Level OID
  Position—Block processing position within a Loop, used by the Download Agent to determine Block position within a Control Level.

Status:
  New—no download action initiated (default state when Record is created)
  Pending—download request is in progress but not yet successfully completed Control Level Name and Control Level OID are used to determine if a delete action requires deleting the Block from the database (Name and OID match) or if the Block should remain in the database, but needs to be deleted from an existing Control Level because the Block has been moved to another Control Level or the Control Level has been renamed (Name and OID do not match). Action record status is used to track progress of download requests. Status is changed from New to Pending when the Block responds to a request for download information from the Download Client.

Action records are deleted by the Block in response to notification from the Download Agent that the action has been successfully completed.

2.9.4.2 Control Levels

Control Levels contain status similar to Blocks and maintain associations with Control Stations similar to the associations Blocks maintain with Control Levels.

2.9.4.2.1 Control Level Action Records

Control Level action records are built similarly to those used for Blocks, except that the Control Station names and OIDs are used in place of the Control Level names and OIDs in the Block action records.

2.9.5 Logging Downloads to the Change Tracking System 2.9.5.1 Change Tracking Service As noted above in connection with the discussion of FIG. 1, change tracking system (CTS) 16 logs configuration information that is downloaded to the control system, e.g., to controllers 10A, 10B and the other control devices (e.g., actuators 18, sensors 24, 26, and other field devices) or controlled apparatus. Illustrated CTS 16 logs information sent to it, e.g., via ports it opens on network 14, and/or otherwise received by it, e.g., via RPC calls, calls to functions it exposes in an applications program interface (API), or otherwise.

More particularly, illustrated CTS accepts XML files generated, e.g., by the Download Service, the field bus module editor and/or the field device editor, that contain textual (e.g. ASCII) or other representations of configuration information downloaded to devices and named to match (or otherwise in accord with) those devices. The textual or other representations contained in those files includes names of the fields, parameters, etc., to which information is downloaded, as well as the values so downloaded. In other embodiments, the change tracking system 16 can accept the information to be logged in other formats (e.g., as appended parameters to HTTP calls on network 14, as fields of remote procedure calls, or otherwise) and/or grouped in other ways (e.g., one file per parameter changed, multiple devices per file, or otherwise).

2.9.5.2 Logging Downloads

As evident above and elsewhere herein, the Download Service downloads configuration information from objects in the model to respective devices of the control system and/or control apparatus. Those downloads can go directly to the respective devices or can go indirectly, e.g., via other devices, such as controllers, field bus modules, as per convention. While in some embodiments of the invention, all attributes and/or parameters associated with the "track" attribute are download, in other embodiments only downloaded are those parameter values (and, more particularly, for example, those attributes) with which the corresponding devices can be configured. In the illustrated embodiment, this is reflected in "device description" files or other databases, data structures and/or lists (typically, for example, provided by device manufacturers and/or by a Process Engineer and/or Process Engineer Administrator, System Administrator or other authorized person) external to the objects and parameters containing the configuration information. Even where downloads (and tracking) may be restricted in accord with settings in such device description files or the like, some embodiments permit those settings to be overridden, e.g., based on the values of "track" or other attributes associated with the model objects and/or parameters, based on user action (e.g., using an editor for download management), or otherwise. Thus, by way of non-limiting example, although the description file associated with a specific device may have settings that would otherwise preclude downloading a particular parameter value (such as, for example, an alarm setting) to that device, the Download Service may be responsive to user action (via and editor or otherwise) and/or a "track" attribute associated with that parameter for overriding the setting and effecting downloading of the parameter (and logging of the downloaded value to the change tracking system).

In connection with transferring configuration information from objects to the devices and apparatus that they (the objects) represent, the Download Service logs that information to the CTS 16. In some embodiments, the Download Service does that for all downloaded information. In the illustrated embodiment, however, it does so for only for those parameters for which the "track" attribute is "true," as defined directly or via inheritance. Continuing with the foregoing examples, it logs to the CTS 16 configuration information transferred to the bus masters and bus slaves pertaining to the respective network segments (e.g., field buses). These are only examples, of course: the Download Service also logs to the CTS 16 other configuration information downloaded to those exemplary devices, as well as configuration information downloaded to other devices in the control system, again, in accord with the "track" attributed of the corresponding parameters.

In the illustrated embodiment, the Download Service logs information to the CTS 16 by generating and transmitting to the CTS on network 14 XML files of the type described above. Thus, for example, in connection with downloading configuration information to a device whose system i.d. is "FBM00222," the Download Service can generate an XML file named, again, for example, "FBM00222.xml" that contains a listing of parameters downloaded to the device, as well as their respective values—or, referring to the Parameter Definition attribute set above, by including in the XML file the "name" attribute of each parameter for which a value is downloaded, as well as that "value" attribute, though, other attributes can be used instead or in addition.

In other embodiments, the Download Service can log changes to the CTS in such other formats and groupings as noted above or otherwise.

2.10 Operator Interface Applications Download Agent and Server

2.10.1 Overview

The Operator Interface (OI) Download Services are responsible for downloading configuration information to IAS applications.

2.10.2 Functionality

2.10.2.1 Download Agents

The Download Agents interact with the Download Manager for user interactions in selecting targets, and providing progress information. The Download Agents rely on the Download Manager for error recovery.

The Download Agents provide a query function used by the Download Manager for determining whether the agent handles the selected source object. The Download Manager passes in an OID for the selected object. The OID's type is tested for determining whether the agent deals with the object. The agent also checks child collections of the object if the Download Manager specifies the children option.

For source objects which the Download Agent handles, the Download Agent returns the list of possible target stations. The Download Agents return either a string array of names or a list of object definitions. If object definitions are returned, the Download Manager displays all instances of the object definition.

Once a download initiates, the Download Agents interact with the source objects to extract information as needed by the OI application. This information is replicated to all target systems using the Replication Server. During the download process, the Download Agents interact with the Download Manager to display progress information.

2.10.2.2 Download Service

The Download Service for OI downloads is comprised of two applications. The first application is a generic application which replicates data files, created by the Download Agents, to a specified list of targets. The second application is specific to OI applications and performs the needed functionality to import the replicated data into the OI application. The OI import application is specific to each OI application. Responsibility for the implementation of the import services resides with the OI application team. The Download Agent may interact directly with an OI Application Server to import the data, without invoking replication services, if appropriate.

2.10.3 Class Descriptions

The Download Agents are transient classes with no object definitions. The interaction between the Download Agents and the objects is through the parameterized object interface. Specific parameters are extracted from the objects to create the OI Application data set. The parameters to extract are either predetermined by the Download Agent or specified as a parameter group in the object.

2.11 Historian Collection Point Editor

The illustrated configuration system supports historian, e.g., in the manner disclosed in incorporated-by-reference U.S. Pat. No. 6,754,885 and, particularly, by way of non-limiting example, in Sections 2.11-2.11.4.1 and FIGS. 110-112 thereof, the teachings of which are particularly incorporated herein by reference—all as adapted in accord with the teachings hereof.

2.12 Enclosure Editor

The illustrated configuration system supports an Enclosure Loading Editor, e.g., in the manner disclosed in incorporated-by-reference U.S. Pat. No. 6,754,885 and, particularly, by way of non-limiting example, in Sections 2.12-2.12.3.14 and FIGS. 113-118 thereof, the teachings of which are particularly incorporated herein by reference—all as adapted in accord with the teachings hereof.

2.13 Reports

The illustrated configuration system supports reporting, e.g., in the manner disclosed in incorporated-by-reference U.S. Pat. No. 6,754,885 and, particularly, by way of non-limiting example, in Sections 2.13-2.13.6 and the accompanying drawings thereof, the teachings of which are particularly incorporated herein by reference—all as adapted in accord with the teachings hereof.

3 Framework Services

The illustrated configuration system supports framework, e.g., in the manner disclosed in incorporated-by-reference U.S. Pat. No. 6,754,885 and, particularly, by way of non-limiting example, in Sections 3-3.1.6 and FIGS. 119-121 thereof, the teachings of which are particularly incorporated herein by reference—all as adapted in accord with the teachings hereof.

Described above are methods and apparatus meeting the objects and goals set thereforth. Those skilled in the art will appreciate that the embodiments shown in the drawings and described in the accompanying text are merely examples and that other embodiments, incorporating modifications and changes therein, fall within the scope of the invention. Thus, by way of non-limiting example, it will appreciated that other programming constructs such as, by non-limiting example, records, "structs," arrays, and tables, may be utilized in place of the data structures referred to as "objects" above. By way of further non-limiting example, methods and apparatus according to the invention can be used to model and configure control systems other than those used for process control such as, by non-limiting example, environmental control systems.

In view thereof, what we claim is:

1. Apparatus for configuring a control system, comprising
   A. a model comprising one or more objects representing one or more devices of a control system,
   B. at least one of the objects representing at least one device ("bus master") that defines and/or controls communications on at least a portion of a network ("segment") over which at least one of the devices communicates, the at least one object including information defining a configuration of the segment,
   C. a download service that is coupled to the model and to the control system and that transfers to the control system at least selected configuration information from objects in the model,
   D. a change tracking system that is in communications coupling with the download service,
   E. the download service transferring to the bus master communications configuration information for the segment and wherein a track attribute of the object indicates whether the object reports its downloading to the device in the control system.

2. The apparatus of claim 1, wherein the change tracking system logs for any of retrieval and reporting configuration information received by it.

3. The apparatus of claim 1, wherein the download service transfers to one or more of the devices, in addition to bus master, configuration information from objects in the model.

4. The apparatus of claim 3, wherein the download service generates for logging by the change tracking system indicia of the information transferred to the devices in the control system.

5. The apparatus of claim 1, wherein the at least one object representing the bus master includes information defining timing of information transfers on the segment.

6. The apparatus of claim 1, wherein the at least one object representing the bus master includes information defining one or more of the following aspects of configuration of the segment: a master station address, a highest station address that can be assigned to the master address, a minimum slave interval, a data control time, a data transfer rate, a maximum retry limit, a GAP update factor, a slot time, a minimum station delay response time, a maximum station delay response time, a setup time, a quiet time, a target rotation time.

7. The apparatus of claim 1, wherein at least one of the objects represents at least one slave device ("bus slave") in communications with the bus master over the segment.

8. The apparatus according to claim 7, wherein the download service transfers to the bus slave communications configuration information for the segment and generates for logging by the change tracking system indicia of the configuration information transferred to the bus slave.

9. The apparatus of claim 1, wherein the at least one object representing the bus slave includes information defining timing of information transfers on the segment.

10. The apparatus of claim 1, wherein the at least one object representing the bus slave includes information defining one or more of the following aspects of configuration of the segment: a minimum station delay response time, a watchdog time, Sync and Freeze mode support, a device failure timeout, groups definition, a DPV1 response timeout, and a failsafe flag.

11. The apparatus of claim 1, wherein the download service generates one or more XML files for transmission to the change tracking system in order to convey indicia of the information transferred to the bus slave.

12. The apparatus of claim 1, wherein the indicia of the information transferred to the bus master include names and values of configuration parameters.

13. Apparatus for configuring a control system, comprising
    A. a model comprising one or more objects representing one or more devices of a control system,
    B. at least one of the objects representing at least one device ("bus slave") on a portion of a network ("segment") that is defined and/or controlled by another device ("bus master"), the at least one object including information defining a configuration of the segment,
    C. a download service that transfers to the control system at least selected configuration information from objects in the model,
    D. the download service transferring to the bus slave communications configuration information for the segment and wherein a track attribute of the object indicates whether the object reports its downloading to the device in the control system.

14. The apparatus of claim 13, wherein the change tracking system is coupled to at least the download service and logs for any of retrieval and reporting configuration information received by it.

* * * * *